US012173962B2

(12) United States Patent
Zielinski et al.

(10) Patent No.: US 12,173,962 B2
(45) **Date of Patent: *Dec. 24, 2024**

(54) METHODS AND APPARATUSES FOR DRYING ELECTRONIC DEVICES

(71) Applicant: REVIVE ELECTRONICS, LLC, Fishers, IN (US)

(72) Inventors: Reuben Zielinski, Fishers, IN (US); Joel Trusty, Fishers, IN (US); David Douberteen, Indianapolis, IN (US); Mark Earle, Fishers, IN (US); Imran Arain, Indianapolis, IN (US); James M. Shrake, Anderson, IN (US); Evan Zaldivar, Carmel, IN (US); Babu Gopala Krishna Santhosh Kadambari, Carmel, IN (US); Matt Earl Hay, Zionsville, IN (US); Jim Eugene McMeel, Carmel, IN (US)

(73) Assignee: Revive Electronics, LLC, Fishers, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/228,504

(22) Filed: Jul. 31, 2023

(65) Prior Publication Data

US 2023/0375270 A1 Nov. 23, 2023

Related U.S. Application Data

(60) Continuation of application No. 17/134,492, filed on Dec. 27, 2020, now Pat. No. 11,713,924, which is a (Continued)

(51) Int. Cl.

*F26B 25/22* (2006.01)
*F26B 3/02* (2006.01)

(Continued)

(52) U.S. Cl.

CPC ................ *F26B 25/22* (2013.01); *F26B 3/02* (2013.01); *F26B 3/20* (2013.01); *F26B 5/04* (2013.01);

(Continued)

(58) Field of Classification Search

CPC .... F26B 25/22; F26B 3/02; F26B 3/20; F26B 5/04; F26B 9/06; F26B 9/106; F26B 23/04

(Continued)

(56) References Cited

U.S. PATENT DOCUMENTS

| | | |
|---|---|---|
| 1,854,956 A | 4/1932 | Reeve |
| 1,854,958 A | 4/1932 | Santosuosso |

(Continued)

FOREIGN PATENT DOCUMENTS

| | | |
|---|---|---|
| AU | 2003100364 | 7/2003 |
| CA | 2050668 A1 | 3/1992 |

(Continued)

OTHER PUBLICATIONS

International Search Report and Written Opinion dated Feb. 25, 2019 in cinnection with International Application No. PCT/US2018/058492, 7 pages.

(Continued)

*Primary Examiner* — Stephen M Gravini

(74) *Attorney, Agent, or Firm* — Baker & McKenzie LLP

(57) ABSTRACT

Methods and apparatuses for drying electronic devices are disclosed. An exemplary method comprises: placing a portable electronic device into a drying chamber; providing a first air channel, wherein the first air channel connects the drying chamber, a pressure-generating device, and a moisture-reducing device; generating a first air flow through the first air channel using the pressure-generating device; removing a first moisture from an interior of the portable (Continued)

electronic device to an exterior of the portable electronic device; detecting moisture removed from the portable electronic device; pausing the generating the first air flow through the first air channel based on the amount of moisture; providing a second air channel, wherein the second air channel connects the moisture-reducing device, the pressure-generating device, a valve, and an evacuation channel; generating a second air flow through the second air channel using the pressure-generating device; and removing a second moisture from the moisture-reducing device.

20 Claims, 74 Drawing Sheets

Related U.S. Application Data continuation of application No. 16/854,862, filed on Apr. 21, 2020, now Pat. No. 10,876,792, which is a continuation-in-part of application No. 16/575,306, filed on Sep. 18, 2019, now Pat. No. 10,690,413, which is a continuation-in-part of application No. 16/363,742, filed on Mar. 25, 2019, now Pat. No. 10,928,135, which is a continuation of application No. 15/979,446, filed on May 14, 2018, now Pat. No. 10,240,867, which is a continuation-in-part of application No. 15/811,633, filed on Nov. 13, 2017, now Pat. No. 9,970,708, which is a continuation-in-part of application No. 15/688,551, filed on Aug. 28, 2017, now Pat. No. 9,816,757, which is a continuation of application No. 15/478,992, filed on Apr. 4, 2017, now Pat. No. 9,746,241, which is a continuation of application No. 15/369,742, filed on Dec. 5, 2016, now Pat. No. 9,644,891, which is a continuation-in-part of application No. 14/213,142, filed on Mar. 14, 2014, now Pat. No. 9,513,053, said application No. 15/369,742 is a continuation-in-part of application No. 14/665,008, filed on Mar. 23, 2015, now Pat. No. 9,683,780, which is a division of application No. 13/756,879, filed on Feb. 1, 2013, now Pat. No. 8,991,067, said application No. 16/575,306 is a continuation-in-part of application No. 15/632,218, filed on Jun. 23, 2017, now Pat. No. 10,651,643, which is a continuation of application No. PCT/US2015/000239, filed on Dec. 23, 2015, said application No. 15/632,218 is a continuation-in-part of application No. 14/903,886, filed as application No. PCT/US2014/046151 on Jul. 10, 2014, now abandoned, said application No. 16/854,862 is a continuation-in-part of application No. 15/799,110, filed on Oct. 31, 2017, now Pat. No. 10,697,701, and a continuation-in-part of application No. PCT/US2018/058492, filed on Oct. 31, 2018, which is a continuation-in-part of application No. 15/799,110, filed on Oct. 31, 2017, now Pat. No. 10,697,701.

(60) Provisional application No. 61/782,985, filed on Mar. 14, 2013, provisional application No. 61/638,599, filed on Apr. 26, 2012, provisional application No. 61/593,617, filed on Feb. 1, 2012, provisional application No. 62/095,997, filed on Dec. 23, 2014, provisional application No. 61/844,654, filed on Jul. 10, 2013.

(51) Int. Cl.
*F26B 3/20* (2006.01)
*F26B 5/04* (2006.01)
*F26B 9/06* (2006.01)
*F26B 9/10* (2006.01)
*F26B 23/04* (2006.01)

(52) U.S. Cl.
CPC ................ *F26B 9/06* (2013.01); *F26B 9/106* (2013.01); *F26B 23/04* (2013.01)

(58) Field of Classification Search
USPC ............................................................ 34/403
See application file for complete search history.

(56) References Cited

U.S. PATENT DOCUMENTS

| | | | |
|---|---|---|---|
| 2,496,054 | A | 1/1950 | Hoyler |
| 2,846,710 | A | 8/1958 | Haka |
| 3,302,303 | A | 2/1967 | Marcel |
| 3,698,098 | A | 10/1972 | Ramsay |
| 3,721,101 | A | 3/1973 | Sheppard |
| 3,897,604 | A | 8/1975 | Weimer |
| 3,932,944 | A | 1/1976 | Chiba |
| 4,020,563 | A | 5/1977 | Hoefer |
| 4,054,376 | A | 10/1977 | Wareham |
| 4,386,471 | A | 6/1983 | Bowrey et al. |
| 4,395,830 | A | 8/1983 | Lockwood |
| 4,464,582 | A | 8/1984 | Aragaki et al. |
| 4,515,751 | A | 5/1985 | Krieg, Jr. |
| 4,558,206 | A | 12/1985 | Ball |
| 4,589,971 | A | 5/1986 | Mayeaux |
| 4,704,805 | A | 11/1987 | Kaya et al. |
| 4,733,428 | A | 3/1988 | Malinge et al. |
| 4,882,851 | A | 11/1989 | Wennerstrum et al. |
| 5,005,410 | A | 4/1991 | Webster et al. |
| 5,038,494 | A | 8/1991 | Lundquist et al. |
| 5,067,251 | A | 11/1991 | Zlobinsky et al. |
| 5,122,344 | A | 6/1992 | Schmoegner |
| 5,172,488 | A | 12/1992 | Okane et al. |
| 5,203,859 | A | 4/1993 | Khinkis et al. |
| 5,222,307 | A | 6/1993 | Oba et al. |
| 5,293,697 | A | 3/1994 | Kawakami |
| 5,318,164 | A | 6/1994 | Barnes et al. |
| 5,335,703 | A | 8/1994 | deJong |
| 5,343,747 | A | 9/1994 | Rosen |
| 5,349,543 | A | 9/1994 | Buliszyn et al. |
| 5,349,845 | A | 9/1994 | Blom |
| 5,376,392 | A | 12/1994 | Ikegami et al. |
| 5,377,425 | A | 1/1995 | Kawakami et al. |
| 5,456,025 | A | 10/1995 | Joiner et al. |
| 5,548,905 | A | 8/1996 | Kuma et al. |
| 5,578,753 | A | 11/1996 | Weiss et al. |
| 5,625,962 | A | 5/1997 | Fleissner |
| 5,636,446 | A | 6/1997 | Mae et al. |
| 5,640,783 | A | 6/1997 | Schumaier |
| 5,671,546 | A | 9/1997 | Haala |
| 5,671,548 | A | 9/1997 | Blaschka |
| 5,715,612 | A | 2/1998 | Schwenkler |
| 5,732,478 | A | 3/1998 | Chapman et al. |
| 5,852,879 | A | 12/1998 | Schumaier |
| 5,884,006 | A | 3/1999 | Frohlich et al. |
| 5,889,466 | A | 3/1999 | Ferguson |
| 5,992,049 | A | 11/1999 | Trost |
| 6,025,580 | A | 2/2000 | Yagi |
| 6,039,696 | A | 3/2000 | Bell |
| 6,067,727 | A | 5/2000 | Muraoka |
| 6,122,836 | A | 9/2000 | Tenedini et al. |
| 6,170,171 | B1 | 1/2001 | Schmidbauer et al. |
| 6,185,839 | B1 | 2/2001 | Kholodenko et al. |
| 6,266,123 | B1 | 7/2001 | Maejima et al. |
| 6,372,508 | B1 | 4/2002 | Shnizer et al. |
| 6,399,920 | B1 | 6/2002 | Guinn |
| 6,470,593 | B1 | 10/2002 | Seo |
| 6,508,599 | B2 | 1/2003 | Blume |
| 6,530,160 | B1 | 3/2003 | Gookins |
| 6,551,552 | B1 | 4/2003 | Lyublinski et al. |
| 6,552,308 | B2 | 4/2003 | Nishimura |
| 6,557,268 | B1 | 5/2003 | Berg et al. |
| 6,568,249 | B2 | 5/2003 | Devine |

(56) References Cited

U.S. PATENT DOCUMENTS 6,622,399 B1 9/2003 Theriault et al.
6,625,900 B1 9/2003 Tobias
6,652,744 B2 11/2003 Lutze et al.
6,675,636 B2 1/2004 Sadler
6,760,981 B2 7/2004 Leap
6,821,025 B2 11/2004 Gerhard
6,834,443 B2 12/2004 Bloemendaal
6,874,247 B1 4/2005 Hsu
6,893,530 B2 5/2005 Kishimoto et al.
6,938,359 B2 9/2005 Bigersson et al.
6,943,325 B2 9/2005 Pittman et al.
7,017,276 B2 3/2006 Greenspan et al.
7,050,837 B2 5/2006 Menz et al.
7,182,820 B2 2/2007 Campbell et al.
7,194,822 B2 3/2007 Kolari
7,205,900 B2 4/2007 Liu et al.
7,243,857 B2 7/2007 Kallestad
7,418,970 B2 9/2008 Sugimoto et al.
7,460,350 B2 12/2008 Talbot et al.
7,493,705 B2 2/2009 Gomi
7,557,466 B2 7/2009 Wong et al.
7,594,343 B2 9/2009 Woerdehoff et al.
7,612,315 B2 11/2009 Corradini
7,631,538 B2 12/2009 Imhof
7,665,226 B2 2/2010 Tsuruta et al.
7,814,678 B2 10/2010 Romanek
7,992,318 B2 8/2011 Kawaji et al.
8,058,588 B2 11/2011 Gagas et al.
8,108,074 B2 1/2012 Boder
8,112,900 B2 2/2012 Romanek
8,203,689 B2 6/2012 Gomi
8,281,499 B2 10/2012 Friesen et al.
8,355,233 B2 1/2013 Schumacher et al.
8,416,542 B2 4/2013 Nakamura
8,446,049 B2 5/2013 Lee
8,498,087 B2 7/2013 Rabu et al.
8,689,461 B1 4/2014 Cookson et al.
8,886,971 B2 11/2014 Chuang
8,991,067 B2 3/2015 Zielinski et al.
9,071,046 B2 6/2015 Stevens et al.
9,488,564 B2 11/2016 Zielinski et al.
9,488,565 B2 11/2016 Zielinski et al.
9,513,053 B2 12/2016 Zielinski et al.
9,644,891 B2 5/2017 Zielinski et al.
9,683,780 B2 6/2017 Zielinski et al.
9,709,327 B2 7/2017 Marchiori
9,746,241 B2 8/2017 Zielinski et al.
9,816,757 B1 11/2017 Zielinski et al.
9,970,708 B2 5/2018 Zielinski et al.
10,074,667 B1 9/2018 Tigashi et al.
10,240,867 B2 3/2019 Zielinski et al.
10,690,413 B2 6/2020 Zielinski et al.
11,713,924 B2 * 8/2023 Zielinski ................. F26B 23/04
34/92
2001/0025431 A1 10/2001 Kitano et al.
2001/0040667 A1 11/2001 Sasaki
2001/0045421 A1 11/2001 Sullivan
2002/0047587 A1 4/2002 Lee et al.
2003/0019124 A1 1/2003 Miyakawa et al.
2003/0115768 A1 6/2003 Hoffman
2003/0116975 A1 6/2003 Cole
2003/0160681 A1 8/2003 Menard et al.
2003/0227550 A1 12/2003 Manico et al.
2004/0050076 A1 3/2004 Palfy et al.
2004/0079136 A1 4/2004 Pillion
2004/0082886 A1 4/2004 Timpson
2004/0098811 A1 5/2004 Tuttle et al.
2004/0186620 A1 9/2004 Chirnomas
2005/0044744 A1 3/2005 Tadano
2005/0079888 A1 4/2005 Menz et al.
2005/0081890 A1 4/2005 Ato et al.
2005/0112040 A1 5/2005 Hasegawa et al.
2005/0217136 A1 10/2005 Blankenship et al.
2005/0218239 A1 10/2005 Busch
2005/0285748 A1 12/2005 Pedraza et al.
2006/0029730 A1 2/2006 Campbell et al.
2006/0058069 A1 3/2006 Garcia et al.
2006/0137213 A1 6/2006 Asuke
2006/0164772 A1 7/2006 Guo
2006/0208914 A1 9/2006 Liu et al.
2006/0236559 A1 10/2006 Mori
2006/0255166 A1 11/2006 Imamura et al.
2006/0277782 A1 12/2006 Chen
2007/0033824 A1 2/2007 Okajima et al.
2007/0199203 A1 8/2007 Federico
2007/0225863 A1 9/2007 Gross et al.
2007/0258870 A1 11/2007 Brown et al.
2007/0271811 A1 11/2007 Tsuruta et al.
2008/0013241 A1 1/2008 Wong et al.
2008/0055235 A1 3/2008 Tanaka
2008/0063809 A1 3/2008 Lee et al.
2008/0083723 A1 4/2008 Tsukamoto et al.
2008/0200779 A1 8/2008 Zimmerling et al.
2008/0204218 A1 8/2008 Tupman
2008/0233018 A1 9/2008 van Dam et al.
2008/0256822 A1 10/2008 Suzuki et al.
2008/0281528 A1 11/2008 Relle, Jr.
2009/0019718 A1 1/2009 Mittleman et al.
2009/0022434 A1 1/2009 Chiba et al.
2009/0077825 A1 3/2009 Toofan et al.
2009/0090022 A1 4/2009 Ho et al.
2009/0145783 A1 6/2009 Forker
2009/0158614 A1 6/2009 Singh et al.
2009/0227118 A1 9/2009 Liu et al.
2009/0272176 A1 11/2009 Lopez et al.
2009/0273480 A1 11/2009 Mittleman et al.
2010/0011609 A1 1/2010 Park et al.
2010/0032600 A1 2/2010 Doe et al.
2010/0040213 A1 2/2010 Park et al.
2010/0088922 A1 4/2010 Romanek
2010/0095504 A1 4/2010 Slack et al.
2010/0097642 A1 4/2010 Sumi
2010/0103566 A1 4/2010 Chen
2010/0122470 A1 5/2010 Davis et al.
2010/0206096 A1 8/2010 Lee et al.
2010/0273477 A1 10/2010 Namaky
2010/0304091 A1 12/2010 Wang
2011/0047814 A1 3/2011 Watson et al.
2011/0060945 A1 3/2011 Leprince et al.
2011/0061477 A1 3/2011 Fitz
2011/0067262 A1 3/2011 Eero
2011/0099831 A1 5/2011 Parisi et al.
2011/0104940 A1 5/2011 Rabu et al.
2011/0137607 A1 6/2011 Hsieh
2011/0219640 A1 9/2011 Latos
2011/0247233 A1 10/2011 Bland
2011/0279931 A1 11/2011 Nakamura
2012/0020015 A1 1/2012 Tian et al.
2012/0038374 A1 2/2012 Johnson
2012/0079100 A1 3/2012 McIntyre et al.
2012/0085324 A1 4/2012 Saito et al.
2012/0132360 A1 5/2012 Damm
2012/0171462 A1 7/2012 Tsai
2012/0231841 A1 9/2012 Niederberger et al.
2012/0304483 A1 12/2012 Sirard et al.
2013/0055585 A1 3/2013 Fujiwara
2013/0073690 A1 3/2013 DeSalvo et al.
2013/0088094 A1 4/2013 Paik
2013/0096375 A1 4/2013 Iyama et al.
2013/0111227 A1 5/2013 Sauerwein, Jr.
2013/0151870 A1 6/2013 Chuang
2013/0167874 A1 7/2013 Mittleman et al.
2013/0182360 A1 7/2013 Stevens et al.
2013/0192083 A1 8/2013 Zielinski et al.
2013/0207455 A1 8/2013 Doljack
2013/0287213 A1 10/2013 Sekiyama
2013/0294017 A1 11/2013 Ota
2013/0339304 A1 12/2013 Lee et al.
2014/0130573 A1 5/2014 Zielinski et al.
2014/0157619 A1 6/2014 Cookson et al.
2014/0160680 A1 6/2014 Stevens
2014/0185177 A1 7/2014 Li
2014/0191588 A1 7/2014 Stevens
2014/0191874 A1 7/2014 Stevens

(56) References Cited

U.S. PATENT DOCUMENTS

| | | | |
|---|---|---|---|
| 2014/0237268 A1 | 8/2014 | Mese | |
| 2014/0247529 A1 | 9/2014 | Borini et al. | |
| 2014/0259730 A1 | 9/2014 | Zielinski et al. | |
| 2014/0307356 A1 | 10/2014 | Hong et al. | |
| 2015/0122422 A1 | 5/2015 | Hayasaka et al. | |
| 2015/0168059 A1 | 6/2015 | Zielinski et al. | |
| 2015/0179037 A1 | 6/2015 | Ren et al. | |
| 2015/0179418 A1 | 6/2015 | Ashtikar et al. | |
| 2015/0192362 A1 | 7/2015 | Zielinski et al. | |
| 2015/0226481 A1 | 8/2015 | Marchiori | |
| 2016/0080553 A1 | 3/2016 | Dempster et al. | |
| 2016/0126722 A1 | 5/2016 | Liao | |
| 2016/0149394 A1 | 5/2016 | Trusty et al. | |
| 2016/0162256 A1 | 6/2016 | Komaromi et al. | |
| 2016/0239047 A1 | 8/2016 | Weber | |
| 2016/0241059 A1 | 8/2016 | Li | |
| 2016/0241945 A1 | 8/2016 | Zadesky et al. | |
| 2017/0082360 A1 | 3/2017 | Zielinski et al. | |
| 2017/0205143 A1 | 7/2017 | Zielinski et al. | |
| 2017/0314854 A1 | 11/2017 | Marchiori | |
| 2018/0289845 A1 | 10/2018 | Chan | |
| 2018/0292132 A1 | 10/2018 | Zielinski et al. | |
| 2019/0031423 A1 | 1/2019 | De La Torre Barreiro et al. | |
| 2019/0219332 A1 | 7/2019 | Zielinski et al. | |
| 2019/0314535 A1 | 10/2019 | Golkowski et al. | |
| 2020/0031319 A1 | 1/2020 | Belanger et al. | |
| 2020/0173573 A1 | 6/2020 | Yokoe | |
| 2023/0375270 A1* | 11/2023 | Zielinski | F26B 5/04 |

FOREIGN PATENT DOCUMENTS

| | | | |
|---|---|---|---|
| CA | 2596104 | C | 2/2008 |
| CA | 2863649 | A1 | 8/2013 |
| CN | 2065321 | U | 11/1990 |
| CN | 1119266 | A | 3/1996 |
| CN | 2307264 | Y | 2/1999 |
| CN | 201018665 | Y | 2/2008 |
| CN | 201255562 | Y | 6/2009 |
| CN | 101986360 | A | 3/2011 |
| CN | 201955259 | U | 8/2011 |
| CN | 109718837 | A | 5/2019 |
| DE | 19539392 | A1 | 4/1997 |
| DE | 102006047664 | A1 | 4/2008 |
| EP | 0539607 | A1 | 5/1993 |
| EP | 0639748 | A1 | 2/1995 |
| EP | 1125177 | B1 | 1/2004 |
| EP | 1080333 | B1 | 8/2009 |
| EP | 2573493 | A1 | 3/2013 |
| EP | 2810004 | A1 | 12/2014 |
| EP | 2479523 | A4 | 2/2015 |
| EP | 3462117 | A1 | 4/2019 |
| EP | 3525308 | A1 | 8/2019 |
| JP | 06-084878 | | 3/1994 |
| JP | 07-027474 | | 1/1995 |
| JP | 07-233931 | A | 9/1995 |
| JP | 7265824 | | 10/1995 |
| JP | 08-261646 | | 10/1996 |
| JP | H10174301 | A | 6/1998 |
| JP | 2001197175 | A | 7/2001 |
| JP | 2001-523329 | A | 11/2001 |
| JP | 2003142451 | A | 5/2003 |
| JP | 2004-232965 | A | 8/2004 |
| JP | 2006019607 | A | 1/2006 |
| JP | 2006-140531 | A | 6/2006 |
| JP | 2006324506 | A | 11/2006 |
| JP | 2006325643 | A | 12/2006 |
| JP | 2007027474 | A | 2/2007 |
| JP | 2007135008 | A | 5/2007 |
| JP | 3139842 | U | 3/2008 |
| JP | 2008093648 | A | 4/2008 |
| JP | 2008261646 | A | 10/2008 |
| JP | 2009-270639 | A | 11/2009 |
| JP | 2010284616 | A | 12/2010 |
| JP | 2011171894 | A | 9/2011 |
| JP | 2012191619 | A | 10/2012 |
| KR | 1995-0005465 | Y1 | 7/1995 |
| KR | 20120064704 | A | 6/2012 |
| KR | 20140144679 | A | 12/2014 |
| KR | 10-1737498 | | 5/2017 |
| KR | 10-2022-0085769 | A | 6/2022 |
| WO | 1998048855 | A1 | 11/1998 |
| WO | 2000023861 | A1 | 4/2000 |
| WO | 2000053983 | A1 | 9/2000 |
| WO | 2006028572 | A2 | 3/2006 |
| WO | 2007019337 | A2 | 2/2007 |
| WO | 2007033493 | A1 | 3/2007 |
| WO | 2008073051 | A1 | 6/2008 |
| WO | 2009087102 | A2 | 7/2009 |
| WO | 2010070551 | A1 | 6/2010 |
| WO | 2011145555 | A1 | 11/2011 |
| WO | 2013116599 | A1 | 8/2013 |
| WO | 2014153007 | A1 | 9/2014 |
| WO | 2015171967 | A1 | 11/2015 |
| WO | 2016014818 | A1 | 1/2016 |
| WO | 2017218832 | A1 | 12/2017 |
| WO | 2019094936 | A1 | 5/2019 |

OTHER PUBLICATIONS

Office Action dated Oct. 1, 2020 in connection with Canadian Application No. 3,050,379, 4 pages.

Lucio, Valentino, "A Solution for Soaked Cells", San Antonio Express-News, pp. 1-3, Oct. 19, 2011.

Cooper, Sean, "Drybox Rescue Station: the ultimate cellphone drying system (hands-on)", www.engadget.com, pp. 1-13, May 22, 2013.

DRYBOX The New Way to Save a Wet Phone Fast, http://www.dryboxrescue.com/, pp. 1-5, Aug. 26, 2013.

International Search Report and Written Opinion dated Feb. 24, 2014 issued in International Application No. PCT/US2013/070178.

International Preliminary Report on Patentability dated Aug. 14, 2014 issued in International Application No. PCT/US2013/024277.

Final Office Action dated Sep. 3, 2014 issued in U.S. Appl. No. 14/080,595.

Non-Final Office Action dated Sep. 20, 2013 issued in U.S. Appl. No. 13/756,879.

Final Rejection dated Feb. 28, 2014 issued in U.S. Appl. No. 13/756,879.

Advisory Action dated Jun. 18, 2014 issued in U.S. Appl. No. 13/756,879.

Advisory Action dated Jul. 9, 2014 issued in U.S. Appl. No. 13/756,879.

Non-Final Rejection dated Feb. 28, 2014 issued in U.S. Appl. No. 14/080,595.

International Search Report and Written Opinion dated Aug. 27, 2014 issued in International Application No. PCT/US2014/028634.

Notice of Allowance dated Jan. 20, 2015 issued in U.S. Appl. No. 13/756,879.

Non-Final Rejection dated Sep. 20, 2014 issued in U.S. Appl. No. 13/756,879.

International Search Report and Written Opinion dated Oct. 28, 2014 issued in International Application No. PCT/US2014/046151.

Non-Final Office Action dated Apr. 10, 2015 issued in U.S. Appl. No. 14/080,595.

International Preliminary Report on Patentability dated May 28, 2015 issued in International Application No. PCT/US2013/070178.

Demand and Article 34 Amendments dated Jan. 14, 2015 issued in International Application No. PCT/US2014/028634.

International Preliminary Report on Patentability dated Apr. 15, 2015 issued in International Application No. PCT/US2014/028634.

Extended European Search Report dated Jun. 12, 2015 issued in European Application No. 13744398.2.

Non-Final Office Action dated Nov. 23, 2015 issued in U.S. Appl. No. 14/080,705.

First Examination Report dated Jun. 8, 2015 issued in Chinese Patent Application No. 201380016934.8.

Non-Final Office Action dated Sep. 1, 2015 issued in U.S. Appl. No. 14/213,142.

(56) References Cited

OTHER PUBLICATIONS

Office Action dated Oct. 23, 2015 issued in Colombian Patent Application No. 14189.782.
Non-Final Office Action dated Jan. 29, 2016 issued in U.S. Appl. No. 14/080,595.
MacVittie, Lori, “Remote Management In-Reach”, Network Computing, 14, 16; ProQuest p. 22, Aug. 21, 2003.
International Search Report and Written Opinion dated May 15, 2013, issued in PCT/US2013/024277.
How to Dry Out a Wet Cell Phone, ehow.com, http://www.ehow.com/pringhow_2042819_dry-out-wet-cll-phone.html, pp. 1-2, Jun. 5, 2013.
U.S. Trademark Registration No. 4,280,438 for the mark DRYBOX, Jan. 22, 2013.
Exhibitor News dated May 3, 2013 from International CTIA Wireless 2012.
EP Patent Application No. 13744398.2, downloaded from http://www.epo.gov on May 17, 2017.
Office Action with English Translation, Japanese Patent Application No. 2014-555734, dated Feb. 7, 2017.
AU 2013214941, dated Oct. 7, 2016.
Substrate definition from Internet dated 2015.
Intemational Preliminary Report on Patentability issued in PCT/US2013/024277, May 8, 2014.
Intemational Preliminary Report on Patentability issued in PCT/US2013/070178, May 19, 2015.
Intemational Preliminary Report on Patentability issued in PCT/US2015/029797, Nov. 8, 2016.
Intemational Preliminary Report on Patentability issued in PCT/US2014/046151, Jan. 12, 2015.
Intemational Preliminary Report on Patentability issued in PCT/US/2013/000239, Aug. 5, 2014.
Intemational Search Report and Written Opinion issued in PCT/US2015/028634, Apr. 29, 2016.
First Office Action with English translation, Chinese Application No. 201380016934.8, dated Jun. 25, 2015, 19 pages.
Second Office Action with English translation, Chinese Application No. 201380016934.8, dated Apr. 19, 2016, 8 pages.
Notification to Grant Patent Right for Invention with English translation, Chinese Application No. 201380016934.8, dated Sep. 29, 2016, 4 pages.
Demand and Article 34 Amendments dated Oct. 24, 2014 issued in International Application No. PCT/US2013/000239.
“How Can I Fix My Cell Phone—It Got Wet”, www.howtospoter.com/general/how-can-i-fix-my-cell-phone-it-got-wet, Apr. 21, 2007.
“How to Save a Wet Cell Phone”; WikiHow, www.wikihow.com/Save-a-Wet-Cell-Phone, Jul. 1, 2008.
“How to Save a Wet Cell Phone”; XHotmail, www.instructables.com/id/How-to-Save-a-Wet-Cell-Phone/?ALLSTEPS, Sep. 1, 2007.
“How to Save Your Wet Cell Phone-Tech Clinic”, Popular Mechanics, www.popularmechanics.com/technology/how-to/ips/4269047/, Jul. 1, 2008.
“Saving a wet cell phone with dry rice . . . Holy crap, it actually works!”, http://openattitude.com/2011/04/12/saving-a-wet-cell-phone-with-dry-rice-holy-crap-it-actually-works/, Apr. 21, 2011.
“Frugal Fix: Revive your Cell Phone or Electronic Devices from Water Damage”, http://www.fiscalgeek.com/2009/06/ff_water_damaged_cellphone/, Jun. 2009.
Office Action issued in Eurasian Patent Application No. 201491450, Jul. 25, 2016.
Notification on Readiness to Grant Patent issued in Eurasian Patent Application No. 201491450, May 18, 2017.
Canadian Examiner Requisition dated May 31, 2017 in connection with Canadian Application No. 2,863,649, 4 pages.
Eurasian Notification of Readiness to Grant a Eurasian Patent dated Aug. 28, 2017 in connection with Eurasian Application No. 201491450/31, 3 pages.
Examination Report dated Oct. 4, 2017 in connection with Australian Application No. 2013214941, 4 pages.
TESS search of BLUETOOTH dated Sep. 22, 2017.
TESS BLUETOOTH trademark status dated Sep. 22, 2017.
TESS WiFi search dated Sep. 22, 2017.
TESS WiFi trademark status dated Sep. 22, 2017.
Canadian Examiner Requisition dated Dec. 11, 2017 in connection with Canadian Application No. 2,863,649, 4 pages.
Office Action dated Jul. 2, 2016 issued in Colombian Patent Application No. 14189782.
Office Action dated Jul. 7, 2017 issued in Mexican Patent Application No. 2014/009259.
Office Action dated Dec. 21, 2017 issued in EP Patent Application No. 13744398.2.
Office Action dated Jun. 19, 2018 issued in Canadian Application No. 2,863,649, 4 pages.
Decision of Rejection dated Jan. 9, 2018 in connection with Japanese Application No. 2014-555734, 4 pages.
Office Action dated Feb. 7, 2019 in connection with U.S. Appl. No. 15/651,391.
First Office Action dated Oct. 25, 2018 in connection with Chinese Application No. 201611154278.X, 28 pages.
Extended European Search Report dated Feb. 5, 2019 in connection with European Application No. 18205789.3, 6 pages.
Korean Office Action dated Mar. 12, 2019 in connection with Korean Application No. 10-2014-7024141, 16 pages.
Korean Office Action dated Sep. 10, 2019 in connection with Korean Application No. 10-2014-7024141, 7 pages.
Indian Examination Report dated May 7, 2019 in connection with Indian Application No. 6535/DELNP/2014, 7 pages.
Japanese Notice of Reasons of Refusal dated May 28, 2019 in connection with Japanese Application No. 2018-089626, 6 pages.
Chinese Office Action dated Jun. 13, 2019 in connection with Chinese Application No. 201611154278.X, 10 pages.
International Search Report and Written Opinion of the International Searching Authority dated Mar. 8, 2019 in connection with International Application No. PCT/US2018/060753, 12 pages.
Office Action dated Feb. 11, 2020 in connection with European Application No. 18205789.3, 4 pages.
Office Action dated Feb. 7, 2020 in connection with Chinese Application No. 201611154278.X, 7 pages.
Examination Report dated Jan. 19, 2017 in connection with EP Patent Application 13744398.2, 4 pages.
Examination Report dated Jan. 21, 2020 in connection with Indian Application No. 201617004673, 6 pages.
Extended European Search Report dated Mar. 23, 2017 in connection with European Application No. 14822876.0, 8 pages.
Notice of Preliminary Rejection dated Oct. 16, 2023, in connection to KR Application No. 10-2023-7004951, 11 pages (no translation).
Supplementary European Search Report dated Oct. 24, 2023 in connection with European Patent Application No. 20865608.2, 11 pages.
European Search Report dated Nov. 23, 2023 in connection with European Patent Application No. 23177384.7, 7 pages.
Extended European Search Report dated Nov. 15, 2023 in connection with EP application No. 23177384.7, 6 pages.
Notice of Preliminary Rejection dated Apr. 22, 2024 in connection with Korean Patent Application No. 10-2020-7016794, 9 pages.
Notice of Reasons for Refusal Office Action dated Feb. 20, 2024 in connection with Japanese Patent Application No. 2023-017666, 23 pages.
International Search Report and Written Opinion dated Feb. 28, 2024 in connection with International Patent Application No. PCT/US2023/036798, 12 pages.
Japanese Notice of Reasons for Refusal, dated Aug. 6, 2024 in connection with Japanese Application No. 2022-517414, 10 pages.

* cited by examiner

Registering customer purchasing new membership

User clicks on Register New Member Button

*Customer receives auto-generated email indicating membership enrollment.

Once a record is located the user clicks details to access the record.

5120

5110

| Trace Length (in) | Trace Width (in) | Effective Thermal Contact Area (sq in) |
|---|---|---|
| 200 | 0.01 | 2 |
| 200 | 0.006 | 1.2 |
| 200 | 0.004 | 0.8 |
| 250 | 0.01 | 2.5 |
| 250 | 0.006 | 1.5 |
| 250 | 0.004 | 1 |
| 300 | 0.01 | 3 |
| 300 | 0.006 | 1.8 |
| 300 | 0.004 | 1.2 |

FIG. 51

METHODS AND APPARATUSES FOR DRYING ELECTRONIC DEVICES

CROSS-REFERENCE TO RELATED APPLICATIONS

This application is a continuation of U.S. application Ser. No. 17/134,492, filed on Dec. 27, 2020, which is a continuation of U.S. application Ser. No. 16/854,862, filed on Apr. 21, 2020, issued as U.S. Pat. No. 10,876,792, which is a continuation-in-part of U.S. application Ser. No. 16/575,306, filed on Sep. 18, 2019, issued as U.S. Pat. No. 10,690,413, which is a continuation-in-part of U.S. application Ser. No. 16/363,742, filed on Mar. 25, 2019, issued as U.S. Pat. No. 10,928,135, which is a continuation of U.S. application Ser. No. 15/979,446, filed on May 14, 2018, issued as U.S. Pat. No. 10,240,867, which is a continuation-in-part of U.S. application Ser. No. 15/811,633, filed on Nov. 13, 2017, issued as U.S. Pat. No. 9,970,708, which is a continuation-in-part of U.S. application Ser. No. 15/688,551, filed on Aug. 28, 2017, issued as U.S. Pat. No. 9,816,757, which is a continuation of U.S. application Ser. No. 15/478,992, filed on Apr. 4, 2017, issued as U.S. Pat. No. 9,746,241, which is a continuation of U.S. application Ser. No. 15/369,742, filed on Dec. 5, 2016, issued as U.S. Pat. No. 9,644,891, which is a continuation-in-part of U.S. application Ser. No. 14/213,142, filed Mar. 14, 2014 issued as U.S. Pat. No. 9,513,053, which claims priority of U.S. Provisional Application No. 61/782,985, filed Mar. 14, 2013, which are all incorporated herein by reference in their entirety, for all purposes. U.S. application Ser. No. 15/369,742 is also a continuation-in-part of U.S. application Ser. No. 14/665,008, filed Mar. 23, 2015, issued as U.S. Pat. No. 9,683,780, which is a divisional of U.S. application Ser. No. 13/756,879, filed Feb. 1, 2013, issued as U.S. Pat. No. 8,991,067, which claims priority of U.S. Provisional Application No. 61/638,599, filed Apr. 26, 2012, and U.S. Provisional Application No. 61/593,617, filed Feb. 1, 2012, all of which are incorporated by reference in their entirety, for all purposes. U.S. application Ser. No. 16/575,306 is also a continuation-in-part of U.S. application Ser. No. 15/632,218, filed on Jun. 23, 2017, issued as U.S. Pat. No. 10,651,643, which is a continuation of International Application No. PCT/US2015/000239, filed Dec. 23, 2015, which claims the benefit of U.S. Provisional Application No. 62/095,997, filed Dec. 23, 2014, all of which are hereby incorporated by reference for all purposes. U.S. application Ser. No. 15/632,218 is also a continuation-in-part of U.S. application Ser. No. 14/903,886, filed on Jan. 8, 2016, which is a national stage entry of International Application No. PCT/US2014/046151, filed on Jul. 10, 2014, which claims priority to U.S. Provisional Application No. 61/844,654, filed on Jul. 10, 2013, all of which are hereby incorporated by reference, for all purposes. U.S. application Ser. No. 16/854,862 is also a continuation-in-part of U.S. application Ser. No. 15/799,110, filed on Oct. 31, 2017, issued as U.S. Pat. No. 10,697,701, which is hereby incorporated by reference, for all purposes. U.S. application Ser. No. 16/854,862 is also a continuation-in-part of PCT Application No. PCT/US2018/058492, filed on Oct. 31, 2018, which claims priority to U.S. application Ser. No. 15/799,110, issued as U.S. Pat. No. 10,697,701, all of which are hereby incorporated by reference, for all purposes.

TECHNICAL FIELD

Embodiments of the present disclosure generally relate to the repair of electronic devices, and to the repair of electronic devices that have been rendered at least partially inoperative due to moisture intrusion.

BACKGROUND

Electronic devices are frequently manufactured using ultra-precision parts for tight fit-and-finish dimensions that are intended to keep moisture from entering the interior of the device. Many electronic devices are also manufactured to render disassembly by owners and or users difficult without rendering the device inoperable even prior to drying attempts. With the continued miniaturization of electronics and increasingly powerful computerized software applications, it is commonplace for people today to carry multiple electronic devices, such as portable electronic devices. Cell phones are currently more ubiquitous than telephone land lines, and many people, on a daily basis throughout the world, inadvertently subject these devices to unintended contact with water or other fluids. This occurs daily in, for example, bathrooms, kitchens, swimming pools, lakes, washing machines, or any other areas where various electronic devices (e.g., small, portable electronic devices) can be submerged in water or subject to high humid conditions. These electronic devices frequently have miniaturized solid-state transistorized memory for capturing and storing digitized media in the form of phone contact lists, e-mail addresses, digitized photographs, digitized music and the like.

SUMMARY

In the conventional art, difficulties currently exist in removing moisture from within an electronic device. The devices can be heated to no avail, as the moisture within the device frequently cannot exit due to torturous paths for removal. Without complete disassembly of the electronic device and using a combination of heat and air drying, the device cannot be dried once it is subjected to water or other wetting agents and/or fluids. Moreover, if general heating is employed to dry the device and the heat exceeds the recommended maximums of the electronics or other components, damage can occur and the device may become inoperable and/or the owner's digitized data can be forever lost.

It was realized by the inventors that a new type of drying system is needed to allow individuals and repair shops to dry electronic devices without disassembly, while retaining the digitized data and/or while saving the electronic device altogether from corrosion.

Embodiments of the present invention relate to equipment and methods for vacuum-pressure drying of materials based on lowering the vapor pressure and the boiling points of liquids. More particularly, certain embodiments of the invention relate to a vacuum chamber with a heated platen that can be automatically controlled to heat electronics, such as an inoperable portable electronic device, via conduction and therefore reduce the overall vapor pressure temperature for the purposes of drying the device and rendering it operable again.

In certain embodiments, a platen that is electrically heated provides heat conduction to the portable electronic device that has been subjected to water or other unintended wetting agent(s). This heated platen can form the base of a vacuum chamber from which air is evacuated. The heated conductive platen can raise the overall temperature of the wetted device through physical contact and the material heat transfer coefficient. The heated conductive platen, being housed in a convective box, radiates heat and can heat other portions of the vacuum chamber (e.g., the outside of the vacuum chamber) for simultaneous convection heating. The pressure can be simultaneously decreased in the vacuum chamber housing that contains the wetted electronic device. The decreased pressure provides an environment whereby liquid vapor pressures can be reduced, allowing lower boiling points of any liquid or wetting agent within the chamber. The combination of a heated path (e.g., a heated conductive path) to the wet electronic device and decreased pressure results in a vapor pressure phase where wetting agents and liquids are "boiled off" in the form of a gas at lower temperatures preventing damage to the electronics while drying. This drying occurs because the vaporization of the liquids into gasses can more easily escape through the tight enclosures of the electronic device and through the torturous paths established in the design and manufacture of the device. The water or wetting agent is essentially boiled off over time into a gas and evacuated from within the chamber housing.

Other embodiments include a vacuum chamber with a heated platen under automatic control. The vacuum chamber is controlled by microprocessor using various heat and vacuum pressure profiles for various electronic devices. This example heated vacuum system provides a local condition to the electronic device that has been wetted and reduces the overall vapor pressure point, allowing the wetting agents to boil off at a much lower temperature. This allows the complete drying of the electronic device without damage to the device itself from excessive (high) temperatures.

In some embodiments, the recovery of lost heat due to the latent heat of evaporation (see, e.g., FIG. 6C) can be enhanced by injecting heated air through an orifice (such as a headphone speaker jack) in the electronic device being dried. Injected air can be generated through the discharge side of the vacuum pump (which may be an oil-less (oil free) type of pump) and optionally heated with an air heater. In other embodiments, the air heater may not be used and the natural heating of compressed air within vacuum pump (e.g., due to the work being performed on the air to compress it and the ideal gas law) is used to heat the electronic device being dried. The temperature of the air discharged from the vacuum pump may be measured using an air temperature sensor, and some embodiment control the temperature of the air being introduced into the electronic device. In some embodiments, the vacuum pump is modulated (such as by pulse-width modulation (PWM)) when introducing air from the discharge of the vacuum pump and into the electronic device to control the temperature of the air entering electronic device 280. In other embodiments, miniaturized vacuum pumps can be utilized in combination with one another to reduce the pressure. A high volume pump can be pneumatically connected in series with a high vacuum pump for purposes of achieving a maximum vacuum pressure in a minimum amount of time.

Some embodiments introduce air (which may be heated) into the electronic device (such as by using a nozzle) and do not utilize a heated conduction platen in contact with the electronic device to transfer heat to the electronic device. Other embodiment utilize both introduction of air and a heated conduction platen to introduce heat into electronic device. In embodiments utilizing both air introduction/injection and a heated conduction platen, the combination of these two methods of transferring heat to the electronic device can increase the speed at which heat is introduced to the electronic device (including during periods when heat is being added to the electronic device to compensate for the cooling effect that occurs due to the latent heat of evaporation when the pressure in vacuum chamber 3 is decreased and some of the liquid is vaporized) providing for quicker drying cycles.

In some embodiments, a vacuum chamber can be a rigid form with an integrated platen heater inside the rigid walled vacuum chamber. The platen heater can be thermofoil traces or surface mount resistors, with a relative humidity sensor and vacuum pressure sensor integrated in their entirety onto one printed circuit board. In other embodiments, the vacuum chamber can be collapsible, e.g. a vacuum pouch that can rest on a rigid platen heater or, wrapped in a flexible platen heater. In other embodiments, the platen heater can be substituted with commercially available hand warmers. In other embodiments, the entire electronic controls, platen heater sub-assembly, and vacuum pumps can be integrated onto one single printed circuit board. In other embodiments, a low-modulus silicone polymer which is thermally conductive can transfer heat from an uneven surface mount resistor platen to an uneven surface of an electronic device.

In some embodiments, a desiccator is used to remove moisture from the air being evacuated from the vacuum chamber, and the desiccator may be regenerated using the compressed air discharged from the vacuum pump. In one embodiment, injected air is forced into the vacuum chamber's evacuation plenum with the vacuum chamber being closed and with the electronic device being removed from the vacuum chamber. Optional desiccator heaters (which may be thermofoil type heaters) may be used to heat the desiccator, and these heaters may be powered by a power supply and controlled by a desiccator temperature feedback signal to achieve a particular temperature for regeneration of the desiccant in the desiccator. The air flowing through the desiccator can assist with rapid moisture evaporation and regeneration of the desiccator. In some embodiments, moist air from the desiccator is discharged to the atmosphere through a desiccator dump valve.

Some embodiments are specific to aid in the reduction of cost, weight, noise, and assembly time by the use of thin-walled plastic injected molded parts, collapsible pouches, and fully integrated electronics on one single printed circuit board.

In some embodiments, an apparatus is provided for drying an electronic device in a computing network environment. The apparatus comprises: an electronic device dryer system for removing moisture from an electronic device affected by moisture intrusion; a WiFi connection device integrated with the electronic device dryer system, wherein the apparatus sends first data to, using the WiFi connection device, or receives second data from, using the WiFi connection device, a computing device, wherein the computing device executes an electronic device drying-related application, wherein the computing device is located near the apparatus; a cellular connection device integrated with the electronic device dryer system, wherein the apparatus sends third data to, using the cellular connection device, or receives fourth data from, using the cellular connection device, a database system associated with a database, wherein the database system is located remotely from the apparatus and the computing device; a host controller integrated with the electronic device dryer system, wherein the host controller communicates with the WiFi connection device and the cellular connection device via a universal asynchronous receive transmit (UART) bus; and a location-determining system integrated with the electronic device dryer system, wherein the location-determining system enables determination of network location information or physical location information associated with at least one of the apparatus or the electronic device.

In some embodiments, the WiFi connection device operates in Access Point mode. In some embodiments, the WiFi connection device operates in WiFi Direct mode. In some embodiments, the computing device comprises a mobile computing device. In some embodiments, the electronic device drying-related application comprises an electronic device drying registration application. In some embodiments, the electronic device drying-related application comprises an electronic device drying progress application. In some embodiments, the cellular connection device operates in at least one of Long Term Evolution (LTE) CAT1, LTE CAT M1, or 2nd Generation (2G) cellular communication mode. In some embodiments, the database system comprises an enterprise system.

In some embodiments, the electronic device dryer system comprises a control system for both controlling an amount of heat added to the electronic device and controlling a decrease of pressure in a chamber comprising the electronic device. In some embodiments, the host controller is separate from the control system. In some embodiments, the host controller is part of the control system. In some embodiments, the UART bus is configured in serial peripheral interface (SPI) mode. In some embodiments, the UART bus is configured in inter-integrated communication (I2C) mode. In some embodiments, the apparatus uses Hypertext Transfer Protocol (HTTP) commands to communicate with the database system. In some embodiments, the apparatus further comprises a telecommunication device. In some embodiments, the telecommunication device comprises or is part of at least one of a cellular telecommunication system or a wireless network telecommunication system. In some embodiments, the telecommunication device is connected to a back-up power source such that the telecommunication device is operational when the apparatus is not connected to an external power source.

In some embodiments, the location-determining system comprises a Global Positioning System (GPS)-based system. In some embodiments, the location-determining system is connected to a back-up power source such that the location-determining system is operational when the apparatus is not connected to an external power source. In some embodiments, the location-determining system enables determination of whether software or firmware installed or associated with the apparatus corresponds with the network location information or the physical location information associated with the at least one of the apparatus or the electronic device. In some embodiments, the location-determining system enables determination of the network location information or the physical location information associated with the at least one of the apparatus or the electronic device upon an initial power-up or a reboot of the apparatus.

In some embodiments, at least one of the first data, the second data, the third data, or the fourth data comprises user data associated with a user of the electronic device or the apparatus. In some embodiments, at least one of the first data, the second data, the third data, or the fourth data comprises electronic device data associated with the electronic device. In some embodiments, at least one of the first data, the second data, the third data, or the fourth data comprises apparatus data associated with the apparatus. In some embodiments, the electronic device comprises a mobile telephone. In some embodiments, the electronic device comprises a mobile device.

Certain features of embodiments of the present invention address these and other needs and provide other important advantages.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present invention will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example only, and not to be construed as limiting the scope of this invention.

FIG. 51 is a table depicting the electrical conductor trace lengths and widths that provide conduction heating of the electrically heated conduction platen of FIG. 2.

DETAILED DESCRIPTION

Figure 1:
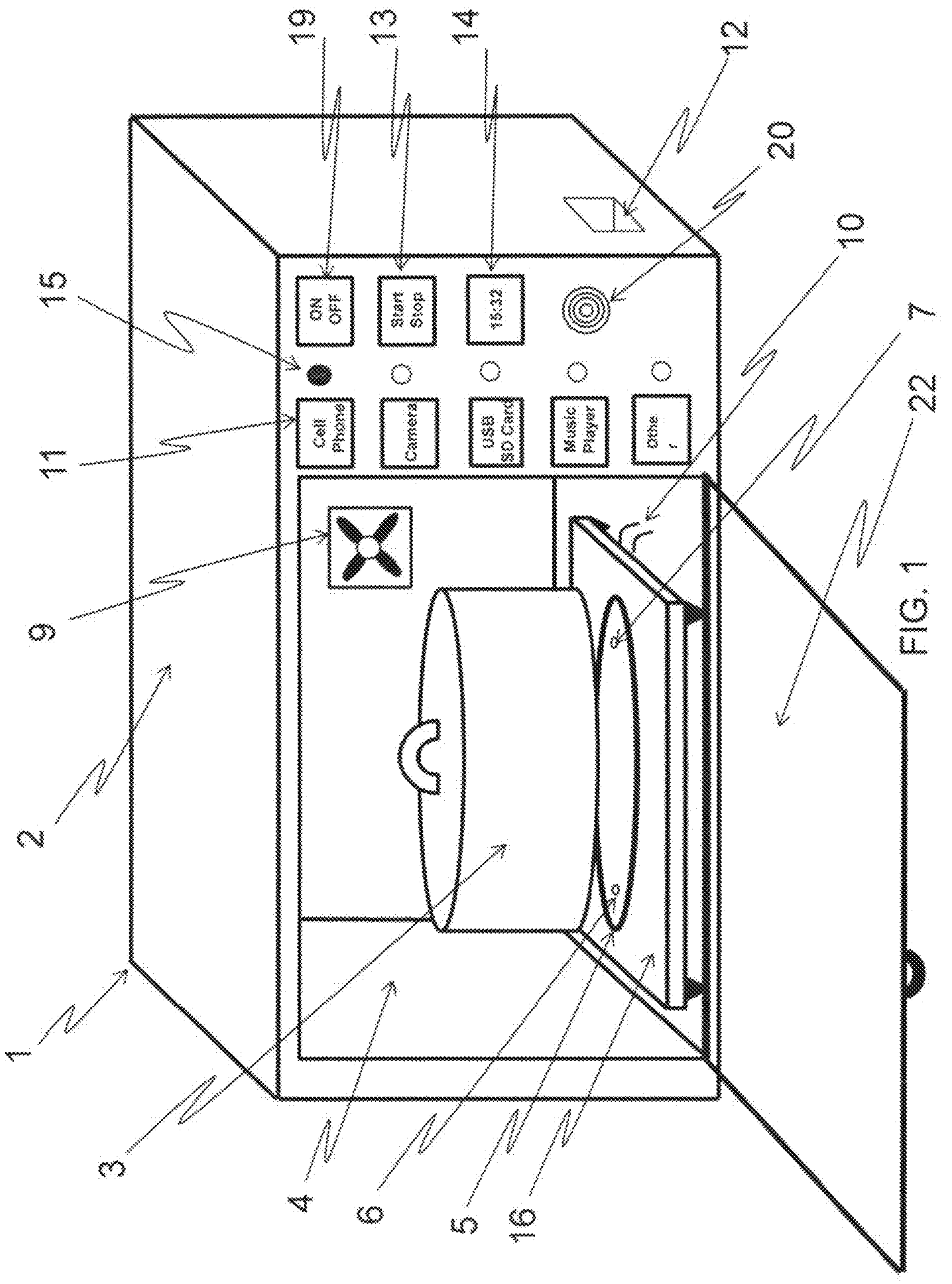
FIG. 1 is an isometric view of an electronic device drying apparatus according to one embodiment of the present disclosure.

For the purposes of promoting an understanding of the principles of the invention, reference is made to selected embodiments illustrated in the drawings and specific language will be used to describe the same. It will nevertheless be understood that no limitation of the scope of the invention is thereby intended; any alterations and further modifications of the described or illustrated embodiments, and any further applications of the principles of the invention as illustrated herein are contemplated as would normally occur to one skilled in the art to which the invention relates. At least one embodiment of the invention is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments of the present invention, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Embodiments of the present disclosure include devices and equipment generally used for drying materials using reduced pressure. Embodiments include methods and apparatuses for drying (e.g., automatic drying) of electronic devices (e.g., portable electronic devices such as cell phones, digital music players, watches, pagers, cameras, tablet computers and the like) after these units have been subjected to water, high humidity conditions, or other unintended deleterious wetting agents that renders such devices inoperable. At least one embodiment provides a heated platen (e.g., a user controlled heated platen) under vacuum that heats the portable electronic device and/or lowers the pressure to evaporate unwanted liquids at lower than atmospheric boiling points. The heat may also be applied through other means, such as heating other components of the vacuum chamber or the gas (e.g., air) within the vacuum chamber. The heat and vacuum may be applied sequentially, simultaneously, or in various combinations of sequential and simultaneous operation.

In still further embodiments, air (such as ambient air or some other gas which may be beneficial in drying the electronic device) may be introduced into the electronic device using a nozzle connected to the electronic device, such as by inserting the nozzle into the headphone or microphone jack. The nozzle may be adapted to securely fit into any standard 2.5 mm or 3.5 mm jack. Warm air may be introduced into the electronic device through the nozzle by, for example, drawing the warm air (which may be at or near the ambient pressure outside the vacuum chamber) into the electronic device using the vacuum of the chamber and/or by pressurizing the warm air above ambient conditions and forcing the warm air into the electronic device (which may be accomplished while the vacuum chamber is at and/or below ambient pressure). In some embodiments where a headphone jack is not present in such devices as hearing aids, smart watches, various phones with only power jacks, the nozzle may not be connected and therefore used to warm the inside of the vacuum chamber, or, collapsible vacuum pouch. In one embodiment, a nozzle is purposely not attached to allow heated, free-flowing air into a vacuum chamber to convectively heat the electronic device and the inside of the chamber or vacuum pouch. This heated air increases the dew point inside the vacuum chamber or pouch and any moisture that has been vaporized from within the electronic device and may condense onto cooler surfaces (e.g. non heated platen surfaces) will have less propensity to do so. In preferred embodiments, warm regenerative air is constantly used to enhance heat transfer into the electronic device as well as internal chamber surfaces in order to expedite vaporization of trapped moisture inside the electronic device.

The evaporation point of the liquid is lowered based upon the materials of construction of the device being heated such that temperature excursions do not exceed the melting points and/or glass transition temperatures of such materials. Thus, the device being subjected to the drying cycle under vacuum pressure can be safely dried and rendered functional again without damage to the device itself.

Figure 23:
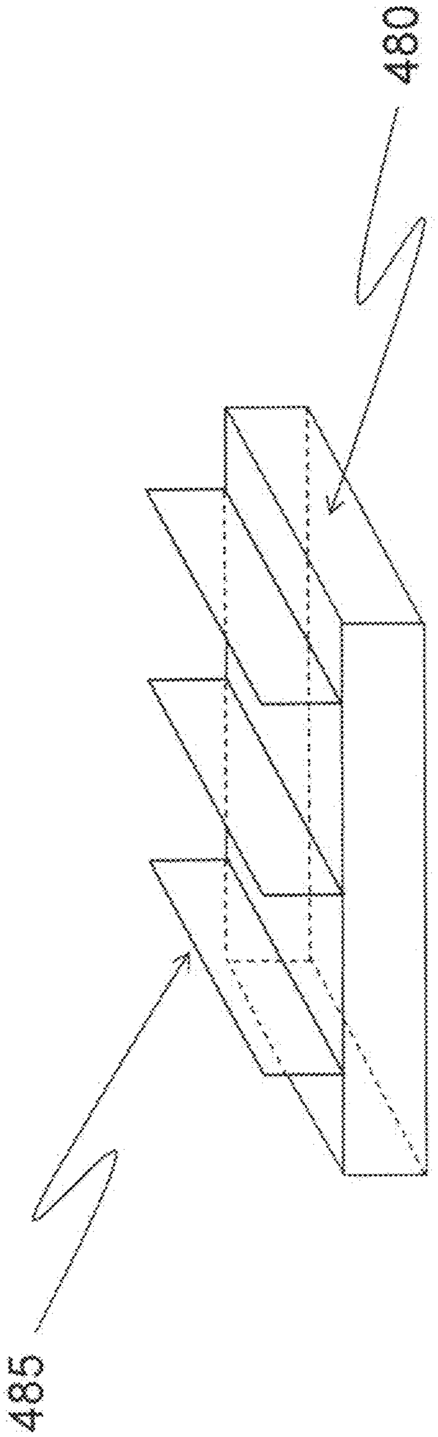
FIG. 23 is an isometric depiction of an alternative vacuum chamber which has been structurally fortified with ribs to minimize deflection during decreasing pressures.

Referring first to FIG. 1, an isometric diagram of a drying apparatus, e.g., an automatic portable electronic device drying apparatus 1, according to one embodiment of the present invention is shown. Electronic device drying apparatus 1 includes enclosure 2, vacuum chamber 3, a heater (e.g., electrically heated conduction platen 16), an optional convection chamber 4, and an optional modem Internet interface connector 12. An optional user interface for the electronic device drying apparatus 1 may be used, and may optionally be comprised of one or more of the following: input device selection switches 11, device selection indicator lights 15, timer display 14, power switch 19, start-stop switch 13, and audible indicator 20. Vacuum chamber 3 may be fabricated of, for example, a polymer plastic, glass, or metal, with suitable thickness and geometry to withstand a vacuum (decreased pressure). Vacuum chamber 3 can be fabricated out of any material that is at least structurally rigid enough to withstand vacuum pressures and to maintain vacuum pressures within the structure, e.g., is sufficiently nonporous. Referring to FIG. 23, a vacuum chamber 3 is depicted as a rectangular vacuum chamber 480 with structural supporting ribs 485. Rectangular vacuum chamber 480 and structural supporting ribs 485 can be made of metal or preferably injection molded plastic, using thin walled properties to reduce weight and adding fiberglass (e.g. glass-filled) to maximize strength and rigidity.

Figure 24:
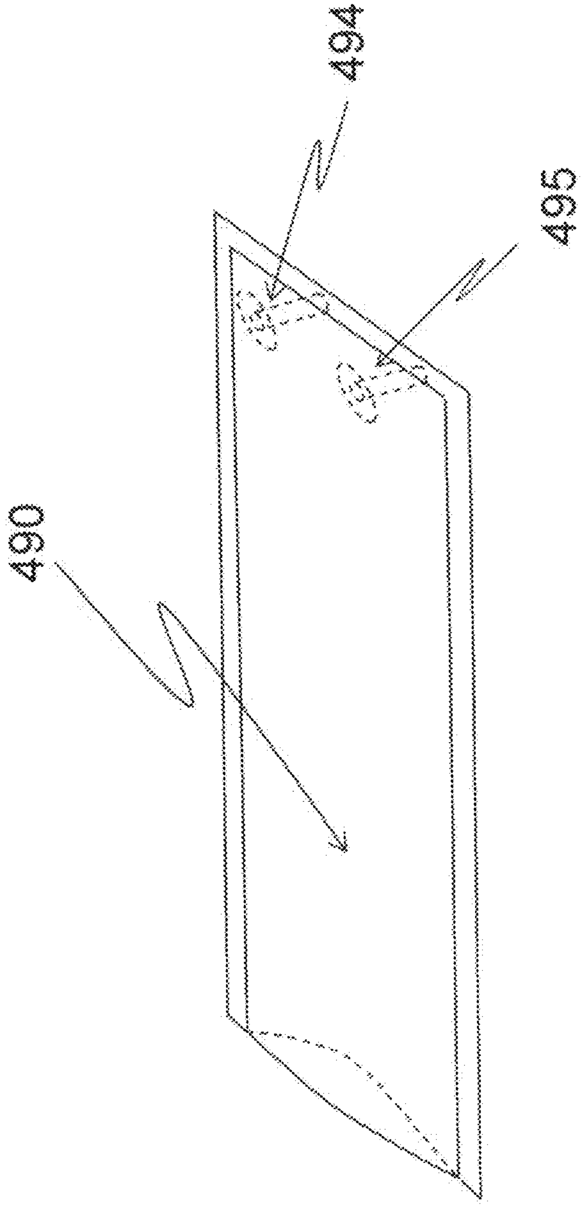
FIG. 24 is an isometric view of a collapsible vacuum pouch depicted with integrated vacuum attachment ports.

In other embodiments as depicted in FIG. 24, a collapsible vacuum chamber (e.g. vacuum pouch) can be used to decrease the pressure on portable electronics. Collapsible vacuum chamber 490 is made from suitable thin-walled plastic such as polyethylene terephthalate (PETG) that supports vacuum pressures. Collapsible vacuum chamber 490 has flanged evacuation ports 494 and 495 which are fabricated from plastic and are attached to one side of collapsible vacuum chamber 490. Flanged evacuation ports 494 and 495 can be attached using silicone, glue, or in a preferred embodiment, ultrasonically welded from the flange to the collapsible vacuum chamber 490.

Heated conduction platen 16 may be electrically powered through heater power wires 10 and may be fabricated from thermally conductive material and made of suitable thickness to support high vacuum. In some embodiments, the electrically heated conduction platen 16 is made of aluminum, although other embodiments include platens made from copper, steel, iron or other thermally conductive material. Heated conduction platen 16 can be mounted inside of convection chamber 4 and mated with vacuum chamber 3 using, for example, an optional sealing O-ring 5. Air within vacuum chamber 3 is evacuated via evacuation port 7 and vented via venting port 6. Convection chamber 4, if utilized, can include fan 9 to circulate warm air within the convection chamber 4.

Figure 2:
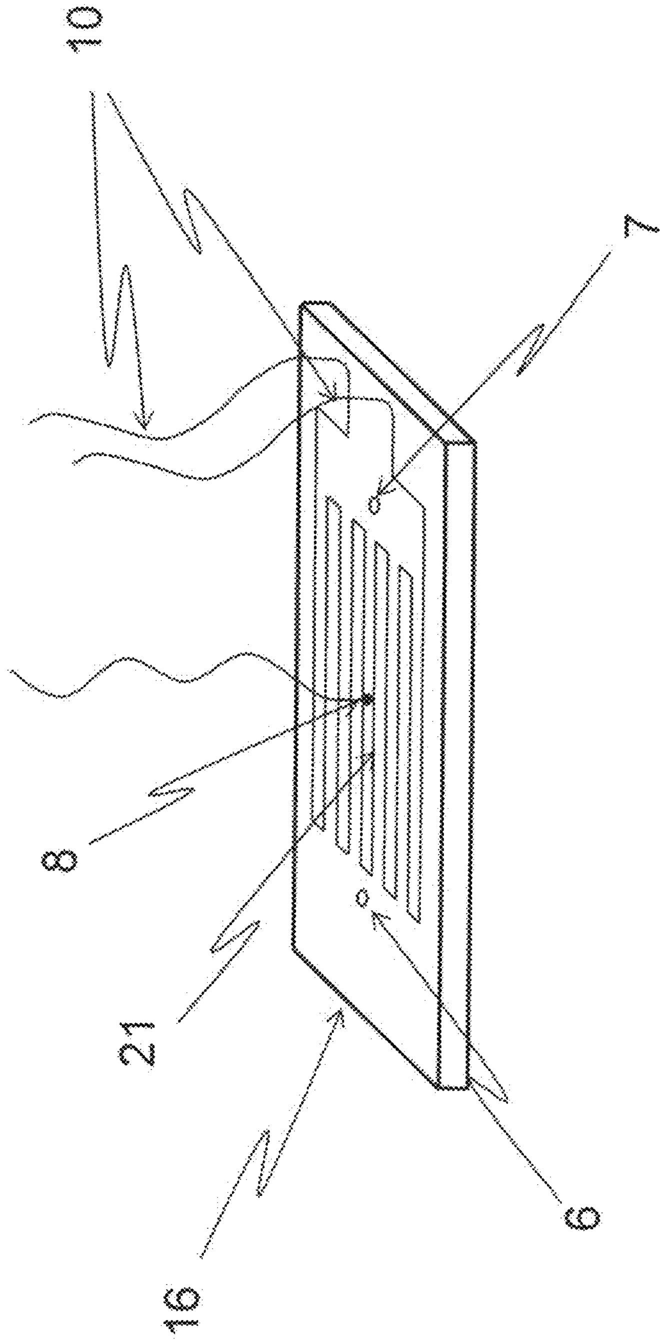
FIG. 2 is an isometric bottom view of the electrically heated conduction platen element of the electronic device drying apparatus depicted in FIG. 1.

FIG. 2 depicts heated conduction platen 16 with a heat generator (e.g., a thermofoil resistance heater 21). Heated conduction platen 16 may also include temperature feedback sensor 8, thermofoil resistance heater power connections 10, evacuation port 7, and/or venting port 6. In one embodiment of the invention, heated conduction platen 16 is a standalone separate heating platen sitting on a vacuum chamber mounting plate.

Figure 25:
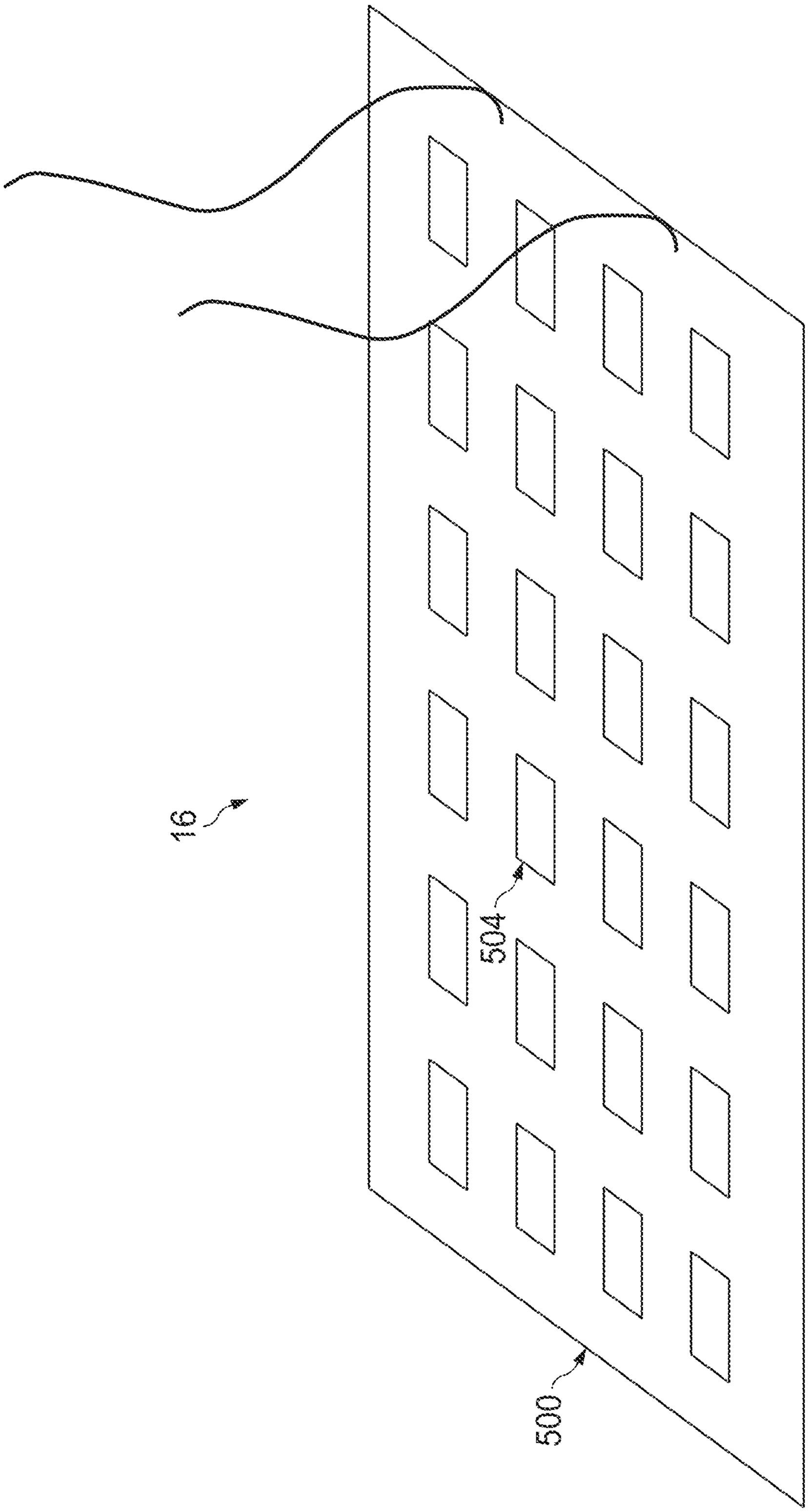
FIG. 25 is an isometric view of a platen heater fabricated with a plurality of surface mount resistors attached to a printed circuit board.

In another embodiment, FIG. 25 depicts a heated platen 16 comprised of a printed circuit board substrate 500 and surface mount technology (SMT) resistors 504. SMT resistors 504 are of suitable resistances that produce heating and thus a heated platen 16.

Figure 26A:
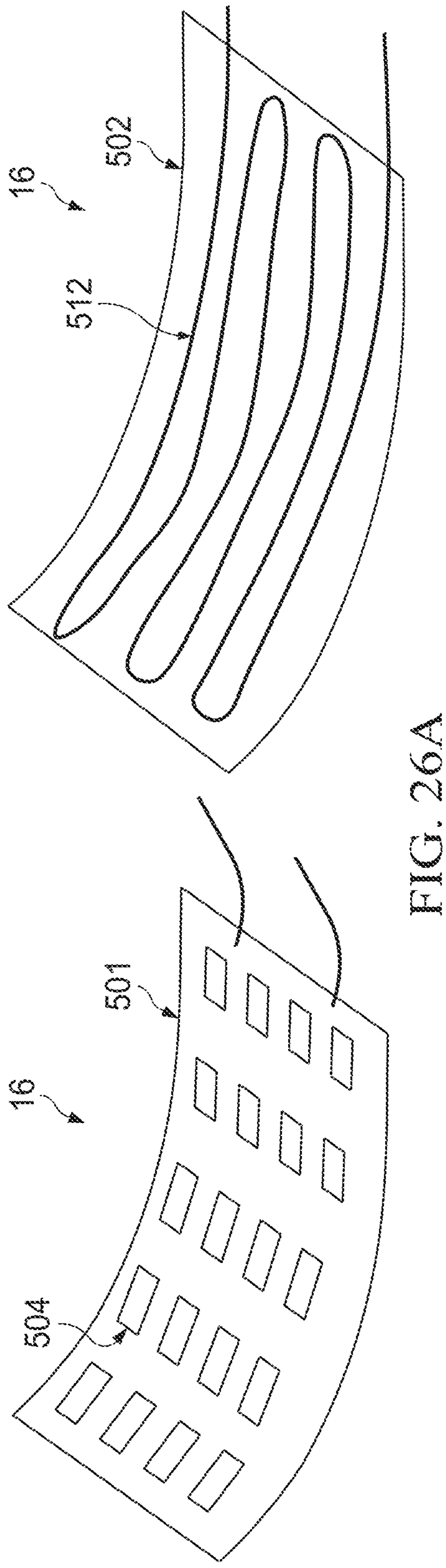
FIG. 26A is an isometric view of a two types of flexible platen heaters fabricated from a plurality of surface mount resistors or a thin resistance heater wire.

As best shown in FIG. 26A, other embodiments of suitable platen heater 16 are a flexible printed circuit board 500 with SMT resistors 504 mounted onto surface and flexible thin-layered thermally conductive silicone 502 with electrical filaments 512 embedded into the thermally conductive silicone 502.

Figure 26B:
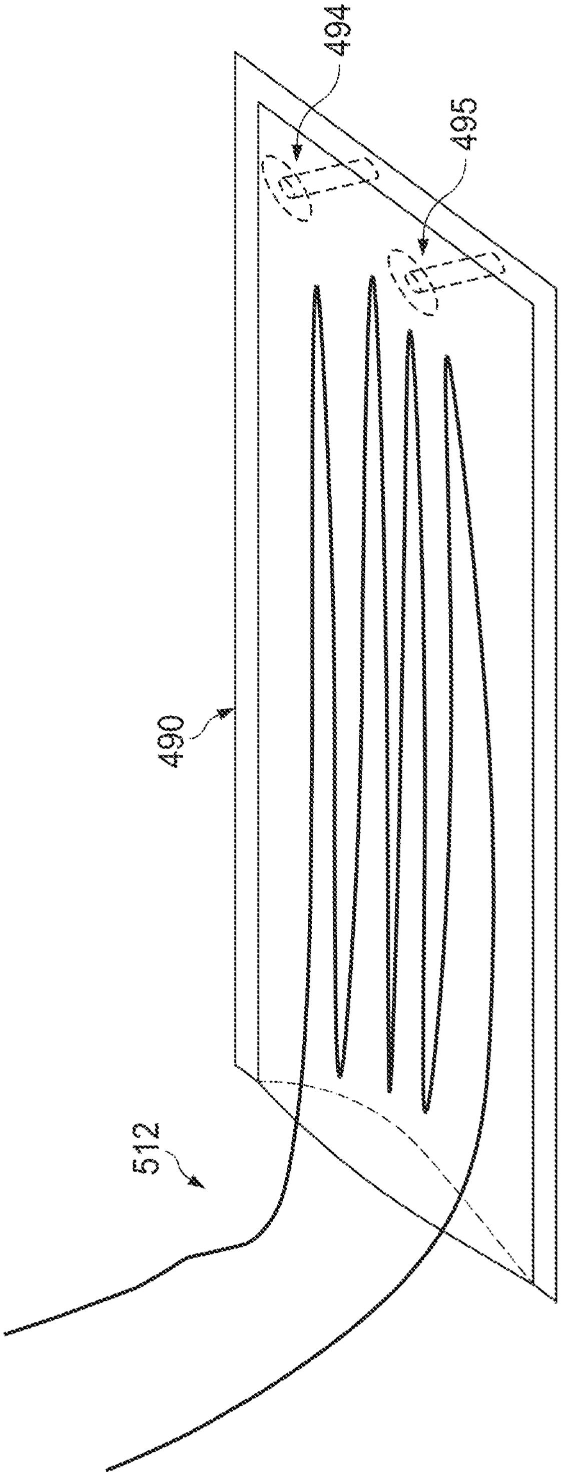
FIG. 26B is an isometric view of a collapsible vacuum pouch depicted in FIG. 24 that has integrated thin resistance heater wire attached to the surfaces of the collapsible vacuum pouch.

In some embodiments as shown in FIG. 26B, a collapsible vacuum chamber 490 has flexible electrical filaments 512 attached to collapsible vacuum chamber surface thus producing a vacuum-sealed conformable platen heater.

Figure 3:
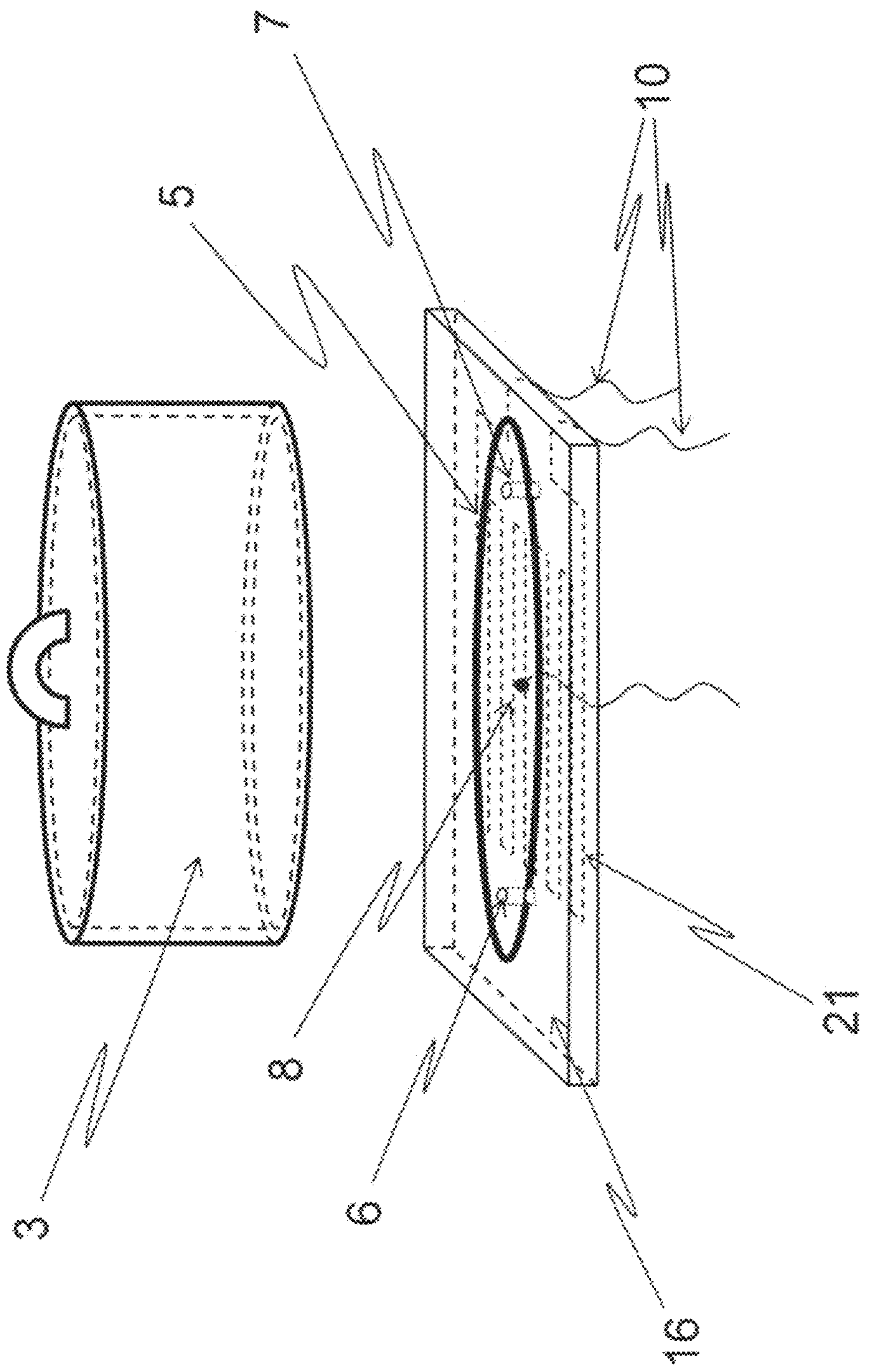
FIG. 3 is an isometric cut-away view of the electrically heated conduction platen element and vacuum chamber depicted in FIG. 1.

FIG. 3 depicts the heated conduction platen 16 and vacuum chamber 3 in a cut-away isometric view. Vacuum chamber 3 is mated to heated conduction platen 16 using sealing O-ring 5. Platen 16 provides heat energy both internally and externally to the vacuum chamber 3 via thermofoil resistance heater 21 attached to the bottom of platen 16, and is temperature-controlled by temperature feedback sensor 8. Temperature feedback sensor 8 could be a thermistor, a semiconductor temperature sensor, or any one of a number of thermocouple types. Evacuation port 7 and venting port 6 are depicted as through-holes to facilitate pneumatic connection to interior of vacuum chamber 3 using the bottom side of the heated conduction platen 16.

Figures 4A, 4B:
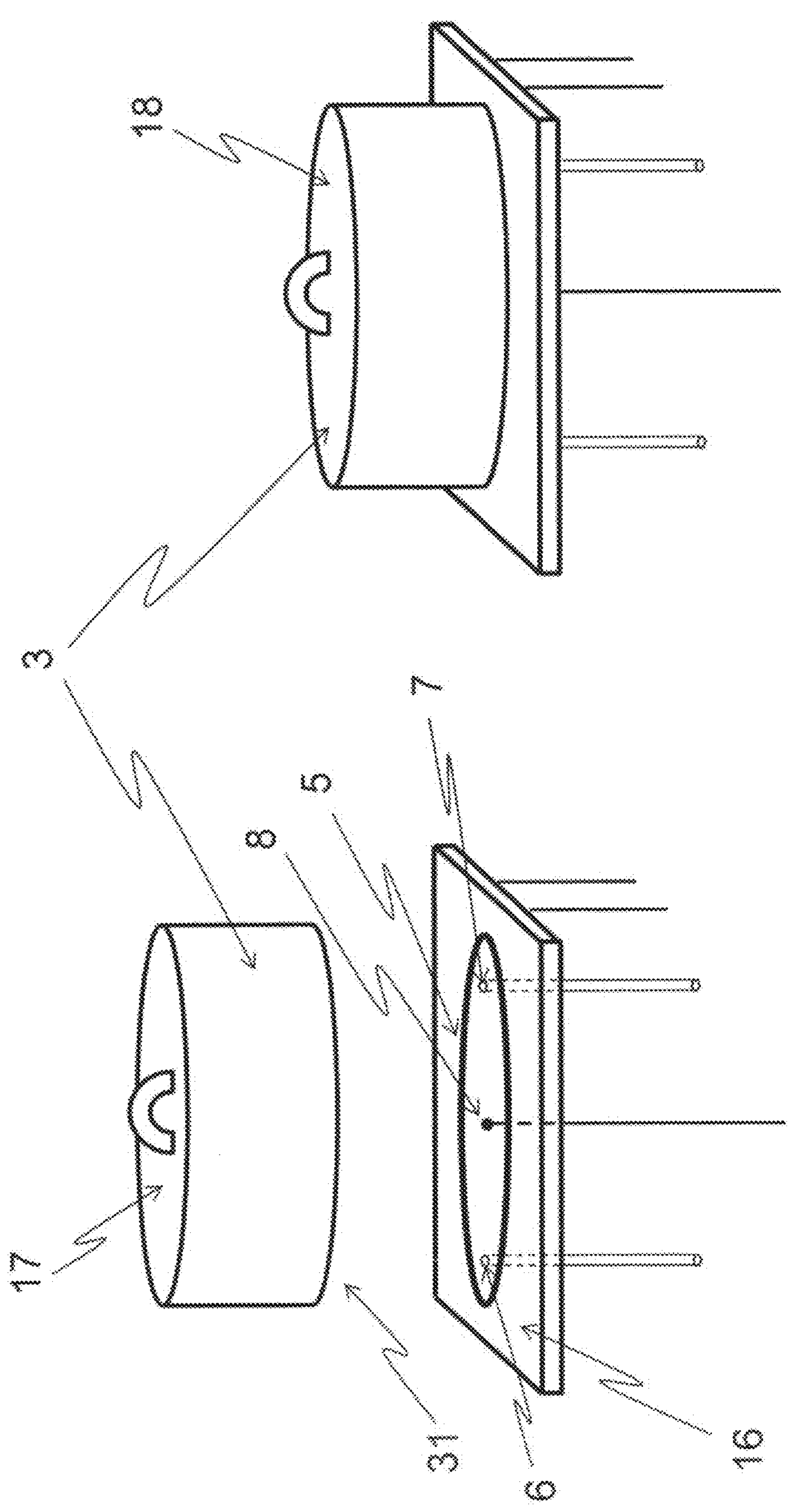
FIG. 4A is an isometric view of the electrically heated conduction platen element and vacuum chamber of FIG. 1 in the open position.
FIG. 4B is an isometric view of the electrically heated conduction platen element and vacuum chamber of FIG. 1 in the closed position.

FIGS. 4A and 4B depicts the vacuum chamber 3 in the open state 17 and closed state 18. Sealing O-ring 5 mates with vacuum chamber sealing surface 31 when going from open state 17 to closed state 18. During closed state 18, evacuation port 7 and atmospheric vent port 6 are sealed inside vacuum chamber 3 by virtue of being disposed within the diameter of sealing O-ring 5.

Figure 5:
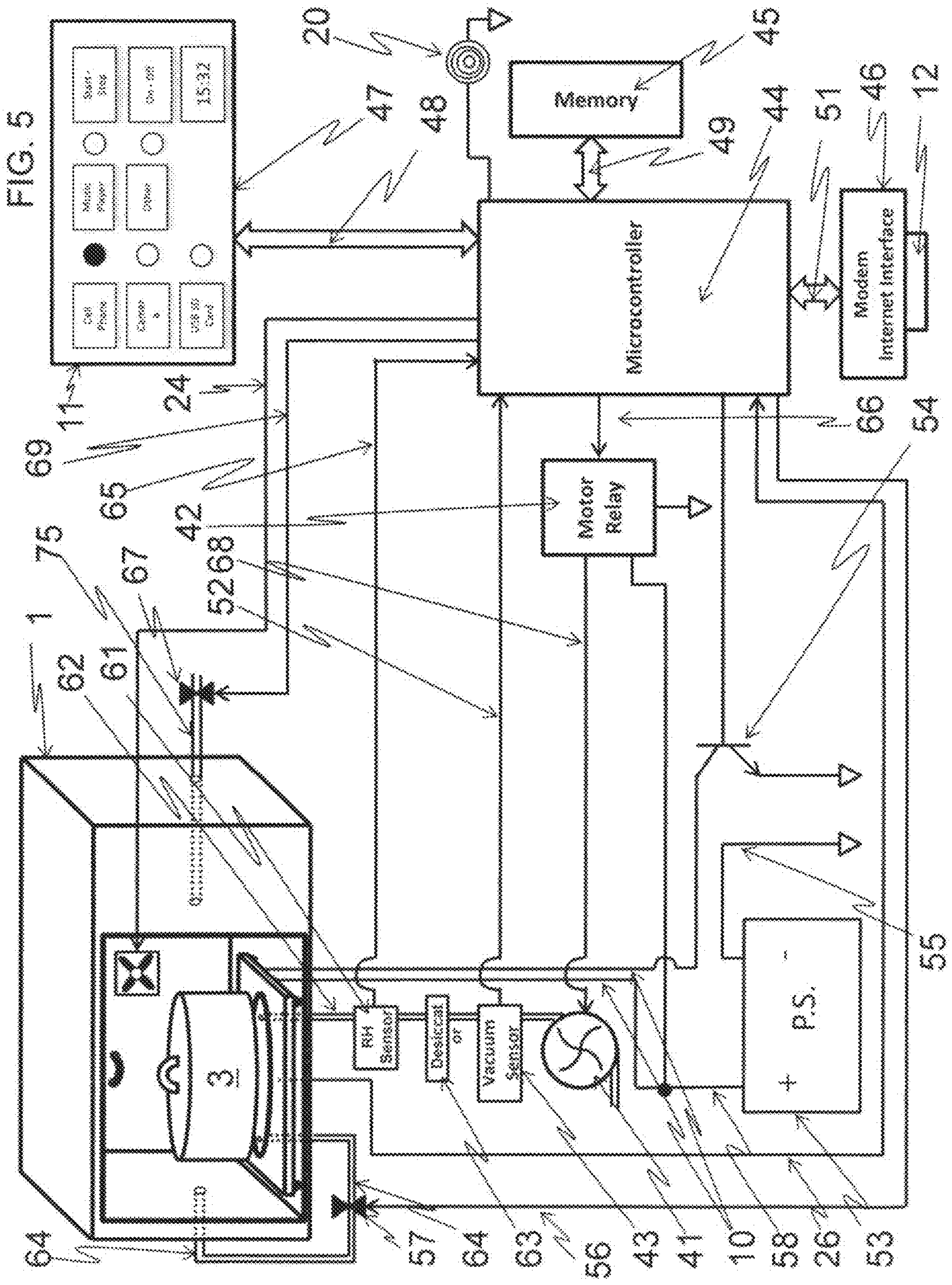
FIG. 5 is a block diagram depicting an electronics control system and electronic device drying apparatus according to one embodiment of the present disclosure.

Referring to FIG. 5, electronic device drying apparatus enclosure 1 is shown in an isometric view with control schematic in block diagram form according to one embodiment of the present invention. A controller, for example microprocessor 44, is electrically connected to user interface 47, memory 45, modem internet interface circuit 46, and evacuation pump relay 42 via user interface buss 48, memory interface buss 49, modem internet interface buss 51 and evacuation pump relay control line 66, respectively. Power supply 53 powers the entire system through, for example, positive power line 58 and negative ground line 55. Thermofoil resistance heater power lines 10 are directly connected to positive power line 58 and negative power line 55 through heater platen control transistor 54. Evacuation manifold 62 is connected to evacuation pump 41, which is electrically controlled via evacuation pump control line 68. Vacuum pressure sensor 43 is connected to evacuation manifold 62 and produces vacuum pressure level signals via vacuum pressure sensor signal wire 52. A relative humidity sensor 61 may be pneumatically connected to evacuation manifold 62 and can produce analog voltage signals that relate to the evacuation manifold 62 relative humidity. Analog voltage signals are sensed by relative humidity signal wire 61 to control microprocessor 44. Convection chamber vent solenoid 57 is connected to convection chamber vent manifold 64 and is controlled by control microprocessor 44 via convection chamber solenoid vent valve control signal 56. Atmospheric vent solenoid valve 67 is connected to atmospheric vent manifold 75 and is controlled by control microprocessor 44 via atmospheric solenoid vent valve control signal wire 69.

Figure 6A:
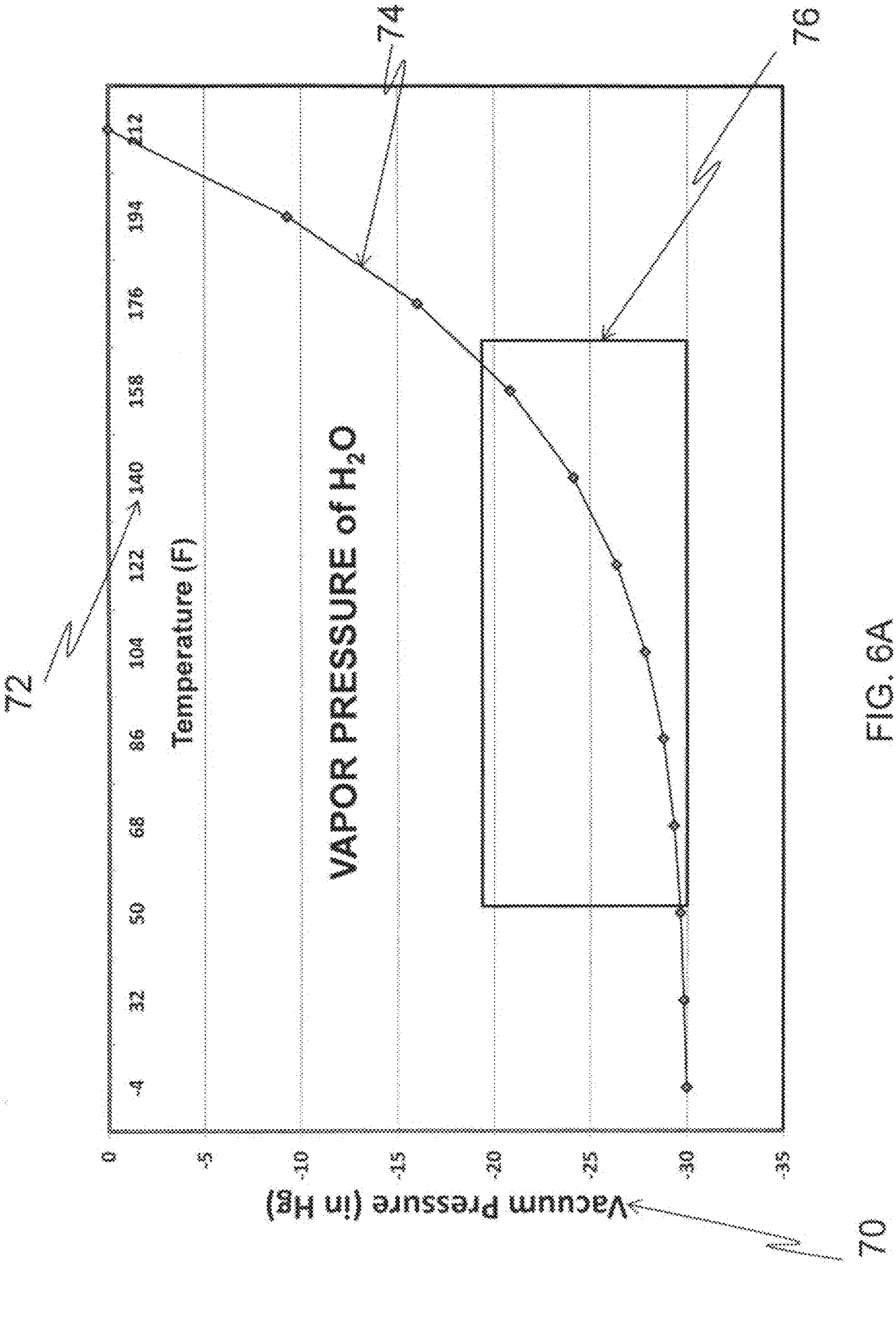
FIG. 6A is a graphical representation of the vapor pressure curve of water at various vacuum pressures and temperatures and a target heating and evacuation drying zone according to one embodiment of the present disclosure.
Figure 6B:
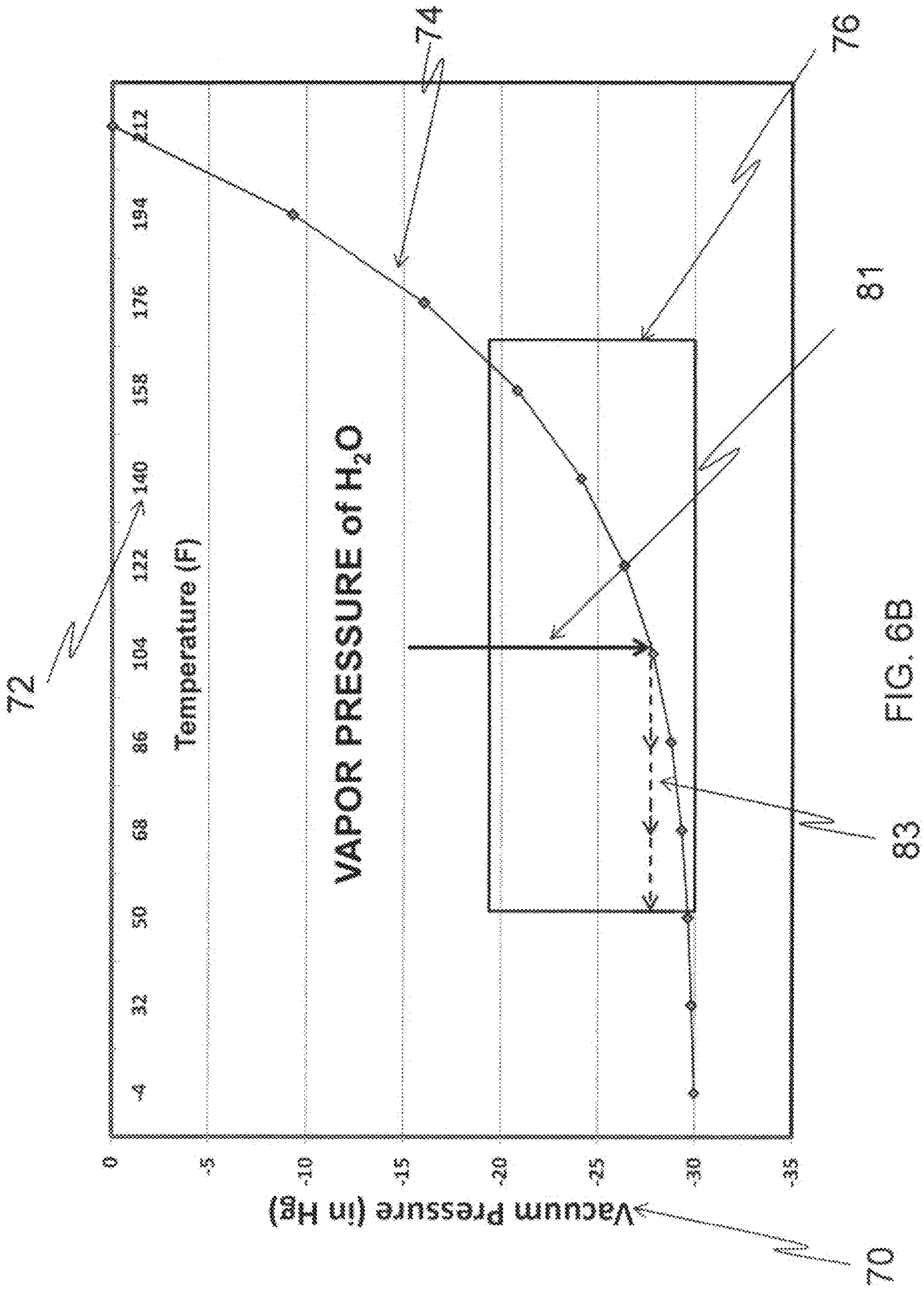
FIG. 6B is a graphical representation of the vapor pressure curve of water at a particular vacuum pressure depicting the loss of heat as a result of the latent heat of evaporation.
Figure 6C:
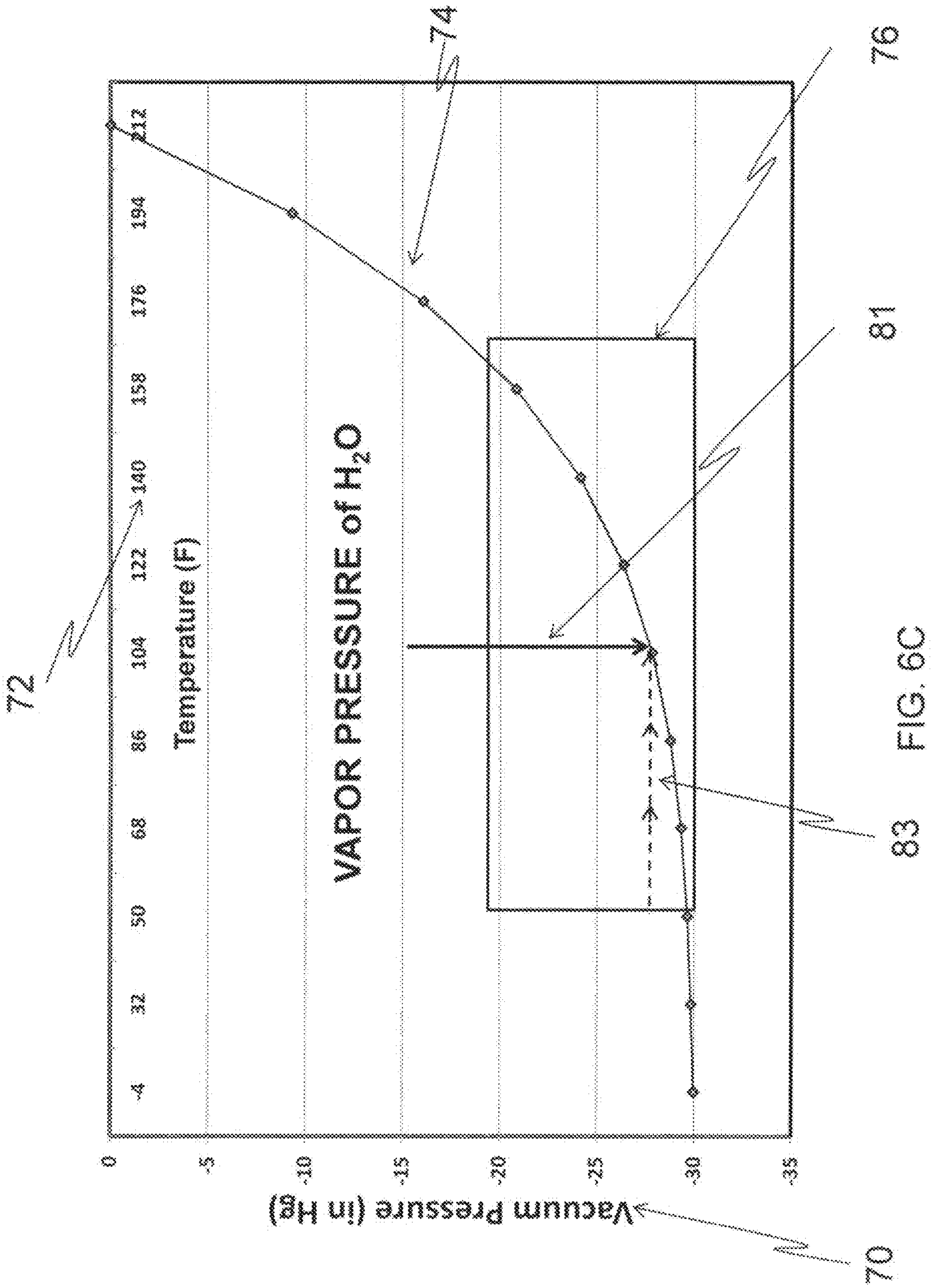
FIG. 6C is a graphical representation of the vapor pressure curve of water at a particular vacuum pressure depicting the gain of heat as a result of the conduction platen heating.

Referring to FIGS. 6A-6C, a graphical representation of water vapor pressure curve 74 is derived from known vapor pressure conversions that relate temperature of the water 72 and vacuum pressure of the air surrounding the water 70. Using the example depicted in FIG. 6B, water maintained at temperature 81 (approximately 104 deg. F.) will begin to boil at vacuum pressure 83 (approximately −27 in Hg). Using vapor pressure curve 74, a target or preferred heating and evacuation drying zone 76 for the automatic drying of portable electronic devices was found. The upper temperature limit of the evacuation drying zone 76 may be governed by the temperature at which materials used to construct the electronic device being dried will begin to deform or melt. The lower temperature limit of the evacuation drying zone 76 may be governed by the ability of evacuation pump 41 to generate the low pressure or the amount of time required for evacuation pump 41 to achieve the low pressure.

Figure 7:
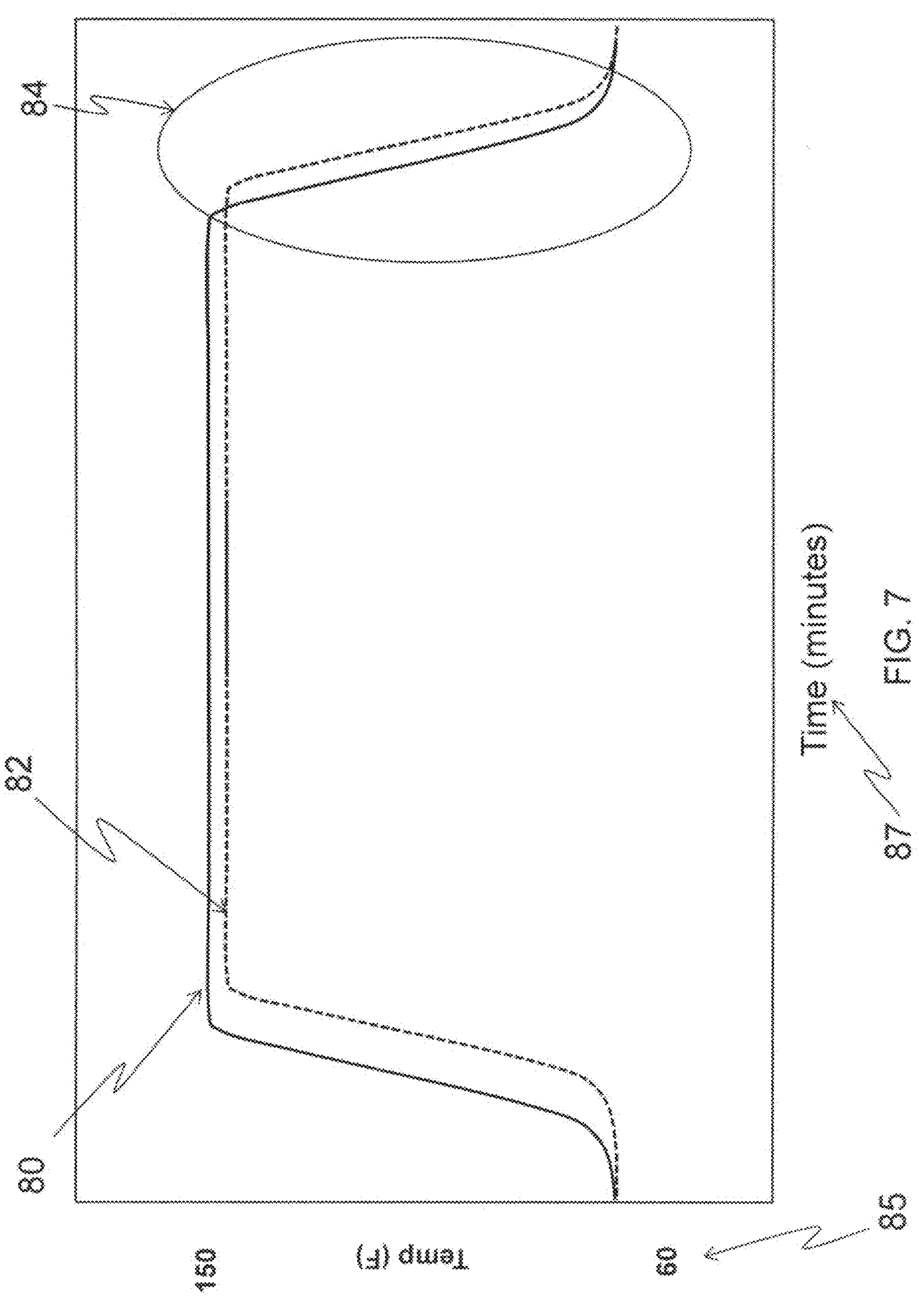
FIG. 7 is a graphical representation of the heated platen temperature and associated electronic device temperature without vacuum applied according to one embodiment of the present disclosure.

Referring to FIG. 7, a graphical representation of heated conduction platen heating curve 80 that is being heated to a temperature value on temperature axis 85 over some time depicted on time axis 87 according to one embodiment of the present invention. A portable electronic device resting on heated conduction platen 16 is subjected to heated conduction platen heating curve 80 and generally heats according to device heating curve 82. Device heating curve 82 is depicted lagging in time due to variation in thermal conduction coefficients.

Now referring to FIG. 8, a graphical representation of heated conduction platen heating curve 80 is depicted with temperature axis 85 over some time on time axis 87 together with vacuum pressure axis 92 according to another embodiment of the present invention. As a result of changing vacuum pressure curve 98 and by virtue of the latent heat escaping due to vapor evaporation of wetted portable electronic device, device heating curve 96 is produced.

When the moisture within the device evaporates, the device would typically cool due to the latent heat of evaporation. The addition of heat to the process minimizes the cooling of the device and helps to enhance the rate at which the moisture can be removed from the device.

Figure 9:
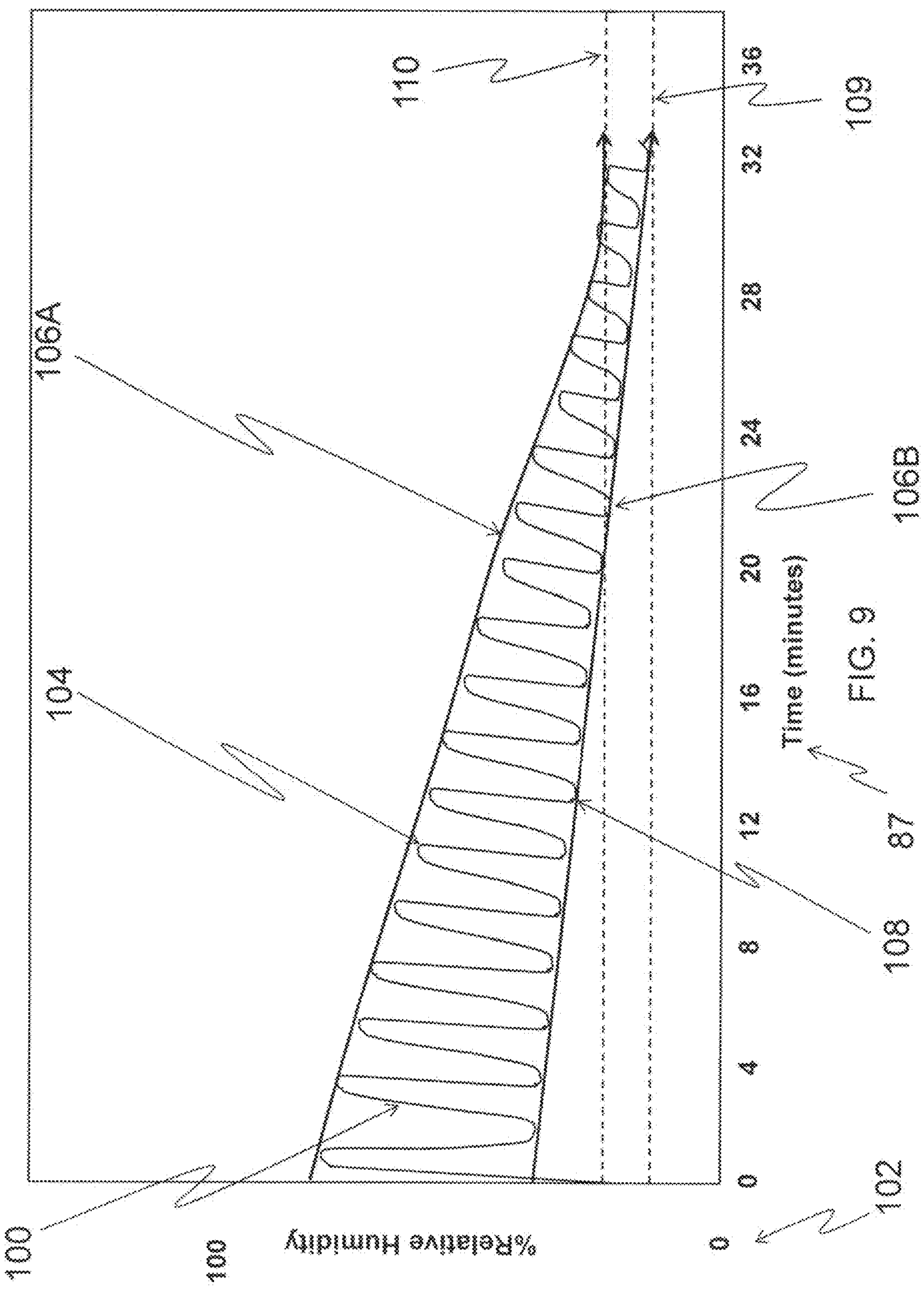
FIG. 9 is a graph depicting the relative humidity sensor output that occurs during the successive heating and vacuum cycles of the electronic device drying apparatus according to one embodiment of the present invention.

Referring to FIG. 9, a graphical representation of relative humidity sensor 61 is depicted with relative humidity axis 102 plotted against cycle time axis 87 according to an embodiment of the present invention. As moisture vaporizes in portable electronic device, the vaporization produces a relative humidity curve 100 that becomes progressively smaller and follows reduction line 106. Relative humidity peaks 104 get successively lowered and eventually minimize to room humidity 108.

Figure 27:
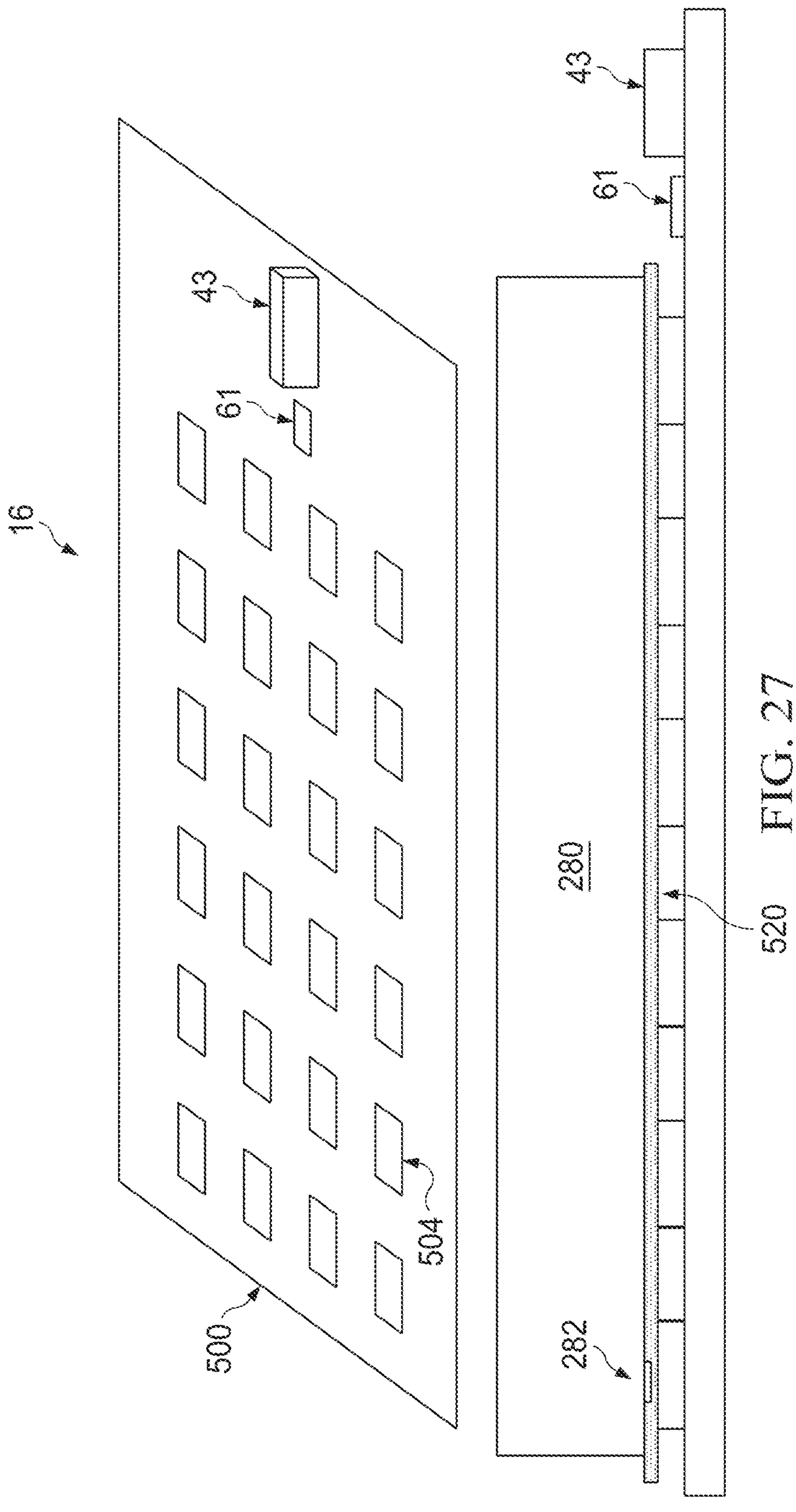
FIG. 27 is an isometric and side view of one of the preferred embodiments of the surface mount resistor platen heater with a silicone thermal pad and portable electronic device resting on silicone thermal pad.

Referring to FIG. 27, in one preferred embodiment, a printed circuit board substrate 500 with SMT resistors 504 makes up heated platen 16. Printed circuit board substrate 500 is used as an integration mechanism with electronic relative humidity sensor 61 and pressure sensor 43 being electrically and mechanically mounted onto printed circuit board substrate 500. Silicone thermal conduction layer 520 is shown adhered over printed circuit substrate 500 and SMT resistors 504. Silicone thermal conduction layer 520 being conformable to irregular surfaces like SMT resistors 504 can also accommodate irregular surfaces such as camera lenses 282 and the like as part of electronic device 280.

Figure 28:
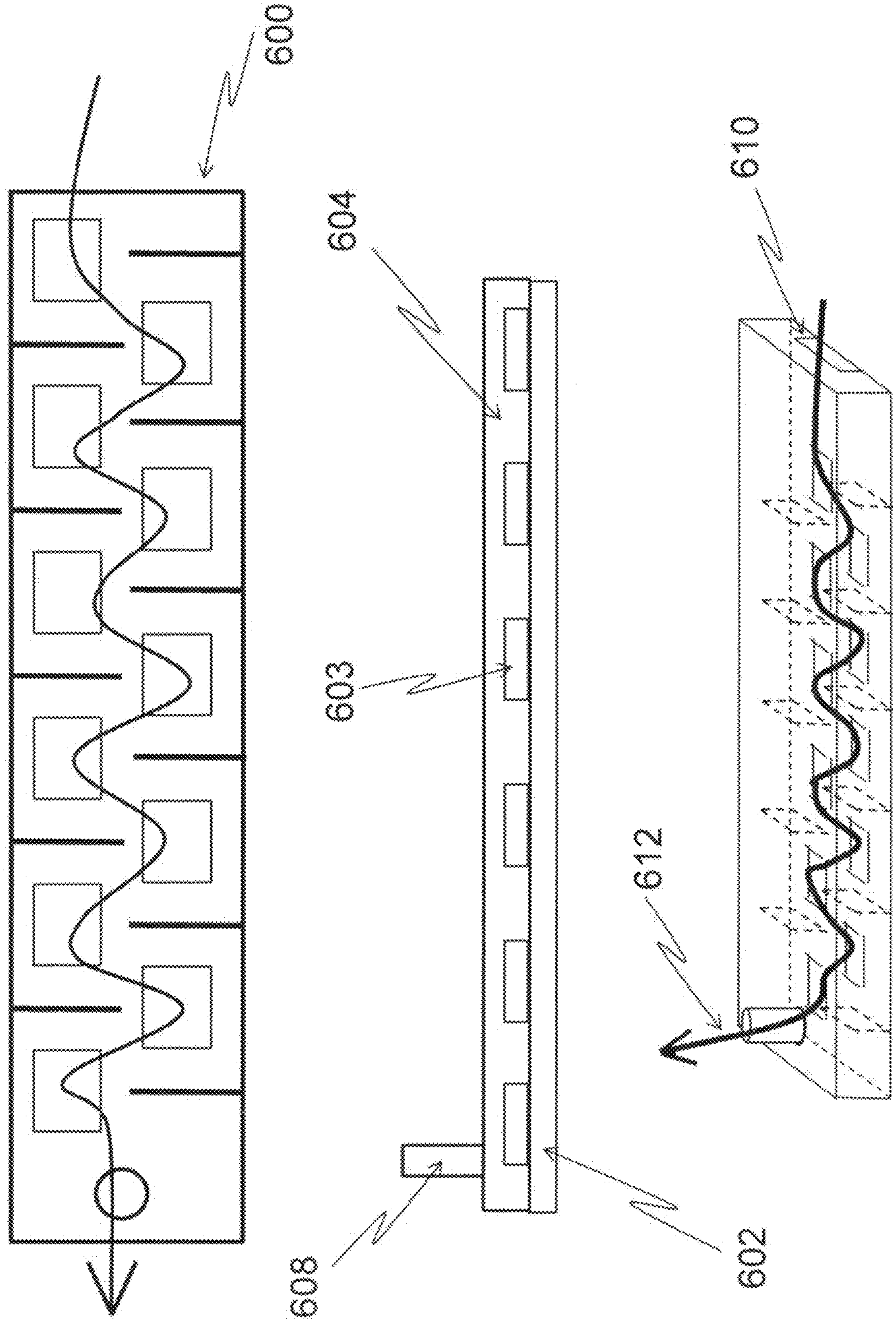
FIG. 28 is an isometric view and side view of one embodiment of a low voltage in-line heater shown with surface mount resistors and a cover to provide a torturous path for convective heat transfer.
Figure 29:
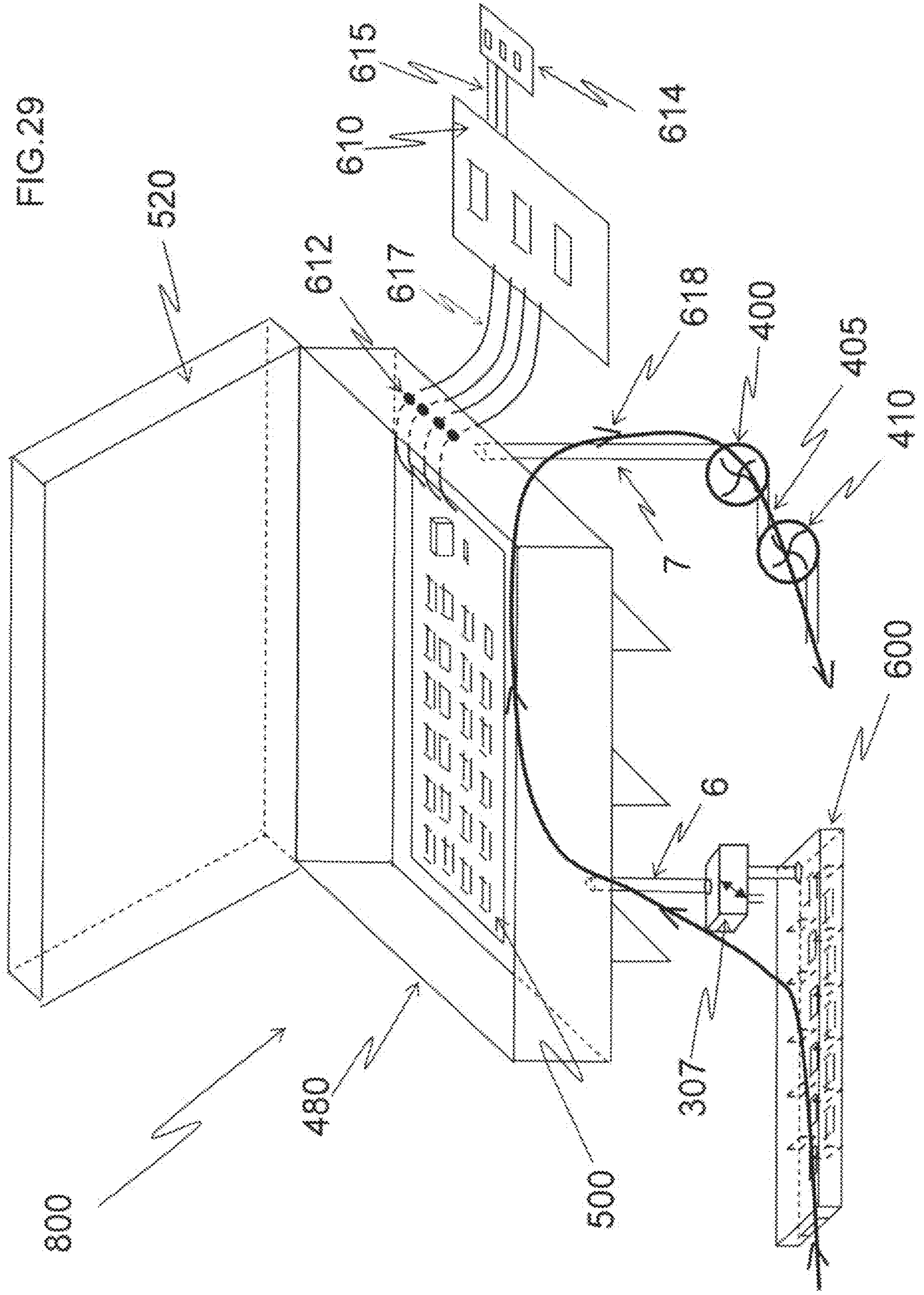
FIG. 29 is a block diagram of one embodiment of an electronic drying apparatus with a non-collapsible (rigid) vacuum chamber.

In other embodiments shown in FIG. 29, device dryer 800 is comprised of rectangular vacuum chamber 480, clear acrylic chamber lid 520, printed circuit board substrate 500 (FIG. 27) in-line heater 600 (FIG. 28), fresh air valve 307, electronic control board 610, and wireless electronic module 614 electrically connected to electronic control board 610 through cable 615. Electronic control board 610 is interfaced to printed circuit board substrate 500 using cable 617 and vacuum chamber pass-through 612. Miniature high vacuum pump 410 and miniature high volume pump 400 are connected pneumatically using pneumatic plenum 405 and to rectangular vacuum chamber 480 through pneumatic plenum 7. Fresh air valve 307 is connected to rectangular vacuum chamber 480 through pneumatic plenum 6.

Figure 30:
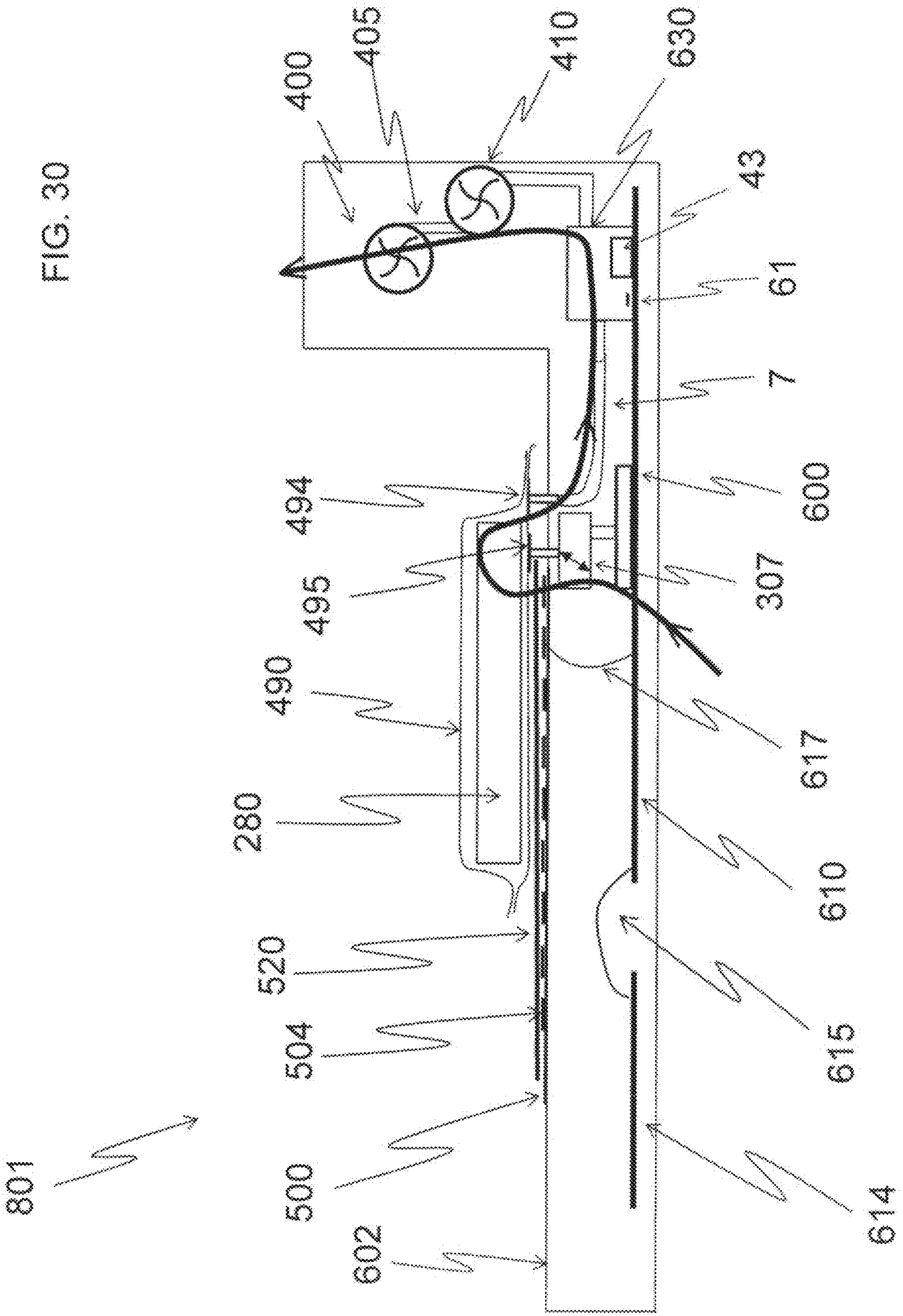
FIG. 30 is a block diagram of one an embodiment of an electronic drying apparatus with a collapsible vacuum pouch.

Referring to FIG. 30, device dryer 801 is comprised of collapsible vacuum pouch 490 is depicted resting on printed circuit board substrate 500 which has SMT resistors 504 providing conductive heat. Electronic device 280 is sealed inside collapsible vacuum pouch 490 with evacuation port 494 pneumatically connected to vacuum plenum 7 and fresh air port 495 pneumatically connected to fresh air valve 307. Electronic control board 610 surface has in-line heater 600, relative humidity sensor 61, and pressure sensor 43. Airtight enclosure 630 is mounted on electronic control board 610 and is used to seal relative humidity sensor 61 and pressure sensor 43 inside vacuum plenum 7 pathway. Miniature high vacuum pump 410 and miniature high volume pump 400 are pneumatically connected through air tight enclosure 630 and within structural enclosure 602.

In one embodiment, the electronic device drying apparatus 1 operates as follows:

A portable electronic device that has become wet or been exposed to humidity is inserted into convection chamber 4 by opening door 22 and placing the device under vacuum chamber 3 that has been lifted off heated conduction platen 16. The lifting of vacuum chamber 3 can be done manually or with a lifting mechanism. Door 22 can be hinged on top of convection chamber 4. (Either method does not take away from or enhance the spirit or intent of the invention).

To initiate a drying cycle operation, the user then pushes or activates on-off switch 19 in order to power on drying apparatus 1. Once the apparatus 1 is powered up, the user selects, via input device selection switches (see FIGS. 1 and 5) the appropriate electronic device for drying. Control microprocessor 44 senses the user's switch selection via user interface buss 48 by polling the input device selection switches 11, and subsequently acknowledges the user's selection by lighting the appropriate input device selection indicator light 15 (FIG. 1) for the appropriate selection. Microprocessor 44 houses software in non-volatile memory 45 and communicates with the software code over memory interface bus 49.

In one embodiment of the invention, memory 45 contains algorithms for the various portable electronic devices that can be dried by this invention—each algorithm containing specific heated conduction platen 16 temperature settings—and the correct algorithm is automatically selected for the type of electronic device inserted into apparatus 1.

In one embodiment, microprocessor 44 activates or powers on heated conduction platen 16 via control transistor 54 that switches power supply 53 positive and negative supply lines 58 and 55, respectively, into heater power wires 10. This switching of power causes thermofoil resistance heater 21 to generate heat via resistance heating. Thermofoil resistance heater 21, which is in thermal contact with (and can be laminated to) heated conduction platen 16, begins to heat to the target temperature and through, for example, physical contact with the subject device, allows heat to flow into and within the device via thermal conduction. In certain embodiments, the target temperature for the heated platen is at least 70 deg. F. and at most 150 deg. F. In further embodiments, the target temperature for the heated platen is at least approximately 110 deg. F. and at most approximately 120 deg. F.

In alternate embodiments the heating of heated conduction platen 16 is accomplished in alternate ways, such as by hot water heating, infrared lamps, incandescent lamps, gas flame or combustible fuel, Fresnel lenses, steam, human body heat, hair dryers, fissile materials, or heat produced from friction. Any of these heating methods would produce the necessary heat for heated conduction platen 16 to transfer heat to a portable electronic device.

Microprocessor 44 polls heated platen temperature sensor 8 (via heated platen temperature sensor signal line 26) and provides power to the platen 16 until platen 16 achieves the target temperature. Once the target temperature is achieved, microprocessor 44 initiates a timer, based on variables in memory 45 via memory interface buss 49, that allows enough time for heated conduction plate 16 to transfer heat into the portable electronic device. In some embodiments, platen 16 has a heated conduction platen heating profile 80 that takes a finite time to achieve a target temperature. Heating profile 80 (FIG. 7) is only one algorithm and the target temperature can lie on any point on temperature axis 85. As a result of heated conduction platen 16 transferring heat into the subject device, the device temperature profile 82 would be generated. In general, portable electronic device temperature profile 82 follows the heated conduction platen heating profile 80, and can generally fall anywhere on the temperature axis 85. Without further actions, the heated conduction platen heating profile 80 and portable electronic device heating profile 82 would reach a quiescent point and maintain these temperatures for a finite time along time 87. If power was discontinued to apparatus 1, the heated conduction platen heating profile 80 and portable electronic device heating profile 85 would cool per profile 84.

During the heating cycle, vacuum chamber 3 can be in open position 17 or closed position 18 as shown in FIGS. 4A and 4B and has little effect on the conductive heat transfer from heated conduction platen 16 to the portable electronic device.

Convection chamber fan 9 may be powered via fan control signal line 24 that is electrically connected to microprocessor 44 to circulate the air within convection chamber 4 and outside vacuum chamber 3. The air within convection chamber 4 is heated, at least in part, by radiated heat coming from heated conduction platen 16. Convection chamber fan 9 provides circulation means for the air within the convection chamber 4 and helps maintain a relatively uniform heated air temperature within convection chamber 4 and surrounding vacuum chamber 3. Microprocessor 44 can close atmospheric vent solenoid valve 67 by sending an electrical signal on atmospheric vent solenoid valve control signal line 69.

In one embodiment of the invention, there are separate heating elements to control the heat within the convection chamber 4. These heating elements can be common electrical resistance heaters. In one embodiment, platen 16 can be used to heat convection chamber 4 without the need for a separate convection chamber heater.

In operation, microprocessor 44 signals the user, such as via audible indicator 20 (FIGS. 1 and 5) that heated conduction platen 4 has achieved target temperature and can initiate an audible signal on audible indicator 20 for the user to move vacuum chamber 3 from the open position 17 to the closed position 18 (see FIGS. 4A and 4B) in order to initiate the drying cycle. Start-stop switch 13 may then be pressed or activated by the user, whereupon microprocessor 44 senses this action through polling user interface buss 48 and sends a signal to convection vent solenoid valve 57 (via convection chamber vent solenoid control signal wire 56), which then closes atmospheric vent 6 through pneumatically connected atmospheric vent manifold 64. The closure of the convection chamber vent solenoid valve 57 ensures that the vacuum chamber 3 is sealed when the evacuation of its interior air commences.

After the electronic device is heated to a target temperature (or in alternate embodiments when the heated platen reaches a target temperature) and after an optional time delay, the pressure within the vacuum chamber is decreased. In at least one embodiment, microprocessor 44 sends a control signal to motor relay 42 (via motor relay control signal line 66) to activate evacuation pump 41. Motor relay 42 powers evacuation pump 41 via evacuation pump power line 68. Upon activation, evacuation pump 41 begins to evacuate air from within vacuum chamber 3 through evacuation port 7, which is pneumatically connected to evacuation manifold 62. Microprocessor 44 can display elapsed time as on display timer 14 (FIG. 1). As the evacuation of air proceeds within vacuum chamber 3, vacuum chamber sealing surface 31 compresses vacuum chamber sealing O-ring 5 against heated conduction platen 16 surface to provide a vacuum-tight seal. Evacuation manifold 62 is pneumatically connected to a vacuum pressure sensor 43, which directs vacuum pressure analog signals to the microprocessor 44 via vacuum pressure signal line 52 for purposes of monitoring and control in accordance with the appropriate algorithm for the particular electronic device being processed.

As air is being evacuated, microprocessor 44 polls heated conduction platen 16 temperature, vacuum chamber evacuation pressure sensor 43, and relative humidity sensor 61, via temperature signal line 26, vacuum pressure signal line 52, and humidity signal line 65, respectively. During this evacuation process, the vapor pressure point of, for example, water on the surface of components within the portable electronic device follows known vapor pressure curve 74 as shown in FIGS. 6A-6C. In some embodiments, microprocessor 44 algorithms have target temperature and vacuum pressure variables that fall within, for example, a preferred vacuum drying target zone 76. Vacuum drying target zone 76 provides water evaporation at lower temperatures based on the reduced pressure within the chamber 4. Microprocessor 44 can monitor pressure (via vacuum pressure sensor 43) and relative humidity (via relative humidity sensor 61), and control the drying process.

As the pressure within the chamber decreases, the temperature of the electronic device will typically drop, at least in part due to the escape of latent heat of evaporation and the vapor being scavenged through evacuation manifold 62, despite the heated platen (or whatever type of component is being used to apply heat) being maintained at a constant temperature. The drop in pressure will also cause the relative humidity to increase, which will be detected by relative humidity sensor 61, being pneumatically connected to evacuation manifold 62.

After the pressure within the chamber has been decreases, it is again increased. This may occur after a predetermined amount of time or after a particular state (such as the relative humidity achieving or approaching a steady state value) is detected. The increase in pressure may be accomplished by microprocessor 44 sending a signal to convection chamber vent solenoid valve 57 and atmospheric vent solenoid valve 67 (via convection chamber vent solenoid valve control signal 56 and atmospheric solenoid valve control signal 69) to open. This causes air, which may be room air, to enter into atmospheric control solenoid valve 67, and thereby vent convection chamber 4. The opening of convection vent solenoid valve 57, which may occur simultaneously with the opening of convection chamber vent solenoid valve 57 and/or atmospheric vent solenoid valve 67, allows heated air within convection chamber 4 to be pulled into the vacuum chamber 3 by vacuum pump 41. Atmospheric air (e.g., room air) gets drawn in due to the evacuation pump 41 remaining on and pulling atmospheric air into vacuum chamber 3 via atmospheric vent manifold 64 and evacuation manifold 62.

After the relative humidity has been reduced (as optionally sensed through relative humidity sensor 61 and a relative humidity sensor feedback signal sent via relative humidity sensor feedback line 65 to microprocessor 44), convection chamber vent solenoid valve 57 and atmospheric solenoid valve 67 may be closed, such as via convection chamber vent solenoid valve control signal 56 and atmospheric solenoid valve control signal 69, and the pressure within the vacuum chamber is again decreased.

This sequence can produce an evacuation chamber profile curve 98 (FIGS. 8B and 8C) that may be repeated based on the selected algorithm and controlled under microprocessor 44 software control. Repetitive vacuum cycling (which may be conducted under constant heating) causes the wetting agent to be evaporated and forced to turn from a liquid state to a gaseous state. This gaseous state of the water allows the resultant water vapor to escape through the torturous paths of the electronic device through which liquid water may not otherwise escape.

In at least one embodiment, microprocessor 44 detects relative humidity peaks 104 (depicted in FIG. 9), such as by using a software algorithm that determines the peaks by detecting a decrease or absence of the rate at which the relative humidity is changing. When a relative humidity peak 104 is detected, the pressure within the vacuum chamber will be increased (such as by venting the vacuum chamber), and the relative humidity will decrease. Once the relative humidity reaches a minimum relative humidity 108 (which may be detected by a similar software algorithm to the algorithm described above), another cycle may be initiated by decreasing the pressure within the vacuum chamber.

Figure 8A:
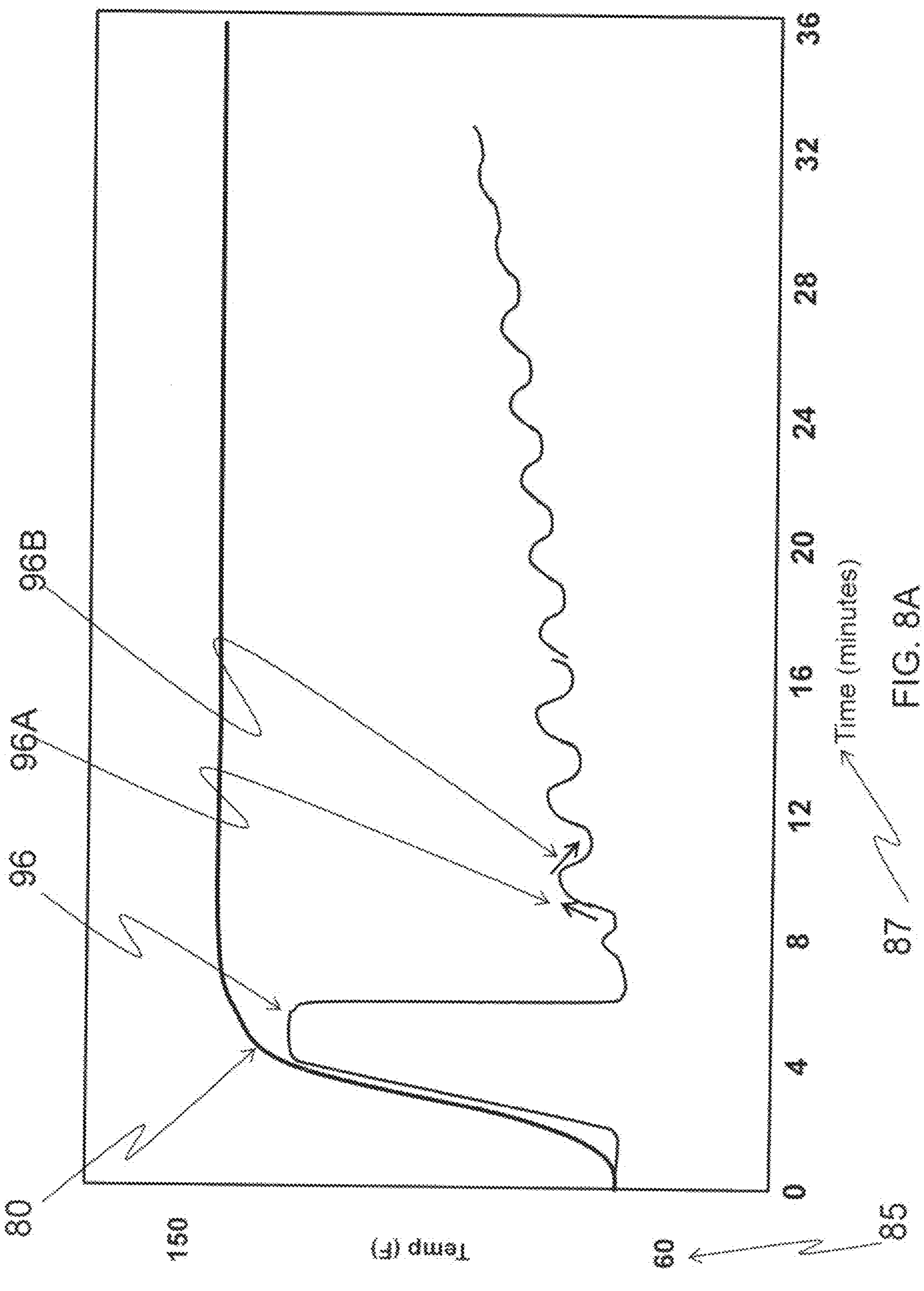
FIG. 8A is a graph depicting the heated platen temperature and associated electronic device temperature response with vacuum cyclically applied and then vented to atmospheric pressure for a period of time according to another embodiment of the present disclosure.
Figure 8B:
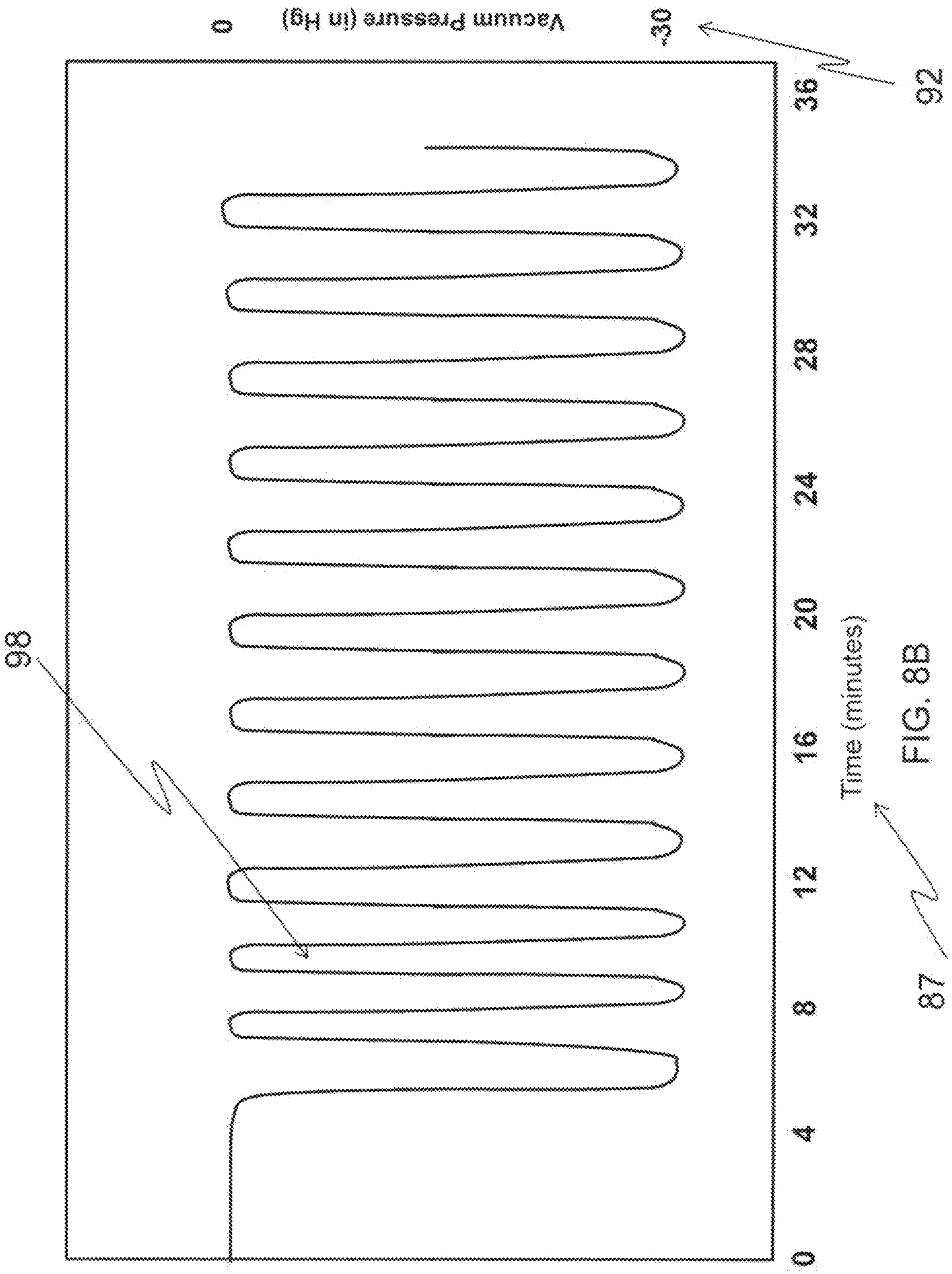
FIG. 8B is a graph depicting the vacuum cyclically applied and then vented to atmospheric pressure for a period of time according to another embodiment of the present disclosure.
Figure 8C:
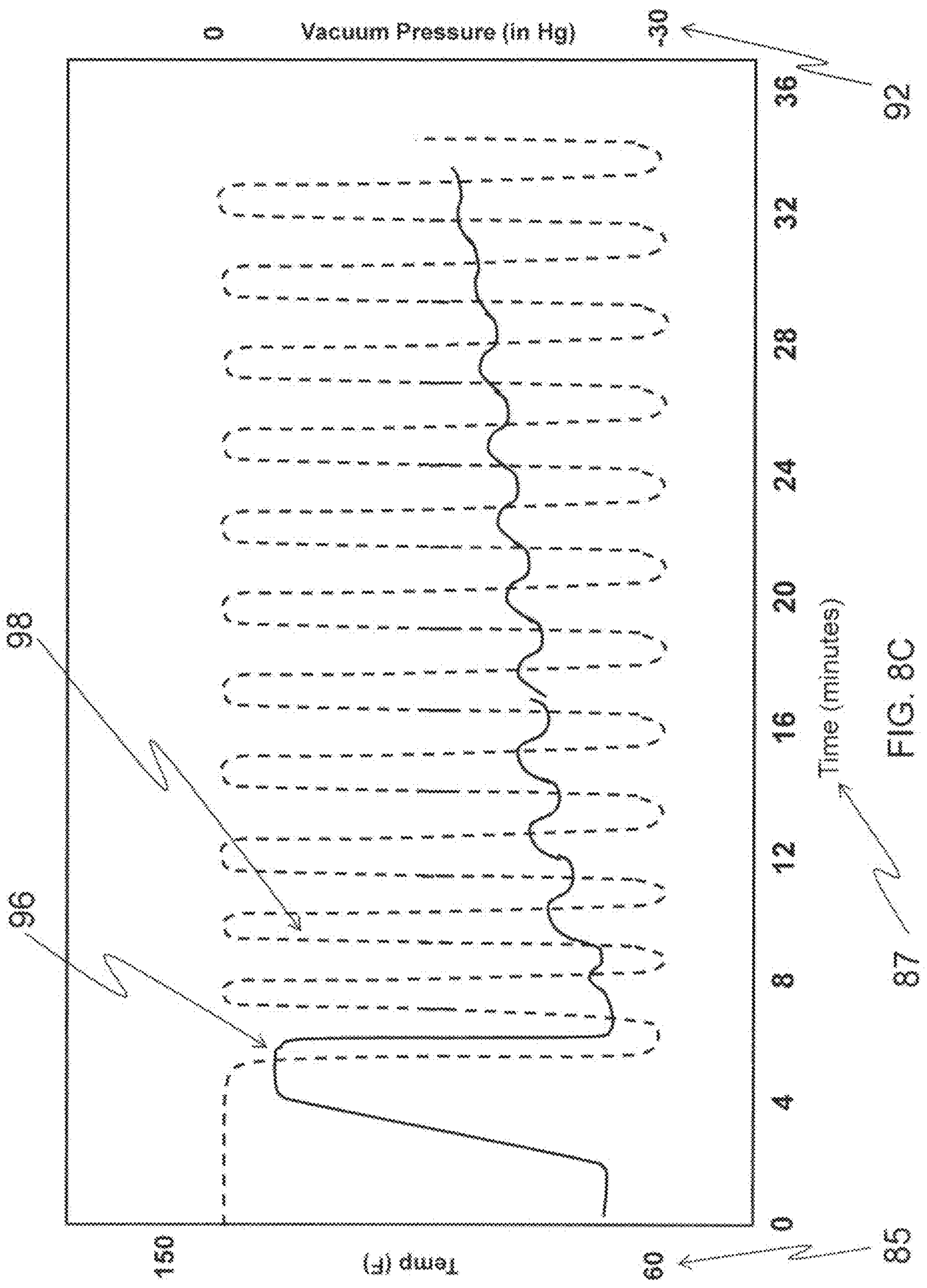
FIG. 8C is a graph depicting the vacuum cyclically applied and then vented to atmospheric pressure with the electronic device temperature response superimposed for a period of time according to another embodiment of the present disclosure.

Referring to FIGS. 8A and 8C, response curve directional plotting arrow 96A generally results from the heat gain when the system is in a purge air recovery mode, which permits the electronic device to gain heat. Response curve directional plotting arrow 96B generally results from latent heat of evaporation when the system is in vacuum drying mode. As consecutive cycles are conducted, the temperature 96 of the electronic device will tend to gradually increase, and the changes in temperature between successive cycles will tend to decrease.

In some embodiments, microprocessor 44 continues this repetitive heating and evacuation of vacuum chamber 3 producing a relative humidity response curve 100 (FIG. 9). This relative humidity response curve 100 may be monitored by the software algorithm with relative humidity cyclic maximums 104 and cyclic minimums 108 stored in registers within microprocessor 44. In alternate embodiments, relative humidity maximums 104 and minimums 108 will typically follow a relative humidity drying profile 106A and 106B and are asymptotically minimized over time to minimums 109 and 110. Through one or more successive heating cycles 96 and evacuation cycles 98, as illustrated in FIG. 8, the portable electronic device arranged within the vacuum chamber 3 is dried. Control algorithms within microprocessor 44 can determine when the relative humidity maximum 104 and relative humidity minimum 108 difference is within a specified tolerance to warrant deactivating or stopping vacuum pump 41.

The system can automatically stop performing consecutive drying cycles when one or more criteria are reached. For example, the system can stop performing consecutive drying cycles when a parameter that changes as the device is dried approaches or reaches a steady-state or end value. In one example embodiment, the system automatically stops performing consecutive drying cycles when the relative humidity falls below a certain level or approaches (or reaches) a steady-state value. In another example embodiment, the system automatically stops performing consecutive drying cycles when the difference between maximum and minimum relative humidity in a cycle falls below a certain level. In still another example embodiment, the system automatically stops performing consecutive drying cycles when the temperature 96 of the electronic device approaches or reaches a steady-state value.

Referring again to FIGS. 1 and 5, microprocessor 44 may be remotely connected to the Internet via, e.g., an RJ11 modem Internet connector 12 that is integrated to the modem interface 46. Microprocessor 44 may thus send an Internet or telephone signal via modem Internet interface 46 and RJ11 Internet connector 12 to signal the user that the processing cycle has been completed and that the electronic device is sufficiently dried.

Thus, simultaneous conductive heating and vacuum drying can be achieved and tailored to specific electronic devices based upon portable electronic materials of construction to dry the various types of electronic devices without damage.

In alternate embodiments, an optional desiccator 63 (FIG. 5) may be connected to evacuation manifold 62 upstream of evacuation pump 41. One example location for desiccator 63 is downstream of relative humidity sensor 61 and upstream of evacuation pump 41. When included, desiccator 63 can absorb the moisture in the air coming from vacuum chamber 3 prior to the moisture reaching evacuation pump 41. In some embodiments desiccator 63 can be a replaceable cartridge or regenerative type desiccator.

In embodiments were the evacuation pump is of the type that uses oil, there can be a tendency for the oil in evacuation pump to scavenge (or absorb) water from the air, which can lead to entrainment of water into the evacuation pump, premature breakdown of the oil in the evacuation pump, and/or premature failure of the evacuation pump. In embodiments where the evacuation pump is of the oil free type, high humidity conditions can also lead to premature failure of the pump. As such, advantages may be realized by removing water (or possibly other air constituents) from the air with desiccator 63 before the air reaches evacuation pump 41.

Although many of the above embodiments describe drying apparatuses and methods that are automatically controlled, other embodiments include drying apparatuses and methods that are manually controlled. For example, in one embodiment a user controls application of heat to the wetted device, application of a vacuum to the wetted device, and release of the vacuum to the wetted device.

Figure 10:
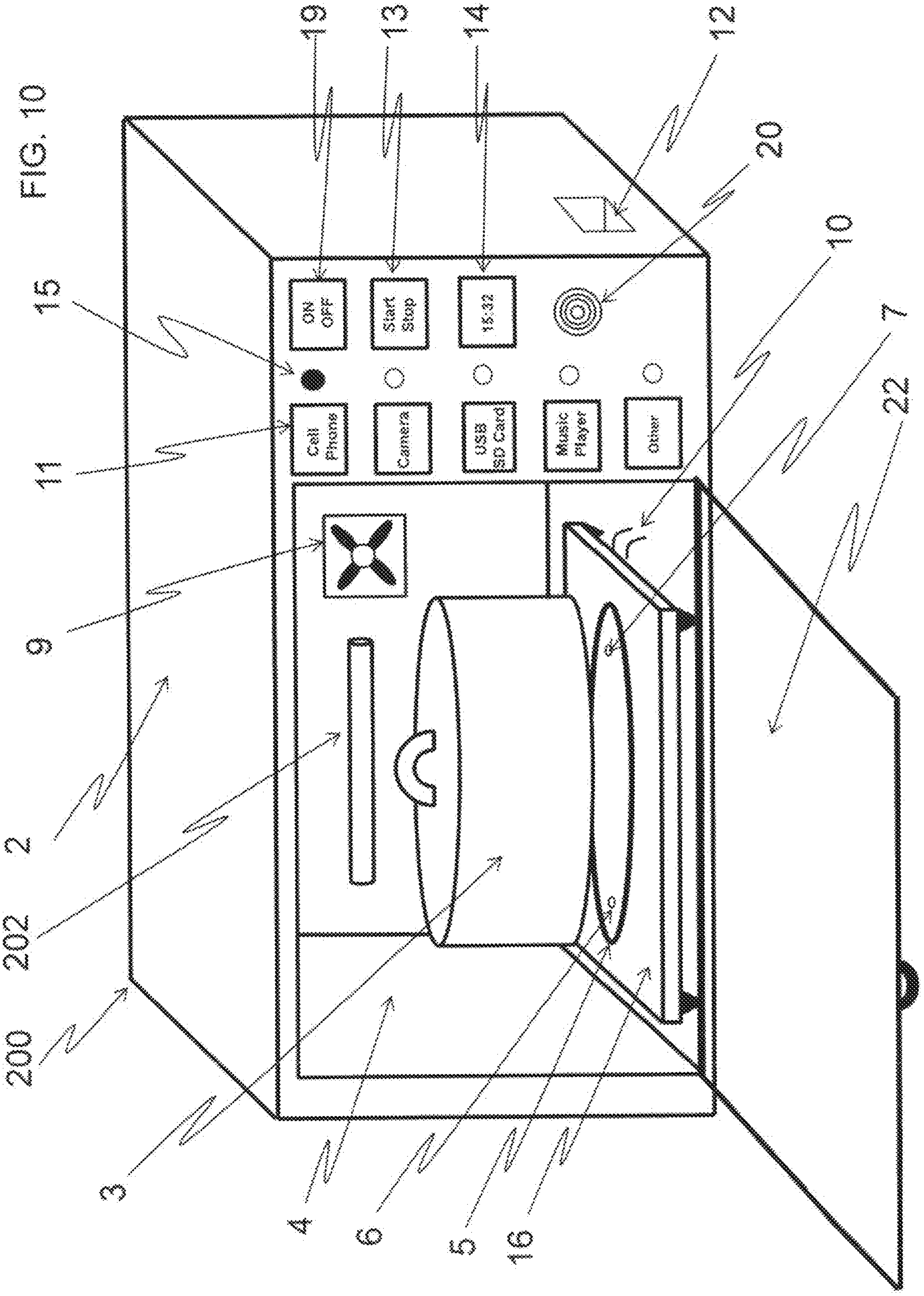
FIG. 10 is an isometric view of an electronic device drying apparatus and germicidal member according to another embodiment of the present disclosure.

Depicted in FIG. 10 is a drying apparatus, e.g., an automatic portable electronic device drying apparatus 200, according to another embodiment of the present invention. Many features and components of drying apparatus 200 are similar to features and components of drying apparatus 1, the same reference numerals being used to indicate features and components that are similar between the two embodiments. Drying apparatus 200 includes a disinfecting member, such as ultraviolet (UV) germicidal light 202, that may, for example, kill germs. Light 202 may be mounted inside convection chamber 4 and controlled by a UV germicidal light control signal 204. In one embodiment, the UV germicidal light 202 is mounted inside convection chamber 4 and outside vacuum chamber 3, with the UV radiation being emitted by germicidal light 202 and passing through vacuum chamber 3, which may be fabricated from UV light transmissive material, one example being Acrylic plastic. In an alternate embodiment, UV germicidal light 202 is mounted inside vacuum chamber 3, which may have benefits in embodiments where vacuum chamber 3 is fabricated from non-UV light transmissive material.

In one embodiment, the operation of drying apparatus 200 is similar to the operation of drying apparatus 1 as described above with the following changes and clarifications. Microprocessor 44 sends control signal through UV germicidal lamp control line 204 and powers-up UV germicidal lamp 202, which may occur at or near the activation of heated conduction platen 16 by microprocessor 44. In one embodiment, UV germicidal lamp 202 will then emit UV waves in the 254 nm wavelength, which can penetrate vacuum chamber 3, particularly in embodiments where vacuum chamber 3 is fabricated from clear plastic in one embodiment.

Figure 11:
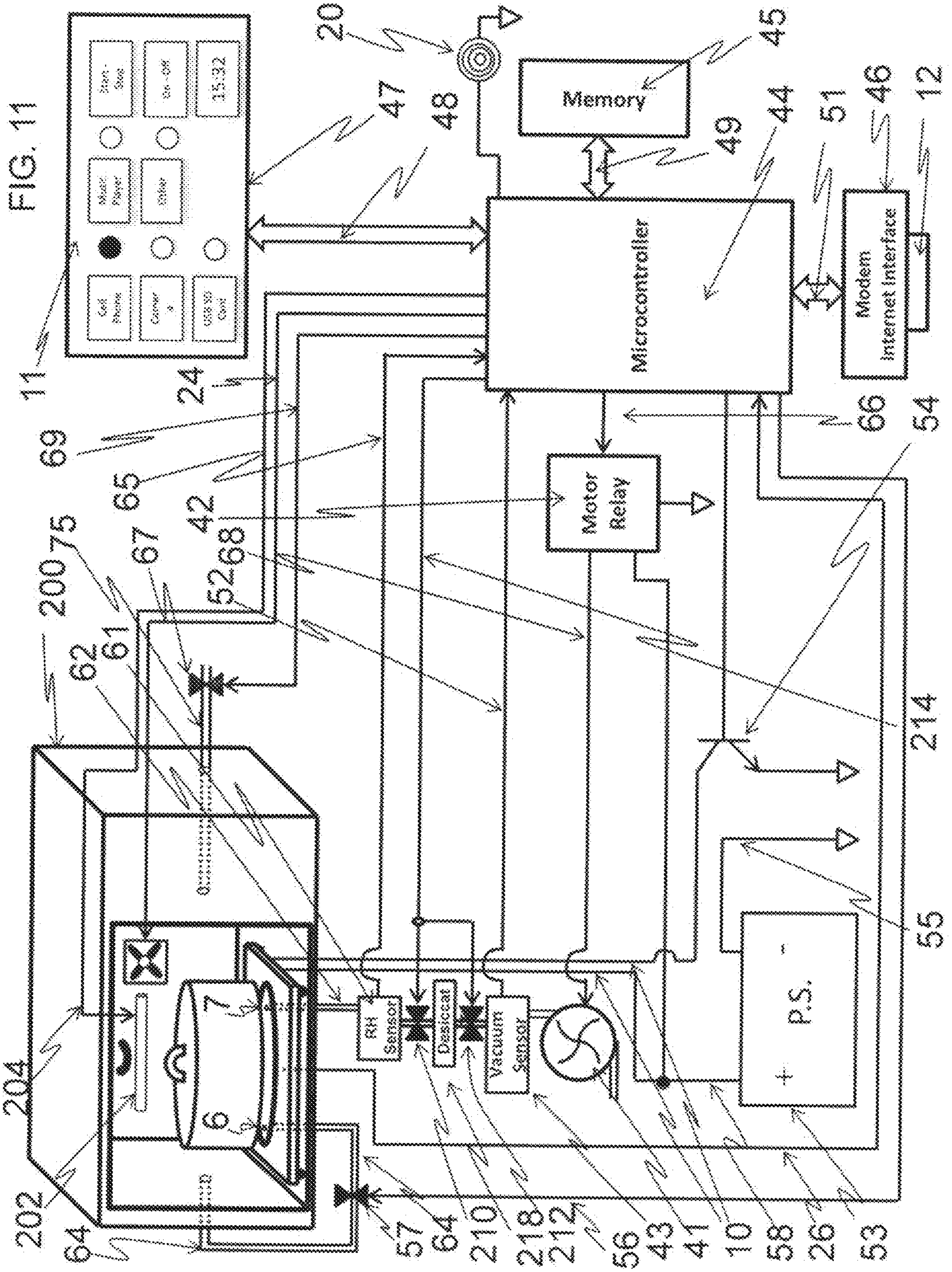
FIG. 11 is a block diagram depicting an electronics control system, electronic device drying apparatus, and germicidal member according to a further embodiment of the present disclosure.

In still further embodiments, one or more desiccators 218 may be isolated from evacuation manifold 62, which may have advantages when performing periodic maintenance or performing automated maintenance cycles of the drying apparatus. As one example, the embodiment depicted in FIGS. 11-13 includes valves (e.g., 3-way air purge solenoid valves 210 and 212) that can selectively connect and disconnect desiccator 218 from evacuation manifold 62. Solenoid valve 210 is positioned between relative humidity sensor 61 and desiccator 218, and solenoid valve 212 positioned between desiccator 218 and vacuum sensor 43. In the illustrated embodiment, 3-way air purge valves 210 and 212 have their common distribution ports pneumatically connected to desiccator 218. This common port connection provides simultaneous isolation of desiccator 218 from exhaust manifold 62 and disconnection of exhaust manifold 62 and vacuum pump 41. This disconnection prevents moisture from vacuum chamber 3 reaching vacuum pump 41 while desiccator 63 is being regenerated. Operation of this embodiment is similar to the embodiment described in relation to FIG. 5 with the following changes and clarifications.

An optional desiccator heater 220 and optional desiccator air purge pump 224 may be included. While desiccator 218 is isolated from evacuation manifold 62 and vacuum pump 41, desiccator 218 may be heated by desiccator heater 220 without affecting vacuum manifold 62 and associated pneumatic vacuum circuitry. As desiccant inside desiccator 218 is heated, for example to a target temperature, to bake off absorbed moisture, purge pump 224 can modulate (for example, according to a maintenance control algorithm with a prescribed time and/or temperature profile commanded by microprocessor 44) to assist in the removal of moisture from desiccant 218. In certain embodiments, the target temperature for the desiccator heater is at least 200 deg. F. and at most 300 deg. F. In further embodiments, the target temperature for the desiccator heater is approximately 250 deg. F.

As purge pump 224 is modulated, atmospheric air is forced along air path 235, across the desiccant housed inside desiccator 218, and the moisture laden air is blown off through atmospheric port 238. An optional desiccator cooling fan 222 may be included (and optionally modulated by microprocessor 44) to reduce the desiccant temperature inside desiccator 218 to a temperature suited for the desiccant to absorb moisture rather than outgas moisture.

When the drying cycle is initiated according to one embodiment, atmospheric vent 6 is closed and microprocessor 44 sends control signals via 3-way air purge solenoid control line 214 to 3-way air purge solenoid valves 210 and 212. This operation closes 3-way air purge solenoid valves 210 and 212 and allows vacuum pump 41 to pneumatically connect to evacuation manifold 62. This pneumatic connection allows evacuated air to flow along air directional path 215, through evacuation manifold 62 and through desiccator 218 before reaching vacuum pump 41. One advantage that may be realized by removing moisture from the evacuated air prior to reaching vacuum pump 41 is a dramatic decrease in the failure rate of vacuum pump 41.

After microprocessor 44 algorithm senses that the portable electronic device is dried, microprocessor 44 may signal the system to enter a maintenance mode. UV germicidal light 202 may be powered off via UV germicidal light control line 204 from microprocessor 44. Microprocessor 44 powers desiccator heater 220 via desiccator heater power relay control signal 166 and desiccators heater power relay 228. The temperature of desiccator 218 may be sampled by microprocessor 44 via desiccator temperature probe 230, and the heating of desiccator 218 may be controlled to a specified temperature that begins baking out the moisture in desiccant housed in desiccator 218. The 3-way air purge solenoid valves 210 and 212 may be electrically switched via 3-way air purge solenoid control line 202 when it is determined that sufficient drying has occurred, which may occur at a finite time specified by microprocessor 44 maintenance algorithm. Air purge pump 224 may then be powered on by microprocessor 44 via air purge pump control signal 232 to flush moisture laden air through desiccator 218 and into atmospheric vent port 238. Microprocessor 44 may use a timer in the maintenance algorithm to heat and purge moisture laden air for a finite time. Once the optional maintenance cycle is complete, microprocessor 44 may turn on desiccator cooling fan 222 to cool desiccator 218. Microprocessor 44 may then turn off air purge pump 224 to ready the system for the drying and optional disinfecting of another electronic device.

Figure 12:
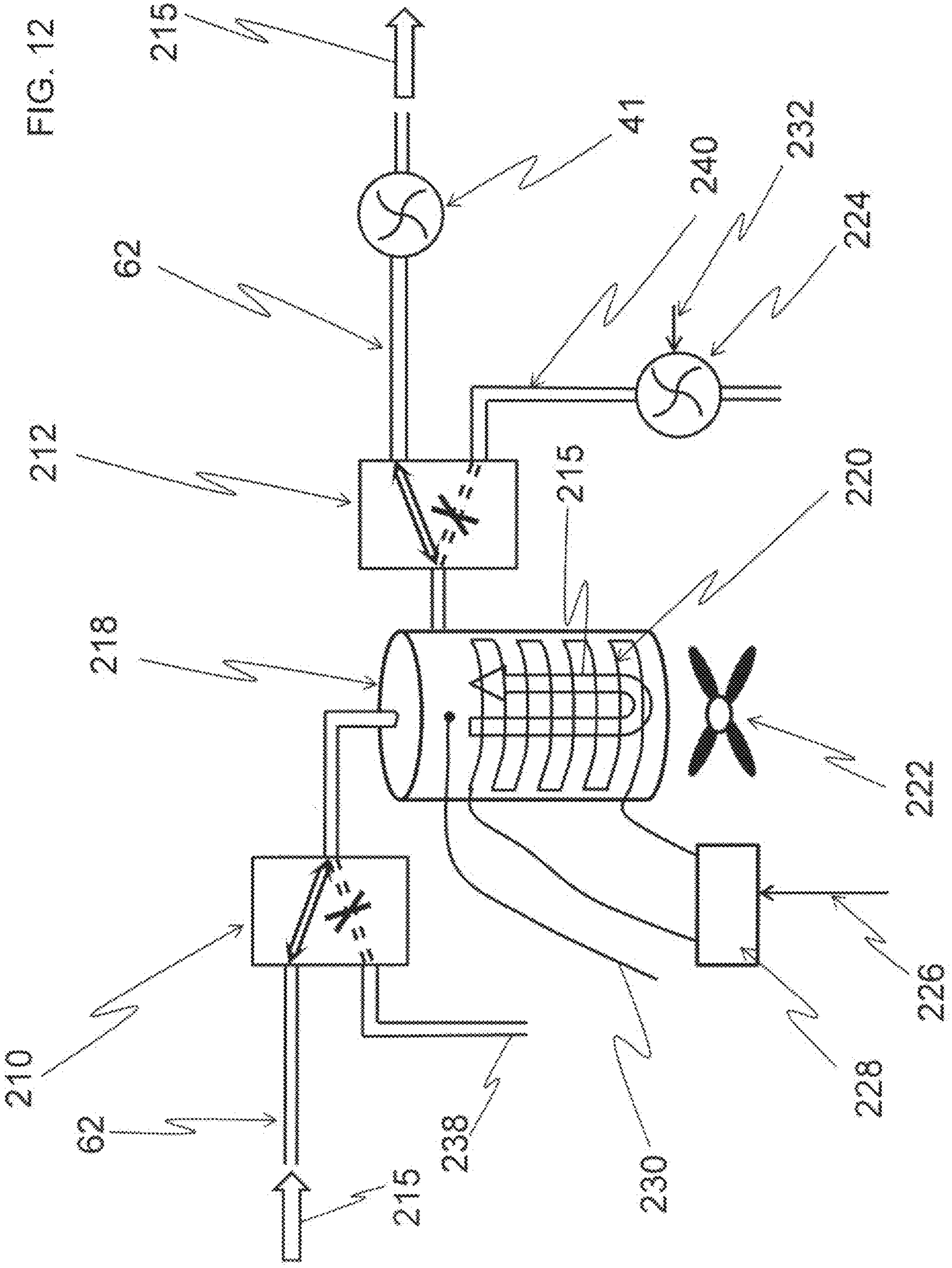
FIG. 12 is a block diagram of a regenerative desiccator depicted with 3-way solenoid valves in the open position to, for example, provide vacuum to an evacuation chamber in the moisture scavenging state according to another embodiment.
Figure 13:
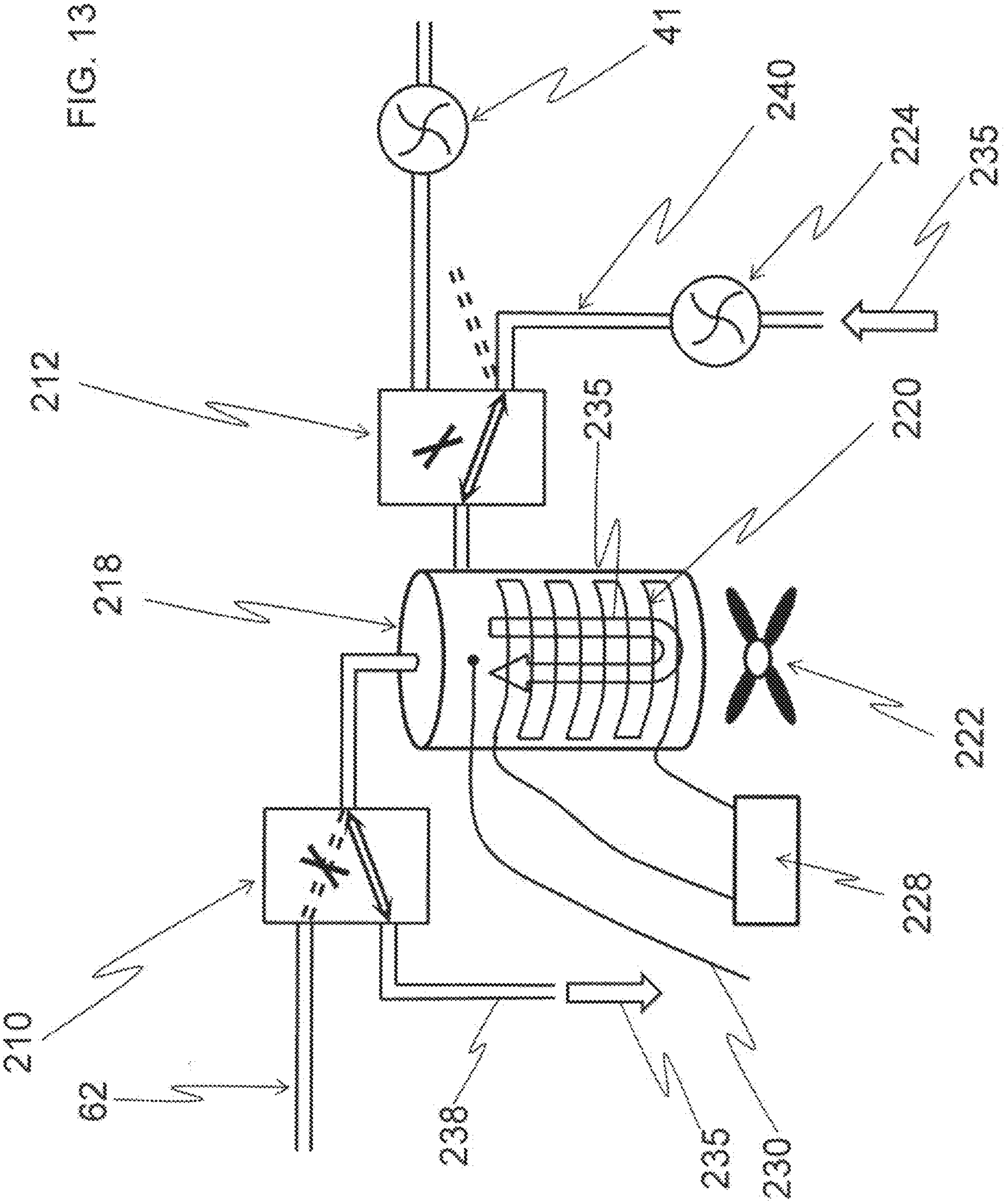
FIG. 13 is a block diagram of the regenerative desiccator of FIG. 12 depicted with 3-way solenoid valves in the closed position to, for example, provide an air purge to the desiccators.

Referring to FIG. 12, desiccator 218 is shown with a desiccator heater 220, a desiccator temperature sensor 230, a desiccator cooling fan 222, and desiccator air purge solenoid valves 210 and 212. Vacuum pump 41 is connected to evacuation manifold 62 and air purge pump 224 is pneumatically connected to air purge solenoid valve 212 via air purge manifold 240. 3-way air purge solenoid valves 210 and 212 are depicted in the state to enable vacuum through desiccator 218 as shown by air directional path Referring to FIG. 13, desiccator 3-way air purge solenoid valves 210 and 212 are depicted in a maintenance state, which permits air flow from air purge pump 224 flushed "backwards" along direction 235 through desiccator and out via purged air port 238. Air purge pump 224 can generate or cause pressurized air to flow along air directional path 235. This preferred directional path of atmospheric air permits the desiccant to give up moisture in a pneumatically isolated state and prevents moisture from entering air purge pump 224, which would occur if air purge pump pulled air through desiccator 218. Purge pump 224 can continue to blow air in the directional path 235 for a prescribed time in microprocessor 44 maintenance control algorithm. In one embodiment, an in-line relative humidity sensor similar to relative humidity sensor 61 is incorporated to sense when desiccator 218 is sufficiently dry.

As described above in at least one embodiment, evacuation manifold 62 is disconnected from vacuum pump 41 when desiccator 218 is disconnected from evacuation manifold 62. Nevertheless, alternate embodiments include an evacuation manifold 62 that remains pneumatically connected with vacuum pump 41 when desiccator 218 is disconnected from evacuation manifold 62. This configuration may be useful in situations where desiccator 218 may be blocking airflow, such as when desiccator 218 has malfunctioned, and operation of drying apparatus 200 is still desired.

Figure 14:
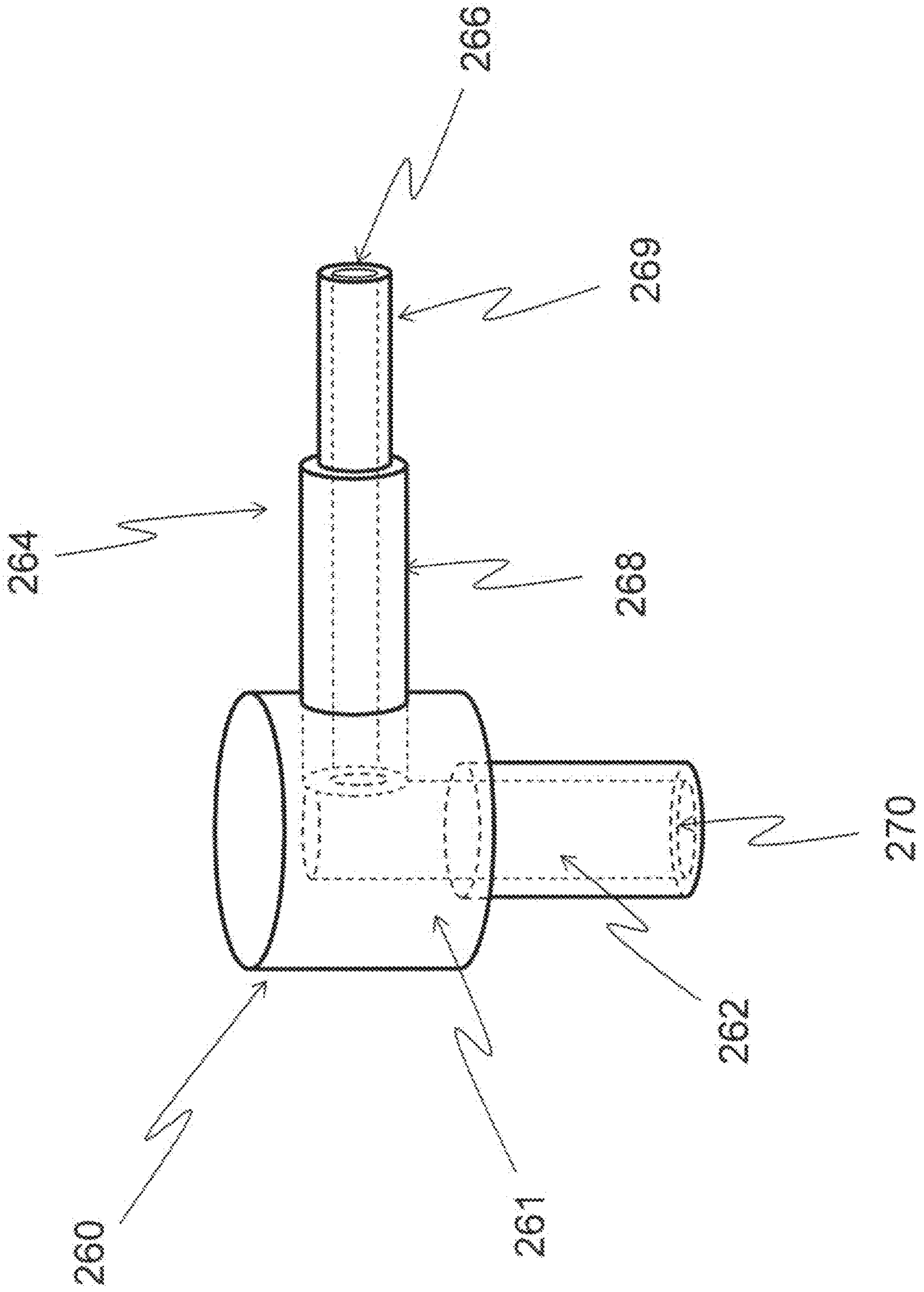
FIG. 14 is an isometric, partially transparent view of a nozzle adapted to inject heated air into an electronic device according to one embodiment of the present disclosure.

Depicted in FIG. 14 is an air injection nozzle 260 according to one embodiment of the present disclosure. Nozzle 260 includes a nozzle body 261 and an injector port 264. Nozzle body 260 includes a passageway 262 through which a gas (such as air) can flow through nozzle 260 between nozzle body orifice 270 and injection port orifice 266. Injection port 264 is generally sized to be received within a standard receptacle in the electronic device, such as with an outer diameter equal to approximately 3.5 mm or 2.5 mm.

In some embodiments, injection port 264 is configured to be received within differently sized receptacles in the electronic device. For example, in the embodiment depicted in FIG. 14, injection port 264 includes a proximal end portion 268 and a distal end portion 269 with different outer diameters, each of which may be received within a standard receptacle in the electronic device. For example, the outer diameter of proximal end 268 may be equal to approximately 3.5 mm and the distal end 269 may be equal to approximately 2.5 mm, each end portion being approximately ¼ inch in length. In still other embodiment, injection nozzle 260 may include one or more sections with a generally frustoconical shape, or may have more than one port 264, each port being differently sized.

Figure 15:
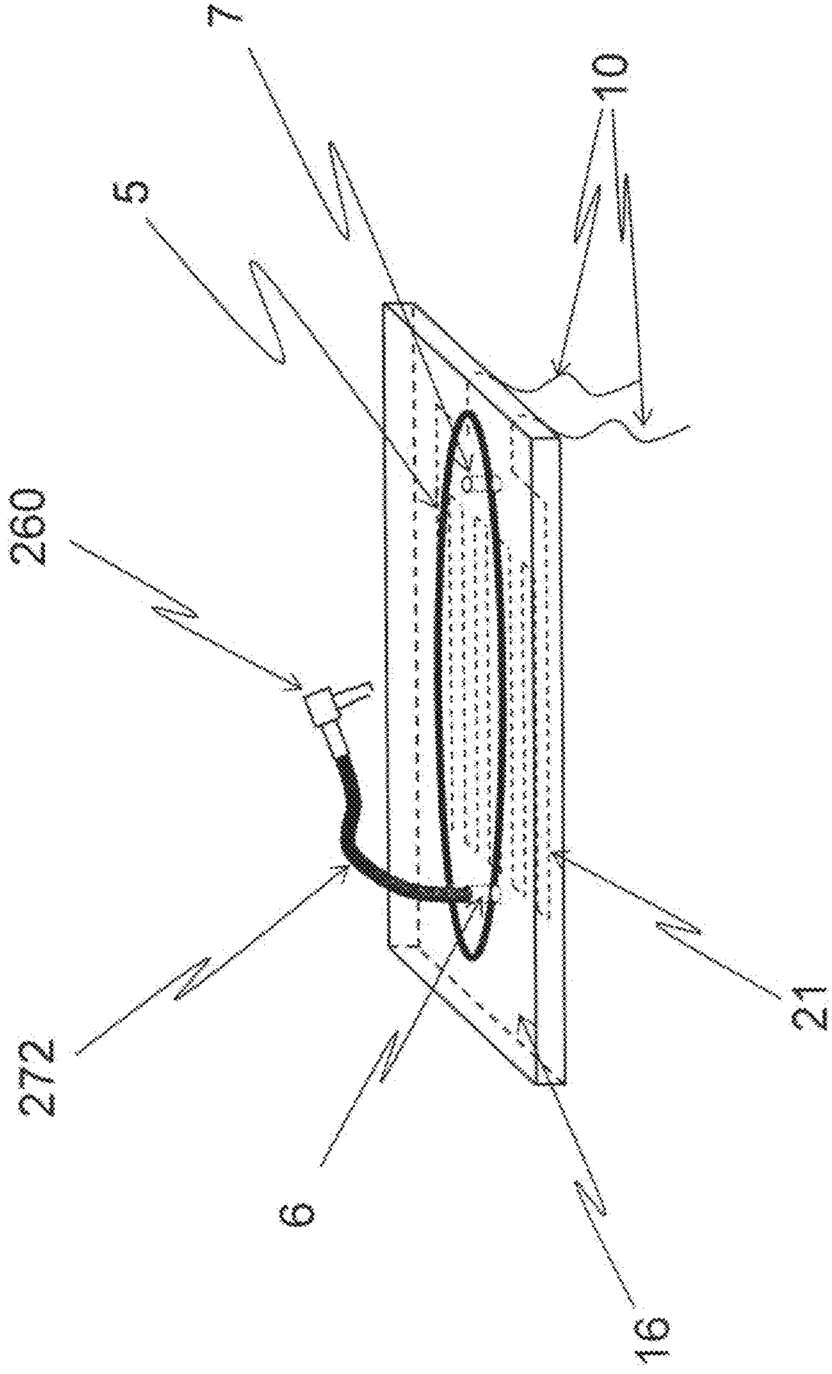
FIG. 15 is an isometric, partially transparent view of the nozzle of FIG. 14 coupled to the platen of FIG. 3 according to one embodiment of the present disclosure.

FIG. 15 depicts air injection nozzle 260 coupled to venting port 6 in heated conduction platen 16 with, for example, an air tube 272.

Figure 16:
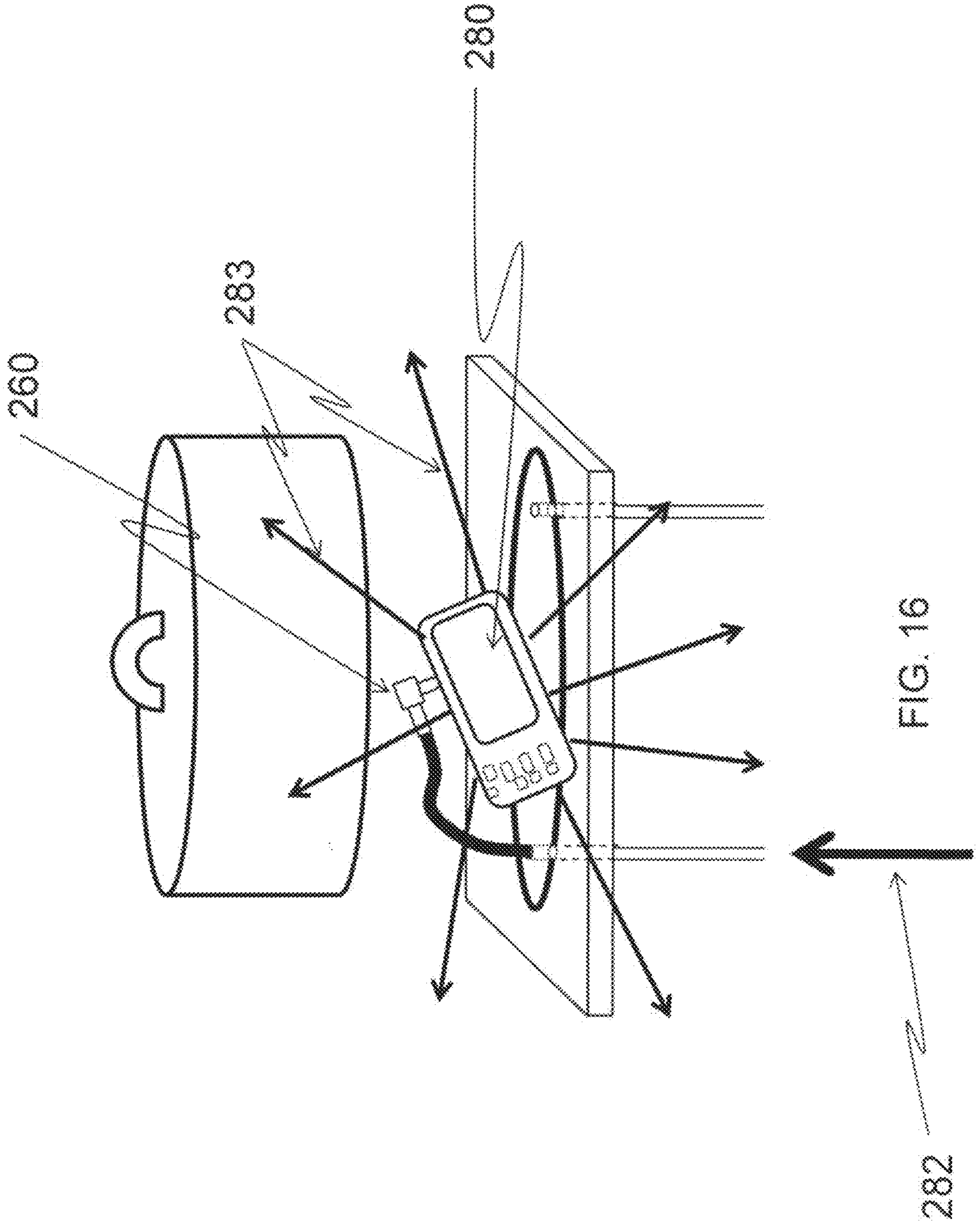
FIG. 16 is an isometric view of the nozzle depicted in FIG. 15 connected to an electronic device with air flowing into and dispersing out of the electronic device.

As depicted in FIG. 16, air injection nozzle 260 may be coupled to an orifice in an electronic device 280, e.g., a common headphone jack, providing a pneumatic path between pneumatic venting port 6 and electronic device 280. Air 282 may be introduced into electronic device 280 via air injection nozzle 260 with resultant escaping air 283 coming from electronic device assembly parting lines, battery cover, speaker grill, and any other physical attribute on electronic device 280 which is not air tight. Air 282 may be pressurized above ambient conditions outside the drying device or air 282 may be at approximately ambient pressure. Air 282 may also be heated.

Figure 17:
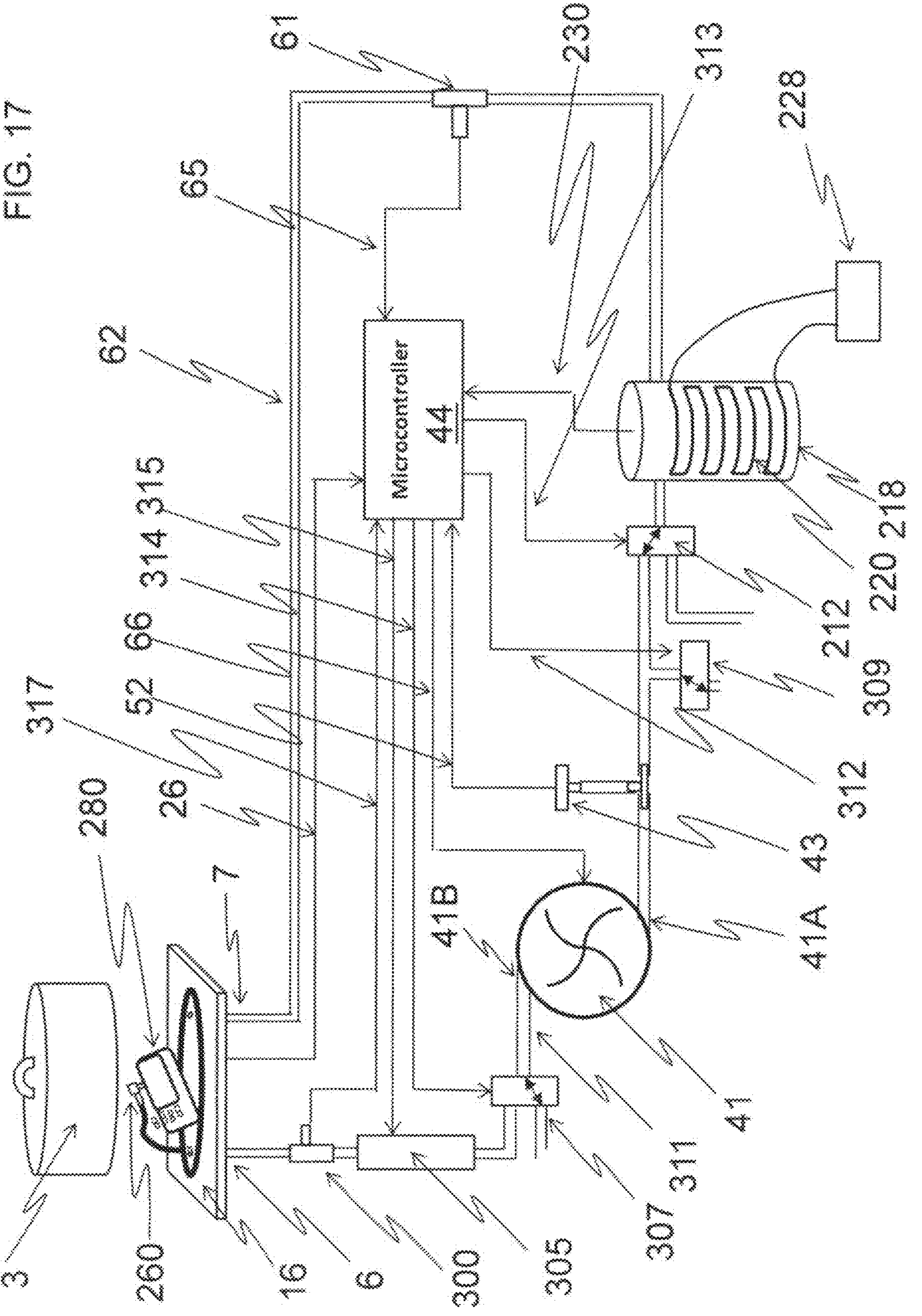
FIG. 17 is a block diagram of a system with a nozzle and vacuum chamber (the vacuum chamber being in the open position) connected to an electronic device according to one embodiment of the present invention.

FIG. 17 depicts an electronic device dryer according to one embodiment of the present disclosure. In FIG. 17, electronic device 280 is sealed within vacuum chamber 3 and connected pneumatically vacuum pump 41 (which may be an oil less vacuum pump) at vacuum pump inlet 41A. Vacuum pump 41 also includes a discharge port 41B, which discharges compressed air and may be connected to a discharge valve 307.

The depicted device dryer may also include one or more optional items, such as humidity sensor 61 (which may sense relative or absolute humidity), desiccator 218, desiccator dump valve 212, vacuum sensor 43, atmospheric valve 309, compressed air heater 305, and temperature sensor 300.

Humidity sensor 61 (when used) detects the moisture in the air coming from vacuum chamber 3 and can send this information to microcontroller 44 via humidity signal 65.

Desiccator 218 (when used) removes moisture from the air coming from vacuum chamber 3 prior to the moist air reaching vacuum pump 41. The optional desiccator heater 220 provides a means to regenerate the desiccator, which may be accomplished during a maintenance mode of operation. Desiccator dump valve 212 can be used to direct air leaving desiccator 218 to either pump 41 or to the atmosphere.

Valve 309 may be used to supply an alternate source of intake air, such as atmospheric air, for pump 41.

Vacuum sensor 43 may be used to monitor pressure at various locations throughout the system, one location being depicted in FIGS. 17-20 where vacuum sensor 43 measures the vacuum generated at the inlet 41A to pump 41.

Discharge valve 307 may be used to direct the flow of air discharged from pump 41 to atmospheric/ambient conditions and/or to electronic device 280 via, for example, port 6. Valve 307 may also be adapted to regulate the amount and/or pressure of air directed to electronic device 280.

Figure 19:
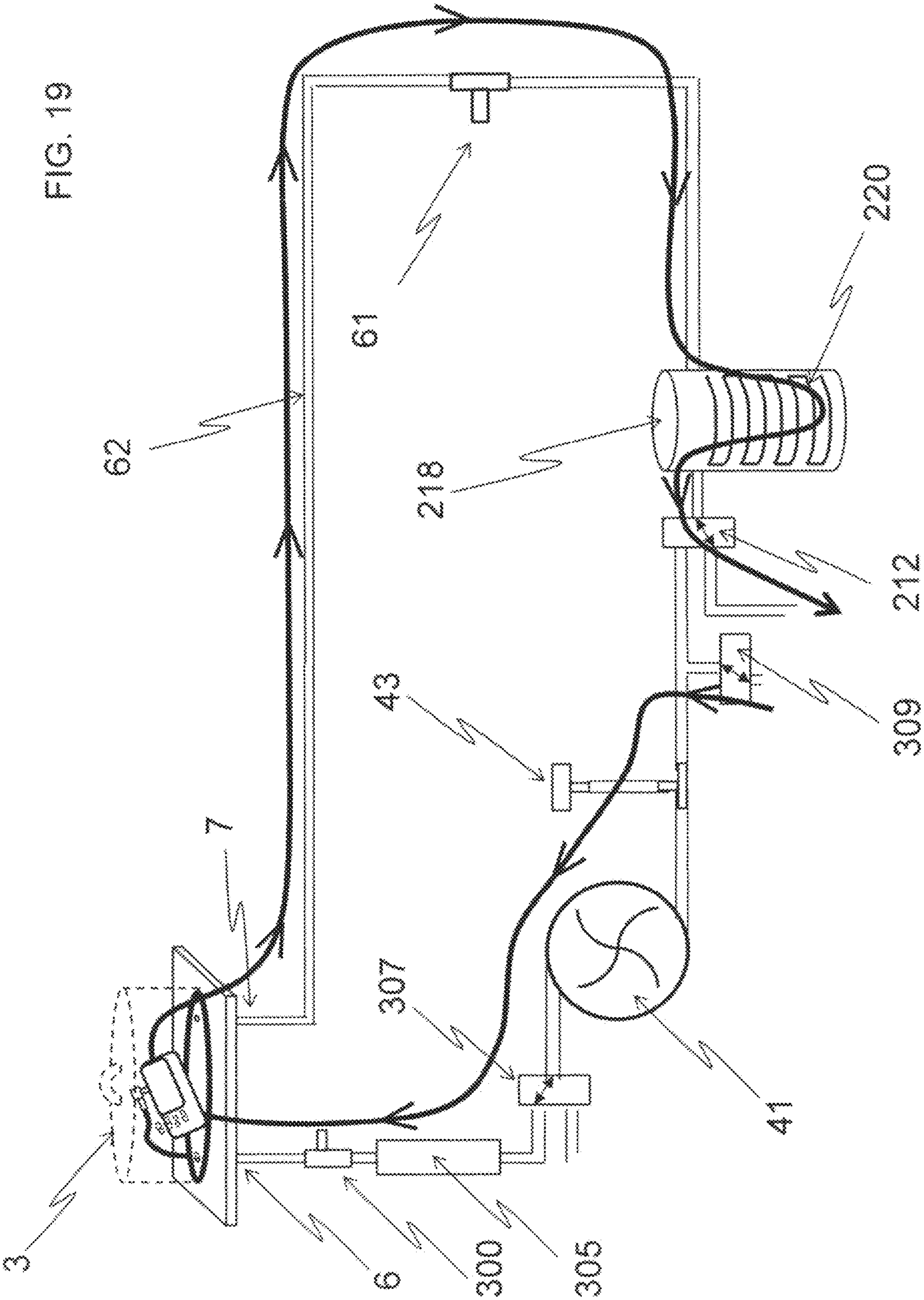
FIG. 19 is a block diagram of the system of FIG. 17 with the electronic device positioned within a closed vacuum chamber with air flowing through the nozzle and the electronic device.
Figure 20:
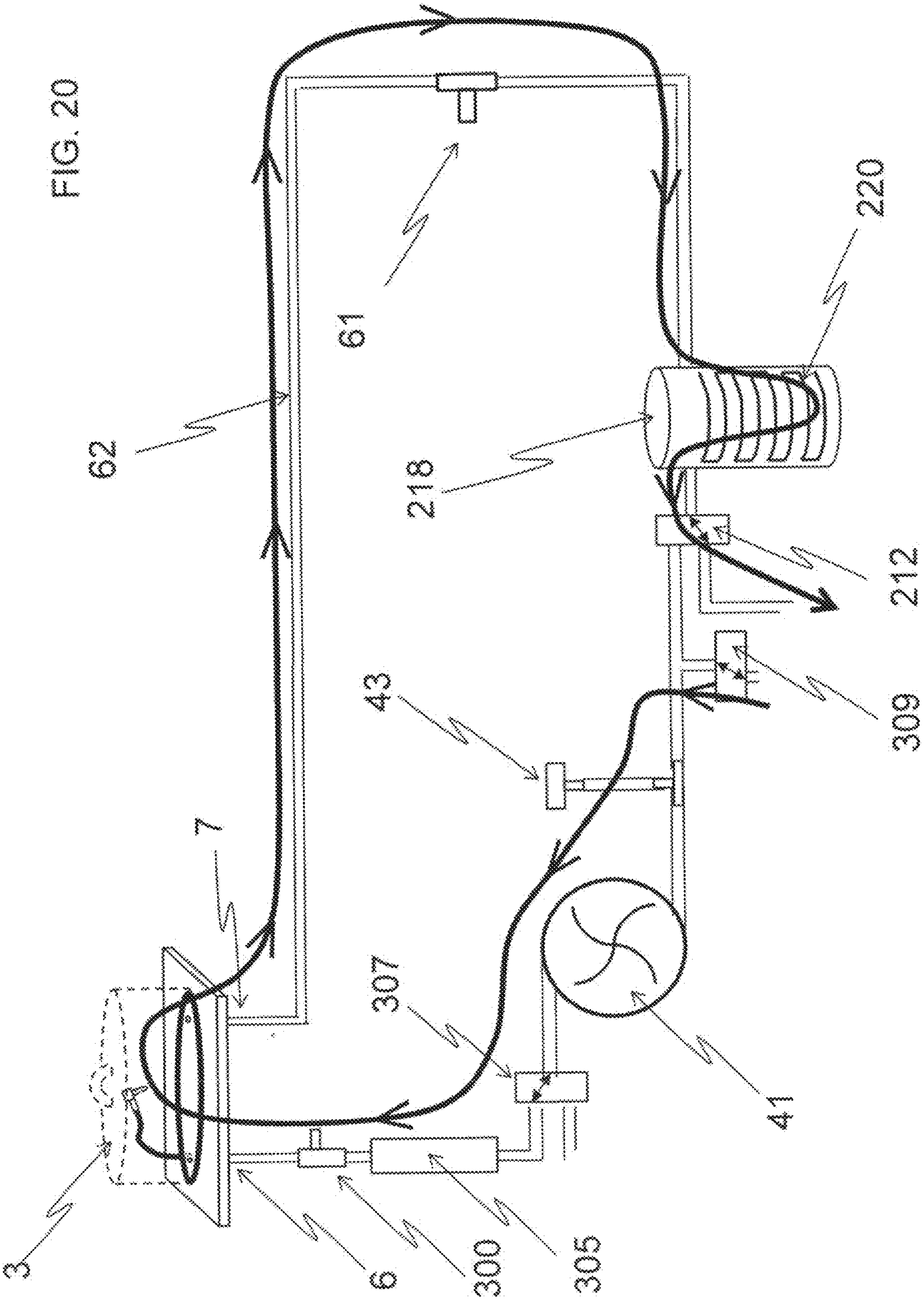
FIG. 20 is a block diagram of the system of FIG. 17 with no electronic device and operating in a system maintenance mode to regenerate the desiccator according to one embodiment of the present disclosure.

In some embodiments, pump 41 generates heated air that may be directed into electronic device 280 to enhance the drying process. Heater 305 may optionally be used to add heat to the air being introduced into electronic device 280, either by adding heat to the air discharged from pump 41 (as depicted in FIG. 19) or to other sources of air, which may include ambient air. The optional heat sensor 300 can monitor the temperature of the air entering electronic device 280 through nozzle 260. Temperature information output from heat sensor 300 may be used to regulate the temperature of the air entering electronic device 280, such as by controlling heater 305 or by controlling the mixing of air leaving pump 41 and/or heater 305 with ambient air.

Figure 21:
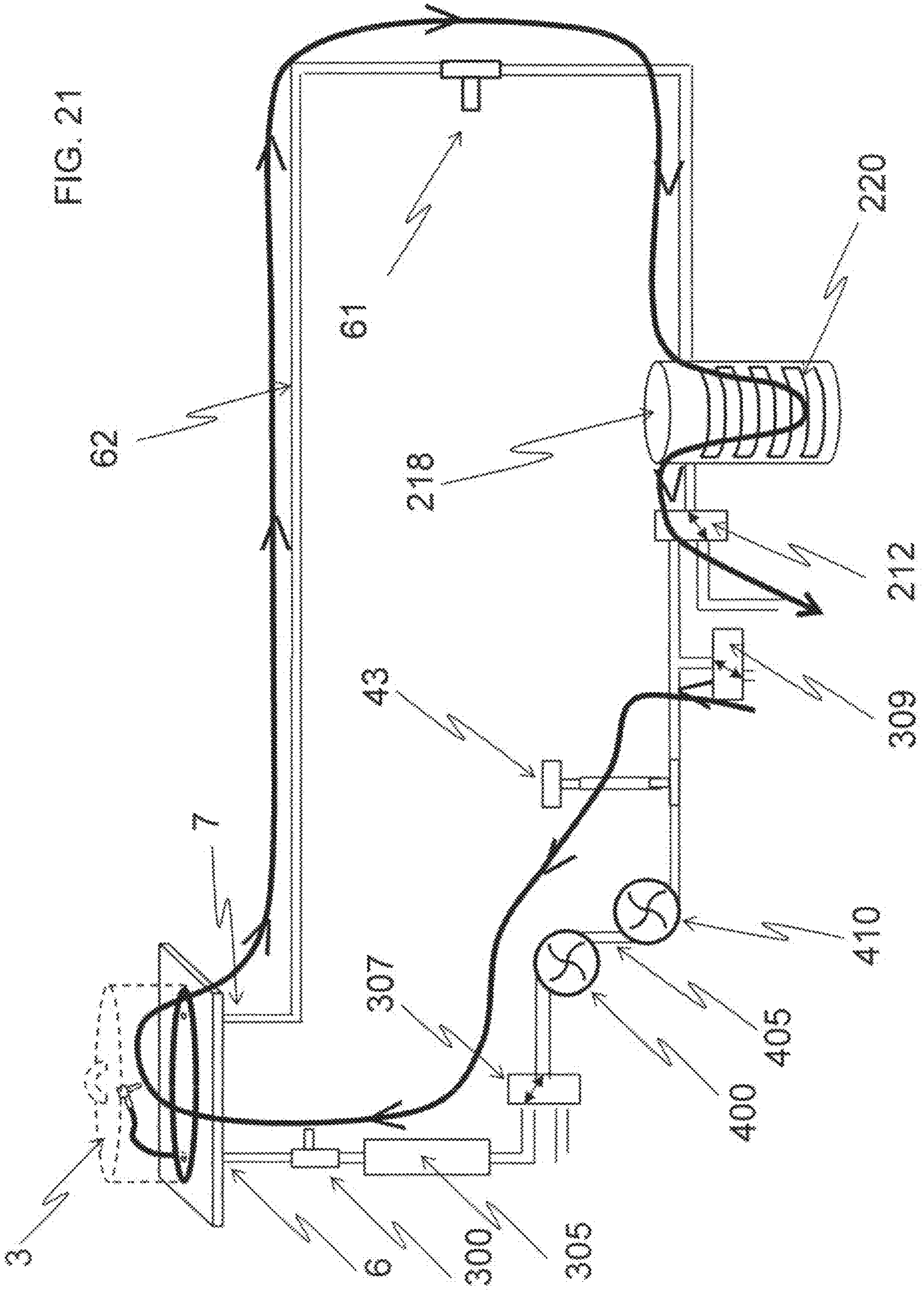
FIG. 21 is a block diagram of the system of FIG. 17 with a high-volume pump and high-vacuum pump connected pneumatically in series.
Figure 22A:
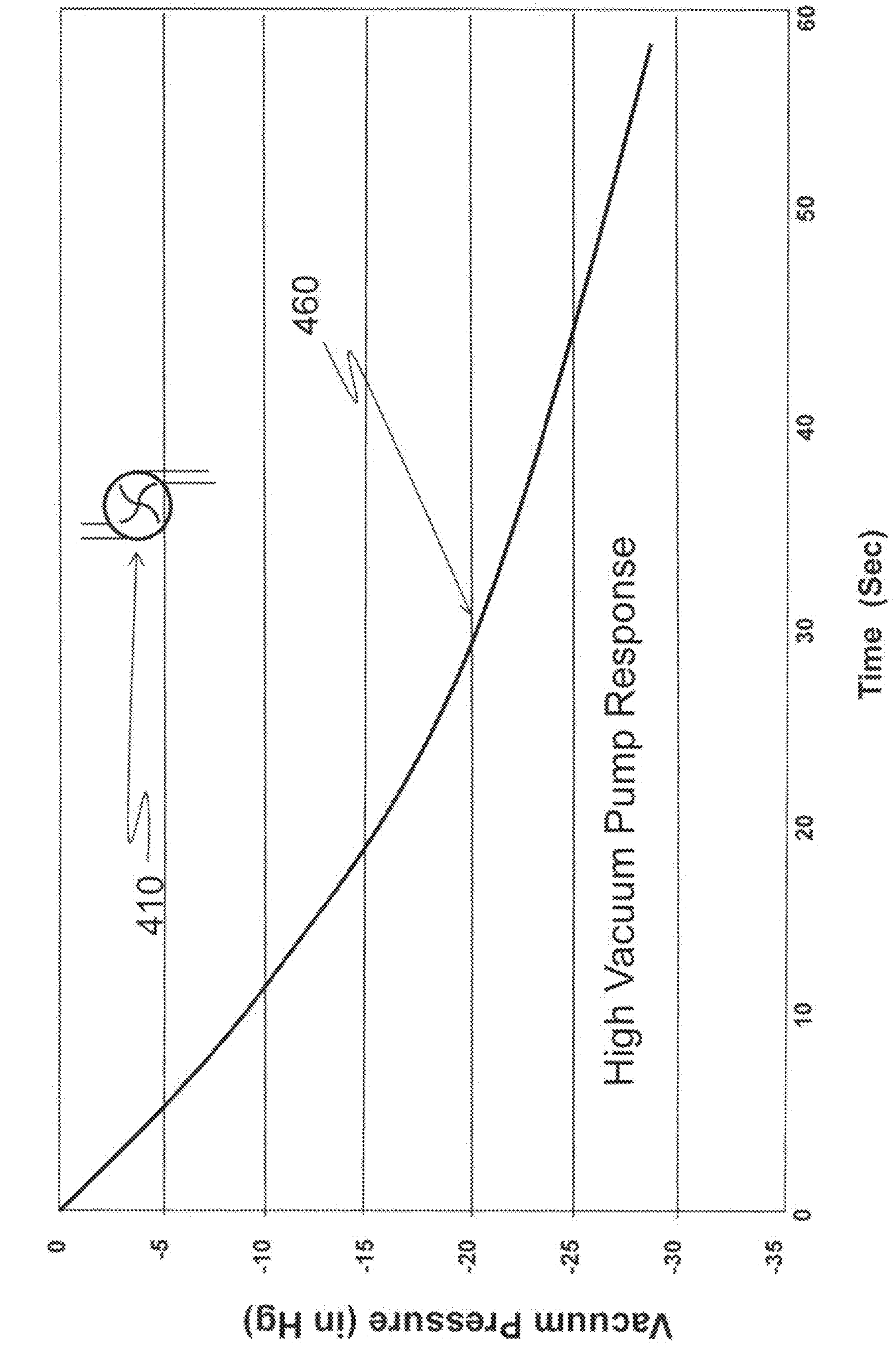
FIG. 22A a graphical representation of a vacuum response curve of a high vacuum pump according to one embodiment of the present invention.
Figure 22B:
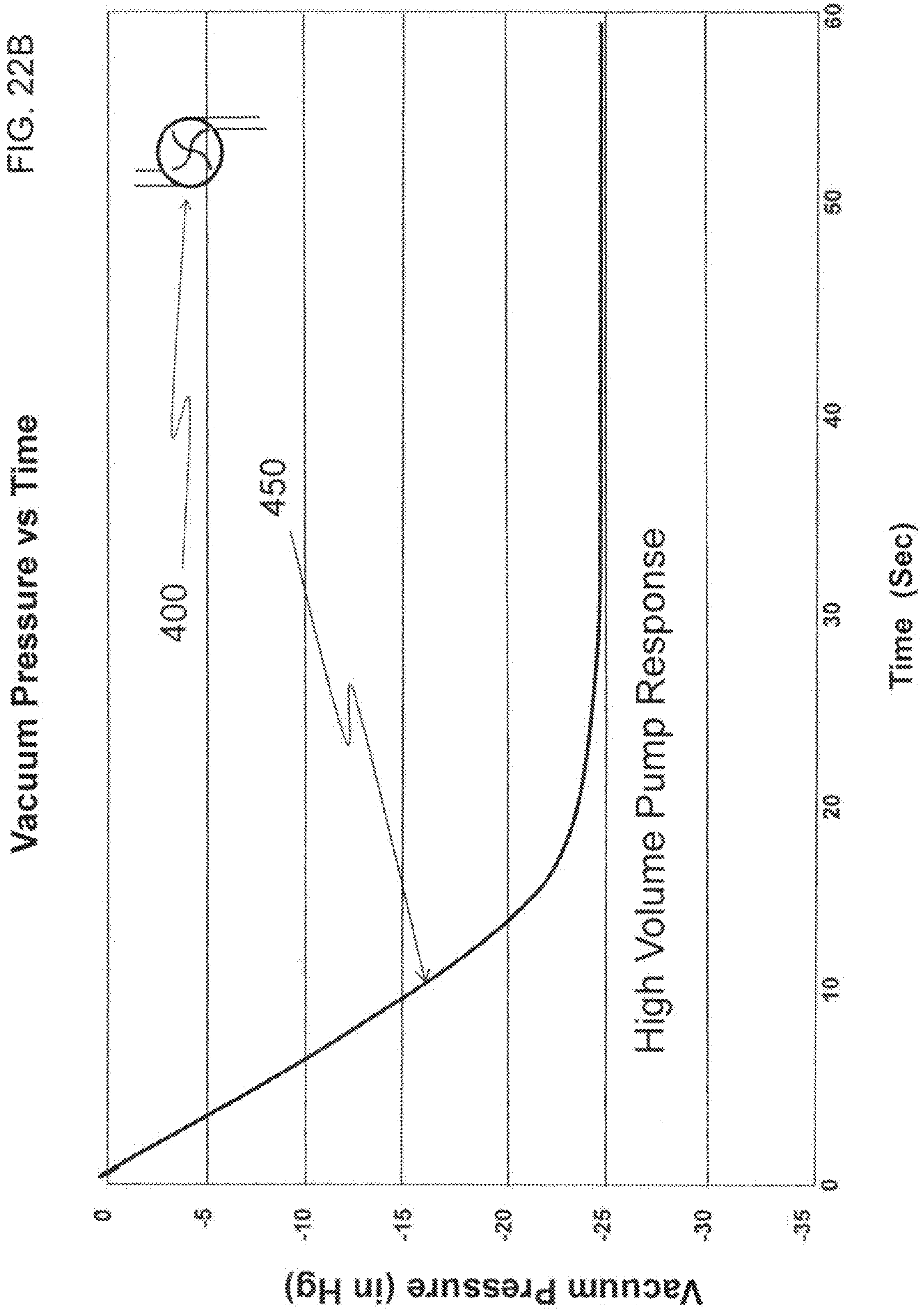
FIG. 22B is a graphical representation of a vacuum response curve of a high volume pump according to one embodiment of the present invention.
Figure 22C:
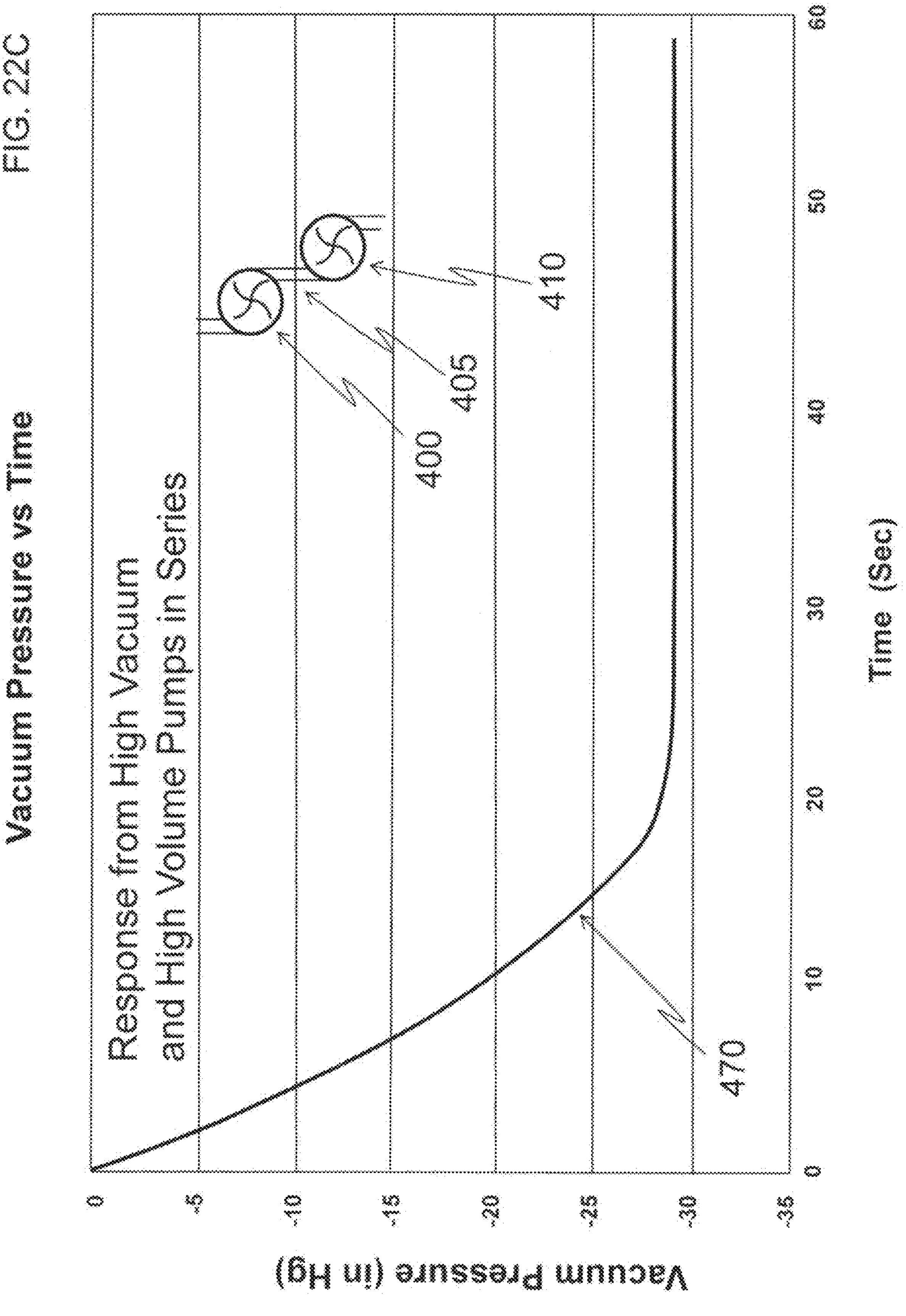
FIG. 22C is a graphical representation of a resulting vacuum response curve with the high vacuum pump of FIG. 22A pneumatically connected in series with the high volume pump of FIG. 22B.

In other embodiments, pump 41 can be comprised of a plurality of pumps. As best shown in FIG. 21, miniature high vacuum pump 410 is pneumatically connected in series through pneumatic crossover 405 to miniature high volume pump 400. FIG. 22A depicts a graphical vacuum curve response 460 of miniature high vacuum pump 410. Miniature high vacuum pump 410 provides a desirable vacuum level of −27 in Hg to −29 in Hg but requires more time (>50 seconds) to achieve. Referring now to FIG. 22B, a graphical vacuum response curve 450 is shown for miniature high volume pump 400. Graphical vacuum response curve 450 achieves the desired time (~20 seconds) at a vacuum level of approximately −25 in Hg. FIG. 22C depicts a vacuum response curve 470 with miniature high vacuum pump 410 connected pneumatically in series with miniature high volume pump 400. The resultant vacuum response curve 470 achieves the desired vacuum level of −27 in Hg to −29 in Hg in the desired time frame of approximately 20 seconds.

Humidity signal 65, heated conduction temperature signal 26, compressed air temperature sensor 300, vacuum sensor 43, and desiccator temperature sensor 230 may all be electrically connected to microprocessor 44 and used for system feedback and control. Compressed air heater signal control line 315, compressed air discharge valve control signal 314, desiccator dump valve control signal 313, vacuum pump control signal 66 may also be electrically connected to microprocessor 44 to provide control signals via control algorithms for system control outputs.

Figure 18:
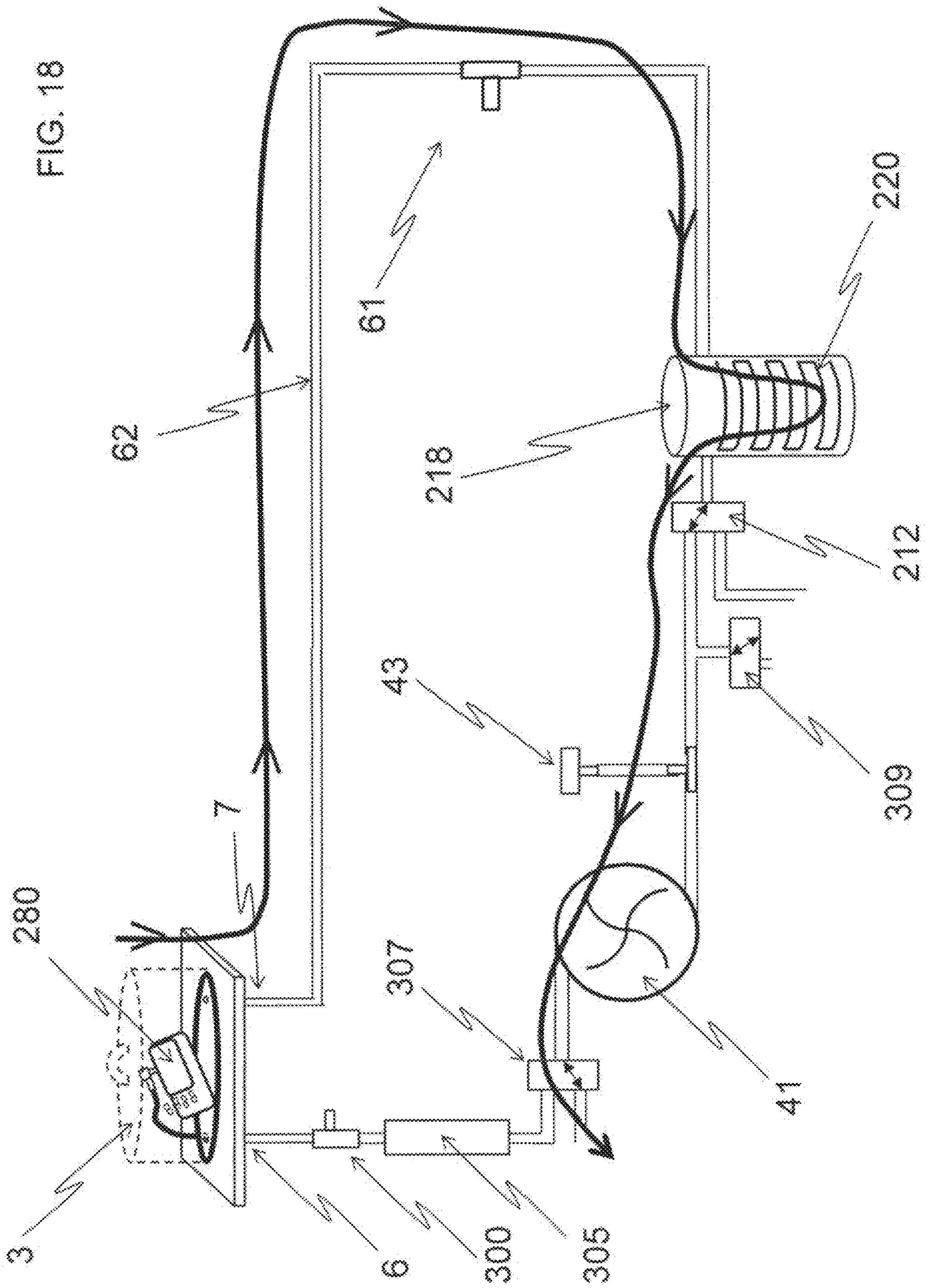
FIG. 18 is a block diagram of the system of FIG. 17 with the electronic device positioned within a closed vacuum chamber with no air flowing through the nozzle.

In the embodiment depicted in FIG. 18, which depicts the pneumatic path of FIG. 17, the electronic dryer decreases pressure within vacuum chamber 3. Compressed air discharge valve 307, desiccator dump valve 212, and atmospheric valve 309 are configured and operated to enable evacuation of air from vacuum chamber 3 to occur when vacuum pump 41 energized. Valve 212 directs air from desiccator 218 to pump 41, valve 309 is closed so vacuum chamber 3 receives the full benefit of the low pressure generated by pump 41, and valve 307 directs discharge air from pump 41 into ambient conditions.

FIG. 19 depicts the electronic dryer of FIG. 18 introducing heated air into electronic device 280. Discharge valve 307 directs pump output air to electronic device 280, valve 309 allows pump 41 to draw ambient air, and desiccator dump valve 212 allows air exiting desiccator 218 to vent to ambient conditions. Depending on the regulation of valve 307, pressurized air may be introduced into electronic device 280. Heater 305 may be used to add heat to the air being directed into electronic device 280, and temperature sensor 300 may be used to control the temperature of the air being injected into electronic device 280 via air injection nozzle 260.

FIG. 28 depicts a preferred embodiment of in-line heater 305. In-line heater printed circuit board 602 has in-line heater SMT resistors 603 mounted onto surface and covered using in-line heater cover 600. In line heater cover 600 is preferably plastic injection molded and has dividing walls 607 molded into the inside such that each dividing wall 607 fits between the plurality of SMT resistors 603. Air can be forced or drawn (e.g. under vacuum) through in line heater 600 and follows tortuous path 612 and exits in line heater exit stack 608. SMT resistors 603 are sized for available voltage levels within drying apparatus 1 and produce enough heat through resistance heating provide heated air in the range of 90 degrees F. and 140 degrees F.

In some embodiments, the temperature of the air/gas being introduced into electronic device 280 is at least approximately 90 degrees F. and at most 140 degrees F. In still other embodiments, the temperature of the air/gas being introduced into electronic device 280 is at least approximately 110 degrees F. and at most 130 degrees F.

In one embodiment, desiccator 218 may be regenerated when operating the system using the same flow paths but with electronic deice 280 removed from vacuum chamber 3. See, e.g., FIG. 20. Desiccator heaters 220 may be energized to produce heat in desiccator 218 and dry the desiccant. Vacuum pump 41 is energized which provides compressed air within evacuation manifold 62 and aids in the moisture evaporation in desiccator 218. Heat generated by pump 41 and/or added by heater 305 can quicken the regeneration of desiccator 218.

In at least one embodiment, pump 41 is powered by motor generating approximately ⅓ horsepower and can generate a vacuum pressure of approximately 29.5 mm of Hg below ambient conditions. In at least one embodiment, the electronic device dryer moves approximately 0.5 to approximately 2.5 cubic feet per minute of gas (e.g., air) into the electronic device being dried.

In some embodiments, miniature high vacuum pump 410 is powered by a small DC motor and generates approximately 3 watts to 5 watts of vacuum generating power with a flow rate of 0.3 liters per minute to 1 liter per minute. Miniature high volume pump 400 is powered by a small DC motor and generates approximately 3 watts to 5 watts of vacuum generating power with a flow rate of 0.6 liters per minute to 3 liters per minute. It is generally understood small DC motors driving miniature high vacuum pump 410 and miniature high volume pump 400 can be brushed or brushless types. When miniature high vacuum pump 410 and miniature high volume pump 400 are pneumatically combined using pneumatic plenum 405, the resulting vacuum response is a range of 0.3 liters per minute to 3 liters per minute and achieves the desired vacuum range of −27 in Hg to −29 in Hg in approximately 20 seconds.

In some embodiments, all of the above described actions are performed automatically so that a user may simply place an electronic device at the proper location and activate the drying device to have the drying device remove moisture from the electronic device.

Microprocessor 44 can be a microcontroller, general purpose microprocessor, or generally any type of controller that can perform the requisite control functions. Microprocessor 44 can read its program from memory 45, and may be comprised of one or more components configured as a single unit. Alternatively, when of a multi-component form, processor 44 may have one or more components located remotely relative to the others. One or more components of processor 44 may be of the electronic variety including digital circuitry, analog circuitry, or both. In one embodiment, processor 44 is of a conventional, integrated circuit microprocessor arrangement, such as one or more CORE i7 HEXA processors from INTEL Corporation (450 Mission College Boulevard, Santa Clara, Calif 95052, USA), ATHLON or PHENOM processors from Advanced Micro Devices (One AMD Place, Sunnyvale, Calif. 94088, USA), POWER8 processors from IBM Corporation (1 New Orchard Road, Armonk, N.Y. 10504, USA), or PIC Microcontrollers from Microchip Technologies (2355 West Chandler Boulevard, Chandler, Ariz. 85224, USA). In alternative embodiments, one or more application-specific integrated circuits (ASICs), reduced instruction-set computing (RISC) processors, general-purpose microprocessors, programmable logic arrays, or other devices may be used alone or in combination as will occur to those skilled in the art.

Likewise, memory 45 in various embodiments includes one or more types such as solid-state electronic memory, magnetic memory, or optical memory, just to name a few. By way of non-limiting example, memory 45 can include solid-state electronic Random Access Memory (RAM), Sequentially Accessible Memory (SAM) (such as the First-In, First-Out (FIFO) variety or the Last-In First-Out (LIFO) variety), Programmable Read-Only Memory (PROM), Electrically Programmable Read-Only Memory (EPROM), or Electrically Erasable Programmable Read-Only Memory (EEPROM); an optical disc memory (such as a recordable, rewritable, or read-only DVD or CD-ROM); a magnetically encoded hard drive, floppy disk, tape, or cartridge medium; or a plurality and/or combination of these memory types. Also, memory 45 may be volatile, nonvolatile, or a hybrid combination of volatile and nonvolatile varieties. Memory 45 in various embodiments is encoded with programming instructions executable by processor 44 to perform the automated methods disclosed herein.

Referring now to FIG. 29 electronic device drying apparatus 800 which utilizes rigid vacuum chamber 480 with structural supporting ribs 485, clear acrylic lid 520, and in-line heater 600. In a similar manner as electronic dryer depicted in FIG. 1, miniature high vacuum pump 410 and miniature high volume pump 410 produce a vacuum greater than −27 in Hg when fresh air valve 307 is closed and clear acrylic lid 520 is closed and sealed against vacuum chamber 480. Electronics control board 610 controls power to platen heater 16 which is comprised of printed circuit board 500 and has relative humidity sensor 61 and vacuum pressure sensor 43 integrated (FIG. 27) onto platen heater 16. Electronics control board 610 modulates fresh air valve 307 and in-line heater 600 and produces relative humidity peaks depicted in FIG. 9. Software algorithms stored in microprocessor 44 on electronics control board 610 monitors relative humidity peaks 104 resulting from vaporization of liquid. The vaporization of liquid resulting relative humidity peaks 104 converge asymptotically thus producing a drying end point defined as a minima relative humidity between 100 and 109 relative humidity peaks. Process data is collected and electronically transmitted through buss 615 to wireless circuit board 614.

As best shown in FIG. 30, one embodiment of an electronic device dryer apparatus 801 utilizes a collapsible vacuum chamber 490 (FIG. 24) with evacuation port 494 and fresh air port 495 integrally mounted onto collapsible vacuum chamber 490. Mounting of evacuation port 494 and fresh air port 495 can be accomplished using ultrasonic welding, gluing, insert molding, or any other attachment means that produces a hermetic seal. Electronic device 280 is inserted into collapsible vacuum chamber 490 and evacuation port 494 and fresh air port 495 pneumatically attached to fresh air valve 307 and evacuation plenum 7. Any suitable means can be used for pneumatic connection, with one preferred embodiment being a rubberized receptacle and evacuation port 494 and fresh air port 495 having barbed features for vacuum sealing. Relative humidity sensor 61 and vacuum pressure sensor 43 are integrated onto electronics control board 610 and sealed inside pneumatic chamber 630 which is attached to electronics control board 610 using a suitable attachment means. Although not specifically described, this seal can be fabricated from a known o-ring, pressure sensitive adhesive, or various silicones and glues. Collapsible vacuum chamber 490 rests on top of platen heater printed circuit board 500 with integrated SMT resistors 504 and thermally conductive silicone 520. Collapsible vacuum chamber 490 is thin-walled plastic and provides sufficient thermal transfer conductivity which allows heat from thermally conductive silicone 520 to transfer into electronic device 280. Electronics control board 610 controls power to SMT resistors 504 through control lines 617 and controls in-line heater 600 which itself is integrated to electronics control board 610 and pneumatically integrated to fresh air valve 307. Electronics control board 610 passes process information to wireless board 614 through communication buss 615.

Electronic device drying apparatuses depicted in 800 and 801 are used to minimize the drying time by minimizing the space requiring evacuation, minimizing cost by utilizing thin wall plastic injection molding on all structural parts, minimizing the noise by utilizing miniature pumps, and minimizing weight by integrating all electronics onto a single printed circuit board substrate.

Figure 31:
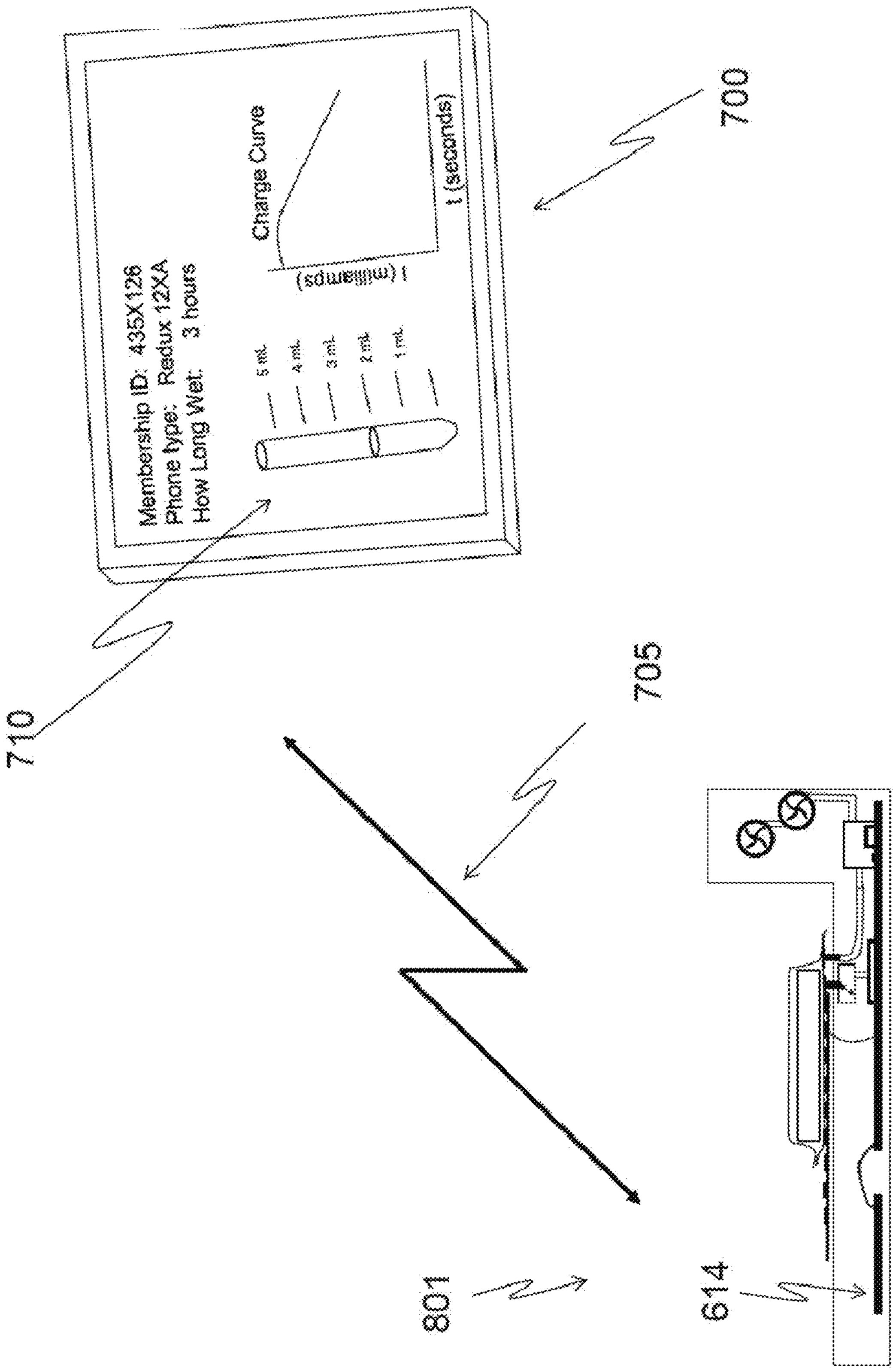
FIG. 31 is an isometric view of a rigid vacuum chambered electronic drying apparatus with a wireless controller and process data collection screen.

Referring now to FIG. 31, an electronic drying application software system 710 is depicted running on a typical iOS or Android enabled tablet 700. Alternatively, the software system 710 may run on any other computing device (e.g., personal computer, mobile device, smart watch, wearable device, camera, etc.). In some embodiments, the software system 710 may run on the electronic device dryer itself. In some embodiments, any computing device described herein may comprise a processor such as a signal processor, microprocessor, etc., and memory that stores instructions configured to perform the various operations described herein. The instructions may be executed by the processor. In some embodiments, a non-transitory computer readable medium is provided comprising computer executable code configured to perform the various methods or operations described herein. In some embodiments, means are provided to perform the various methods or operations described herein.

Electronic drying application software 710 is configurable to communicate using various IEEE protocols and provides electromagnetic communication signals 705 to wireless modules 614 in dryer 800 or dryer 801. Although only electronic dryer 801 is depicted, it is generally understood that electronic dryer 801 has similar wireless communication hardware and software and would communicate in the exact same manner. Electronic drying application software 710 provides means to communicate to a single or multiple dryers, and through handshaking signals 705 initiates control signals to dryer 801. Integral to electronic drying application software system 710 is the routines to capture through a user interface analytic data such as how long an electronic device has been wet, if the electronic device was plugged in (attempted charge) after it got wet, what make (e.g., model, manufacturer, etc.) the device is, how did it get wet, etc. This data is collected on a server 900 in FIG. 32 and presumably used for analytic data investigation either in real time or at a future date. Electronic drying application software system 710 is used to display in real-time the amount of water removed from the electronic device being dried, and, when the device is charging post drying the charging regulation curve. The real-time amount of water removed is calculated by microprocessor 44 in dryer 800 or 801. Microprocessor 44 integrates the relative humidity values from relative humidity sensor 61 which are used for real-time water volume removal calculations. The charging regulation curve can be used to discern between an inoperable and operable electronic device. Through experimentation, the inventors have discovered electronic devices which have become inoperable due to water intrusion and are then subsequently dried draw between 400 mA and 1000 mA for up to 10 minutes. The charging regulation curve then begins to drop at 3-10 mA per minute. The slope of the charging regulation curve can be used to discern a probable device recovery. In some embodiments, when the charge current is monitored, algorithms in microprocessor 44 can detect and predict success (operable), partial success (partially operable), or no success (inoperable) in device recovery. If device charge current starts at 400 mA-1000 mA for the first 5 minutes the likelihood of a full success is high. The negative slope post initial charging period can be used to finalize the prediction. If the charge current begins to drop at 3 mA-10 mA per minute, the battery is accepting a normal charge and the device is not likely shorted internally. If on the other hand there is no negative slope (e.g., the charging current remains steady at 400 mA-1000 mA), the battery and battery charge circuits are likely blown and the device is unrecoverable or inoperable.

Electronic drying application software 710 is used to generate a unique identifier for a membership-based (subscription) service which is tied to a relationship database linking the unique identifier to a phone number, address, date of birth, or all of the above. The unique identifier is used as a pointer (meta-data) and used for search purposes, start and end dates of memberships, and general tracking of the electronic device which has been registered under the unique identifier. It is generally understood the unique identifier can be used as a Stock Keeping Unit (SKU), or, to generate a SKU for purposes of a line item to charge a customer with at a point of sale (POS) device.

In some embodiments, a device is wet if it has moisture greater than or equal to a first threshold level. In some embodiments, a device is dry if it has moisture less than the first threshold level or less than a second lower threshold level. In some embodiments, a device is operable if it can be turned on and used to execute at least some applications in a working manner. In some embodiments, a device is inoperable if it cannot be turned on or it cannot be used to execute at least some applications in a working manner. Wet devices are generally inoperable while dry devices are generally operable. However, in some embodiments, dry devices are inoperable.

Figure 32:
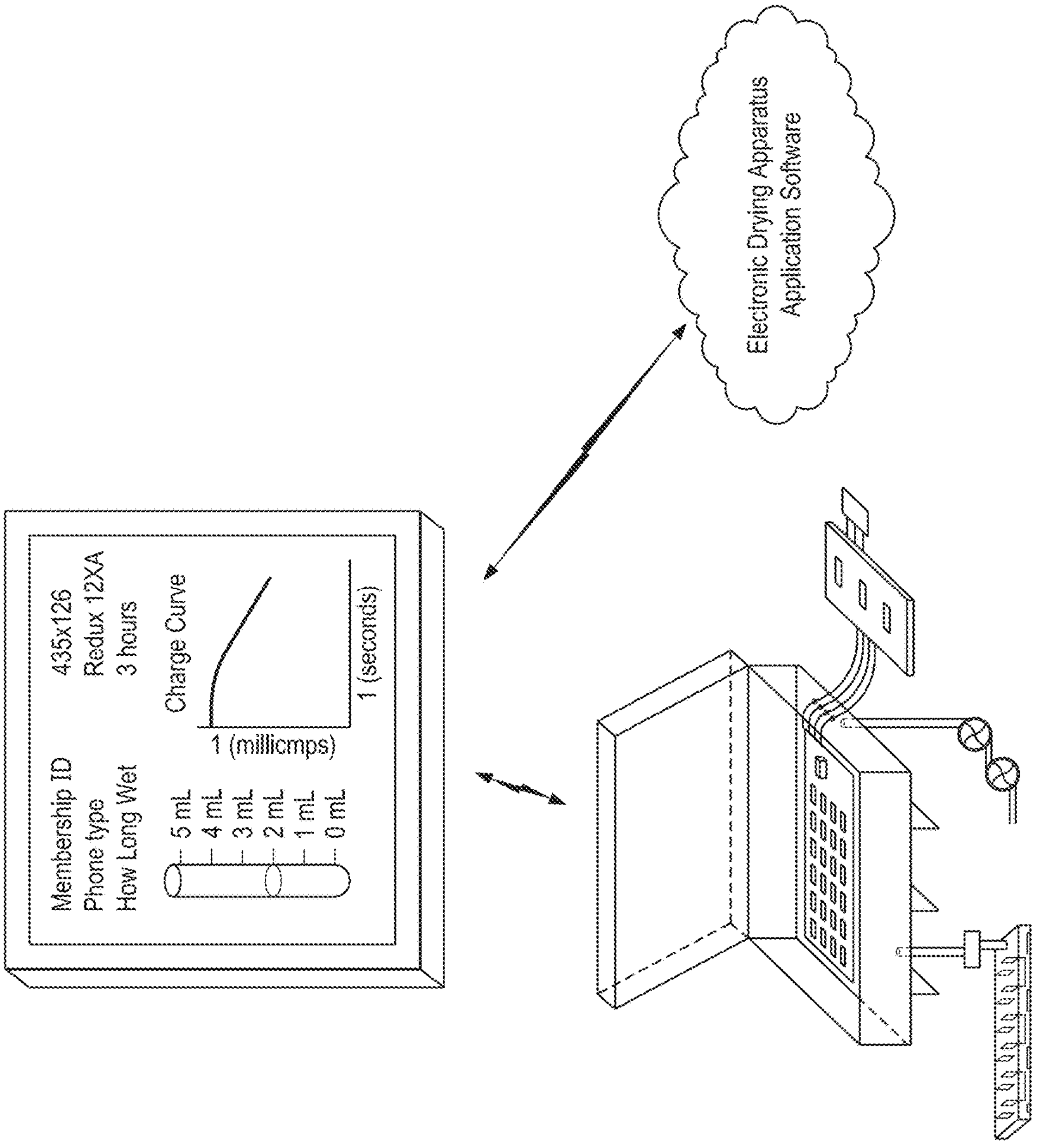
FIG. 32 is a diagram of a wireless controller and process data collection screen together with a fully integrated enterprise server and vacuum pouch electronic drying apparatus.
Figure 33:
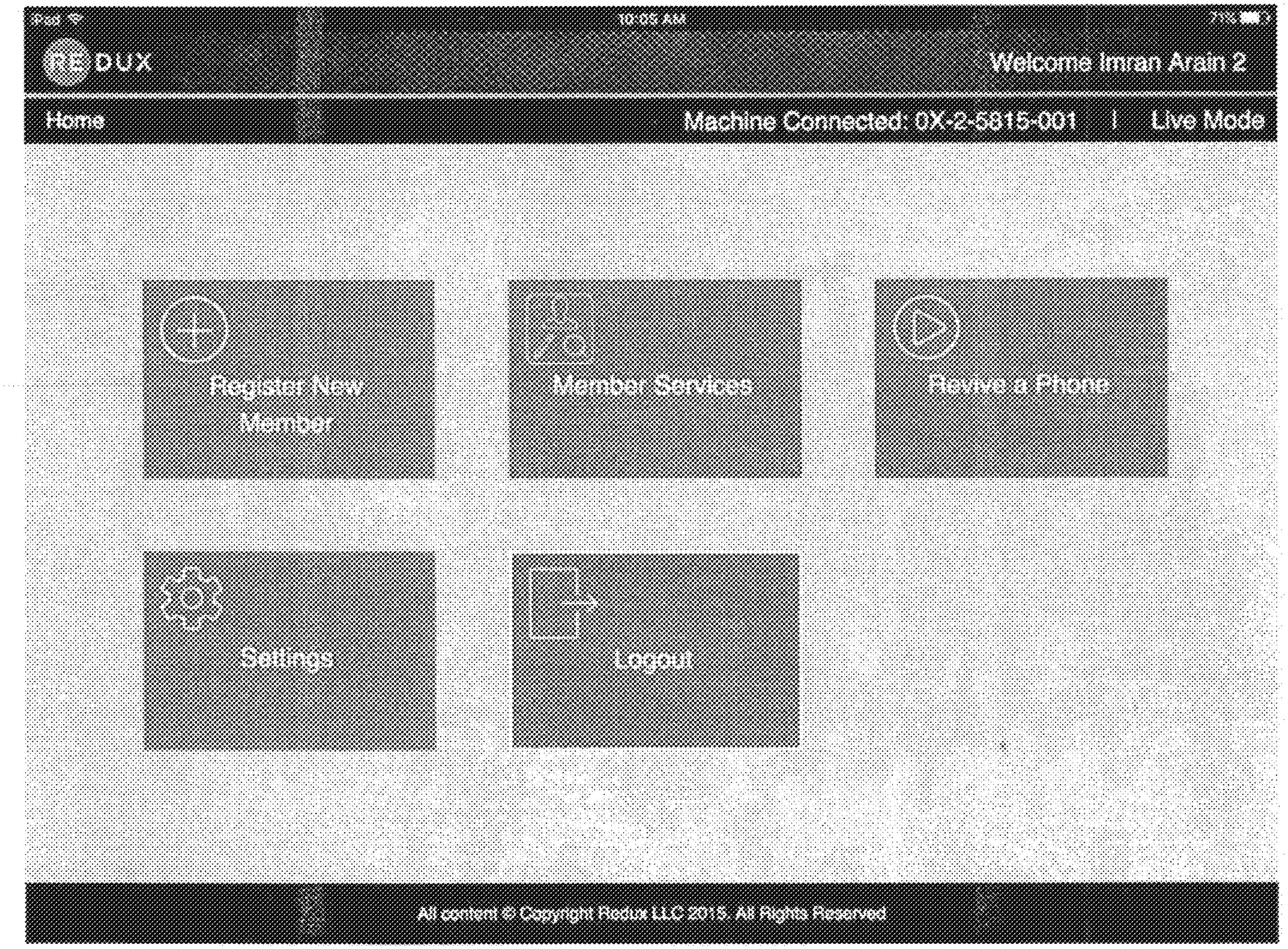
FIG. 33 is a screen shot of the software application home screen depicting the radio buttons used to select a customer purchasing a device registration application (membership).
Figure 34:
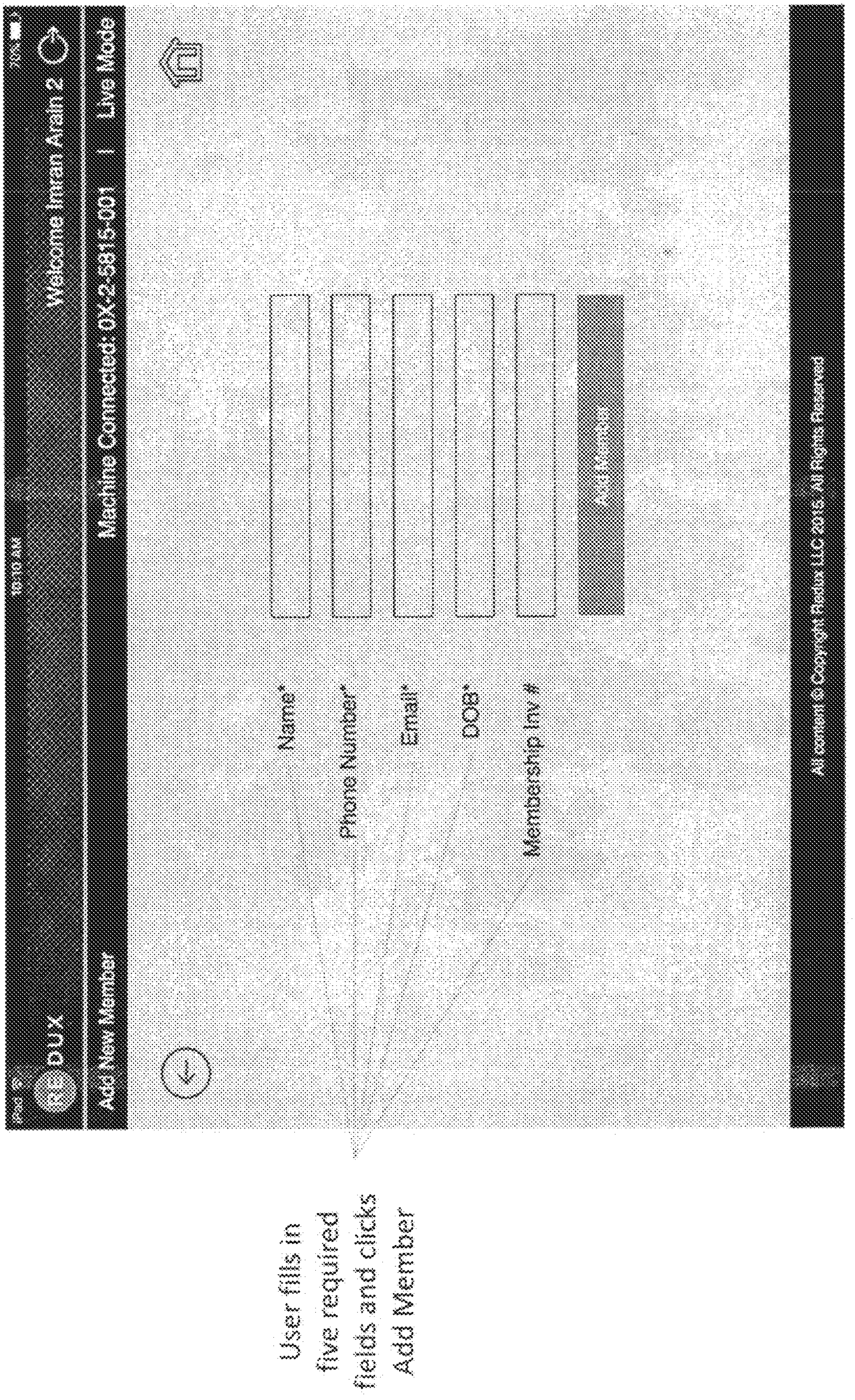
FIG. 34 is a screen shot of the drop down menu for adding a device registration.
Figure 35:
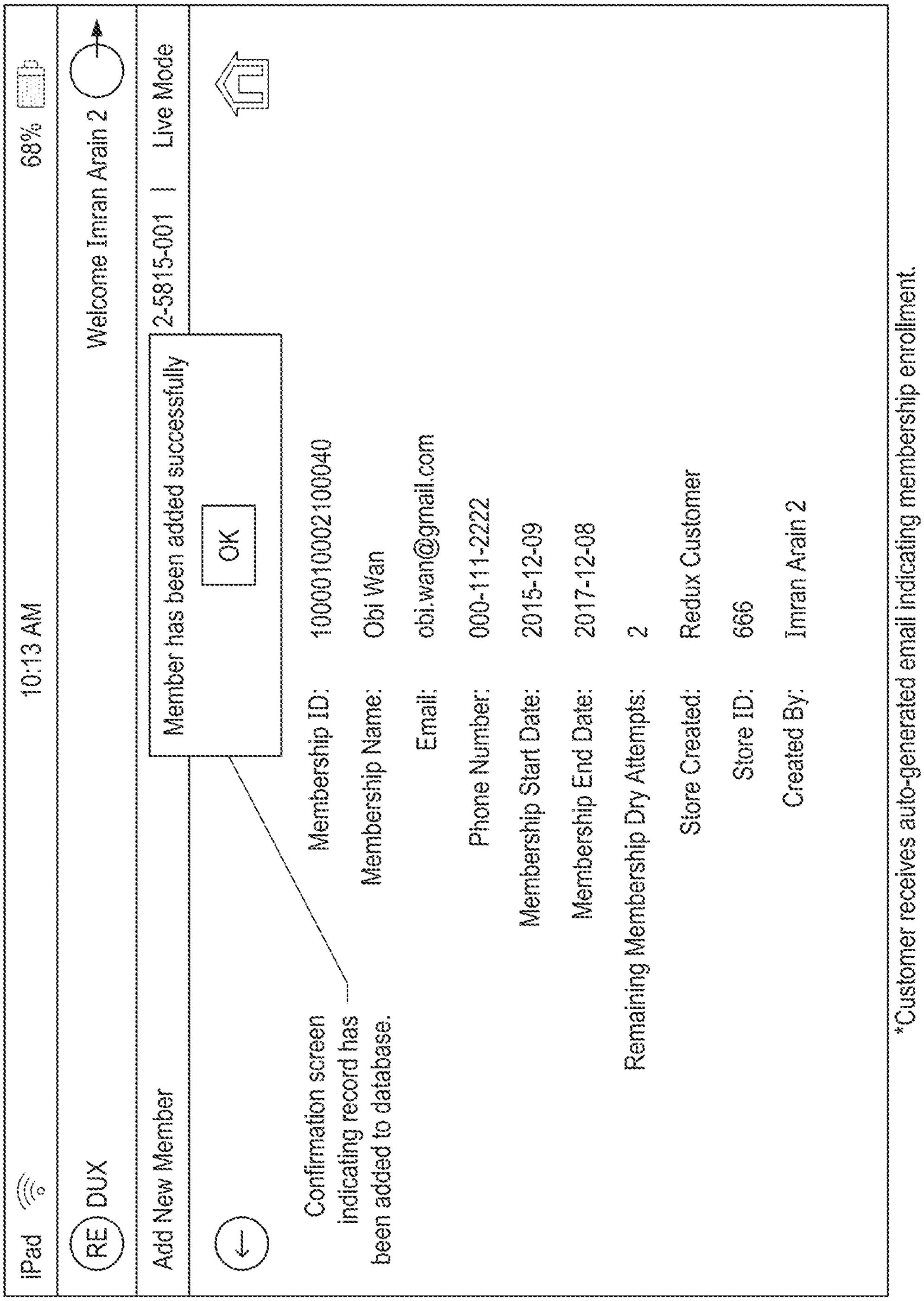
FIG. 35 is a screen shot of the resulting handshaking from the server noting the device registration record has been added to the database.
Figure 36:
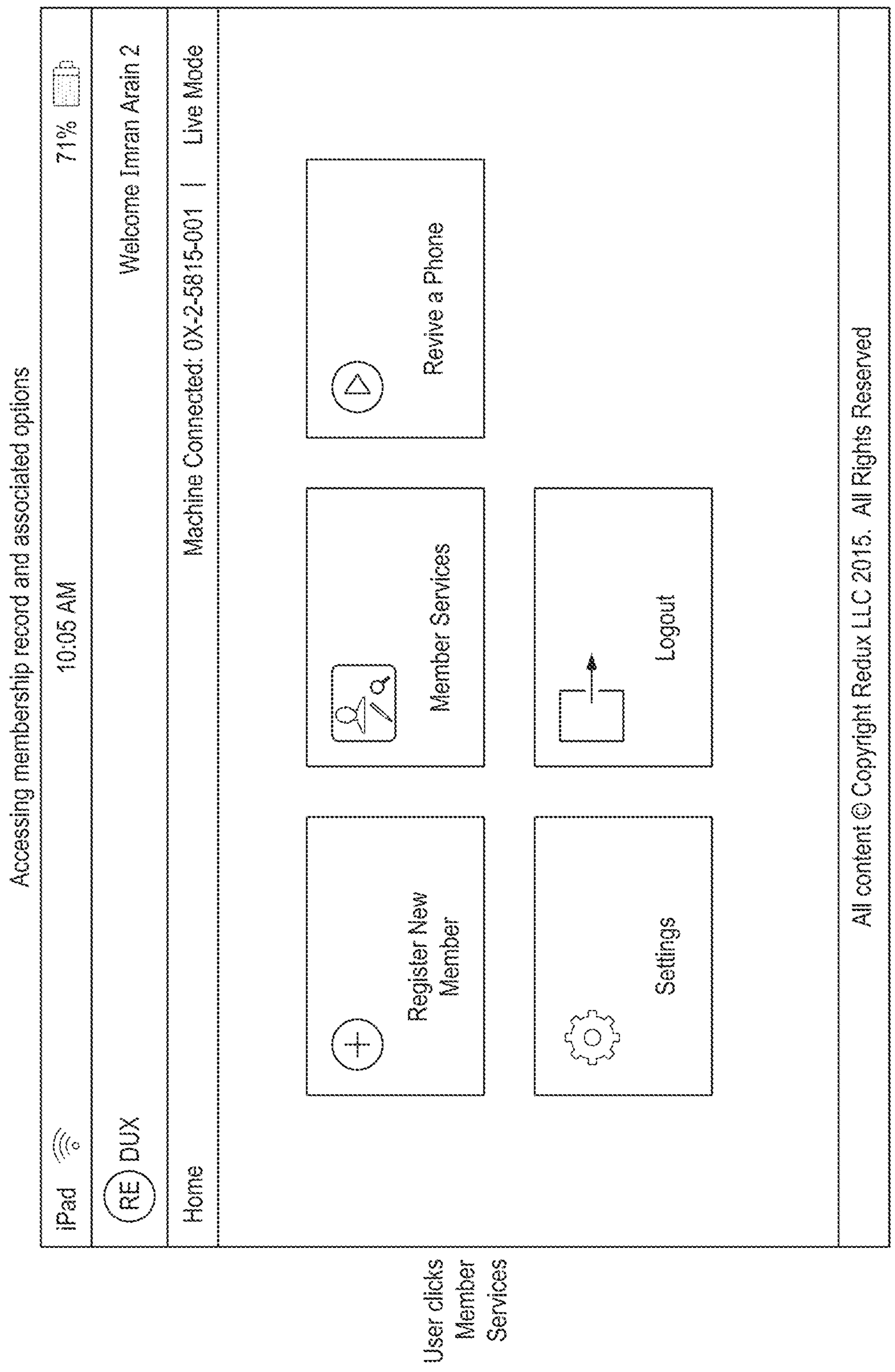
FIG. 36 is a screen shot of the means to access the device registration database and associated options.
Figure 37:
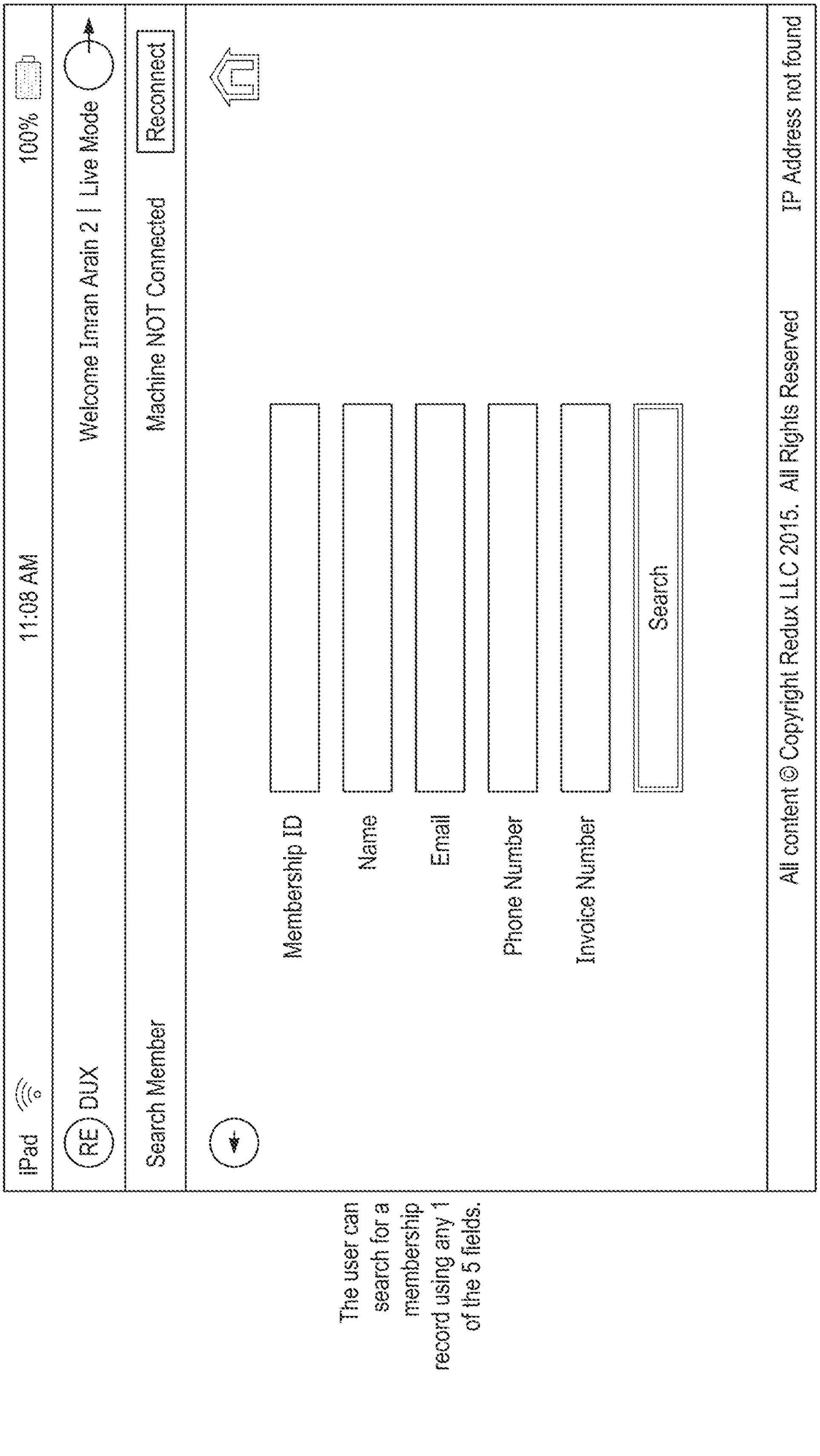
FIG. 37 is a screen shot of the drop down menu associated with the device registration service that allows a search on various fields for the customer device registration record.
Figure 38:
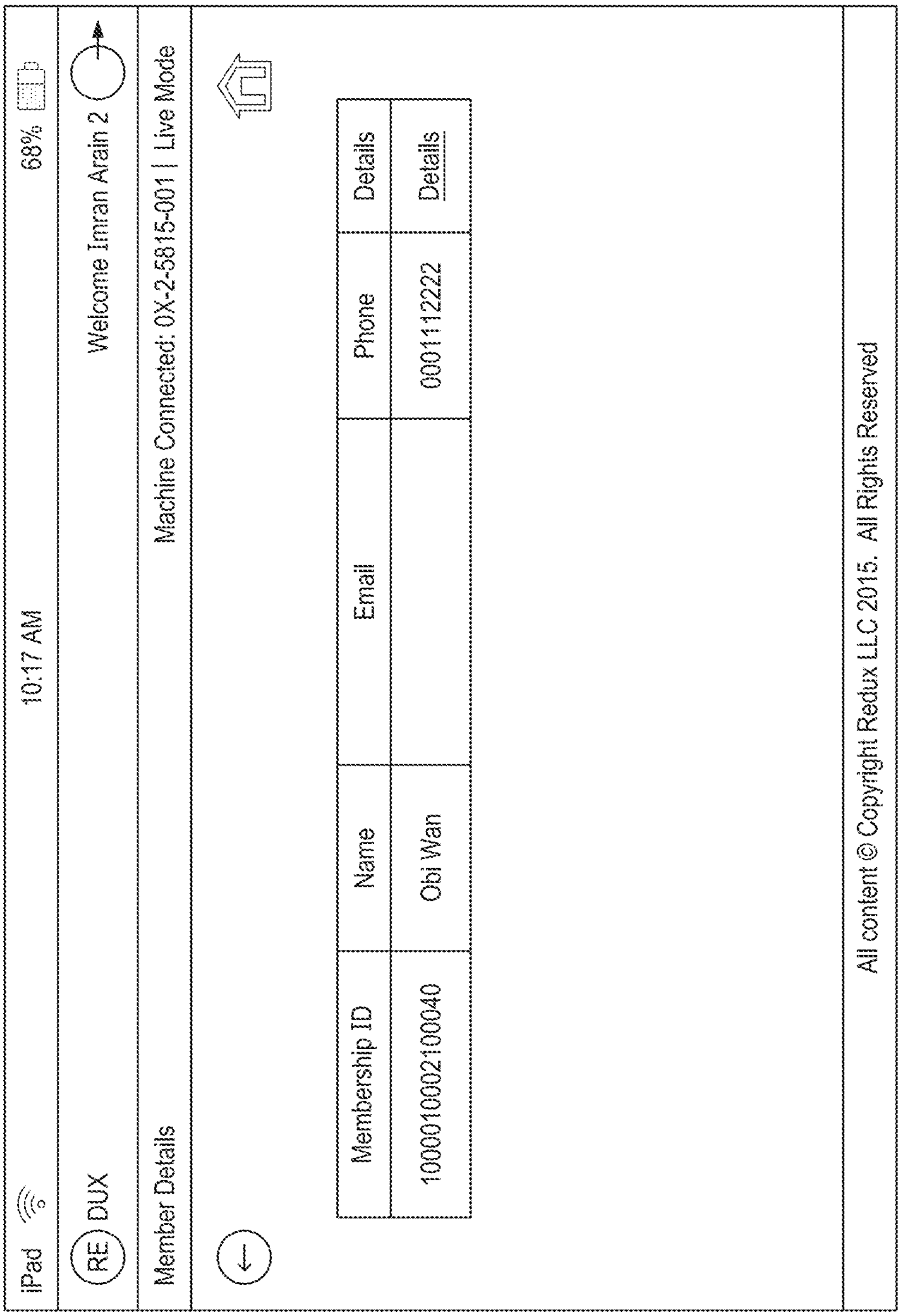
FIG. 38 is a screen shot of the record locator screen depicting the device registration identifier (membership number) together with name, phone number, and details link.
Figure 39:
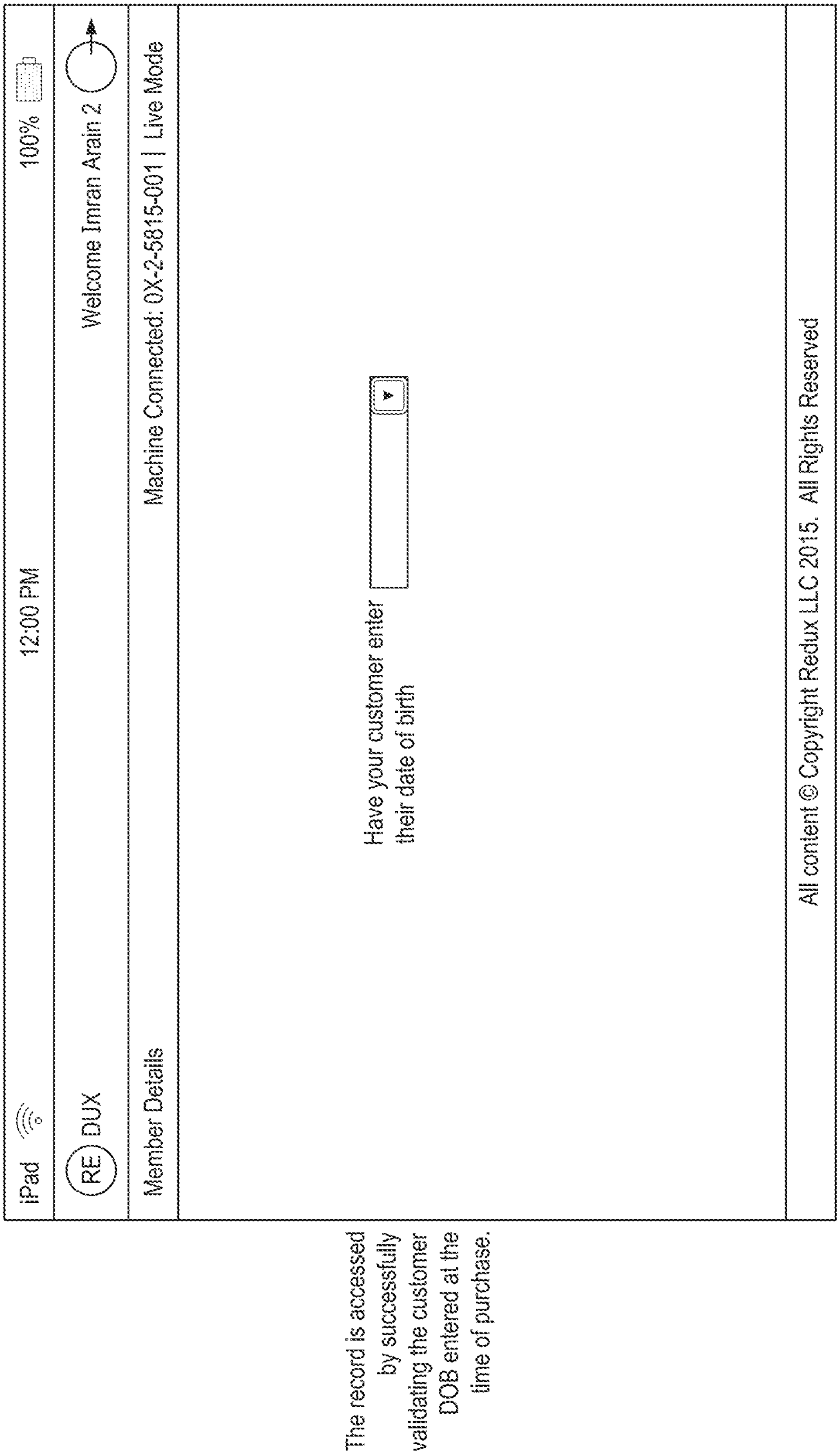
FIG. 39 is a screen shot of the application depicting the device registration validation field which requires the date of birth.
Figure 40:
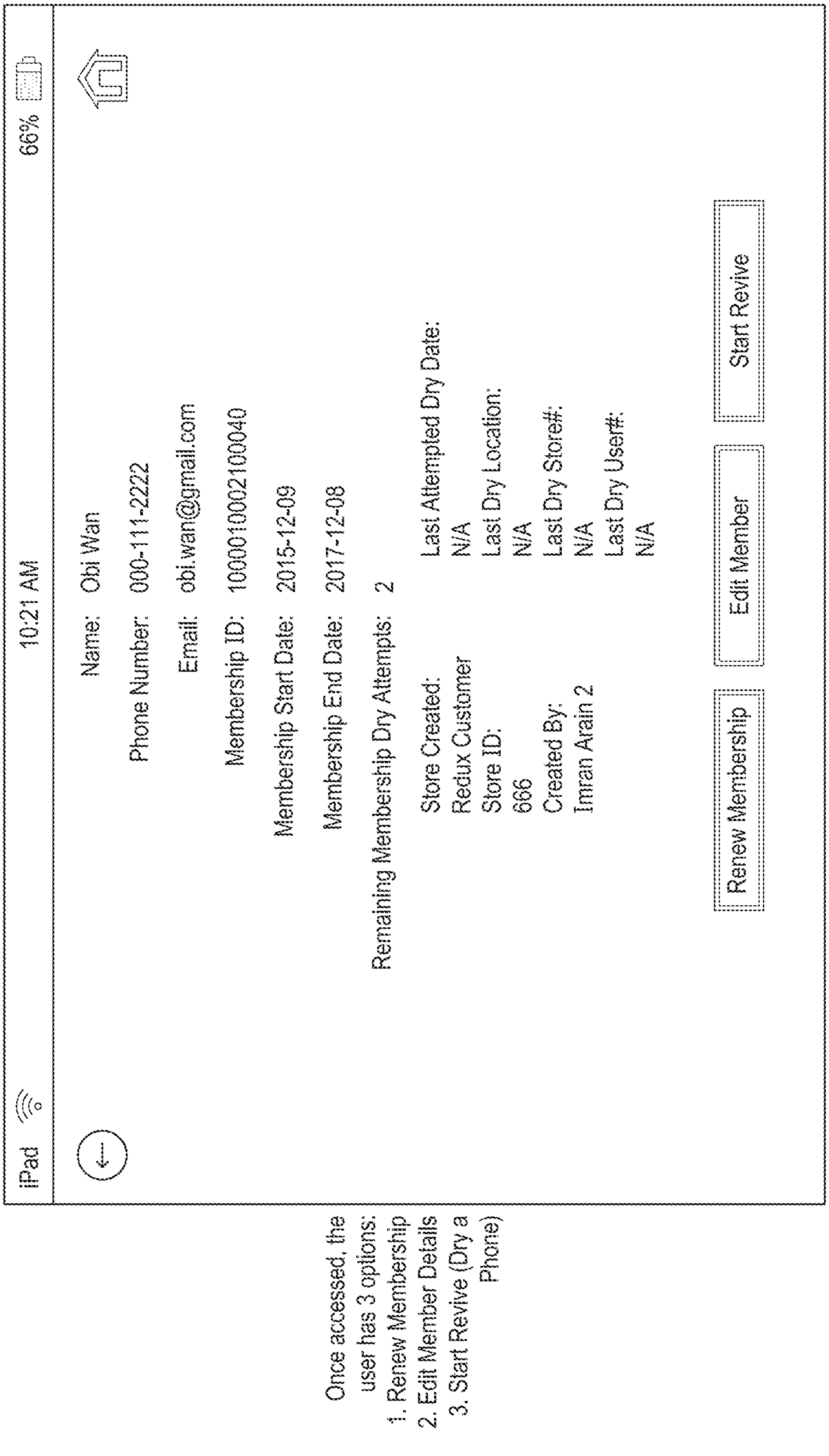
FIG. 40 is a screen shot of the application depicting various options for the device registration record.
Figure 41:
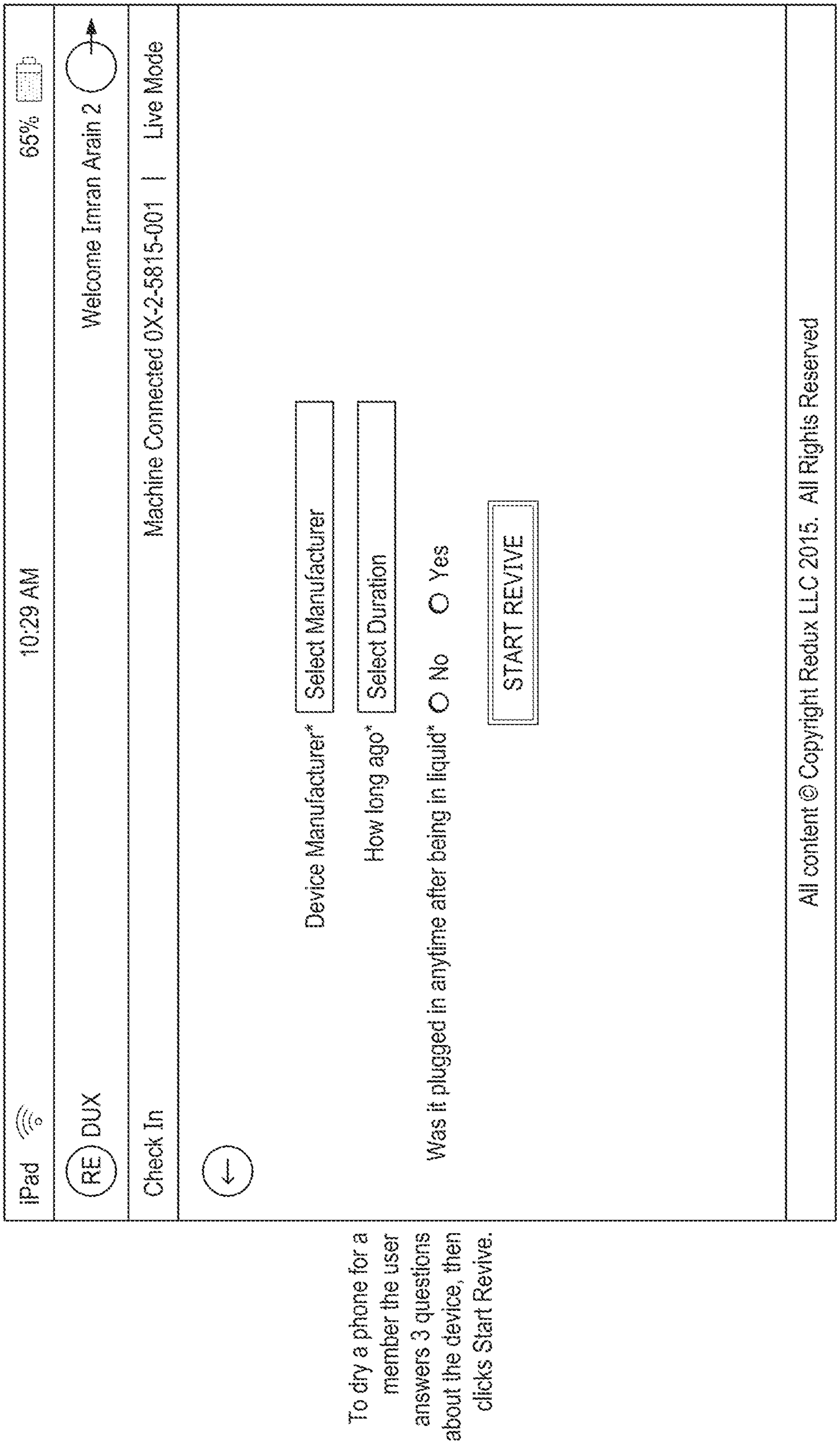
FIG. 41 is a screen shot of the application depicting the machine control for drying an electronic device and requesting three basic questions to be answered.
Figure 42:
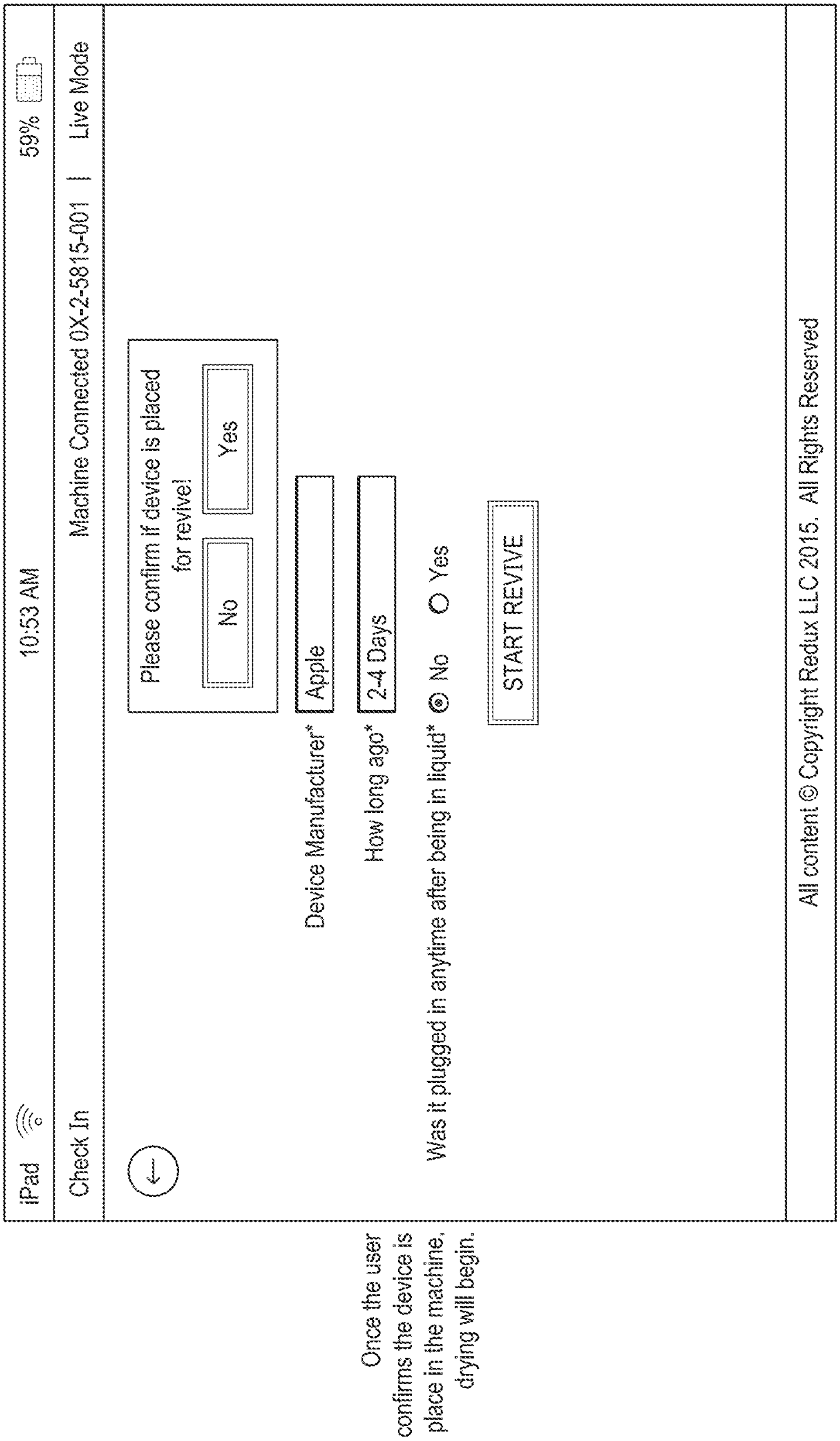
FIG. 42 is a screen shot of the application depicting the wireless handshaking between the dryer and application confirming the electronic device has been placed in the dryer.
Figure 43:
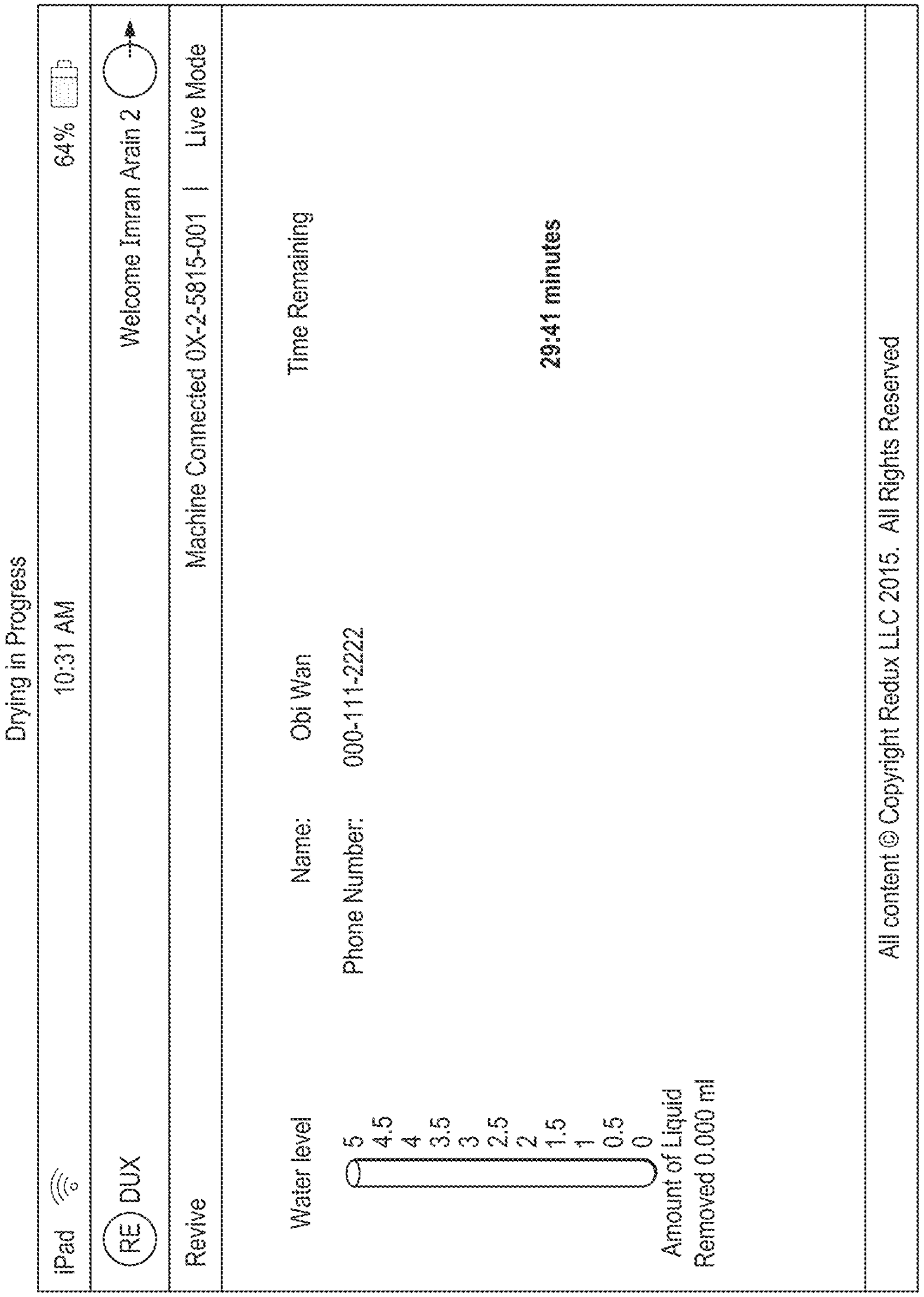
FIG. 43 is a screen shot of the application depicting the time elapsed and amount of water removed obtained real time from the dryer while the electronic device is being dried.
Figure 44:
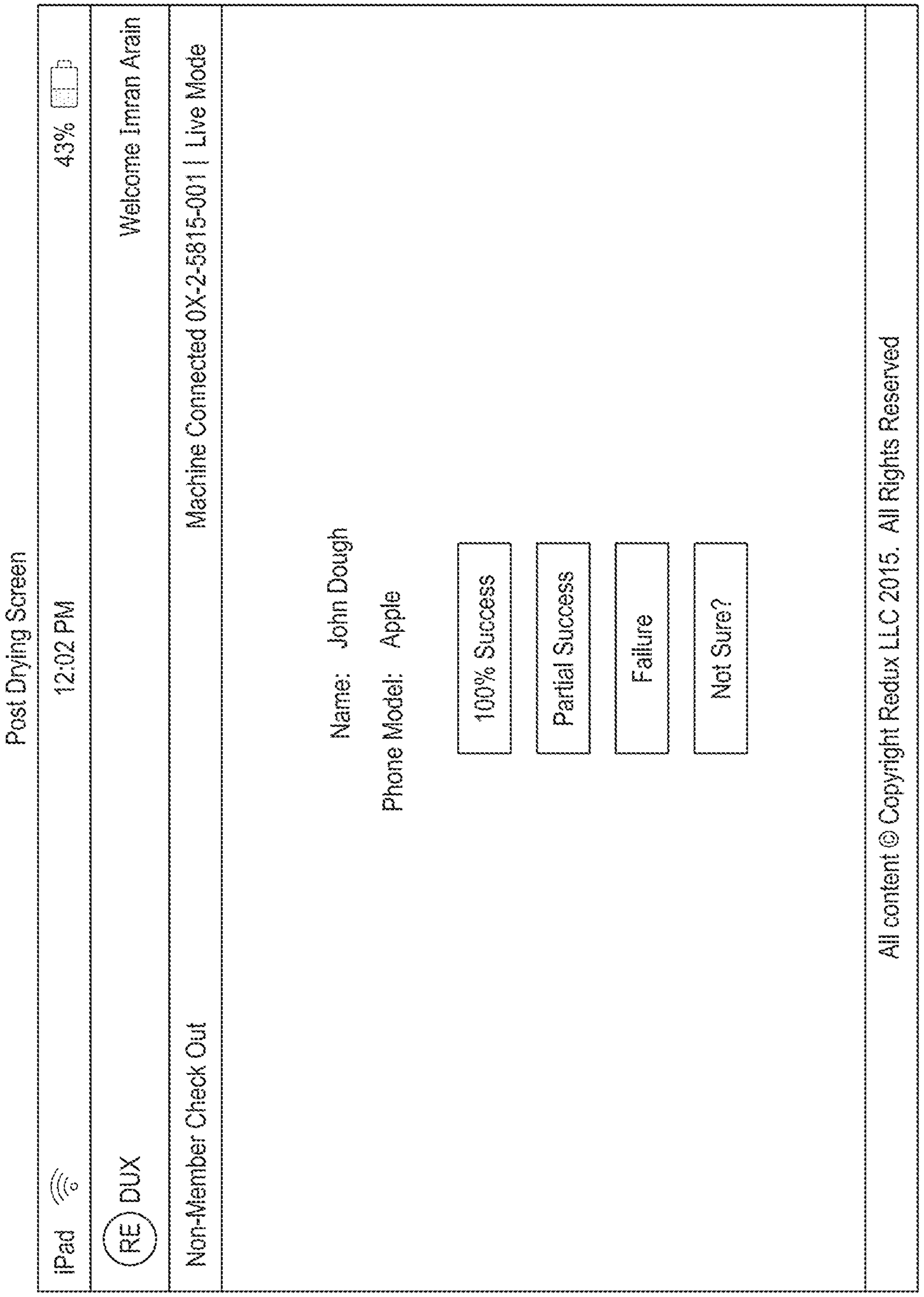
FIG. 44 is a screen shot of the application depicting the post drying menu prompting the user (store associate) to select the condition of the electronic device post drying.
Figure 45A:
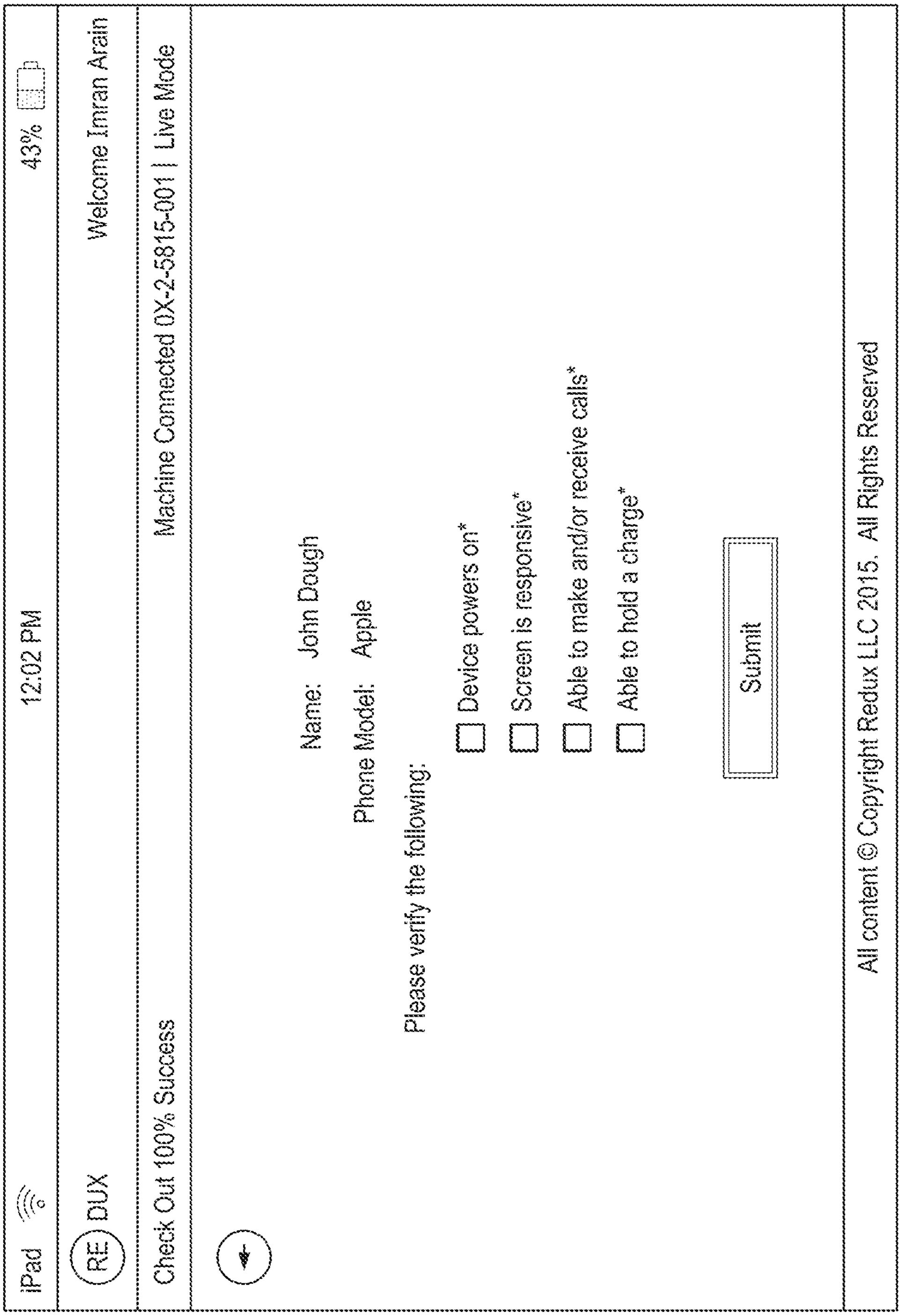
FIGS. 45A, 45B, and 45C are screen shots of the application for post drying radio buttons based on either non-device registrant (non-member) or device registrant (member).
Figure 45B:
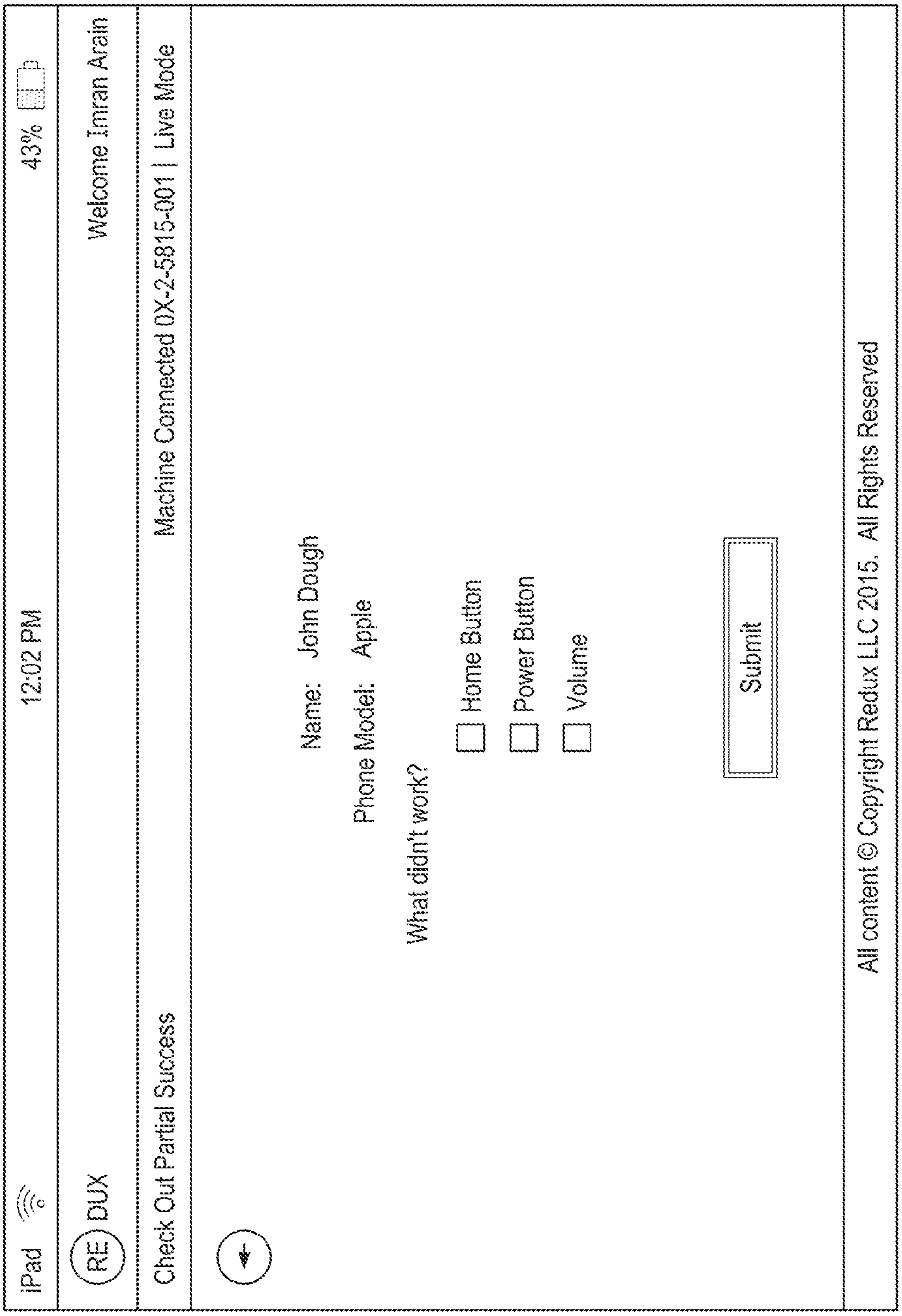
Figure 45C:
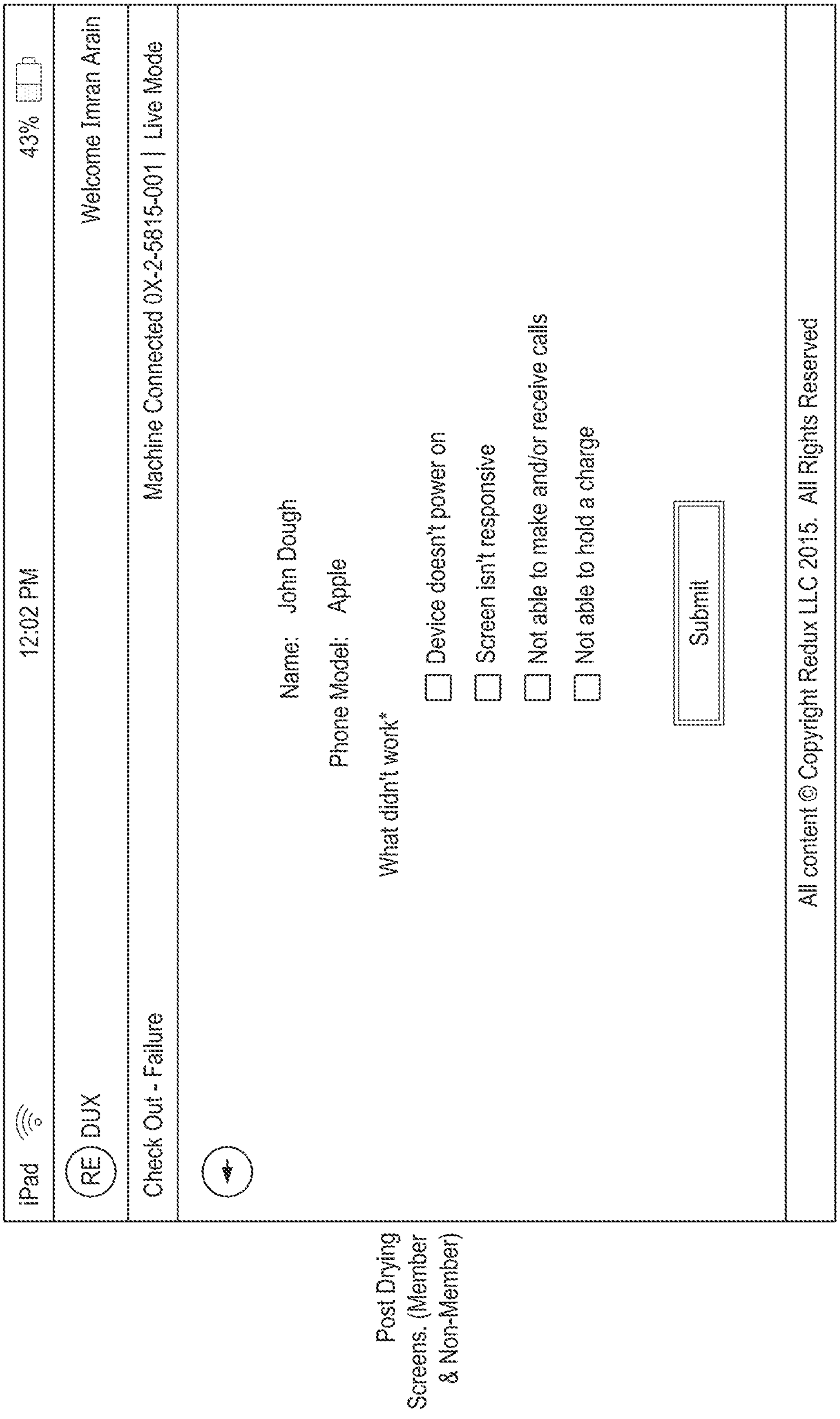

Referring now to FIG. 33-FIG. 48, the software application which is used to collect consumer data, condition of the electronic device being contemplated for drying, the process for registering the devices for the membership database, are herein described. When a customer buys a phone, the store associate inquires whether or not the customer would like to register their device in the drying database. The store associate invokes the application and the device registration screen pops up as shown in FIG. 33 and selects the radio button "Register New User". The application presents a new screen to the user requesting the name, phone number, email, date of birth (DOB) and device registration (membership) invoice number and shown in FIG. 34. The membership invoice number is presumably generated from the store point of sale (POS) equipment by using a unique Stock Keeping Unit (SKU) number for the device registration (membership) costs. As best shown in FIG. 35, the application now prompts the user/store associate indicating the device has been registered. The device registration contains the unique registration identifier, registrant name, phone number, registration start and end date, remaining dry attempts, store at which the registration was created, and store associate name who created the registration. It is generally understood the registration length of time can be variable as well as the remaining dry attempts. Once the registration record is created, and presumably a registrant visits a participating store network which has a license to use the application and drying service, the store associate would access the registrant's information as best shown in FIG. 36 by selecting the Member Services radio button. As best shown in the screen shot in FIG. 37, the store associate can now invoke a database search for the possible registrant by entering one of the five fields and then selecting the search button. If the registrant is in the database (defined by being a paid-up member), the registrants' information is displayed as shown in FIG. 38. Once, the registrant record locator is verified through a store associate prompting of the customer, the details link is selected which invokes FIG. 39 which is a screen shot of the validation process. The store associate enters the registrants' date of birth (which presumably only the registrant would know) the full record is displayed as shown in FIG. 40 and the store associate can verify whether or not the registrant is valid, has remaining dry attempts, and what store created the registration. Once the store associate verifies the registration through the application, the store associate can now select the radio button to either renew the registration, edit the registration, or dry a phone (Start Revive). In the case of drying a phone, the application displays the screen shot of FIG. 41, whereby the store associate now can enter the device manufacturer, how long ago it saw the wet peril, and if it where plugged it (charging attempted while wet). This data all gets written to the application database for later analytics and sorting for reports. After the store associate enters the information, the start revive radio button is selected and now screen shot in FIG. 42 is displayed. FIG. 42 prompts the store associate to ensure the wet electronic device has been placed into the dryer (revive) and if this is the case, the store associate selects the start revive button once again. As best shown in the screen shot of FIG. 43, the revive drying process is now in process and the revive dryer is communicating to the application via wireless signals as shown in FIG. 32. The drying process application screen of FIG. 43 depicts the time elapsed and amount of water removed based on algorithms within the revive dryer and transmitted via wireless to the application. Once the drying process is completed, a post drying screen is displayed as best shown in the screen shot in FIG. 44. The application prompts the store associate with the registrants' name phone model, and what condition the device is in post drying. Once the store associate selects a condition radio button, the application displays one of three screen shots shown in FIG. 45, which contain the 100% success, partial success, and failure screens. The store associate is prompted to select the various radio buttons on these screens and the drying process and data collection is completed for a registered device (member).

Figure 46:
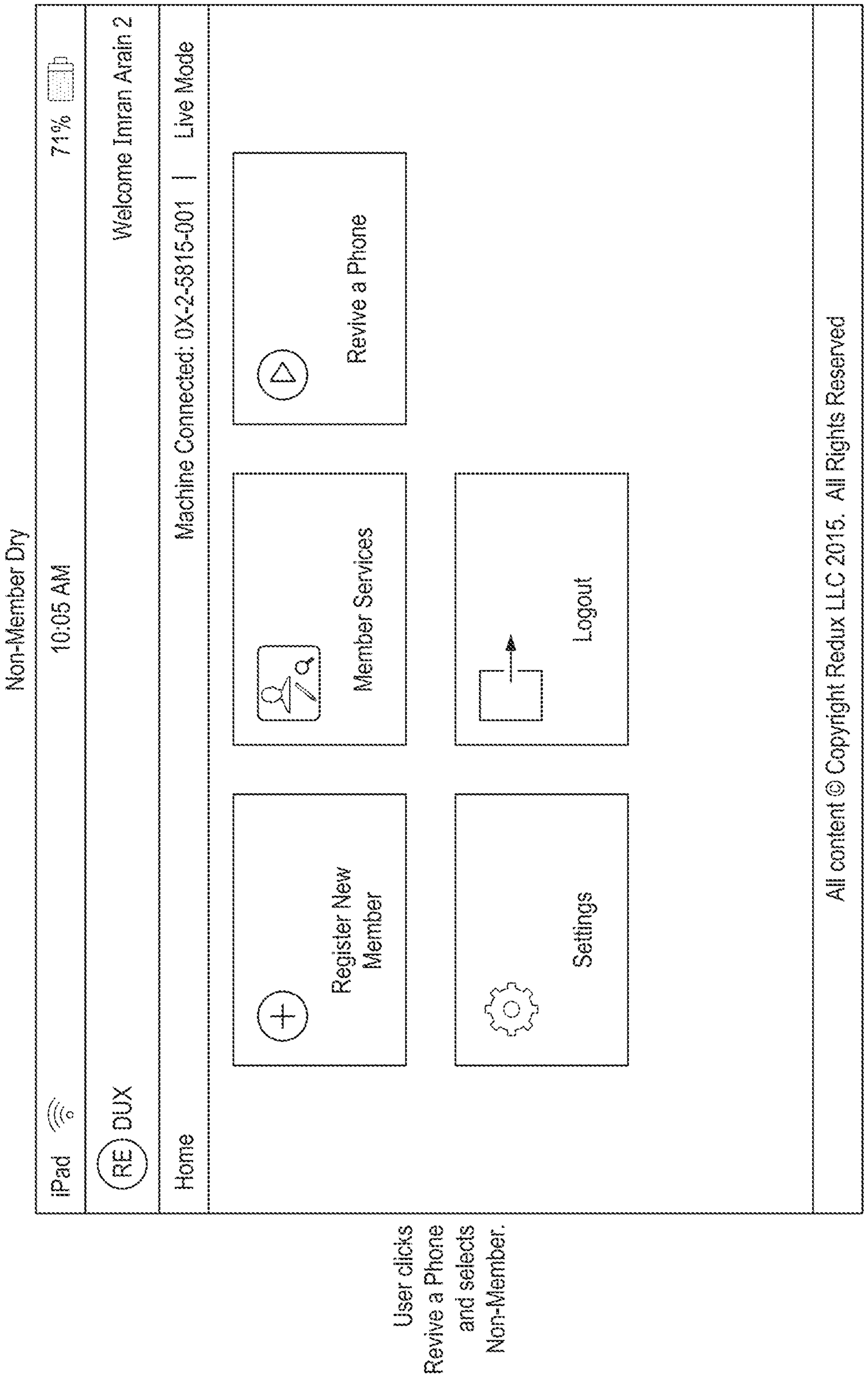
FIG. 46 is a screen shot of the application depicting a non-device registrant (non-member) that allows a non-registrant's electronic device to be dried.
Figure 47:
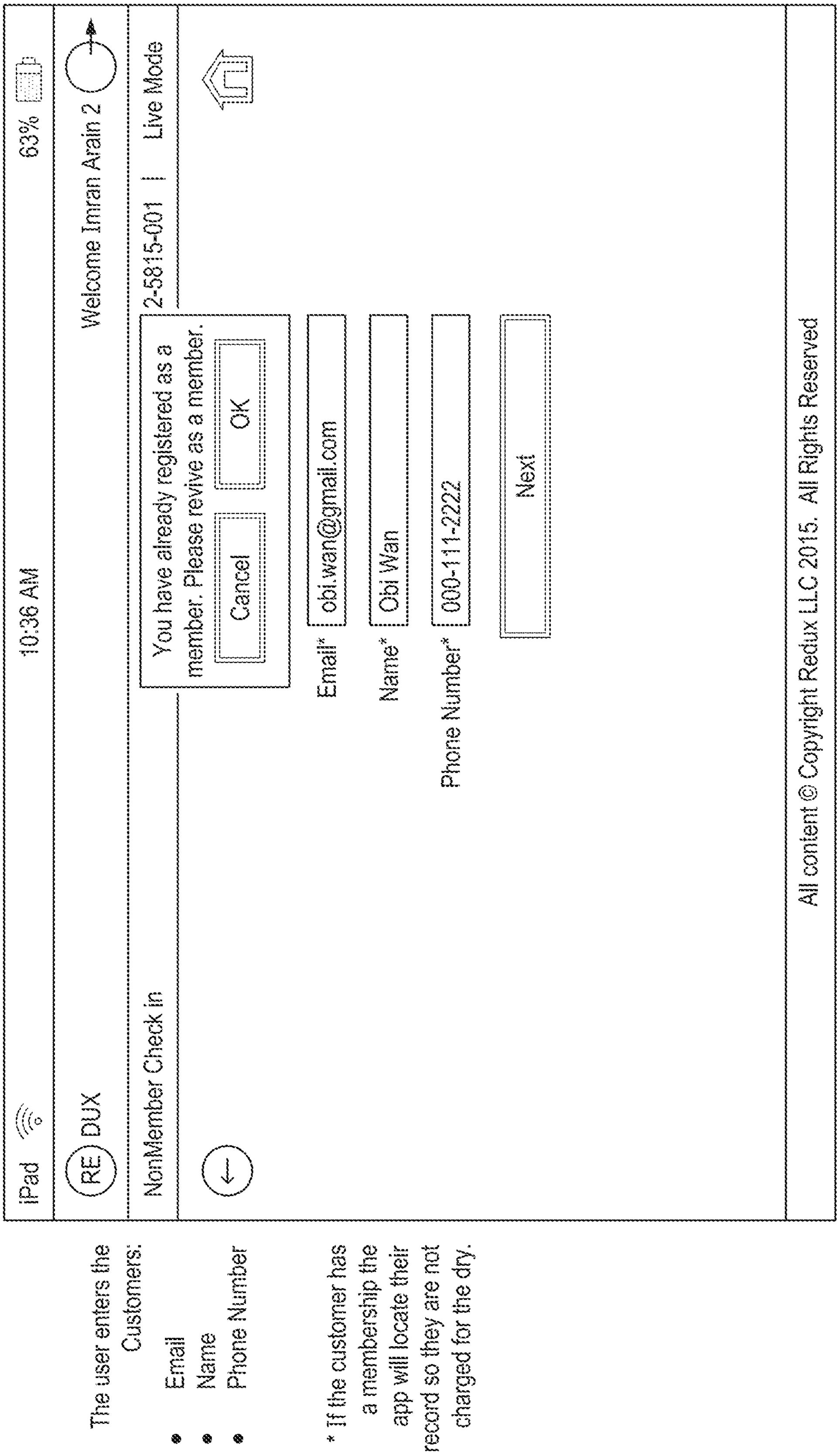
FIG. 47 is a screen shot of the application depicting the non-registrant's check-in wherein the application prompts the user for email, name, and phone number.
Figure 48:
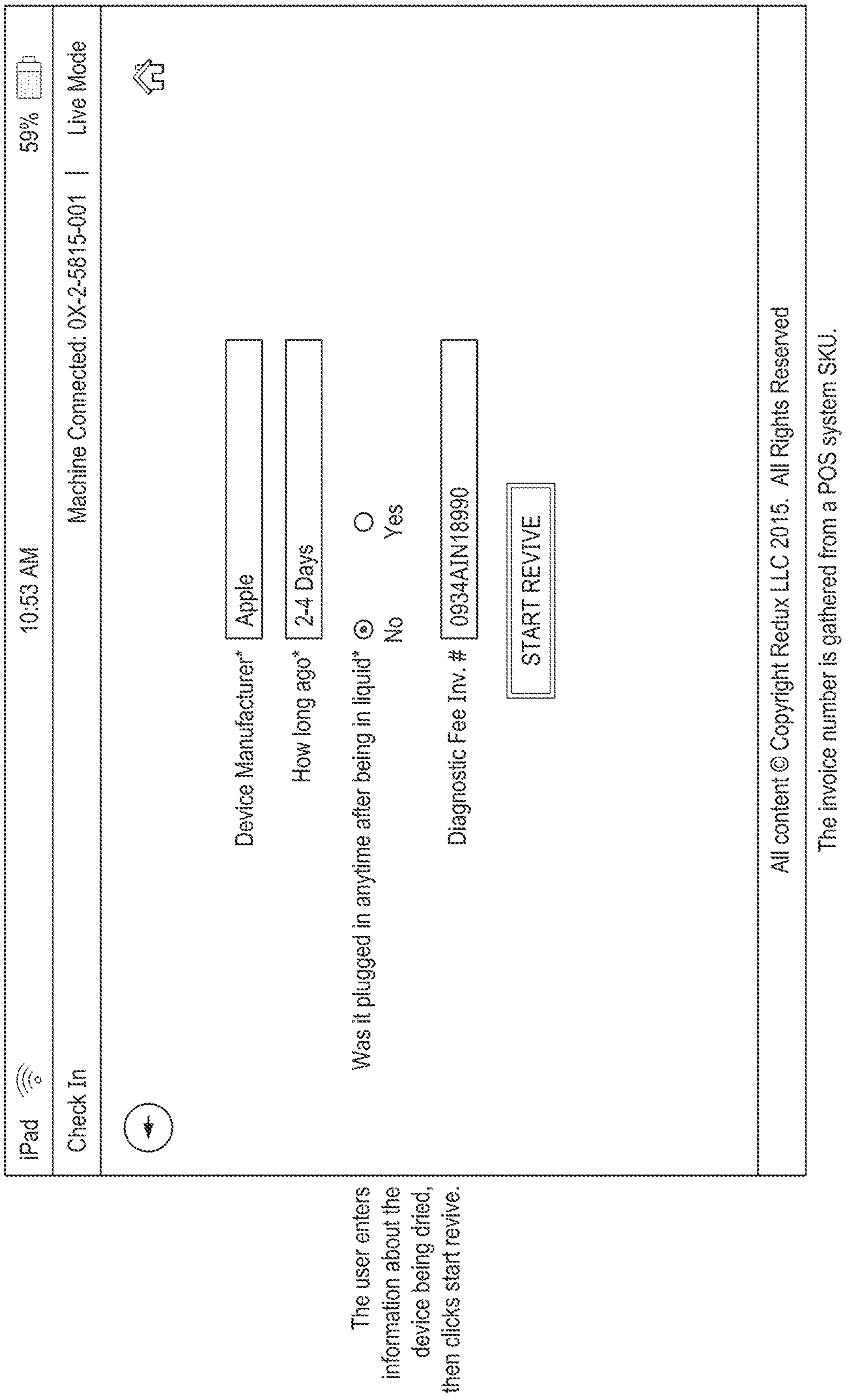
FIG. 48 is a screen shot of the application depicting the check-in process whereby the application prompts the user for a diagnostic fee invoice number which is then used for the Point of Sale (POS).

In the case where a non-registered device has a water peril and comes into a store to presumably dry their phone, the store associate selects the revive a phone as shown in the screen shot of FIG. 46. Once the revive a phone radio button is selected, screen shot depicted in FIG. 47 is displayed. The application prompts the store associate to enter the customer (non-registrants') email, name, or phone number and the application now checks the database of FIG. 32 to ensure the non-registrant is indeed a non-registrant. If the database detects the customer identifiers, the application provides a balloon prompt that the non-registrant is a registrant (member) and they can now dry their phone by the previous depicted process. If the application does not detect the customer as a registrant, then screen shot in FIG. 48 is produced which permits a non-registrant the ability to dry their phone as a diagnostic. The application prompts the store associate for the diagnostic fee invoice which is presumably driven off the store POS system and given a diagnostic SKU which the store associate enters in the field. The store associate now selects the start revive radio button and application reverts to FIG. 41 and the non-registrants' phone can be dried as described in the previous process.

Figure 49:
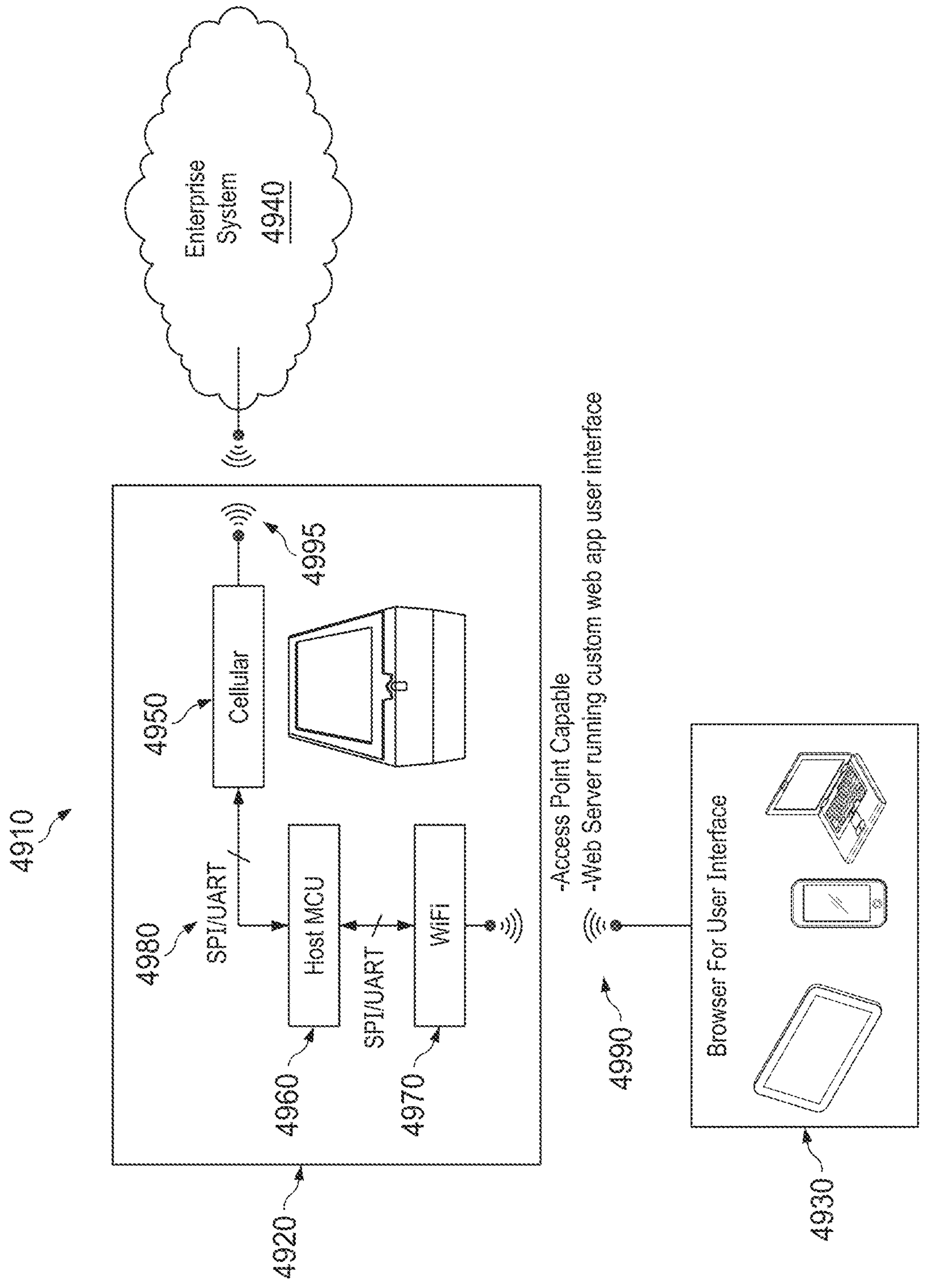
FIG. 49 is a system architectural diagram which depicts a machine-to-machine internet of things (IoT) control scheme which allows an open-system user interface for vacuum drying purposes.

Referring now to FIG. 49, an Internet of Things (IoT) machine-to-machine control system 4910 is shown with vacuum dryer wireless control system 4920 (i.e., the controller for the device electronic device dryer apparatus), web-browser user interface 4930 (displayed on a user's computing device which can be any type of computing device described in this disclosure) and enterprise system 4940, which includes an enterprise database cloud storage device or service. Each of these systems may be one or more computing devices or systems. The control system 4910 also includes one or more electronic device dryers as described in this disclosure. Vacuum dryer control system 4920 is comprised of host microcontroller (MCU) 4960, WiFi connection device or module 4970, and cellular connection device or module 4950. In some embodiments, host controller 4960 communicates with WiFi connection device 4970 and cellular connection device 4950 via universal asynchronous receive transmit (UART) bus 4980. UART bus 4980 can be custom configured in serial peripheral interface (SPI) mode or inter-integrated communication (I2C) mode in host microcontroller 4960 using a firmware communication stack housed in host microcontroller 4960 memory. In preferred embodiments, host microcontroller 4960 is configured in SPI mode for ease of set-up and error handling between WiFi connection device 4970 and cellular connection device 4950. In some embodiments, the WiFi connection device 4970 and cellular connection device 4950 may be different portions of the same device. The vacuum dryer wireless control system 4920 may be located in the device dryer (e.g., any device dryer described in this disclosure) or may be located separately from the device dryer but in wired or wireless communication with the device dryer.

Firmware communication stack housed in memory of host microcontroller 4960 is configured in such a manner as to permit wireless communication of WiFi connection device 4970 in Access Point (AP) mode (and/or WiFi Direct mode) to web browser user interface 4930 on any web-enabled device via wireless communication signals 4990. The WiFi connection device 4970 may be controlled by host microcontroller 4960.

Near simultaneously with the communication between the WiFi connection device 4970 and the web browser user interface 4930, cellular module 4950, which is being controlled by host microcontroller 4960, communicates with the host controller 4960 via Long Term Evolution (LTE) CAT1 communication signals 4995 or any other kind of wired or wireless signals such as any signals described in this disclosure. In some embodiments, any signals described herein are non-transitory signals. In other embodiments, any signals described herein are transitory signals. In preferred embodiments, cellular connection device 4950 is replaceable and pluggable within vacuum dryer wireless control system 4920 and can be substituted with communication devices or modules that support LTE CAT M1 communication protocols and second generation (2G) communication protocols. LTE CAT1 communication signals 4995 communicate to a cloud based enterprise system 4940 via cellular towers and provide token exchanges and handshaking signals to allow data to be passed with communication signals 4995 to and from the enterprise system 4940.

In preferred embodiments, the handshaking signals (e.g., transmitted from the vacuum dryer wireless control system 4920 to the enterprise system 4940) are comprised of transmitted data from the vacuum dryer wireless control system 4920 which comprises, at minimum, the dryer serial number and a registrant's (i.e., user or customer) mobile phone number, address, email, or other contact or identification information. Software flags which are configured in the enterprise system 4940 provide the status of the registrant (e.g. member or not a member). Once the status of the registrant is determined or confirmed, the enterprise system 4940 transmits a unique software key or token back to the vacuum dryer wireless control system 4920 (which may also be known as the controller or control system or power and control system in various parts of this disclosure). In some embodiments, the vacuum dryer system (i.e., the electronic device dryer) being controlled by the vacuum dryer wireless control system 4920 may automatically start the drying process after receiving and/or processing the software key or token. In other embodiments, the dryer may present an indicator (e.g., on a display or the indicator may be communicated (e.g., from the vacuum dryer wireless control system 4920) to the computing device associated with the user interface 4930 such that the indicator is displayed on the user interface 4930) such that another computing device or a human may initiate the drying process associated with the device dryer. The indicator presented on the user interface 4930 indicates whether the registrant/user/customer is a member or non-member. If the registrant/user/customer is a member, the user interface 4930 (or another user interface or display associated with the vacuum dryer wireless control system 4920) also indicates the number of dry attempts remaining for the member either prior to after the drying process has either started or completed. In some embodiments, either prior to or after the drying process has either started or completed, the vacuum dryer wireless control system 4920 (and/or the computing device associated with the user interface 4930) sends process information or data associated with the drying process (e.g., identification information associated with the apparatus and/or the electronic device, the progress of the drying process, the success or failure of the drying process, the operation status of the electronic device being processed or dried by the device dryer, etc.) to the enterprise system 4940, and the enterprise system 4940 decrements the number of remaining dry attempts for the member by 1.

In some embodiments, the computing device associated with the user interface 4930 communicates with the enterprise system 4940 directly (e.g., WiFi direct) via one or more wireless or wired communication protocols. In other embodiments, the computing device associated with the user interface 4930 communicates with the enterprise system 4930 via the WiFi of the location where the device dryer and the vacuum dryer wireless control system 4920 are located. In such embodiments, the computing device associated with the user interface 4930 may need the WiFi credentials of the WiFi at the location, and the vacuum dryer wireless control system 4920 may also need the WiFi credentials of the WiFi at the location.

In some embodiments, the computing device associated with the user interface 4930 communicates with the vacuum dryer wireless control system 4920 directly (e.g., WiFi Direct) via one or more wireless or wired communication protocols. In other embodiments, the computing device associated with the user interface 4930 communicates with the vacuum dryer wireless control system 4920 via the WiFi of the location where the device dryer and the vacuum dryer wireless control system 4920 are located. In such embodiments, the computing device associated with the user interface 4930 may need the WiFi credentials of the WiFi at the location, and the vacuum dryer wireless control system 4920 may also need the WiFi credentials of the WiFi at the location. Features of any embodiments, devices, or processes may be combined with features of any other embodiments, devices, or processes described herein.

The enterprise system 4940 may comprise one or more databases or memory devices to store information associated with device dryers, entities, or locations at which the device dryers are located and/or one or more registered or non-registered device dryer customers/users. The enterprise system 4940 may comprise one or more communications devices to receive data from or send data, either directly or indirectly, via one or more computing devices, to the vacuum dryer wireless control system 4920 and/or web-browser/application user interface 4930 or a computing device associated with the web-browser user interface 4930. In some embodiments, the web-browser/application user interface 4930 may be associated with any mobile or non-mobile computing device, including tablets, phones, desktop computers, kiosks, etc.

In some embodiments, the entire system or environment of FIG. 49 may be referred to as an Internet of Things (IoT) system or environment. In some embodiments, a computing device, as described in this disclosure, may refer to at least one of the vacuum dryer wireless control system 4920, the computing device connected to or displaying the web-browser user interface 4930, and/or the enterprise system 4940. In some embodiments, the web-browser user interface 4930 may be a user interface associated with a user or customer application. The communication between the vacuum dryer wireless control system 4920 and the enterprise system (and/or the computing device associated with the web-browser user interface 4930) may be referred to as IoT machine-to-machine communication. In some embodiments, this machine-to-machine communication is characterized by data transfer associated with a low data transfer rate or bandwidth (e.g., 1 kB/sec). In some embodiments, the vacuum dryer wireless control system 4920 may use Hypertext Transfer Protocol (HTTP) POST commands to upload data or files via the web to a server. This data may include a registrant's name, phone number, email, etc. In some embodiments, this data may be input or transmitted to a computing device (e.g., the computing device associated with the user interface 4930) and communicated to the enterprise system 4940. In some embodiments, the vacuum dryer wireless control system 4920 uses HTTP GET commands to receive data from the enterprise system 4940. This data includes data associated with a registrant in the database stored at or accessed by the enterprise system 4940. For example, this data includes information associated with a registrant/user/customer's registration status (e.g., member, non-member, etc.), whose information may have been transmitted in the POST command. In some embodiments, software upgrades to the vacuum dryer wireless control system 4920 may be communicated from at least one of the computing device associated with the user interface 4930 or the enterprise system 4940. In some embodiments, any direct or WiFi communication between two systems or devices in this disclosure may refer to WiFi Direct communication.

Figure 50:
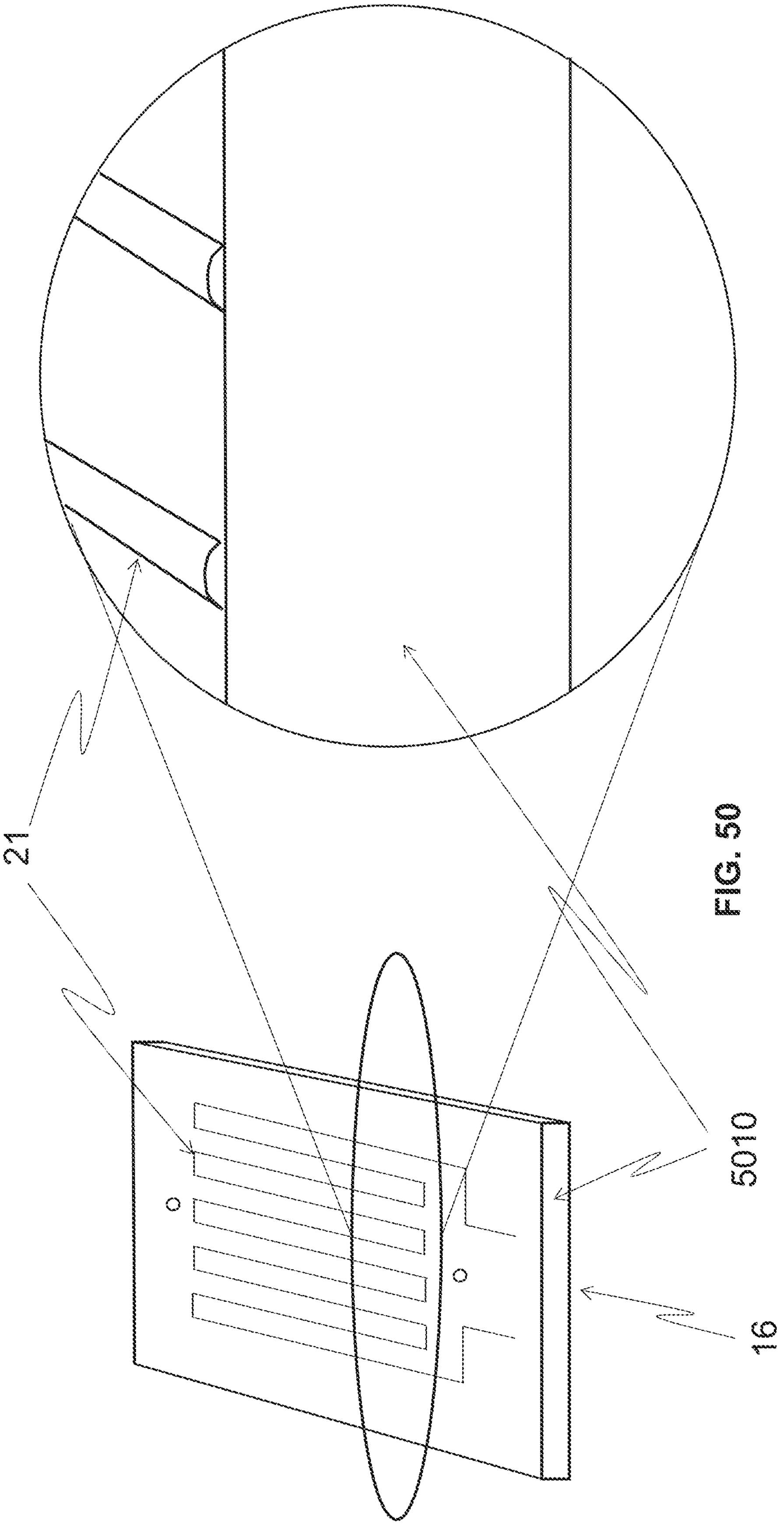
FIG. 50 is an isometric magnified view of the electrically heated conduction platen of FIG. 2

Referring now to FIG. 50, heated conduction platen 16 of FIG. 2 is depicted with thermofoil resistance heater 21 mounted on heater substrate 5010 in a isometric magnified view. In some embodiments, heater substrate 5010 is a planar material which can be non-thermally conductive (insulative) or thermally conductive. In some preferred embodiments, heater substrate is silicone or FR4 (Flame Retardant 4) printed circuit board material. In another preferred embodiment, thermofoil resistance heater 21 is or comprises printed circuit conductors etched or plated onto heater substrate 5010, itself fabricated from FR4 printed circuit board material. When thermofoil resistance heater 21 traces are formed through the etching of photoresist, the thermofoil resistance heater traces 21 are crowned with longitudinal tangent surfaces due to inherent uneven chemical etching. This manifests into longitudinal contours that provide tangential contact onto any planar object placed in top of heated conduction platen 16. In some embodiments, any contoured surface may refer to any spherical or curved surface.

Referring now to FIG. 51, a trace length vs. trace width effective thermal contact area table 5110 is depicted. For various desired wattages of heated conduction platen 16 of FIG. 50, trace lengths and trace widths are calculated. The combination of trace lengths and widths produce desired effective thermal contact areas of 0.5 square inches to 3 square inches. In some preferred embodiments, the combination of trace lengths of 250 inches and trace width of 0.006 inches produces an effective thermal contact area of 1.5 square inches, or ideal contact area combination 5120.

Figure 52:
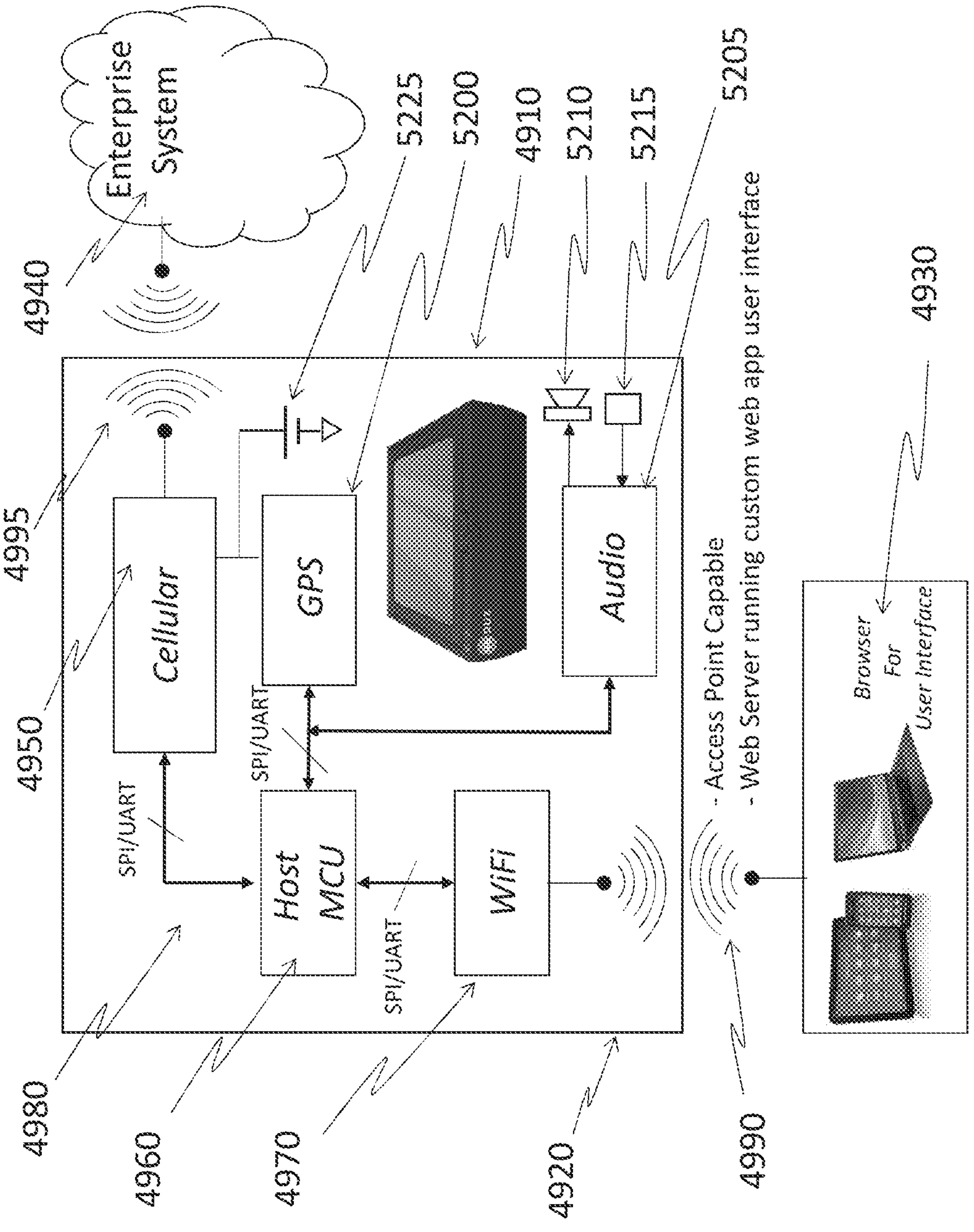
FIG. 52 is a system architectural diagram which depicts a machine-to-machine internet of things (IoT) control scheme with GPS location services and audio system components to provide a service desk remote audio communication to the vacuum dryer.

As shown in FIG. 52, the entire system or environment of FIG. 49 has Global Positioning System (GPS) system or device 5200, audio system or device 5205 with speaker 5210, and microphone 5215. GPS system 5200 and audio system 5205 are interfaced with host MCU 4960 using SPI/UART bus 4980. In some preferred embodiments, GPS system 5200 uses geostationary GPS satellite network to precisely determine or provide the location of vacuum dryer wireless control system 4920 and/or the electronic device drying apparatus in communication with or comprising the vacuum dryer wireless control system 4920. In other embodiments, other location-determining systems (e.g., triangulation systems using cell towers, etc.) may be used (in addition to or alternatively from the GPS system 5200) to determine a physical or network location (e.g., Internet Protocol (IP) address) of the vacuum dryer wireless control system 4920 or the associated electronic device drying apparatus (e.g., associated with or comprising the control system 4920). The location information may include, in addition to or alternatively from the physical or network location, identification information associated with the electronic device drying apparatus, identification information associated with a store or merchant where the electronic device dryer apparatus is located, etc.

In other embodiments, one or more communications boards or circuits comprising the GPS system 5200 (or any other location-determining system), the cellular device 4950 (or any other communication device), and/or any other devices, modules, or systems in any of the figures, including FIG. 52 and FIG. 49, may be powered by a battery (internal power source) or through wall power (external power source). In some embodiments, the battery may be a back-up battery that is used as a power source when there is no external power source available. As shown in FIG. 52, in preferred embodiments, GPS system 5200 (or any other location-determining system) and cellular device 4950 can be powered by back-up battery 5225. Back-up battery 5225 is configured in such a manner as to allow location services (e.g., location information being sent to a remote server either automatically or based on pings from the remote server) and cellular communications (e.g., voice calls or data sending/receiving to a remote server via cellular network)

without system power (e.g., without power being provided to the electronic device drying apparatus and/or the vacuum dryer wireless control system 4920).

The location information is useful because it can be used to determine a location of the electronic device drying apparatus, and can be used to keep track of a particular electronic device drying apparatus when it moves from one location to another. Also, electronic device drying apparatuses may be located in many countries, each of which has different electrical power cord configurations. Knowing the location of an electronic device drying apparatus would make it easier to match a particular electronic device drying apparatus with power cord configuration for the country where it is located, or make it easier to provide appropriate power-related hardware systems (or software) to the electronic device drying apparatus so that the electronic device drying apparatus can receive power from a power source in the country where it is located. Knowing the location of an electronic device drying apparatus would also make it easier to track stolen apparatuses.

Knowing the location of an electronic device drying apparatus can also help to ensure that software/firmware associated with (or to be installed in) the apparatus or any other computing device communicating with the apparatus matches the country in which apparatus is located. Each country may be associated with or require a different a software/firmware installation in the apparatus or associated computing device.

Additionally, knowing the location of an electronic device drying apparatus can assist with tracking the apparatus on its initial power up or during any reboot. In some embodiments, the apparatus may be configured to send location information (e.g., to a remote server) on its initial power up or during any reboot. In other embodiments, the apparatus may be pinged periodically for its location information, or may automatically send, on a periodic basis, location information to a remote server. The remote server comprise or communicate with a database that may store historical location information for electronic device drying apparatuses described herein.

In other preferred embodiments, remote service desk calls can be made via cellular device 4950. Local store associates or technicians (e.g., located at or near the electronic device drying apparatus and/or the vacuum dryer wireless control system 4920, which may be comprised in the electronic device drying apparatus or located outside the electronic device drying apparatus) can communicate directly with service desk support (e.g., located remotely from the electronic device drying apparatus and/or the vacuum dryer wireless control system 4920) using microphone 5215, speaker 5210 and audio system 5205. In some embodiments, speaker 5210 and microphone 5215 may be replaced by a 3.5 mm headphone jack. In some embodiments, the calls may be made through or received from computing devices (e.g., mobile computing devices such as phones or tablets) in communication with the electronic device drying apparatus and/or the vacuum dryer wireless control system 4920.

Figure 53:
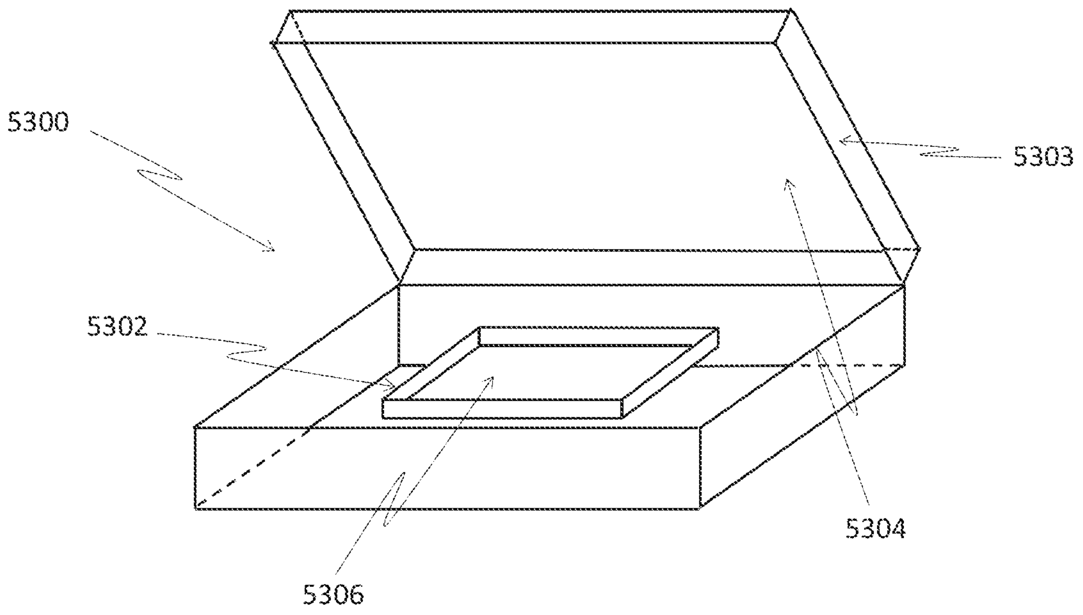
FIG. 53 is a block diagram of one embodiment of an electronic drying apparatus with a reduced volume rectangular non-collapsible (rigid) vacuum chamber.

Referring now to FIG. 53, a drying apparatus 5300 is depicted with a rectangular vacuum chamber 5302, metalized chamber coating 5306, and metalized chamber lid coating 5304. Rectangular vacuum chamber 5302 is sized to accommodate hearing aids, cochlear implants, or in general, any hearables which permit the ability to minimize chamber volume. Rectangular vacuum chamber 5302 and chamber lid 5303 are fabricated from low cost polymer plastic. Although various polymer plastics could be used, the preferred embodiment is flame-proof polycarbonate 94V. Under normal atmospheric conditions, polymeric materials acclimate to the localized temperature and humidity in the air. In some embodiments, plastic injection molding is used to perform a drying process on the polymer pellets used as feedstock for the plastic injection molding machine. This drying process comprises a heated air blower blowing heated air that is directed across the pellets and evaporates the moisture in the plastic pellets. Without this drying process, the trapped moisture will evaporate under the elevated plastic injection molding temperatures and outgas, leaving voids in the finished plastic parts. Once the plastic parts are ejected from the plastic injection molding machine, the plastic parts begin to naturally uptake water vapor once again from the local environment. Thus, all plastic parts retain some level of molecular water vapor which can affect moisture measurements. Metalized chamber coating 5306 and metalized chamber lid coating 5304 provide a sealing means for the plastic to prevent desorption of moisture within the polymers during the vacuum drying process. Metalized coatings also provide a reflective surface for ultraviolet (UV) light used for germicidal cleaning. The metalized coatings provide a means to more accurately measure humidity levels within the vacuum chamber 5302. By minimizing the water desorption coming out of the vacuum chamber 5302 (background humidity), the humidity level within the vacuum chamber is primarily the result of the moisture content in the hearing aid, cochlear implant, or any other hearable being subjected to vacuum drying.

Figure 54:
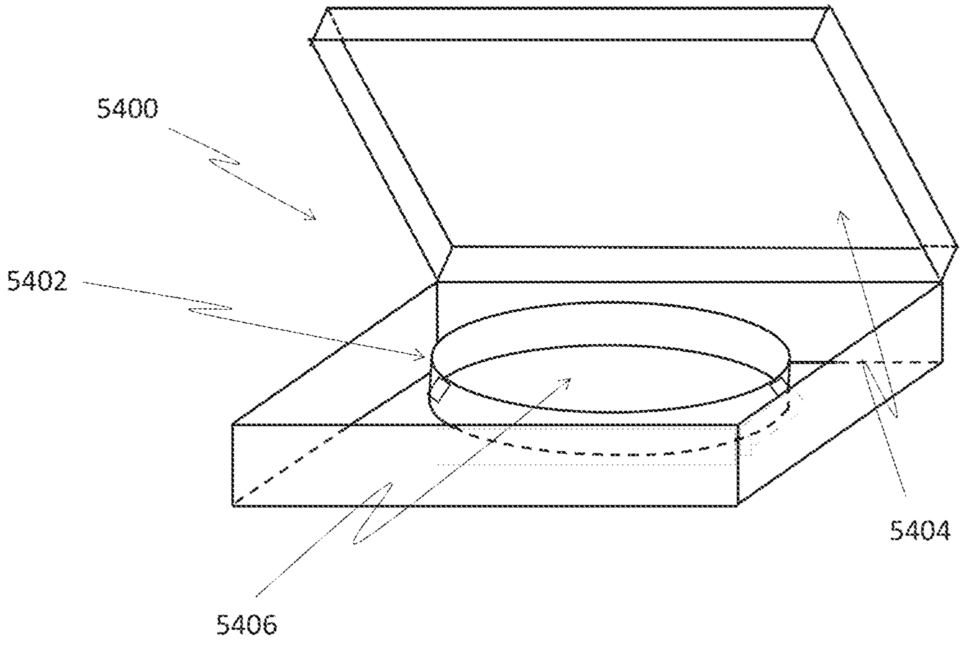
FIG. 54 is a block diagram of a preferred embodiment of an electronic drying apparatus with a reduced volume round non-collapsible (rigid) vacuum chamber.

As best shown in FIG. 54, drying apparatus 5400 is depicted with round vacuum chamber 5402, metalized round vacuum chamber coating 5406, and metalized chamber lid coating 5404. Like the embodiment shown in FIG. 53, the metalized round vacuum chamber coating 5406 and metalized chamber lid coating 5402 are used to minimize chamber volume, provide a desorption barrier for the plastics, and provide a reflective surface means for UV lights.

Figure 55:
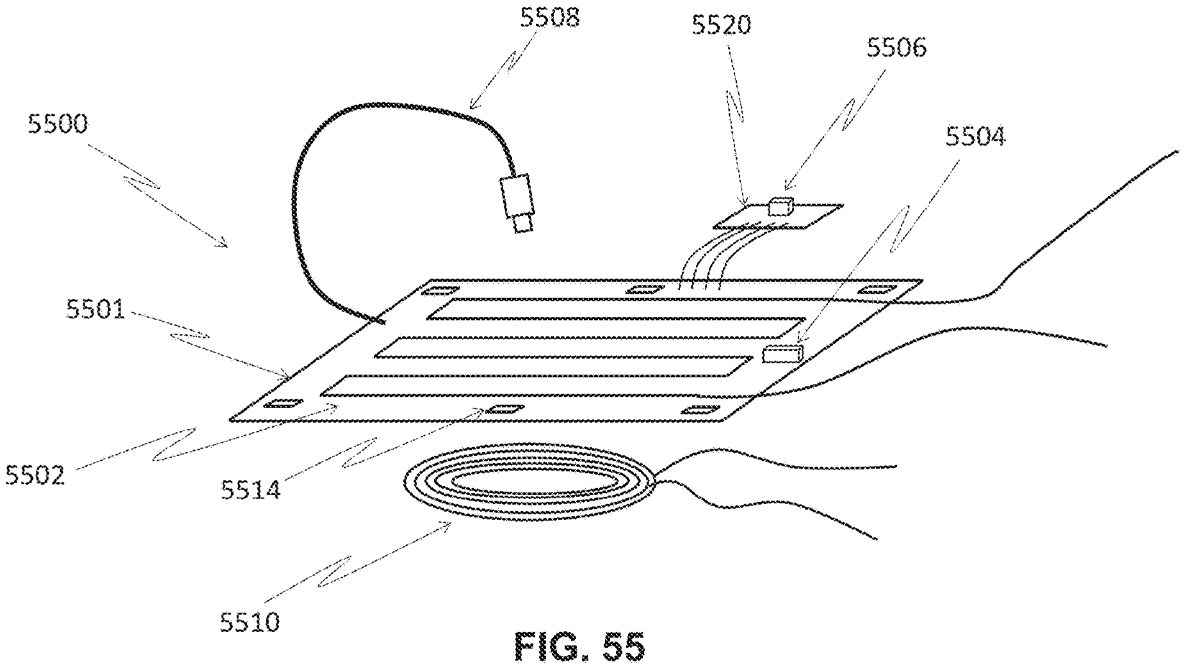
FIG. 55 is a is an isometric view of the electrically heated conduction platen element of the electronic device drying apparatus sized to fit rectangular vacuum chamber and with integrated charging features.

FIG. 55 is an isometric diagram of a heating platen assembly 5500, together with rectangular printed circuit board heater 5501, heater traces 5502 (used to heat the platen via electrical resistance which is best suited at 10W-25 W), humidity sensor 5506, pressure sensor 5504, UV light array 5514, USB charging cord 5508, and wireless charging circuitry 5510. The pressure sensor 5504 may be mounted on the reverse side of the heating platen. This eliminates the need for a separate sensor board and provides a means to measure the vacuum pressure inside the vacuum chamber. The control software utilizes this vacuum pressure measurement to determine when the boiling point of water is achieved to start humidity sampling. Although humidity sensor 5506 is surface-mountable to a printed circuit board, it is depicted mounted on a separate sensor board 5520 which is thermally isolated from printed circuit board heater 5501. Humidity sensor 5506 is a fast response type sensor which can be sampled at least 1 time per second within a thermal range of 25° C. to 85° C. Although this thermal range provides accurate measurements (e.g., associated with moisture), thermal isolation is required to incorporate the most accurate moisture removed calculations. To determine minimal moisture levels removed of at least 0.5 microliters, the thermal isolation range of humidity sensor 5506 and therefore sensor board 5520 and the printed circuit board heater 5501 must be between 0° C. and 15° C. In some embodiments, USB charging cord 5508 is controlled by electronics control board 610 of FIG. 29. Similarly, in some embodiments, wireless charging circuitry 5510 is controlled by electronics control board 610 of FIG. 29.

Figure 56:
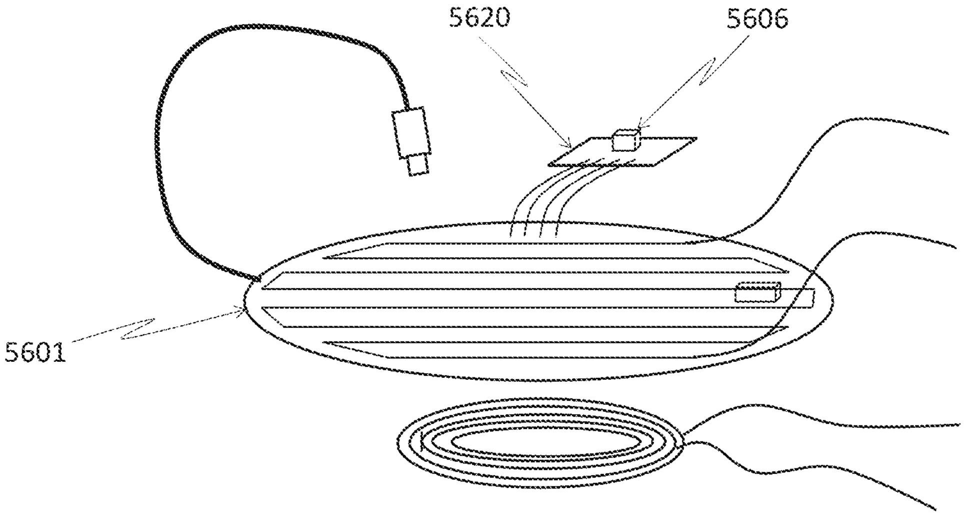
FIG. 56 is an isometric view of the electrically heated conduction platen element of the electronic device drying apparatus sized to fit round vacuum chamber and with integrated charging features.

Referring now to FIG. 56, round printed circuit board heater 5601 is depicted similarly to FIG. 55, with sensor board 5620 thermally isolated from round printed circuit board heater 5601. Separate printed circuit boards ensure humidity sensor 5606 is thermally isolated from round printed circuit board heater 5601 in the range of between 0° C. and 15° C. for moisture level calculations.

Figure 57:
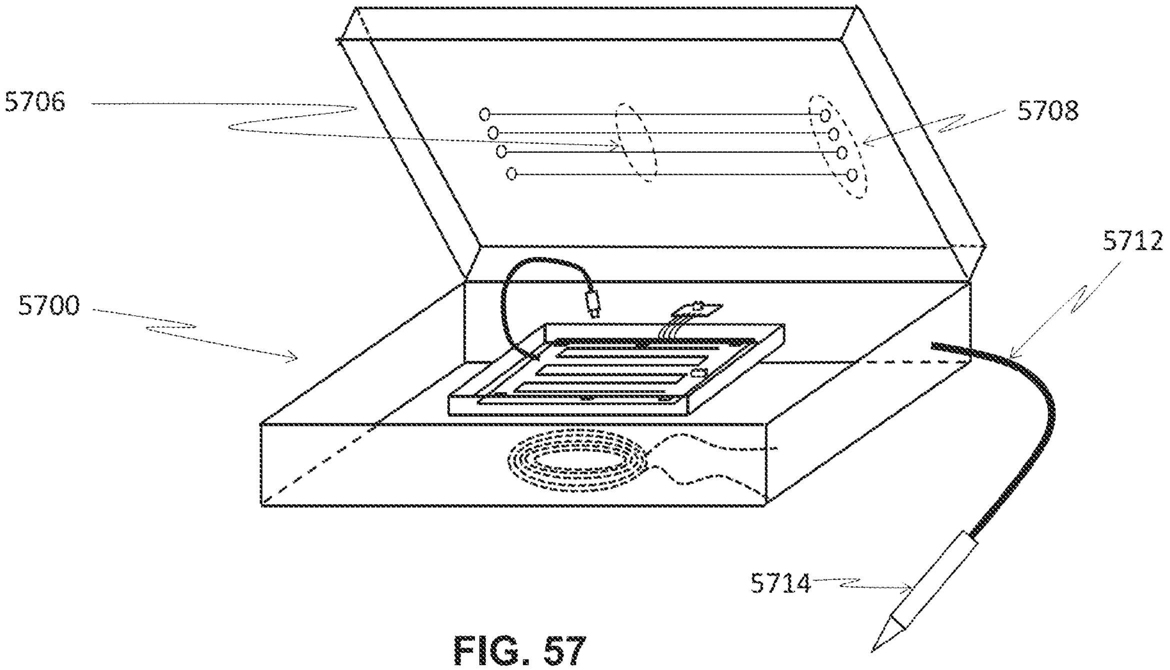
FIG. 57 is a block diagram of one embodiment of an electronic drying apparatus depicted with an integrated vacuum wand and charging features.
Figure 58:
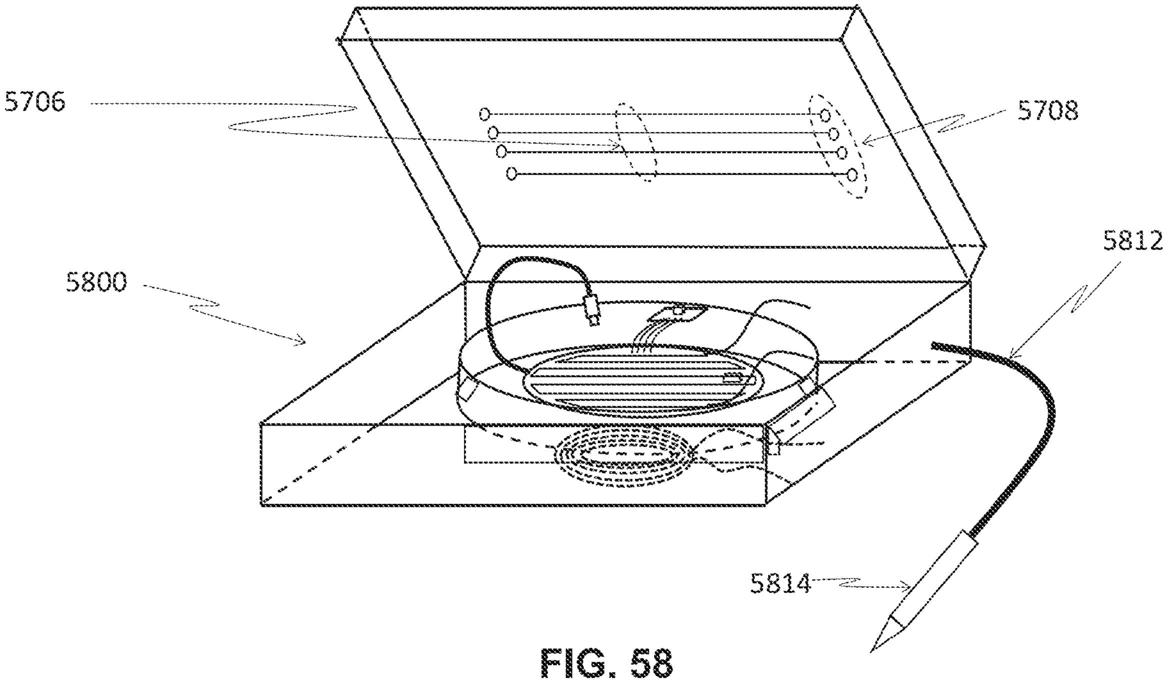
FIG. 58 is a block diagram of a preferred embodiment of an electronic drying apparatus depicted with an integrated round vacuum chamber and charging features.

As best shown in FIG. 57 and FIG. 58, a fully configured electronics dryer for hearables 5700 and 5800 is depicted. Both electronics dryers for hearables 5700 and 5800 incorporate hearable hold-down straps 5706, hold-down strap attachment studs 5708, vacuum tube 5712, and cleaning vacuum wand 5714. Hearable hold-down straps 5706 provide a hold-down force of 10 grams up to 500 grams to adequately press any hearing aid, cochlear implant, or other hearable into the heater traces 5502 (which may be in physical contact with and located on top of, underneath, or in the platen on which the hearing aid device is placed). Hold-down strap attachment studs 5708 are used to attach hearable hold-down straps 5706 to chamber lid 5303 (or apparatus lid). Cleaning vacuum wand 5714 utilizes miniature vacuum generated from high vacuum pump 400 and miniature high volume pump 410 shown in FIG. 29. Cleaning vacuum wand 5714 is configured to allow vacuum pressure generated from high vacuum pump 400 to permit vacuum cleaning of hearing aids and the like, particularly for scavenging cerumen (ear wax) and debris attached to said cerumen. In some embodiments, a hearing aid device or apparatus may refer to any type of hearing aid, cochlear implant, or other hearable.

Figure 59:
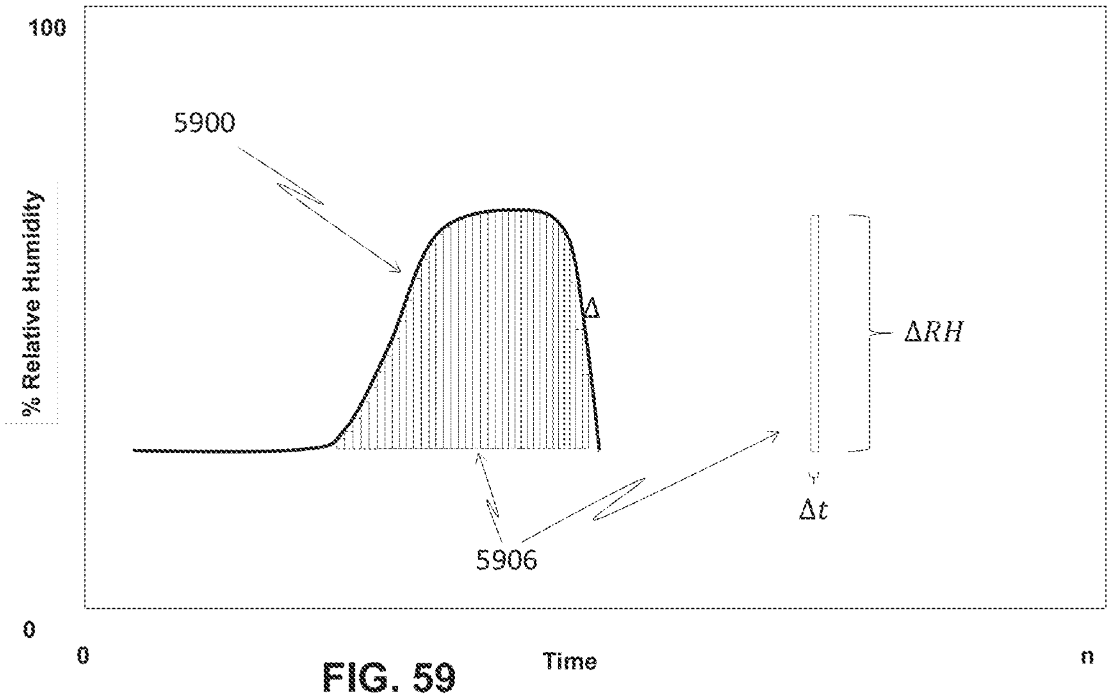
FIG. 59 is a graphical representation of one embodiment of a relative humidity quantization technique.

Referring now to FIG. 59, relative humidity sensor quantization scheme is depicted. Quantization curve 5900 has quantized packets 5906 which are sampled between one and 20 times per second. A preferred embodiment samples the humidity sensor 5506 of FIG. 55 and humidity sensor 5606 of FIG. 56 ten times (10×) per second. This sampling rate provides the optimum accuracy for moisture level detection and measurement.

Figure 60:
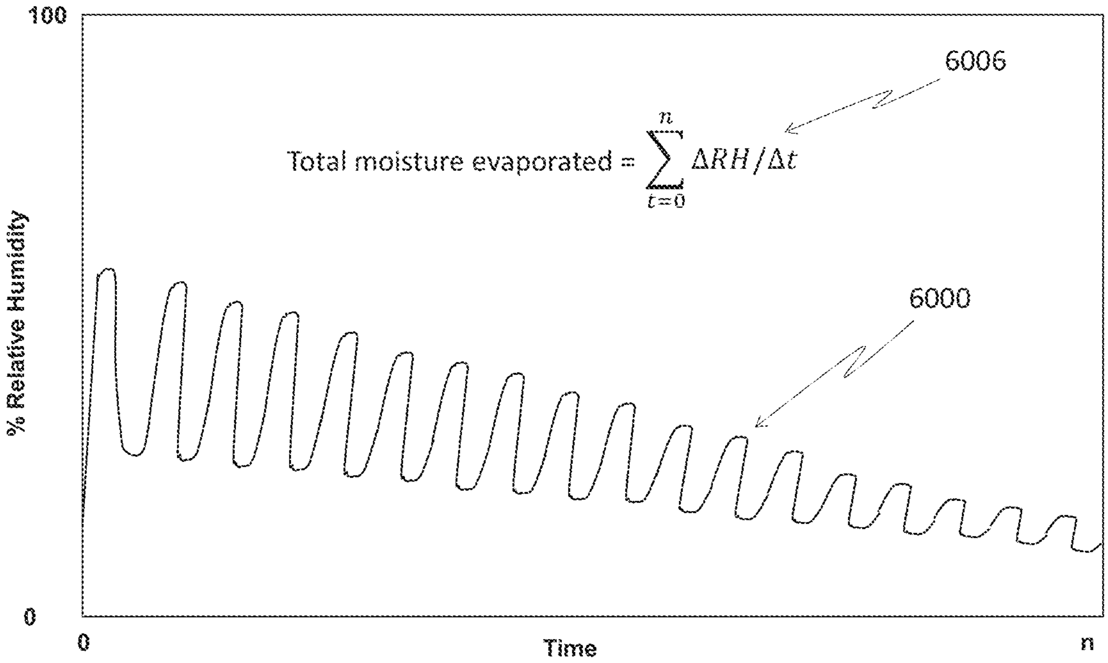
FIG. 60 is a graphical representation of one embodiment of an integration of multiple relative humidity quantization packets over time.

As best shown in FIG. 60, a complete relative humidity response curve 6000 is depicted over time. Humidity response curve 6000 is comprised of quantized packets 5906 of FIG. 59. In some embodiments, electronics control board 610 in FIG. 29 provides inter-integrated control sampling and initiates and enables calculation of the total moisture given off by electronic device being dried using the summation operation 6006 in FIG. 60. In this manner, the total amount of moisture (e.g., amount of moisture remaining in the hearing aid and/or low-pressure chamber, or amount of moisture removed from the hearing aid and/or low-pressure chamber, etc.) can be calculated in the most accurate fashion.

In some embodiments, a miniature metalized chamber is provided for hearables with 5 $in^3$-25 $in^3$ optimum size. The metalized chamber minimizes the desorption of water in or from the chamber. The metalized chamber further aids in the UV reflectivity of chamber disinfection. Hold down straps ensure lightweight hearable is in contact with platen heater. The humidity sensor is a high-speed humidity sensor, i.e., minimum 1 second response time to retain >63% humidity measurement. Because the embodiments described herein are evaporating/boiling a very minute amount of water off very quickly, there is a need for a humidity sensor that has a response time of 1 second or less and has at least 63% of the humidity that was sampled available in a digital register for microcontroller action. The humidity sensor senses or samples 10 times per second to yield an accurate moisture content/humidity measurement. The humidity sensor is thermally isolated for the most accurate moisture content/humidity measurement (0° C.-15° C. range of thermal isolation ideal). Additionally, UV germicidal lights are provided for disinfecting hearing aid located in the low-pressure chamber. In some embodiments, integrated wired or wireless charging is provided in the dryer. In some embodiments, the evacuation pump power has a range of 0.5 watts to 500 watts. In some embodiments, the vacuum cleaning wand can be pneumatically switched on and off.

Figure 61:
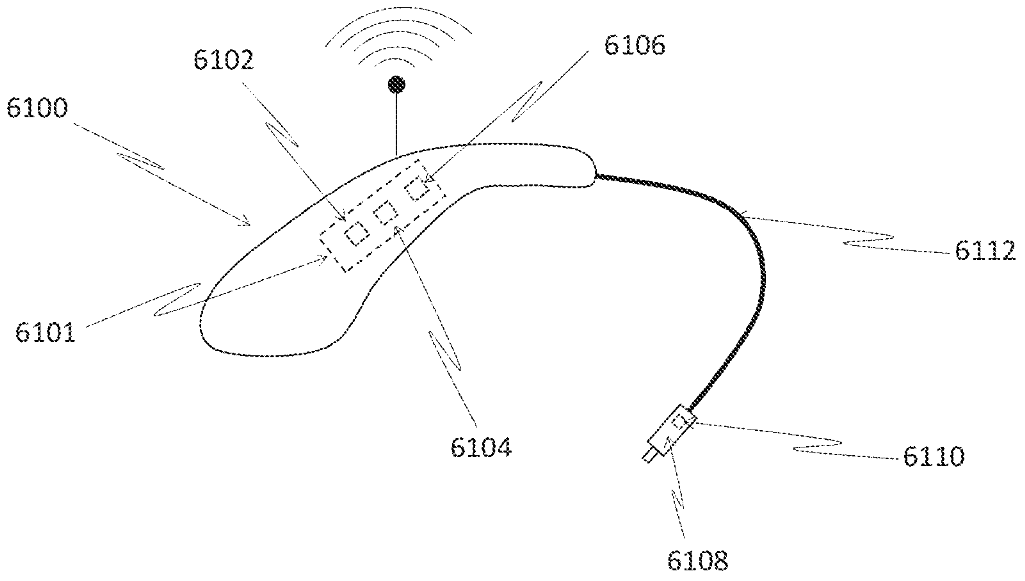
FIG. 61 is a top view of a typical receiver in the canal (RIC) hearing aid with one embodiment of the electronic power interruption arrangement embedded into said hearing aid.

Referring now to FIG. 61, a receiver in the canal (RIC) hearing aid 6100 is depicted with power interrupting circuitry 6101, which is utilized to connect/disconnect power from said RIC hearing aid 6100, housed internally to RIC hearing aid 6100. Power interrupting circuitry 6101 comprises hearing aid controller 6102, hearing aid communication module 6104, and hearing aid humidity sensor 6106. Hearing aid controller 6102 has firmware installed in non-volatile memory that measures hearing aid humidity sensor 6106 and controls the connection/disconnection of power using power interrupting circuitry 6101 based on humidity data (e.g., predetermined rates of change of humidity levels). The hearing aid communication module can be Wi-Fi, Bluetooth Low Energy, cellular, or implementing a hard-wired technique using a USB connector, or any other type of communication module. Receiver 6108 has receiver humidity sensor 6110 incorporated into receiver case 6110. Receiver humidity sensor 6110 communicates with hearing aid controller 6102 using a serial Inter-Integrated Circuit (I2C) bus embedded into receiver tube 6112. Although a RIC hearing aid is depicted, humidity sensor(s) could be embedded into any form of hearing aid.

Figure 62:
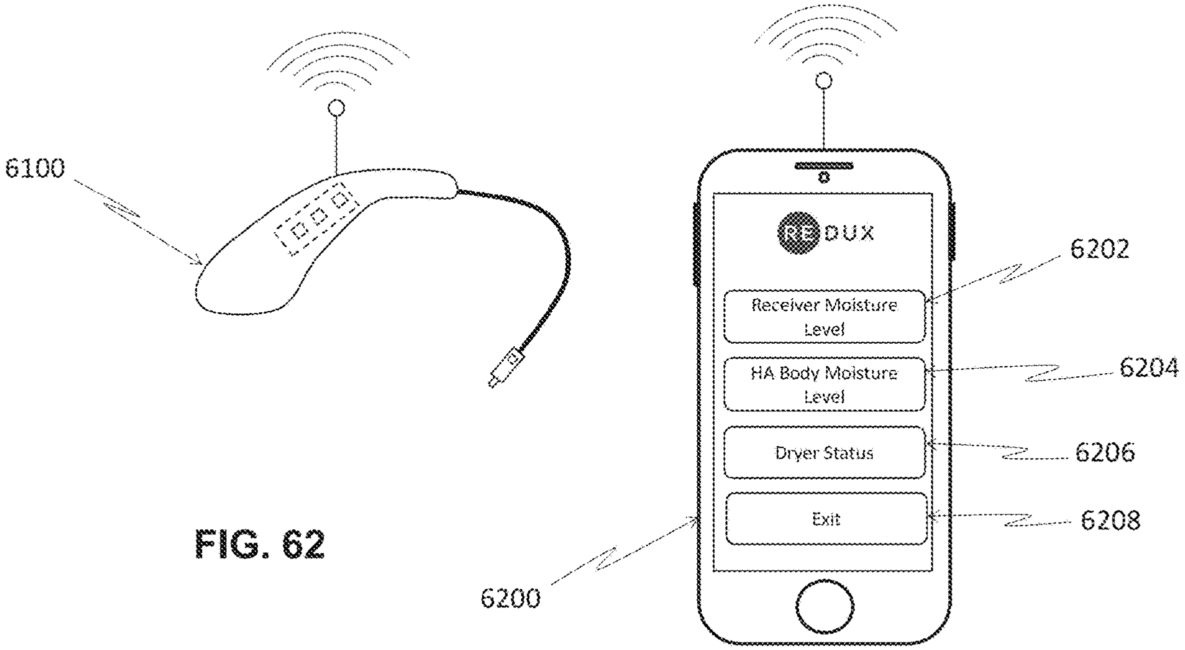
FIG. 62 is a diagram depicted RIC hearing aid depicted in FIG. 61 together with a smart phone application which interfaces with said hearing aid and provides status of electronic power interruption sensors.

As best shown in FIG. 62, smart mobile device (e.g., phone) application 6200 being executed on a mobile device interfaces with hearing aid communication module 6104 via communication signals. Smart phone application 6200 has user selectable fields to monitor receiver moisture level 6202 (e.g., how much moisture is present, how much moisture is removed etc.), hearing aid body moisture level 6204 (e.g., how much moisture is present, how much moisture is removed, etc.), dryer status 6206 (e.g., power source level, whether it is activated, whether it is currently drying a device, etc.), and exit field 6208.

Figure 63:
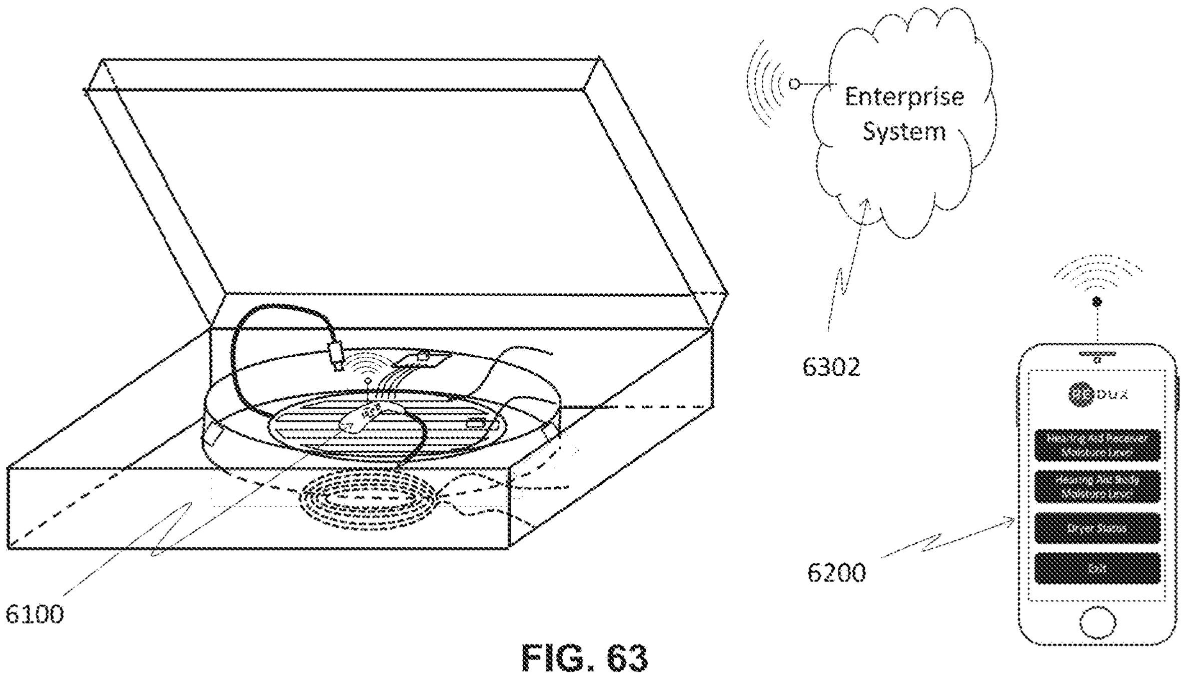
FIG. 63 depicts application in FIG. 62 together with electronic drying apparatus drying said hearing aid and recording results in enterprise database.

Referring now to FIG. 63, RIC hearing aid 6100 is shown being dried in a portable electronic drying apparatus. Portable electronic drying apparatus provides drying status (e.g., associated with a drying apparatus, hearing aid device, etc.) and overall process results to enterprise system 6302 which houses or is in communication with hearing aid database registration data and provides updates to smart phone application 6200 being executed on a mobile device. Any of the embodiments described in this disclosure or in any material incorporated by reference in this disclosure may be used in combination. Any of the features or elements or processes applicable to electronic devices described in this disclosure are also applicable to any type of hearing aid devices.

In some embodiments, a humidity measurement is provided within a hearing aid device (also referred to as hearable). In some embodiments, a humidity measurement is provided within at least one of the body and receiver (speaker) of the hearable. The humidity measurement may be wirelessly transmitted to another computing device (e.g., a mobile device, a server, etc.). In some embodiments, an application may be provided on the computing device to monitor humidity levels in the hearable and/or the low-pressure chamber in which the hearable is location. In some embodiments, the application may execute operations to calculate an amount of moisture removed and/or remaining from or in the hearable and/or the low-pressure chamber. In some embodiments, the application may determine or calculate an amount of elapsed drying time and/or an amount of time until the hearable becomes dry and operational. In some embodiments, the application alerts the user when the drying operation is completed. In some embodiments, the application interfaces with a server in communication with a dryer database that stores moisture levels (e.g., over a period of time) associated with the hearing aid device.

Figure 64:
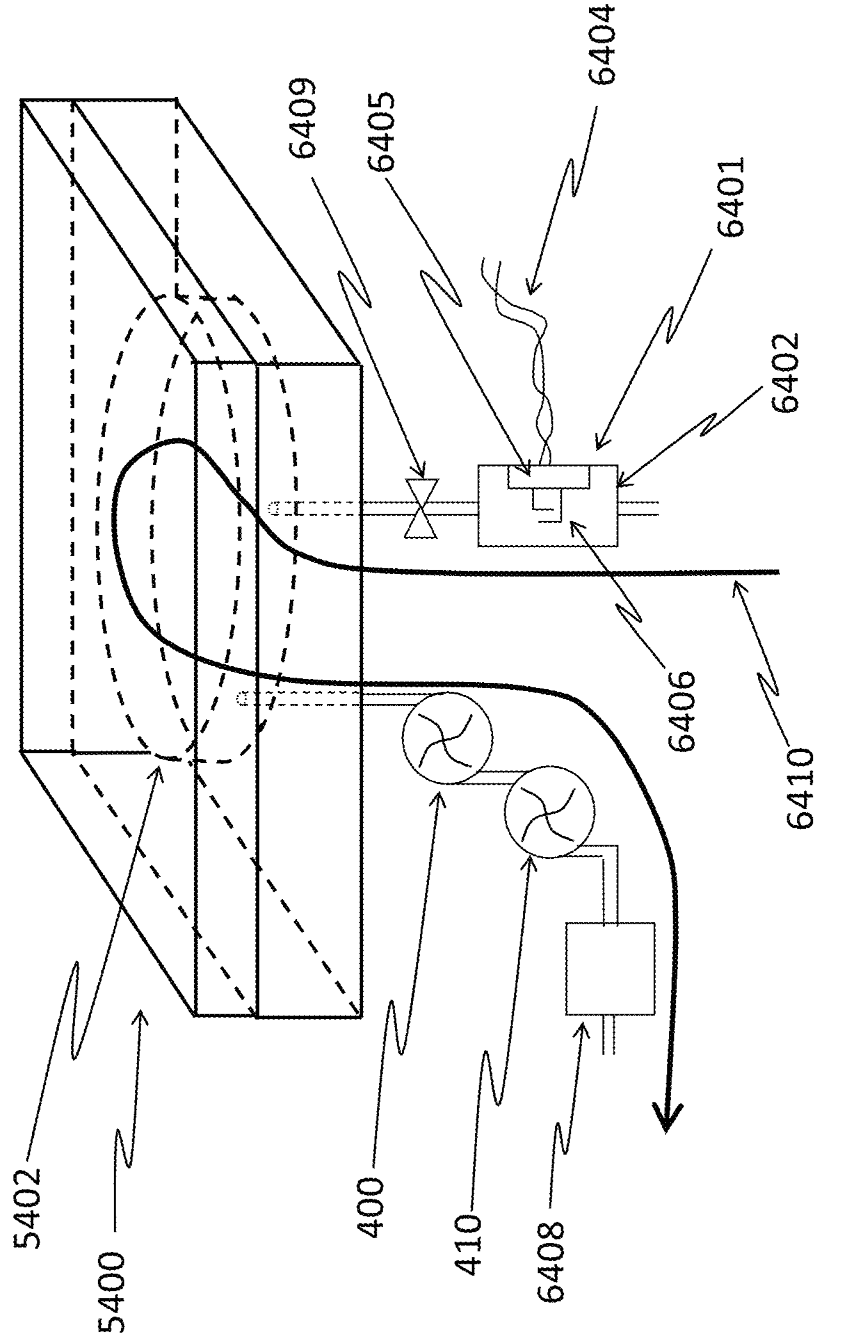
FIG. 64 is a diagram depicting a gas generator together with a vacuum chamber and gas detector.

In some embodiments, an apparatus is provided for drying an electronic device or non-electronic object. Referring now to FIG. 64, drying apparatus 5400 (which may comprise any features described in any of the embodiments in this disclosure) is depicted with substantially round or cylindrical vacuum chamber 5402 or low-pressure chamber 5402 (which houses an electronic device or a non-electronic device which needs to be dried and/or sanitized) with high volume vacuum pump 400 and high vacuum pump 410, in series with each other, and air valve 6409. In some embodiments, high volume low vacuum pump 400 and high vacuum low volume vacuum pump 400 may be fabricated in one single four-headed pump. In other embodiments, these pumps may be fabricated separately. In some embodiments, ozone generator 6401 is comprised of substantially airtight polymeric enclosure 6402, high voltage power supply 6405, low voltage power supply 6404, and ozone producing electrode set 6406. In-line (e.g., pneumatically in-line) ozone sensor 6408 samples ozone within the apparatus 5400 and/or the chamber 5402 which follows air path 6410. In some embodiments, the ozone generator may be replaced with a generator that generates another gas or a liquid or a mix of gas and liquid. In preferred embodiments, pneumatically in-line ozone sensor 6408 is mounted inside substantially round or cylindrical vacuum chamber 5402.

In some embodiments, the low voltage supply power 6404 is at least 4 volts and no more than 24 volts. In some embodiments, high voltage power supply 6405 is comprised of an electronic chopper/switcher such that it produces 3 KV to 20 KV of static voltage onto ozone producing electrode set 6406. In some embodiments, the ozone gas produced is at least 0.1 ppm and less than or equal to 100 ppm for adequate biological marker amelioration. In other embodiments, the vacuum chamber 5402 is subjected to partial vacuum and establishes a negative pressure system to minimize any ozone exposure to human users of the apparatus 5400. Any of the features described elsewhere in this disclosure may be combined or applied to the apparatuses or processes described in any of the figures, including FIG. 64 and FIG. 65. Any embodiments described in this disclosure may be combined with any other embodiments in this disclosure.

Figure 65:
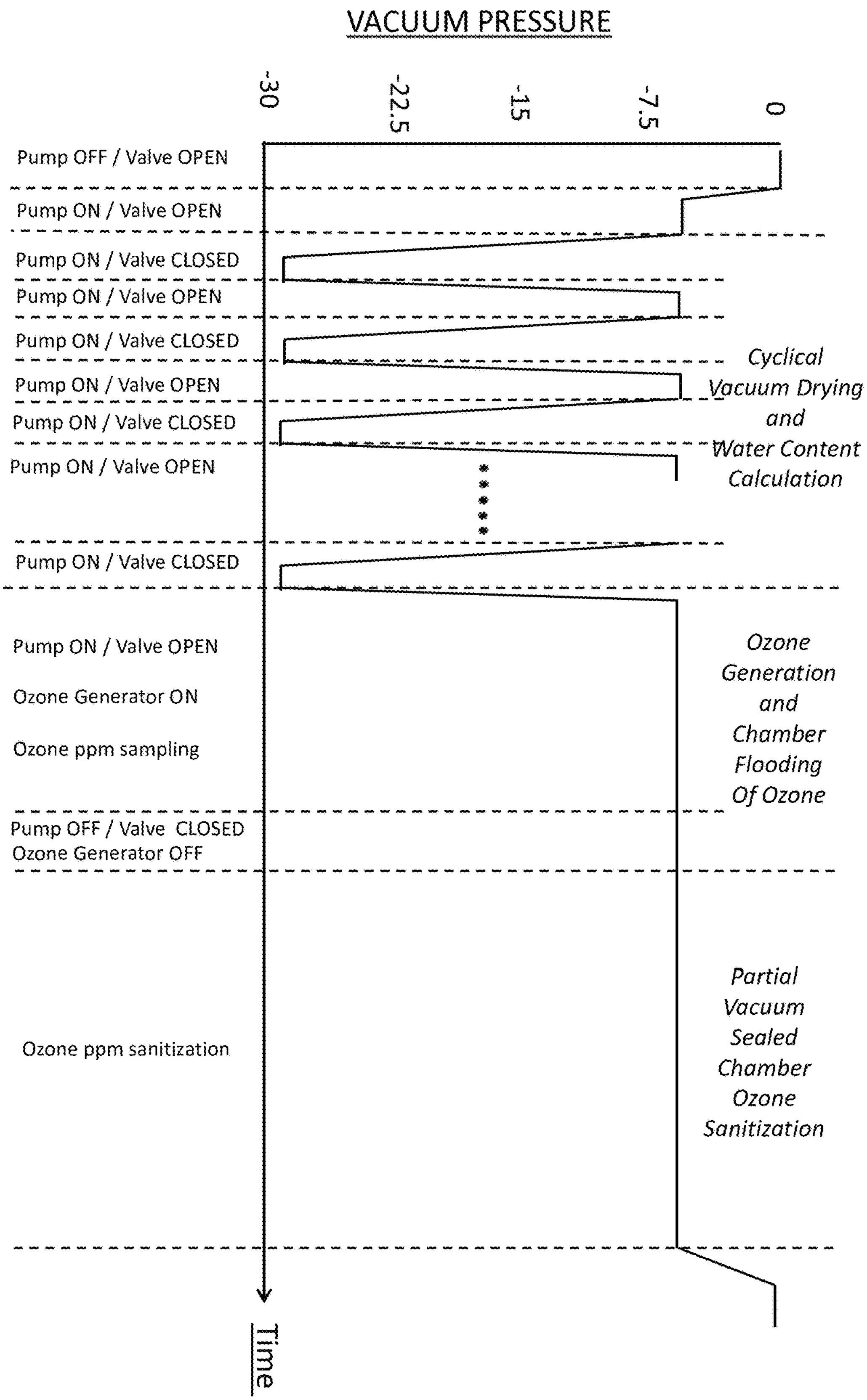
FIG. 65 is a graphical representation of the phases of vacuum drying, gas generation and sampling, and sanitization of electronic devices.

Referring now to FIG. 65, a graphical timing diagram depicts the various phases of the exemplary drying apparatus 5400 of FIG. 64 and the interaction of the ozone generator 6401 during the sanitization phase of the process (e.g., which may occur at least one of before, during, or after the drying process described in this disclosure). During cyclical vacuum drying, high volume low vacuum pump 400 and low volume high vacuum pump 410 are powered ON, while air valve 6409 (or atmospheric valve) is toggled OFF and ON producing rapid vaporization of water within electronic device located in the chamber 5402. In some embodiments, post vacuum drying, ozone generator 6401 is powered ON through low voltage power supply 6404 and produces ozone gas with high voltage power supply 6405 across ozone producing electrodes 6406. Negative chamber pressure in the chamber 5402 (produced from high volume vacuum pump 400 and high vacuum pump 410 which are connected to the chamber 5402) pulls ozone gas produced through enclosure 6402, thereby flooding the sealed vacuum chamber 5402 and envelopes any devices within vacuum chamber 5402. The negative chamber pressure is produced due to a low valve flow coefficient (Cv) being produced with a small valve (e.g., the release valve connected to the low-pressure chamber). This low Cv produces a flow restriction which causes a partial flow restriction which causes a partial vacuum as the vacuum pumps work to provide maximum vacuum. Ozone sensor 6408 senses the ppm level of the ozone gas produced and when a desired level is achieved (e.g., 0.1 ppm to 100 ppm), the air valve 6409 closes, the high volume vacuum pump 400 and high vacuum pump 410 turn off, and the ozone gas stays present under negative pressure in vacuum chamber 5402.

In some embodiments, the control system initiates opening/closing of the valve and activation/deactivation of the gas generator (e.g., the ozone generator) such that the gas generator generates or stops generation of the gas. While these actions by the control system may be independent, they can be tied together to achieve FIG. 65 with the ppm level of the gas controlled by information sensed by the gas sensor and communicated back to the control system or an external computing system that may be in communication with the control system.

In some embodiments, an apparatus and associated firmware and apps can be provided for just sanitizing an electronic device (without drying) in the apparatus described herein.

In some embodiments, once a sanitization cycle is completed, and the low-pressure chamber and any device inside the low-pressure chamber is under a vacuum/partial vacuum, the opening of the air valve (connected to the low-pressure chamber) will cause pressure equalization and will pull in the gas (e.g., ozone in the low-pressure chamber) to the inside of the device which is going from low pressure to a higher pressure.

In some embodiments, near simultaneous drying and sanitizing may be provided. In some embodiments, the sanitizing gas may not interfere with determination of humidity-related information in the low-pressure chamber. In some embodiments, turning on the gas generator such that sanitizing gas such as ozone inundates the chamber when the air valve is opened can effectively kill any bacteria or virus residing inside or outside the electronic device placed in the chamber.

Ozone has a half-life that is about 3 days at room temperature air (20 C) but decreases dramatically (to a few minutes) if the ozone is bubbled through water and undergoes an advanced oxidation process. In some embodiments, the apparatus here generates so little ozone to achieve 0.3 ppm (recognized concentration that kills SARs et al) in our chamber, and once the chamber is opened in a 10'×10'×8' room, the actual ozone concentration is about ppb (parts per billion), which will generally not harm any humans in the immediate environment. However, to make the apparatus safer, the apparatus may include a gas bubbler, wherein the sanitizing gas (e.g., ozone) is bubbled through water to advance the oxidation process and reduce the half-life of the sanitizing gas. Additionally, since output from the vacuum pumps described herein is pressurized air (it is essentially a weak compressor), easy and effective bubbling through water can be achieved using the pressurized air. In some embodiments, the sanitizing gas is bubbled through water comprised in the gas bubbler before the sanitizing gas exits the chamber.

In some embodiments, an apparatus comprises: a low-pressure chamber comprising an interior configured for placement of an electronic device in the interior and removal of the electronic device from the interior; an evacuation pump connected to the low-pressure chamber; a heater connected to the low-pressure chamber; and a gas device for providing gas into the low-pressure chamber; and at least one control system connected to the evacuation pump, the heater, and the gas device, wherein the at least one control system controls removal of moisture from the electronic device by controlling the evacuation pump to decrease pressure within the low-pressure chamber, and controlling operation of the heater to provide heat to the electronic device, wherein the at least one control system is further configured for determining whether to stop removing the moisture from the electronic device, wherein in response to stopping the removing of the moisture from the electronic device, the at least one control system activates a portion of the gas device such that the gas is provided into the low-pressure chamber from the gas device, and wherein, after a period, in response to determining a parameter associated with the gas in the low-pressure chamber, the at least one control system deactivates the portion of the gas device such that the gas is no longer provided into the low-pressure chamber from the gas device.

In some embodiments, the gas device comprises at least one of a gas generator or a gas storage.

In some embodiments, the gas is either pushed from the gas device into the low-pressure chamber or is pulled from the gas device into the low-pressure chamber.

In some embodiments, the pressure in the low-pressure chamber is lower than a second pressure in the gas device such that the gas is pulled from the gas device into the low-pressure chamber.

In some embodiments, the parameter is based on or comprises information sensed or sampled by a gas sensor associated with the low-pressure chamber.

In some embodiments, the parameter is equal to or greater than a threshold parameter level.

In some embodiments, the parameter associated with the gas comprises a parts per million (ppm) level.

In some embodiments, the gas device is located at least one of inside or outside the low-pressure chamber.

In some embodiments, the evacuation pump comprises a high-volume low-vacuum pump and a high-vacuum low-volume pump in series with each other.

In some embodiments, the high-volume low-vacuum pump and the high-vacuum low-volume pump are fabricated as a single four-headed pump.

In some embodiments, the gas device comprises an ozone generator.

In some embodiments, the gas device comprises at least one enclosure for storing the gas produced by or in the gas device and at least one power supply.

In some embodiments, the gas device comprises at least one set of gas-producing electrodes.

In some embodiments, the at least one power supply comprises a high-voltage power supply and a low-voltage power supply.

In some embodiments, the low-voltage power supply is used to activate the portion of the gas device such that the gas device enters an "on" state, and wherein the gas is produced in or by the gas device when the high-voltage power supply produces a voltage across ozone-producing electrodes comprised in the gas device.

In some embodiments, the low-voltage power supply provides a voltage greater than or equal to 4 volts and less than or equal to 24 volts, or wherein the high-voltage power supply provides a voltage greater than or equal to 3 kV and less than or equal to 20 kV, or wherein a ppm level of the gas is equal to greater than 0.1 ppm and less than or equal to 100 ppm.

In some embodiments, the apparatus further comprises an air valve connected to the low-pressure chamber.

In some embodiments, the at least one control system either initiates opening of the valve approximately when portion of the gas device is activated, or initiates activation of the portion of the gas device to provide the gas into the low-pressure chamber approximately when the air valve is opened.

In some embodiments, the at least one control system either initiates closing of the air valve approximately when the portion of the gas device is deactivated, or initiates deactivation of the portion of the gas device such that the gas device stops providing the gas into the low-pressure chamber approximately when the air valve is closed.

In some embodiments, an apparatus is provided comprising: a low-pressure chamber comprising an interior configured for placement of an electronic device in the interior and removal of the electronic device from the interior; an evacuation pump connected to the low-pressure chamber; a heater connected to the low-pressure chamber; a valve connected to the low-pressure chamber, wherein the valve has a closed state and an open state; a gas generator for generating sanitizing gas; a gas sensor for sensing the sanitizing gas; and at least one control system connected to the evacuation pump, the heater, the valve, and the gas generator, wherein the at least one control system is configured to control: the evacuation pump to decrease pressure within the low-pressure chamber, the heater to provide heat to the electronic device, the valve to change the pressure within the low-pressure chamber, and the gas generator to generate the sanitizing gas for passing into the low-pressure chamber, wherein the gas sensor senses the sanitizing gas and sends information associated with the sanitizing gas to the at least one control system or a computing system external to the apparatus.

In some embodiments, the valve is toggled between the open state and the closed state approximately when the at least one control system controls the evacuation pump to decrease the pressure within the low-pressure chamber, thereby causing removal of moisture from the electronic device.

In some embodiments, the decreased pressure within the low-pressure chamber causes the sanitizing gas generated by the gas generator to be pulled into the low-pressure chamber.

In some embodiments, the gas generator is activated to generate the sanitizing gas approximately when a sensor in the apparatus determines that the electronic device is sufficiently dry or approximately when the valve is switched to the open state.

In some embodiments, when the information associated with the sanitizing gas meets or satisfies a condition, the at least one control system switches the valve to the closed state and controls the gas generator to stop generating the sanitizing gas.

In some embodiments, the at least one control system controls the gas generator to generate the sanitizing gas, such that the sanitizing gas is pulled into the low-pressure chamber, approximately when the valve is switched from the closed state to the open state.

In some embodiments, the sanitizing gas comprises ozone.

In some embodiments, an amount of the sanitizing gas being exhausted from the low-pressure chamber is determined by at least one of the gas sensor, the at least one control system, or the computing system, and wherein the at least one control system switches the valve to the closed state and controls the gas generator to stop generating the sanitizing gas approximately when the amount of the sanitizing gas being exhausted from the low-pressure chamber meets or satisfies a condition.

In some embodiments, the gas sensor is located inside the low-pressure chamber.

In some embodiments, the gas sensor is mounted on a circuit board located in the apparatus or located in the low-pressure chamber in the apparatus.

In some embodiments, the gas generator is located inside or outside the low-pressure chamber.

In some embodiments, drying of the electronic device is executed substantially simultaneously with sanitizing the electronic device.

In some embodiments, activating the gas generator when the valve is opened causes the sanitizing gas to inundate the low-pressure chamber.

In some embodiments, the sanitizing gas does not interfere with determining when to stop removing moisture from the low-pressure chamber.

In some embodiments, the gas generator is activated to generate the sanitizing gas approximately when a sensor in the apparatus determines that the electronic device is sufficiently dry or approximately when the valve is switched to the open state, and wherein the sanitizing gas that enters the low-pressure chamber is pulled into an interior portion of the electronic device. In some embodiments, the gas generator is located outside the low-pressure chamber.

In some embodiments, an apparatus comprises: a chamber comprising an interior configured for placement of an electronic device in the interior and removal of the electronic device from the interior; a gas generator for generating sanitizing gas; a gas sensor for sensing the sanitizing gas; and at least one control system connected to the gas generator, wherein the at least one control system is configured to control activation of the gas generator to generate the sanitizing gas for passing into the low-pressure chamber, wherein the gas sensor senses the sanitizing gas and sends information associated with the sanitizing gas to the at least one control system or an external computing system, and wherein the information is used by the at least one control system or the external computing system to determine when to initiate deactivation of the gas generator such that the gas generator stops generating the sanitizing gas. In some embodiments, the apparatus further comprises a gas bubbler, wherein at least a portion of the sanitizing gas is bubbled through water comprised in the gas bubbler before the at least the portion of the sanitizing gas exits the chamber.

In some embodiments, the gas generator is located inside the chamber.

In some embodiments, the gas generator is located outside the chamber.

In some embodiments, the gas sensor is located inside the chamber.

In some embodiments, the sanitizing gas is either pushed from the gas generator into the chamber or is pulled from the gas generator into the chamber.

In some embodiments, the information is equal to or greater than a threshold level.

In some embodiments, the information comprises a ppm level.

In some embodiments, the gas generator comprises an ozone generator.

In some embodiments, the gas generator comprises at least one enclosure for storing the sanitizing gas produced by or in the gas generator and at least one power supply.

In some embodiments, the gas generator comprises at least one set of gas-producing electrodes.

In some embodiments, the at least one power supply comprises a high-voltage power supply and a low-voltage power supply.

In some embodiments, the low-voltage power supply is used to activate the gas generator such that the gas generator enters an on state, and wherein the sanitizing gas is produced in or by the gas generator when the high-voltage power supply produces a voltage across ozone-producing electrodes comprised in the gas generator.

In some embodiments, the low-voltage power supply provides a voltage greater than or equal to 4 volts and less than or equal to 24 volts, or wherein the high-voltage power supply provides a voltage greater than or equal to 3 kV and less than or equal to 20 kV, or wherein the sanitizing gas is equal to greater than 0.1 ppm and less than or equal to 100 ppm.

In some embodiments, the apparatus further comprises a gas bubbler, wherein the sanitizing gas is bubbled through water either prior to, during, or after the sanitizing gas is passed into the chamber. In most embodiments, the gas bubbler is used to reduce the dispersed ozone gas effects (e.g., when the ozone gas passes out of the chamber and/or the apparatus) on humans.

In some embodiments, pressurized air output of one or more vacuum pumps that are connected to the chamber is used to create the gas bubbler.

In some embodiments, an apparatus is provided for drying hearing aid devices, the apparatus comprising: a low-pressure chamber having an interior configured for placement of a hearing aid device in the interior and removal of the hearing aid device from the interior; an evacuation pump connected to the low-pressure chamber; a heater connected to the low-pressure chamber, wherein the heater, comprising a conductive surface in physical contact with the hearing aid device, conductively heats the hearing aid device; a component for maintaining the hearing aid device in physical contact with the conductive surface during removal of moisture from the hearing aid device; and at least one control system connected to the evacuation pump and to the heater, the at least one control system controlling removal of the moisture from the hearing aid device by controlling the evacuation pump to decrease pressure within the low-pressure chamber, and controlling operation of the heater to conductively heat the hearing aid device.

In some embodiments, the component comprises a strap, wherein the apparatus comprises a lid, and wherein the strap is connected to an attachment stud positioned on an interior surface of the lid.

In some embodiments, the strap is in physical contact with the hearing aid device when the lid of the apparatus is closed, thereby sealing the apparatus during the removal of the moisture from the hearing aid device.

In some embodiments, the evacuation pump comprises a vacuum tube.

In some embodiments, the evacuation pump comprises a vacuum tube and a vacuum wand.

In some embodiments, the vacuum wand is pneumatically activatable or deactivatable.

In some embodiments, a surface of the low-pressure chamber is at least one of circular, square, elliptical, or rectangular.

In some embodiments, the low-pressure chamber has a volume equal to or greater than five cubic inches and less than or equal to twenty-five cubic inches.

In some embodiments, the apparatus further comprises a lid for the apparatus or the low-pressure chamber.

In some embodiments, the lid and the low-pressure chamber are manufactured with a polymer material.

In some embodiments, an interior surface of the lid is coated with metallized coating.

In some embodiments, an interior surface of the low-pressure chamber is coated with metallized coating.

In some embodiments, the metallized coating of the low-pressure chamber substantially prevents desorption of moisture in the low-pressure chamber.

In some embodiments, the apparatus further comprises an ultraviolet (UV) light source, wherein light from the UV light source reflects off of the metallized coating of the low-pressure chamber or off of second metallized coating of a lid of the apparatus.

In some embodiments, the light from the UV light source at least partially disinfects the hearing aid device.

In some embodiments, the apparatus further comprises a seal for the low-pressure chamber, wherein the seal substantially prevents desorption of moisture in or from the low-pressure chamber.

In some embodiments, the apparatus further a charging cord for connecting to the hearing aid device and charging a power source comprised in the hearing aid device.

In some embodiments, the apparatus further wireless charging circuitry for wirelessly charging a power source comprised in the hearing aid.

In some embodiments, the wireless charging circuitry is in communication with a conductive heating surface on which the hearing aid device rests in the low-pressure chamber.

In some embodiments, the apparatus further a conductive heating assembly located in the low-pressure chamber.

In some embodiments, the conductive heating assembly further comprises the conductive heating surface on which the hearing aid device rests in the low-pressure chamber.

In some embodiments, the conductive heating assembly comprises a printed circuit board.

In some embodiments, the printed circuit board further comprises a heater trace.

In some embodiments, the conductive heating assembly further comprises an ultraviolet (UV) light array.

In some embodiments, the apparatus further comprises a pressure sensor for measuring a pressure in the low-pressure chamber.

In some embodiments, the apparatus further comprises a humidity sensor for measuring a humidity in the low-pressure chamber.

In some embodiments, data from the humidity sensor enables determination of an amount of moisture removed from the hearing aid device or the low-pressure chamber.

In some embodiments, data from the humidity sensor enables determination of an amount of moisture remaining in the hearing aid device or the low-pressure chamber.

In some embodiments, data from the humidity sensor enables determination of an amount of remaining time for removing the moisture from the hearing aid device.

In some embodiments, the humidity sensor transmits a sensor signal or samples the humidity within the low-pressure chamber at least 10 times per second.

In some embodiments, the apparatus further comprises a conductive heating assembly comprising a printed circuit board, and a humidity sensor for measuring a humidity in the low-pressure chamber, wherein the humidity sensor is mountable to the printed circuit board.

In some embodiments, the apparatus further comprises a conductive heating assembly comprising a printed circuit board, and a humidity sensor for measuring a humidity in the low-pressure chamber, wherein the humidity sensor is thermally isolated from the printed circuit board.

In some embodiments, a range of the thermal isolation is greater than or equal to 0° C. and is less than or equal to 15° C.

In some embodiments, the humidity sensor is mountable to a second printed circuit board different from the printed circuit board.

In some embodiments, the printed circuit board comprises a printed circuit board heater.

In some embodiments, a power of the evacuation pump is equal to or greater than 0.5 watts and is equal to or less than 500 watts.

In some embodiments, the apparatus further comprises a communication device, wherein the communication device transmits data to at least one of a mobile device or a server.

In some embodiments, the mobile device executes an application.

In some embodiments, the application processes the data to enable determination of at least one of an amount of moisture removed from the hearing aid device or the low-pressure chamber, an amount of moisture remaining in the hearing aid device or the low pressure chamber, an elapsed or remaining duration associated drying the hearing aid device, a status of the apparatus, or a power source level of the apparatus.

In some embodiments, the data comprises moisture-related data and identification data associated with at least one of the apparatus or the hearing aid device.

In some embodiments, the server is in communication with a database, wherein the data is stored in a record of the database, wherein the record is associated with the apparatus or the hearing aid device.

In some embodiments, the hearing aid device, wherein the hearing aid device transmits data to at least one of a mobile device or a server.

In some embodiments, the mobile device executes an application.

In some embodiments, the application processes the data to enable determination of at least one of an amount of moisture removed from the hearing aid device or the low-pressure chamber, an amount of moisture remaining in the hearing aid device or the low pressure chamber, an elapsed or remaining duration associated drying the hearing aid device, a status of the apparatus, or a power source level of the apparatus.

In some embodiments, the data comprises moisture-related data and identification data associated with at least one of the apparatus or the hearing aid device.

In some embodiments, the server is in communication with a database, wherein the data is stored in a record of the database, wherein the record is associated with the apparatus or the hearing aid device.

In some embodiments, the hearing aid device comprises a receiver in the canal (RIC) hearing aid device.

In some embodiments, the hearing aid device sends an alert to a mobile device or a server when the hearing aid device determines a moisture level in the hearing aid device equal to or greater than a threshold level.

In some embodiments, the hearing aid device periodically sends an alert to a mobile device or a server to initiate a drying operation for the hearing aid device.

In some embodiments, a computing device is either located in the apparatus or is located external to the apparatus, and wherein the computing device executes instructions for at least one of receiving, processing, or transmitting data associated with at least one of the apparatus, the hearing aid device, or a user of the hearing aid device.

In some embodiments, the computing device: searches for a record of the hearing aid device in a database, and in response to finding the record for the hearing aid device in the database, initiates a computing operation for registering additional hearing aid devices associated with the hearing aid device.

In some embodiments, the computing device: searches for a record of the hearing aid device in a database, and in response to finding the record for the hearing aid device in the database, generates, receives, or extracts a token from a second computing device or the database.

In some embodiments, the token is uniquely associated with at least one of the computing device, the record, the database, the apparatus, the hearing aid device, or the user of the hearing aid device.

In some embodiments, a location associated with the hearing aid device, the computing device, or the apparatus is determined to be an approved location for executing a drying operation for the hearing aid device.

In some embodiments, the location is determined to be the approved location by at least one of the computing device or the apparatus based on referencing location-related information from a database, and determining whether the location corresponds with the location-related information.

In some embodiments, the location-related information is associated with a record.

In some embodiments, the token is communicated to the apparatus or the computing device such that the apparatus, the computing device, or a user of the apparatus or the computing device initiates a drying operation for the hearing aid device based on receipt of the token or based on successful processing of the token.

In some embodiments, the computing device initiates transmitting of information associated with the drying operation to the database.

In some embodiments, the computing device is identified based on referencing or accessing a database comprising information associated with one or more computing devices.

In some embodiments, the computing device is associated with a database associated with the apparatus or a location of the apparatus, the location being associated with or comprising at least one of a physical location, a network location, a merchant, or an entity.

In some embodiments, identification information associated with the computing device is stored in a database.

In some embodiments, the database stores information associated with computing devices registered with a location, a network, or an entity associated with the apparatus.

In some embodiments, the database stores information associated with hearing aid devices registered with a location, a network, or an entity associated with the apparatus, or registered by the computing device or a user of the computing device.

In some embodiments, the data comprises at least one of a manufacturer of the hearing aid device or a model of the hearing aid device.

In some embodiments, the data is used to determine post-drying operability of different types of hearing aid devices.

In some embodiments, the at least one control system is further configured for determining whether to stop or continue removing the moisture from the hearing aid device based on data associated with at least one of the hearing aid device or the low-pressure chamber.

In some embodiments, the apparatus further comprises at least one connection device, wherein the apparatus sends first data to, using the at least one connection device, or receives second data from, using the at least one connection device, a database system, the database system associated with a database, and wherein the apparatus sends third data to, using the at least one connection device, or receives fourth data from, using the at least one connection device, a computing device.

In some embodiments, the apparatus uses Hypertext Transfer Protocol (HTTP) commands to communicate with the database system.

In some embodiments, the at least one connection device comprises a first connection device and a second connection device, and wherein the apparatus: sends the first data to the database system using the first connection device or receives the second data from the database system using the first connection device, and sends the third data to the computing device using the second connection device or receives the fourth data from the computing device using the second connection device.

In some embodiments, the apparatus further comprises at least one connection device, wherein the at least one connection device comprises a first connection device and a second connection device, and wherein the apparatus: sends first data, to a database system, using the first connection device, or receives second data, from the database system, using the first connection device; or sends third data, to a computing device, using the second connection device, or receives fourth data, from the computing device, using the second connection device.

In some embodiments, a hearing aid apparatus is provided, the apparatus comprising: a power interrupting circuit; a communication device; a receiver comprising a receiver humidity sensor; a body comprising a body humidity sensor; a controller in communication with the power interrupting circuit, the communication device, the receiver humidity sensor, and the body humidity sensor.

In some embodiments, the communication device comprises at least one of a WiFi communication device, a cellular communication device, a Bluetooth communication device, a Bluetooth Low Energy communication device, a wired communication device. In some embodiments, the hearing aid device comprises a receiver in the canal (RIC) hearing aid device.

In some embodiments, a hearing aid apparatus is provided, the apparatus comprising: a power interrupting circuit; a communication device; a receiver; a body; a humidity sensor located in either the receiver or the body of the hearing aid apparatus; a controller in communication with the power interrupting circuit, the communication module, and the humidity sensor.

In some embodiments, the communication device transmits data to at least one of a mobile device or a server.

In some embodiments, the mobile device executes an application.

In some embodiments, the application processes the data to enable determination of at least one of an amount of moisture removed from the hearing aid apparatus or the low-pressure chamber, an amount of moisture remaining in the hearing aid apparatus or the low pressure chamber, an elapsed or remaining time associated with a current or scheduled drying operation for the hearing aid apparatus, a status of the apparatus, or a power source level of the apparatus.

In some embodiments, the data comprises moisture-related data and identification data associated with at least one of the apparatus or the hearing aid apparatus.

In some embodiments, the server is in communication with a database, wherein the data is stored in a record of the database, wherein the record is associated with the apparatus, the hearing aid apparatus, or a user or family associated with the hearing aid apparatus.

In some embodiments, the hearing aid apparatus comprises a receiver in the canal (RIC) hearing aid apparatus.

In some embodiments, the hearing aid apparatus sends an alert to a mobile device or a server when the hearing aid apparatus determines a moisture level in the hearing aid apparatus equal to or greater than a threshold level. In some embodiments, any processes or operations performed by the hearing aid apparatus may additionally or alternatively be performed by the dryer for drying the hearing aid, or vice versa.

In some embodiments, the hearing aid apparatus periodically sends an alert to a mobile device or a server to initiate or schedule a drying operation for the hearing aid apparatus.

In some embodiments, an apparatus is provided for drying hearing aid devices, the apparatus comprising: a low-pressure chamber having an interior configured for placement of a hearing aid device in the interior and removal of the hearing aid device from the interior, wherein an interior wall of the low-pressure chamber is coated with metalized coating, and wherein ultraviolet (UV) light reflected off of the interior wall of the low-pressure chamber illuminates the hearing device at least one of before, during, or after a drying operation for the hearing aid device; an evacuation pump connected to the low-pressure chamber; a heater connected to the low-pressure chamber, wherein the heater, comprising a conductive surface in physical contact with the hearing aid device, conductively heats the hearing aid device; a component for maintaining the hearing aid device in physical contact with the conductive surface during the drying operation for the hearing aid device, wherein the component pushes the hearing aid device against the conductive surface when the apparatus is in a closed position; and at least one control system connected to the evacuation pump and to the heater, the at least one control system controlling removal of moisture from the hearing aid device by controlling the evacuation pump to decrease pressure within the low-pressure chamber, and controlling operation of the heater to conductively heat the hearing aid device.

In some embodiments, the apparatus further comprises a humidity sensor, wherein the humidity sensor is thermally isolated from the heater.

In some embodiments, the component is further in contact with a lid of the apparatus.

In some embodiments, the component is not in physical contact with the hearing aid device when the apparatus is in an open position.

In some embodiments, a hearing aid apparatus is provided comprising: a power interrupting circuit; a power source; a communication device; a receiver; a body; a humidity sensor located in either the receiver or the body of the hearing aid apparatus, wherein the humidity sensor senses an amount of moisture in the receiver or the body of the hearing aid apparatus; a controller in communication with the power interrupting circuit, the communication module, and the humidity sensor, wherein the hearing aid apparatus transmits an alert to a mobile device or a server when the hearing aid apparatus determines a moisture level in the hearing aid apparatus is equal to or greater than a threshold level, wherein the alert comprises data comprising moisture-related data and identification data associated with the hearing aid apparatus, and wherein an application executable on the mobile device or the server processes the data or second data received from the hearing aid apparatus to enable indication of at least one of an amount of moisture or humidity present in the hearing aid apparatus, a status of the hearing aid apparatus, or a power source level of the hearing aid apparatus, and wherein the controller initiates the power interrupting circuit to at least one of connect the power source to or disconnect the power source from the receiver or the body of the hearing aid apparatus based on the amount of moisture or humidity present in the receiver or the body of the hearing aid apparatus.

In some embodiments, the controller initiates the power interrupting circuit to connect the power source to the receiver or the body of the hearing aid apparatus when the amount of the moisture in the receiver or the body of the hearing aid apparatus is less than or equal to a threshold moisture level.

In some embodiments, the controller initiates the power interrupting circuit to disconnect the power source from the receiver or the body of the hearing aid apparatus when the amount of the moisture in the receiver or the body of the hearing aid apparatus is greater than or equal to a threshold moisture level.

In some embodiments, the power interrupting circuit comprises a power interrupter.

In some embodiments, air is moved from within the hearing aid device to the humidity sensor.

In some embodiments, the apparatus further comprises a switch for switching between a connected state and a disconnected state.

In some embodiments, the switch electrically isolates at least one of the receiver, the body, the communication device, or the humidity sensor, from the power source.

In some embodiments, the switch is comprised in or comprises the power interrupting circuit.

In some embodiments, the amount of moisture or humidity comprises a rate of change of the moisture or the humidity.

In some embodiments, the apparatus further comprises a pump for moving air from the receiver or the body to the humidity sensor.

In some embodiments, the apparatus further comprises a pneumatic connector.

In some embodiments, the apparatus further comprises a pump to move gas from the pneumatic connector to the humidity sensor.

In some embodiments, an apparatus is provided. The apparatus comprises: a low-pressure chamber defining an interior and having the interior configured for placement of an electronic device in the interior and removal of the electronic device from the low-pressure chamber; and at least one control system connected to the evacuation pump and to the heater, the at least one control system controlling removal of moisture from the electronic device by controlling the evacuation pump to decrease pressure within the low-pressure chamber, and controlling operation of the heater to add heat to the electronic device, wherein the apparatus is in communication with a computing device, wherein the computing device executes a computing application for at least one of receiving, processing, or transmitting data associated with at least one of the electronic device or the apparatus.

In some embodiments, an apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and to the heater, the at least one control system controlling removal of moisture from the electronic device by controlling the evacuation pump to decrease pressure within the low-pressure chamber, and controlling operation of the heater to add heat to the electronic device; and a computing device, wherein the computing device is either located in the apparatus or is located external to the apparatus, wherein the computing device executes instructions for at least one of receiving, processing, or transmitting data associated with at least one of the apparatus, the electronic device, or a user of the electronic device.

In some embodiments, the computing device accesses a drying database, and initiates searching of the drying database for a record associated with the electronic device.

In some embodiments, the computing device, in response to finding the record for the electronic device in the drying database, initiates a computing operation for registering additional electronic devices associated with the electronic device.

In some embodiments, the computing device, in response to finding the record for the electronic device in the drying database, generates a token, or receives or extracts a token from a second computing device or the drying database.

In some embodiments, the token is uniquely associated with at least one of the computing device, the record, the drying database, the apparatus, the electronic device, or a user of the electronic device.

In some embodiments, a location associated with the electronic device, the computing device, or the apparatus is determined to be an approved location for executing a drying operation for the electronic device.

In some embodiments, the location is determined to be the approved location by at least one of the computing device or the apparatus based on referencing location-related information in the drying database or an informational database, and determining whether the location corresponds with the location-related information.

In some embodiments, the location-related information is associated with the record.

In some embodiments, the token is communicated to the apparatus such that the apparatus or a user of the apparatus initiates a drying operation for the electronic device based on receipt of the token or based on successful processing of the token.

In some embodiments, the computing device initiates transmitting of information associated with the drying operation to the drying database.

In some embodiments, the computing device is identified based on referencing or accessing metadata associated with a database comprising information associated with one or more computing devices.

In some embodiments, the computing device is associated with a database associated with the apparatus or a location of the apparatus, the location being associated with or comprising at least one of a physical location, a network location, a merchant, or an entity.

In some embodiments, identification information associated with the computing device is stored in a database.

In some embodiments, the database stores information associated with computing devices registered with a location, a network, or an entity associated with the apparatus.

In some embodiments, the database stores information associated with electronic devices registered with a location, a network, or an entity associated with the apparatus, or registered by the computing device.

In some embodiments, the data comprises at least one of a manufacturer of the electronic device or a model of the electronic device.

In some embodiments, the data is used to determine post-drying operability of different types of electronic devices.

In some embodiments, another apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and to the heater, the at least one control system controlling removal of moisture from the electronic device by controlling the evacuation pump to decrease pressure within the low-pressure chamber, and controlling operation of the heater to add heat to the electronic device; a WiFi connection device; and a cellular connection device.

In some embodiments, the WiFi connection device operates in Access Point mode.

In some embodiments, the WiFi connection device operates in WiFi Direct mode.

In some embodiments, the apparatus sends or receives, using the WiFi connection device, data from a mobile computing device, wherein the mobile computing device executes an electronic device drying registration application.

In some embodiments, the cellular connection device operates in at least one of LTE CAT1, LTE CAT M1, or 2G cellular communication mode.

In some embodiments, the apparatus sends or receives, using the cellular connection device, data from an enterprise system, the enterprise system associated with a drying database.

In some embodiments, the apparatus establishes machine-to-machine communication with an enterprise system associated with a drying database.

In some embodiments, the apparatus further comprises a host controller, and wherein the host controller communicates with the WiFi connection device and the cellular connection device via a universal asynchronous receive transmit (UART) bus.

In some embodiments, the host controller is separate from the at least one control system or is part of the at least one control system.

In some embodiments, the UART bus can be configured in either serial peripheral interface (SPI) mode or inter-integrated communication (I2C) mode.

In some embodiments, another apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and the heater, the at least one control system controlling removal of moisture from the electronic device by controlling the evacuation pump to decrease pressure within the low-pressure chamber, and controlling operation of the heater to add heat to the electronic device; a first connection device; and a second connection device, wherein the at least one control system is also connected to the first connection device and a second connection device, wherein the at least one control system is also connected to the first connection device and a second connection device, wherein the apparatus sends first data to, using the first connection device, or receives second data from, using the first connection device, a database system, the database system associated with a drying database, and wherein the apparatus sends third data to, using the second connection device, or receives fourth data from, using the second connection device, a computing device, wherein the computing device executes an electronic device drying registration application.

In some embodiments, the apparatus uses HTTP commands to communicate with the database system.

In some embodiments, the apparatus communicates with the database system, using the first connection device, and the computing device, using the second connection device, substantially simultaneously.

In some embodiments, the first connection device and the second communication device may be the same communication device.

In some embodiments, another apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and the heater, the at least one control system controlling removal of moisture from the electronic device by controlling the evacuation pump to decrease pressure within the low-pressure chamber, and controlling operation of the heater to add heat to the electronic device; and at least one connection device, wherein the at least one control system is also connected to the at least one connection device, wherein the apparatus sends first data to, using the at least one connection device, or receives second data from, using the at least one connection device, a database system, the database system associated with a drying database, and wherein the apparatus sends third data to, using the at least one connection device, or receives fourth data from, using the at least one connection device, a computing device, wherein the computing device executes an electronic device drying registration application.

In some embodiments, the computing device accesses a drying database, and initiates searching of the drying database for a record associated with the electronic device.

In some embodiments, the computing device, in response to finding the record for the electronic device in the drying database, initiates a computing operation for registering additional electronic devices associated with the electronic device.

In some embodiments, the computing device, in response to finding the record for the electronic device in the drying database, generates a token, or receives or extracts a token from a second computing device or the drying database.

In some embodiments, the token is uniquely associated with at least one of the computing device, the record, the drying database, the apparatus, or the electronic device.

In some embodiments, a location associated with the electronic device, the computing device, or the apparatus is determined to be an approved location for executing a drying operation for the electronic device.

In some embodiments, the location is determined to be the approved location by at least one of the computing device or the apparatus based on referencing location-related information in the drying database or an informational database, and determining whether the location corresponds with the location-related information.

In some embodiments, the location-related information is associated with the record.

In some embodiments, the token is communicated to the apparatus such that the apparatus initiates a drying operation for the electronic device based on receipt of the token or based on successfully processing the token.

In some embodiments, the computing device initiates transmitting of information associated with the drying operation to the drying database.

In some embodiments, the computing device is identified based on referencing metadata associated with a database comprising information associated with one or more computing devices.

In some embodiments, the computing device is associated with a database associated with the apparatus or a location of the apparatus, the location being associated with or comprising at least one of a physical location, a network location, a merchant, or an entity.

In some embodiments, identification information associated with the computing device is stored in a database.

In some embodiments, the database stores information associated with computing devices registered with a location, a network, or an entity associated with apparatus.

In some embodiments, the database stores information associated with electronic devices registered with a location, a network, or an entity associated with apparatus, or registered by the computing device.

In some embodiments, the data comprises at least one of a manufacturer of the electronic device or a model of the electronic device.

In some embodiments, the data is used to determine post-drying operability of different types of electronic devices.

In some embodiments, the computing device comprises a mobile computing device.

In some embodiments, the mobile computing device comprises a tablet computing device.

In some embodiments, the computing device is remotely located from the apparatus.

In some embodiments, the computing device is integrated into the apparatus.

In some embodiments, the computing application comprises an electronic device drying application.

In some embodiments, the data is received from the apparatus or the electronic device, and wherein the data comprises charging regulation data for the electronic device, the charging regulation data for determining when the electronic device is operable for use.

In some embodiments, the electronic device is rendered at least partially inoperable due to presence of moisture in the electronic device.

In some embodiments, the data is received from the apparatus or the electronic device, and wherein the data is associated with status of removal of the moisture from the electronic device.

In some embodiments, the data is received from the apparatus or the electronic device, and wherein the data is associated with an amount of moisture removed from the electronic device.

In some embodiments, the data is received from the apparatus or the electronic device, and wherein the data is associated with an amount of moisture remaining in the electronic device.

In some embodiments, the data is received from the apparatus or the electronic device, and wherein the data is associated with an amount of elapsed time associated with removal of the moisture from the electronic device.

In some embodiments, the data is received from the apparatus or the electronic device, and wherein the data is associated with an amount of remaining time until the electronic device is determined to be dry.

In some embodiments, another method is provided. The method comprises executing, using a computing device, an electronic device drying application; capturing, using the computing device, analytic data associated with an electronic device, the electronic device being rendered at least partially inoperable due to presence of moisture in the electronic device; transmitting, using the computing device, the analytic data to a database; establishing, using the computing device, wireless communication with an electronic device dryer, the electronic device dryer being used for drying the electronic device; receiving, using the computing device, information associated with an amount of moisture removed from the electronic device; receiving, using the computing device, charging regulation information for the electronic device, the charging regulation information for determining when the electronic device is operable for use.

In some embodiments, the amount of moisture removed from the electronic device is determined based on humidity values (e.g., relative humidity values) determined by a humidity sensor in the electronic device dryer. In some embodiments, when the amount of moisture removed from the electronic device is equal to or greater than a threshold level, the electronic device is ready to be charged again. In some embodiments, the electronic device dryer may also comprise a charging station such that the electronic device can be charged using a connection between the electronic device and the charging station.

In some embodiments, the charging regulation comprises a slope of a charging regulation curve. If the slope of the charging regulation curve during the initial charging period is a negative slope, the device is operable for use. If the slope of the charging regulation curve during the initial charging period is a constant slope, the device is inoperable for use.

In some embodiments, the method further comprises receiving, using the computing device, information associated with completion of moisture removal from the electronic device.

In some embodiments, the analytic data comprises at least one of how long the electronic device has been wet, if the device was plugged in after it got wet, a model or manufacturer of the device, or how the device got wet.

In some embodiments, the method comprises accessing, using a computing device, a drying database; searching, using the computing device and based on a search parameter, the drying database for a record associated with an electronic device; in response to finding the record in the drying database, receiving, using the computing device, selection of an option to dry the electronic device; establishing, using the computing device, wireless communication with an electronic device dryer, wherein the electronic device is placed in the electronic device dryer; receiving, from the electronic device dryer, at least one of information associated with an amount of moisture in the electronic device or information associated with an amount of time associated with drying the electronic device.

In some embodiments, the method further comprises in response to finding the record in the drying database, determining the electronic device has remaining drying attempts out of a certain number of allowable drying attempts.

In some embodiments, information associated with the electronic device or a user of the electronic device was previously registered in the drying database.

In some embodiments, the method further comprises in response to not finding a record in the drying database for the electronic device, prompting for entry of information to determine whether the electronic device is a registered electronic device.

In some embodiments, the method further comprises in response to not finding a record in the drying database for the electronic device, creating a computing transaction for enabling drying of the electronic device in the electronic device dryer.

In some embodiments, an apparatus is provided. The apparatus comprises: a low-pressure chamber having an interior configured for placement of an electronic device in the interior and removal of the electronic device from the interior; an evacuation pump connected to the low-pressure chamber; a heater connected to the low-pressure chamber; and at least one control system connected to the evacuation pump and the heater, the at least one control system controlling removal of moisture from the electronic device by controlling the evacuation pump to decrease pressure within the low-pressure chamber, and controlling operation of the heater to add heat to the electronic device.

In some embodiments, the apparatus further comprises a location-determining system for determining network location information or physical location information associated with at least one of the apparatus or the electronic device.

In some embodiments, the location-determining system comprises a Global Positioning System (GPS).

In some embodiments, the apparatus further comprises a telecommunication device and an audio system.

In some embodiments, the apparatus further comprises a user can place or receive a call using the cellular and device and the audio system.

In some embodiments, the apparatus further comprises the telecommunication device comprises at least one of a cellular system or a Wi-Fi system.

In some embodiments, the apparatus further comprises at least one connection device.

In some embodiments, the apparatus sends first data to, using the at least one connection device, or receives second data from, using the at least one connection device, a database system, the database system associated with a database, and wherein the apparatus sends third data to, using the at least one connection device, or receives fourth data from, using the at least one connection device, a computing device, wherein the computing device executes an electronic device drying application.

In some embodiments, the at least one connection device comprises a first connection device and a second connection device, and wherein the apparatus: sends the first data, to the database system, using the first connection device; or receives the second data, from the database system, using the first connection device; and sends the third data, to the computing device, using the second connection device; or receives the fourth data, from a computing device, using the second connection device.

In some embodiments, the heater provides heat to the electronic device via one or more contoured surfaces at least partially contacting the electronic device.

In some embodiments, a total surface area associated with the one or more contoured surfaces contacting the electronic device is approximately 1.5 square inches.

In some embodiments, the heater comprises a thermofoil resistance heater.

In some embodiments, the thermofoil resistance heater is mounted on a heater substrate.

In some embodiments, the control system is further configured for determining whether to stop or continue removing the moisture from the electronic device based on data associated with at least one of the electronic device or the low-pressure chamber.

In some embodiments, the apparatus further comprises a humidity sensor, and wherein the data comprises humidity data sensed by the humidity sensor.

In some embodiments, the data comprises a duration.

In some embodiments, the heater provides heat to the electronic device via one or more contoured surfaces at least partially contacting the electronic device.

In some embodiments, the interior is shaped by the one or more contoured surfaces for fitting the electronic device in the interior.

In some embodiments, a method is provided comprising: providing a low-pressure chamber having an interior configured for placement of an electronic device in the interior and removal of the electronic device from the interior; connecting an evacuation pump to the low-pressure chamber; connecting the low-pressure chamber to a heater; connecting at least one control system to the evacuation pump and to the heater; and controlling removal of moisture from the electronic device by controlling the evacuation pump to decrease pressure within the low-pressure chamber, and controlling operation of the heater to add heat to the electronic device.

In some embodiments, the method further comprises executing, by a computing device, located either in an apparatus or located external to the apparatus, instructions for at least one of receiving, processing, or transmitting data associated with at least one of the apparatus, the electronic device, or a user of the electronic device or the apparatus.

In some embodiments, the method further comprises searching, in a database, for a record of the at least one of the apparatus, the electronic device, or a user of the electronic device.

In some embodiments, the method further comprises in response to finding the record in the database, generating, receiving, or extracting a token from a second computing device or the database.

In some embodiments, the method further comprises determining a location associated with the electronic device, the computing device, or the apparatus is determined to be an approved location for executing a drying operation for the electronic device.

In some embodiments, the method further comprises transmitting information associated with the drying operation to the database.

In some embodiments, the method further comprises heating the electronic device via one or more contoured surfaces at least partially contacting the electronic device.

In some embodiments, the method further comprises heating the electronic device via one or more contoured surfaces at least partially contacting the electronic device.

In some embodiments, the interior is shaped by the one or more contoured surfaces for closely fitting the electronic device in the interior.

In some embodiments, a method is provided comprising: executing, by a computing device, located either in an apparatus or located external to the apparatus, instructions for at least one of receiving, processing, or transmitting data associated with at least one of the apparatus, an electronic device, or a user of the electronic device or the apparatus, wherein the apparatus comprises: a low-pressure chamber having an interior configured for placement of an electronic device in the interior and removal of the electronic device from the interior; an evacuation pump connected to the low-pressure chamber; a heater connected to the low-pressure chamber; and at least one control system connected to the evacuation pump and the heater, the at least one control system controlling removal of moisture from the electronic device by controlling the evacuation pump to decrease pressure within the low-pressure chamber, and controlling operation of the heater to add heat to the electronic device.

In some embodiments, the method further comprises heating the electronic device via one or more contoured surfaces at least partially contacting the electronic device.

In some embodiments, the interior is shaped by the one or more contoured surfaces for fitting the electronic device in the interior.

In some embodiments, the method further comprises executing, by the computing device, an electronic device drying application or an electronic device drying registration application.

In some embodiments, a mobile device (e.g., phone, tablet, etc.) is provided that is configured for executing instructions for at least one of receiving, processing, or transmitting data associated with at least one of an apparatus, an electronic device, or a user of an electronic device or the apparatus, wherein the apparatus comprises: a low-pressure chamber having an interior configured for placement of an electronic device in the interior and removal of the electronic device from the interior; an evacuation pump connected to the low-pressure chamber; a heater connected to the low-pressure chamber; and at least one control system connected to the evacuation pump and the heater, the at least one control system controlling removal of moisture from the electronic device by controlling the evacuation pump to decrease pressure within the low-pressure chamber, and controlling operation of the heater to add heat to the electronic device.

In some embodiments, the mobile device is configured for executing an electronic device drying application or an electronic device drying registration application.

The present application incorporates by reference the entirety of U.S. patent application Ser. No. 15/811,633 (filed on Nov. 13, 2017 and entitled, "METHODS AND APPARATUSES FOR DRYING ELECTRONIC DEVICES"), and issued as U.S. Pat. No. 9,970,708, for all purposes.

The present application incorporates by reference the entirety of U.S. patent application Ser. No. 15/688,551 (filed on Aug. 28, 2017 and entitled, "METHODS AND APPARATUSES FOR DRYING ELECTRONIC DEVICES"), and issued as U.S. Pat. No. 9,816,757, for all purposes. U.S. patent application Ser. No. 15/688,551 is a continuation of U.S. patent application Ser. No. 15/478,992. The present application incorporates by reference the entirety of U.S. patent application Ser. No. 15/478,992 (filed on Apr. 4, 2017 and entitled, "METHODS AND APPARATUSES FOR DRYING ELECTRONIC DEVICES"), and issued as U.S. Pat. No. 9,746,241, for all purposes. U.S. patent application Ser. No. 15/478,992 is a continuation of U.S. application Ser. No. 15/369,742, which as indicated below, is also incorporated by reference for all purposes. U.S. patent application Ser. No. 15/478,992 is a continuation of U.S. application Ser. No. 15/369,742, filed on Dec. 5, 2016, issued as U.S. Pat. No. 9,644,891, which is a continuation-in-part of U.S. application Ser. No. 14/213,142, filed Mar. 14, 2014 issued as U.S. Pat. No. 9,513,053, which claims priority of U.S. Provisional Application Ser. No. 61/782,985, filed Mar. 14, 2013, which are all incorporated herein by reference in their entirety, for all purposes. U.S. application Ser. No. 15/369,742 is also a continuation-in-part of U.S. application Ser. No. 14/665,008, filed Mar. 23, 2015, which is a division of U.S. application Ser. No. 13/756,879, filed Feb. 1, 2013, which claims priority to U.S. Provisional Application Ser. No. 61/638,599, filed Apr. 26, 2012, and U.S. Provisional Application Ser. No. 61/593,617, filed Feb. 1, 2012, all of which are incorporated by reference in their entirety, for all purposes.

U.S. patent application Ser. No. 14/213,142 is a nonprovisional application of U.S. Provisional Patent Application No. 61/782,985 (filed Mar. 14, 2013 and entitled, "METHODS AND APPARATUSES FOR DRYING ELECTRONIC DEVICES"), which are all incorporated by reference in their entirety for all purposes.

The present application incorporates by reference the entirety of U.S. patent application Ser. No. 14/213,142 (filed on Mar. 14, 2014 and entitled, "METHODS AND APPARATUSES FOR DRYING ELECTRONIC DEVICES") for all purposes. U.S. patent application Ser. No. 14/213,142 is a nonprovisional application of U.S. Provisional Patent Application No. 61/782,985 (filed Mar. 14, 2013 and entitled, "METHODS AND APPARATUSES FOR DRYING ELECTRONIC DEVICES"), which is also incorporated by reference in entirety for all purposes.

The present application incorporates by reference the entirety of U.S. patent application Ser. No. 14/665,008 (filed on Mar. 23, 2015 and entitled, "METHODS AND APPARATUSES FOR DRYING ELECTRONIC DEVICES") for all purposes. U.S. patent application Ser. No. 14/665,008 is a divisional application of U.S. patent application Ser. No. 13/756,879 (filed Feb. 1, 2013 and entitled, "METHODS AND APPARATUSES FOR DRYING ELECTRONIC DEVICES") as well as a nonprovisional application of U.S. Provisional Patent Application Nos. 61/638,599 (filed Apr. 26, 2012 and entitled, "METHODS AND APPARATUSES FOR DRYING AND DISINFECTING PORTABLE ELECTRONIC DEVICES") and 61/593,617 (filed Feb. 1, 2012 and entitled, "METHODS AND APPARATUSES FOR DRYING PORTABLE ELECTRONIC DEVICES"), which are all also incorporated by reference in entirety for all purposes.

Some of the claims of allowed U.S. patent application Ser. No. 15/478,992 and of the instant application are included below in prose form.

In some embodiments, a method is provided. The method comprises placing a portable electronic device, that has been rendered at least partially inoperable due to moisture intrusion, into a low-pressure chamber; heating the portable electronic device; decreasing pressure within the low-pressure chamber; removing moisture from an interior of the portable electronic device to an exterior of the portable electronic device; increasing the pressure within the low-pressure chamber after the decreasing pressure, the increasing further comprising: measuring a humidity within the low-pressure chamber; increasing the pressure after the humidity has decreased or after a rate of change of the humidity has decreased; equalizing the pressure within the low-pressure chamber with pressure outside the low-pressure chamber; and removing the portable electronic device from the low-pressure chamber.

In some embodiments, the humidity comprises relative or absolute humidity.

In some embodiments, the increasing the pressure after the humidity has decreased or after a rate of change of the humidity has decreased further comprises increasing the pressure after the humidity has decreased and the rate of change of the humidity has decreased.

In some embodiments, the method further comprises detecting when an amount of moisture has been removed from the portable electronic device.

In some embodiments, the decreasing pressure and increasing the pressure are repeated sequentially before the removing the portable electronic device.

In some embodiments, the method further comprises controlling the repeated decreasing pressure and increasing the pressure according to at least one predetermined criterion.

In some embodiments, the method further comprises detecting when an amount of moisture has been removed from the portable electronic device; and stopping the repeated decreasing pressure and increasing the pressure after the detecting.

In some embodiments, an apparatus is provided. The apparatus comprises a low-pressure chamber defining an interior and having the interior configured for placement of an electronic device in the interior and removal of the electronic device from the interior; an evacuation pump connected to the low-pressure chamber; a heater connected to the low-pressure chamber; and a first controller connected to the evacuation pump and a second controller connected to the heater, the first controller controlling removal of moisture from the electronic device by controlling the evacuation pump to decrease pressure within the low-pressure chamber, and the second controller controlling operation of the heater to add heat to the electronic device.

In some embodiments, an apparatus is provided. The apparatus comprises a low-pressure chamber defining an interior and having the interior configured for placement of an electronic device in the interior and removal of the electronic device from the interior; an evacuation pump connected to the low-pressure chamber; a heater connected to the low-pressure chamber; and a controller connected to the evacuation pump and to the heater, the controller controlling removal of moisture from the electronic device by controlling the evacuation pump to decrease pressure within the low-pressure chamber and controlling operation of the heater to add heat to the electronic device.

In some embodiments, the controller connected to the evacuation pump and to the heater comprises either a single controller connected to the evacuation pump and to the heater, or a first controller connected to the evacuation pump and a second controller connected to the heater.

In some embodiments, the controller controls the evacuation pump to decrease the pressure within the low-pressure chamber multiple times, and wherein the pressure within the low-pressure chamber increases between successive decreases in the pressure within the low-pressure chamber.

In some embodiments, the apparatus further comprises at least one of: a pressure sensor connected to the low-pressure chamber and the controller, wherein the controller controls the evacuation pump to control the pressure within the low-pressure chamber based at least in part on a signal received from the pressure sensor; a temperature sensor connected to the heater or the low-pressure chamber, and the controller, wherein the controller controls the heater to control temperature associated with the heater or the low-pressure chamber based at least in part on a signal received from the temperature sensor; a humidity sensor connected to the low-pressure chamber and the controller, wherein the controller controls the evacuation pump to control the pressure within the low-pressure chamber based at least in part on a signal received from the humidity sensor; a valve connected to the low-pressure chamber and the controller, wherein the pressure within the low-pressure chamber increases between successive decreases in the pressure at least in part due to the controller controlling the valve to change the pressure; a sterilizing member connected to the low-pressure chamber, the sterilizing member being configured to kill germs associated with the electronic device; or a gas injector configured for introducing a gas into an interior of the electronic device.

In some embodiments, the heater comprises a platen with which the electronic device is in direct or indirect contact during removal of moisture from the electronic device.

In some embodiments, the controller controls the evacuation pump to stop decreasing the pressure within the low-pressure chamber when a humidity in the low-pressure chamber decreases, or when a rate at which the humidity in the low-pressure chamber changes decreases or is approximately zero.

In some embodiments, the apparatus further comprises at least one of: a humidity sensor connected to the low-pressure chamber and the controller, wherein the controller controls the evacuation pump to control the pressure within the low-pressure chamber based at least in part on a signal received from the humidity sensor, wherein the humidity sensor detects maximum and minimum values of the humidity as the evacuation pump decreases the pressure within the low-pressure chamber multiple times, and wherein the controller determines that the electronic device is sufficiently dry when a difference between successive maximum and minimum humidity values is equal to or less than a value; or a valve connected to the low-pressure chamber and the controller, wherein the pressure within the low-pressure chamber increases between successive decreases in the pressure within the low-pressure chamber at least in part due to the controller controlling the valve to increase the pressure within the low-pressure chamber, wherein the controller at least one of: controls the valve to increase the pressure within the low-pressure chamber at approximately the same time the controller controls the evacuation pump to stop decreasing the pressure within the low-pressure chamber; or controls the valve to equalize pressure between the interior of the low-pressure chamber and an outside of the low-pressure chamber.

In some embodiments, the heater is in indirect contact, via one or conductive mediums, with a surface of the electronic device.

In some embodiments, the low-pressure chamber is manufactured from rigid thin-walled plastic and comprises substantially vertical ribs, or at least a portion of the low-pressure chamber is covered with a substantially transparent cover.

In some embodiments, the low-pressure chamber comprises at least one of: an electrical connector to transmit electrical signals in or out of the low-pressure chamber, or a charging connector for charging the electronic device.

In some embodiments, the low-pressure chamber comprises a connection for charging the electronic device once the device is determined to be sufficiently dry.

In some embodiments, at least one of the low-pressure chamber or the interior is configured as a collapsible body or space that substantially forms around the electronic device.

In some embodiments, at least one of a humidity sensor, a pressure sensor, or a temperature sensor is integrated with or connected to the collapsible body or space, or the collapsible body or space is comprised of, formed with, integrated with, or connected to conductive elements or devices providing heat transfer to the electronic device inside the collapsible body or space.

In some embodiments, the heater or a heating surface connected to the heater comprises surface mount (SMT) resistors mounted on a printed circuit board and are at least partially covered with thermally conductive silicone.

In some embodiments, a surface either of the heater or connected to the heater is modifiable to at least partially conform to a shape of the electronic device placed in the low-pressure chamber.

In some embodiments, the evacuation pump is comprised of at least two pumps in series, or wherein the evacuation pump comprises at least one volume pump and at least one vacuum pump in series.

In some embodiments, an apparatus comprises a low-pressure chamber defining an interior and having the interior configured for placement of an electronic device in the interior and removal of the electronic device from the interior; an evacuation pump connected to the low-pressure chamber; a heater connected to the low-pressure chamber, the heater providing heat, via conduction through one or more contoured surfaces, to the electronic device; and one or more controllers connected to the evacuation pump and to the heater, the one or more controllers controlling removal of moisture from the electronic device based on controlling the evacuation pump to decrease pressure within the low-pressure chamber and controlling operation of the heater to add heat to the electronic device.

In some embodiments, the heater comprises a resistance heater, or the interior is sized, by the one or more contoured surfaces, for the electronic device in the interior.

In some embodiments, the interior is shaped by the one or more contoured surfaces for substantially closely fitting the electronic device in the interior.

In some embodiments, the one or more controllers connected to the evacuation pump and to the heater comprises either a single controller connected to the evacuation pump and to the heater, or a first controller connected to the evacuation pump and a second controller connected to the heater.

In some embodiments, at least one of: the electronic device is placed on a resistive heating surface, or the apparatus further comprises a door hingedly connected to at least one of the low-pressure chamber or the interior.

In some embodiments, the controller is comprised in or comprises a power and control system, the controller being configured to at least one of: control a valve comprised in the apparatus for modifying pressure in the low-pressure chamber in response to detection of a first control event, or stop a drying operation or cycle in response to detection of a second control event.

In some embodiments, the controller connected to the evacuation pump and to the heater comprises a single controller connected to the evacuation pump and to the heater.

In some embodiments, the controller connected to the evacuation pump and to the heater comprises a first controller connected to the evacuation pump and a second controller connected to the heater.

In some embodiments, the controller controls the evacuation pump to decrease the pressure within the low-pressure chamber multiple times.

In some embodiments, the pressure within the low-pressure chamber increases between successive decreases in the pressure within the low-pressure chamber.

In some embodiments, the apparatus comprises a pressure sensor connected to the low-pressure chamber and the controller, wherein the controller controls the evacuation pump to control the pressure within the low-pressure chamber based at least in part on a signal received from the pressure sensor.

In some embodiments, the apparatus comprises a temperature sensor connected to the heater or a heating surface associated with the heater or the low-pressure chamber or the interior, and the controller, wherein the controller controls the heater to control a temperature associated with the heater or the heating surface associated with the heater or the low-pressure chamber or the interior based at least in part on a signal received from the temperature sensor.

In some embodiments, the apparatus comprises a humidity sensor connected to the low-pressure chamber and the controller, wherein the controller controls the evacuation pump to control the pressure within the low-pressure chamber based at least in part on a signal received from the humidity sensor.

In some embodiments, the apparatus comprises a valve connected to the low-pressure chamber and the controller, wherein the pressure within the low-pressure chamber increases between successive decreases in the pressure within the low-pressure chamber at least in part due to the controller controlling the valve to change the pressure within the low-pressure chamber.

In some embodiments, the apparatus comprises a sterilizing member connected to the low-pressure chamber, the sterilizing member being configured to kill germs associated with the electronic device.

In some embodiments, the apparatus comprises a gas injector configured for introducing a gas into an interior of the electronic device.

In some embodiments, the heater comprises a platen with which the electronic device is in direct contact during removal of moisture from the electronic device.

In some embodiments, the controller controls the evacuation pump to stop decreasing the pressure within the low-pressure chamber when a humidity in the low-pressure chamber decreases.

In some embodiments, the controller controls the evacuation pump to stop decreasing the pressure within the low-pressure chamber when a rate at which a humidity in the low-pressure chamber changes decreases or is approximately zero.

In some embodiments, the apparatus comprises a humidity sensor connected to the low-pressure chamber and the controller.

In some embodiments, the controller controls the evacuation pump to control the pressure within the low-pressure chamber based at least in part on a signal received from the humidity sensor.

In some embodiments, the humidity sensor detects maximum and minimum values of a humidity in the low-pressure chamber as the evacuation pump decreases the pressure within the low-pressure chamber multiple times.

In some embodiments, the controller determines that the electronic device is sufficiently dry when a difference between successive maximum and minimum humidity values is equal to or less than a value.

In some embodiments, the apparatus comprises a valve connected to the low-pressure chamber and the controller.

In some embodiments, the pressure within the low-pressure chamber increases between successive decreases in the pressure within the low-pressure chamber at least in part due to the controller controlling the valve to increase the pressure within the low-pressure chamber.

In some embodiments, the controller controls the valve to increase the pressure within the low-pressure chamber at approximately the same time the controller controls the evacuation pump to stop decreasing the pressure within the low-pressure chamber.

In some embodiments, the controller controls the valve to equalize pressure between the interior of the low-pressure chamber and an outside or exterior of the low-pressure chamber.

In some embodiments, a heating surface associated with or comprised in the heater is in indirect contact, via one or conductive mediums, with a surface of the electronic device.

In some embodiments, the low-pressure chamber is manufactured from substantially rigid thin-walled plastic and comprises substantially vertical ribs.

In some embodiments, at least a portion of the low-pressure chamber is covered with a substantially transparent cover.

In some embodiments, the low-pressure chamber comprises an electrical connector to transmit electrical signals in or out of the low-pressure chamber.

In some embodiments, the apparatus further comprises a charging connector for charging the electronic device.

In some embodiments, the low-pressure chamber comprises a connection for charging the electronic device once the device is determined to be sufficiently dry.

In some embodiments, at least one of the low-pressure chamber or the interior is configured as a collapsible body that substantially forms around the electronic device.

In some embodiments, at least one of a humidity sensor, a pressure sensor, or a temperature sensor is integrated with or connected to the collapsible body.

In some embodiments, the collapsible body is comprised of, formed with, integrated with, or connected to conductive elements or devices providing heat transfer to the electronic device inside the collapsible body.

In some embodiments, at least one of the low-pressure chamber or the interior is configured as a collapsible space that substantially forms around the electronic device.

In some embodiments, at least one of a humidity sensor, a pressure sensor, or a temperature sensor is integrated with or connected to the collapsible space.

In some embodiments, the collapsible space is comprised of, formed with, integrated with, or connected to conductive elements or devices providing heat transfer to the electronic device inside the collapsible space.

In some embodiments, the collapsible body comprises a pouch.

In some embodiments, at least one of a humidity sensor, a pressure sensor, or a temperature sensor are integrated in a plenum pneumatically connected to the pouch.

In some embodiments, the pouch is integrated with conductive circuitry providing heat transfer to the electronic device comprised in the collapsible pouch.

In some embodiments, the one or more contoured surfaces substantially conforms to a shape of the electronic device.

In some embodiments, the apparatus further comprises a temperature sensor connected to the heater or a heating surface associated with the heater or the low-pressure chamber or the interior, and the controller, wherein the controller controls the heater to control a temperature associated with the heater or the heating surface associated with the heater or the low-pressure chamber or the interior based at least in part on a second signal received from the temperature sensor.

In some embodiments, the apparatus further comprises a humidity sensor connected to the low-pressure chamber and the controller, wherein the controller at least one of controls the evacuation pump to control the pressure within the low-pressure chamber, or controls the temperature associated with the heater or the heating surface associated with the heater or the low-pressure chamber or the interior, based at least in part on a third signal received from the humidity sensor.

In some embodiments, the heater or a heating surface connected to or comprised in the heater comprises surface mount (SMT) resistors mounted on a printed circuit board.

In some embodiments, the SMT resistors are at least partially covered with thermally conductive silicone.

In some embodiments, the SMT resistors are at least partially covered with a staggered airway chamber for gas to be heated while the gas flows over the SMT resistors.

In some embodiments, a surface of the heater is modifiable to at least partially conform to a shape of the electronic device placed in the low-pressure chamber.

In some embodiments, a surface connected to the heater is modifiable to at least partially conform to a shape of the electronic device placed in the low-pressure chamber.

In some embodiments, the evacuation pump is comprised of at least two pumps in series.

In some embodiments, the at least two pumps comprise at least one volume pump and at least one vacuum pump.

In some embodiments, the electronic device is placed on a resistive heating surface connected to or comprised in the heater.

In some embodiments, the apparatus further comprises a door hingedly connected to the low-pressure chamber.

In some embodiments, the apparatus further comprises a door hingedly connected to the interior.

In some embodiments, the apparatus further comprises a door hingedly connected to the low-pressure chamber.

In some embodiments, the apparatus further comprises a door hingedly connected to the interior.

In some embodiments, the controller comprises a power and control system.

In some embodiments, the controller is comprised in a power and control system.

In some embodiments, the controller comprises or is comprised in a power and control system, and the electronic device is placed on a resistive heating surface connected to or comprised in the heater.

In some embodiments, the controller initiates control of a valve comprised in the apparatus for modifying the pressure in the low-pressure chamber in response to detection of a first control event.

In some embodiments, the controller initiates stopping of a drying operation or cycle in response to detection of a control event.

In some embodiments, the controller is configured to control a valve comprised in the apparatus for modifying the pressure in the low-pressure chamber in response to detection of a first control event.

In some embodiments, the controller is configured to stop a drying operation or cycle in response to detection of a control event.

In some embodiments, the drying operation or cycle is a next drying operation or cycle.

In some embodiments, the drying operation or cycle is a current drying operation or cycle.

In some embodiments, the controller is configured to control a valve comprised in the apparatus for modifying the pressure in the low-pressure chamber in response to detection of a first control event.

In some embodiments, the controller is configured to stop a drying operation or cycle in response to detection of a control event.

In some embodiments, the controller is comprised in a power and control system, and wherein the electronic device is in contact with a conduction surface connected to or comprised in the heater.

In some embodiments, the controller comprises a power and control system, and wherein the electronic device is in contact with a resistive surface connected to or comprised in the heater.

In some embodiments, the controller is comprised in a power and control system, and wherein the controller is configured to determine when an amount of moisture has been removed from the electronic device.

In some embodiments, the controller is comprised in a power and control system, and wherein the controller is configured to determine when the electronic device is sufficiently dry.

In some embodiments, the controller is configured to control a valve comprised in the apparatus for modifying the pressure in the low-pressure chamber in response to detection of a first control event.

In some embodiments, the controller is configured to stop a drying operation or cycle in response to detection of a control event, the control event comprising the determination that the electronic device is sufficiently dry.

In some embodiments, the controller is configured to stop a drying operation or cycle in response to detection of a control event, the control event causing the heater or a heating surface associated with the heater to be powered off.

In some embodiments, the controller is comprised in a power and control system, wherein the controller is configured to control a valve comprised in the apparatus for modifying the pressure in the low-pressure chamber in response to detection of a first control event.

In some embodiments, the controller is configured to stop a drying operation or cycle in response to detection of a second control event.

In some embodiments, the controller is comprised in a power and control system, wherein the controller is configured to control a valve comprised in the apparatus for modifying the pressure in the low-pressure chamber in response to detection of a first control event.

In some embodiments, the controller is configured to stop a drying operation or cycle in response to detection of a second control event.

In some embodiments, the heater comprises a resistance heater.

In some embodiments, the interior is sized, by the one or more contoured surfaces, for fitting the electronic device in the interior.

In some embodiments, the one or more controllers connected to the evacuation pump and to the heater comprises a single controller connected to the evacuation pump and to the heater.

In some embodiments, the one or more controllers connected to the evacuation pump and to the heater comprises a first controller connected to the evacuation pump and a second controller connected to the heater.

In some embodiments, the humidity comprises relative humidity.

In some embodiments, the humidity comprises absolute humidity.

In some embodiments, the increasing the pressure after the humidity has decreased or after the rate of change of the humidity has decreased further comprises increasing the pressure after the humidity has decreased.

In some embodiments, the increasing the pressure after the humidity has decreased or after the rate of change of the humidity has decreased further comprises increasing the pressure after the rate of change of the humidity has decreased.

In some embodiments, the portable electronic device is selected from a group consisting of a cell phone, a digital music player, a watch, a pager, a camera, and a portable computer.

In some embodiments, the electronic device is selected from a group consisting of a cell phone, a digital music player, a watch, a pager, a camera, and a portable computer.

In some embodiments, the electronic device is selected from a group consisting of a cell phone, a digital music player, a watch, a pager, a camera, and a portable computer.

In some embodiments, the electronic device comprises a mobile phone.

In some embodiments, the electronic device comprises a watch.

In some embodiments, the electronic device comprises a portable computer.

In some embodiments, the electronic device is placed on a heating surface connected to or comprised in the heater.

In some embodiments, the controller is operable to control a valve comprised in the apparatus for modifying the pressure in the low-pressure chamber in response to detection of a control event.

In some embodiments, the control event comprises a determination that a humidity in the low-pressure chamber or the interior is equal to or less than a threshold humidity.

In some embodiments, the control event comprises a determination that a first temperature in the low-pressure chamber or the interior, or a second temperature associated with the heater or a heating surface located in the low-pressure chamber or the interior, is equal to or greater than a threshold temperature.

In some embodiments, the controller is operable to stop a drying operation or cycle in response to detection of a control event.

In some embodiments, the control event comprises a determination that a humidity in the low-pressure chamber or the interior is equal to or less than a threshold humidity.

In some embodiments, the heating surface is electrically powered through power wires.

In some embodiments, the heating surface is manufactured with at least partially thermally conductive material.

In some embodiments, the electronic device is placed on a conduction platen or surface connected to the heater, wherein the conduction platen or surface is powered by a power and control system located in the apparatus, and wherein the power and control system comprises the controller.

In some embodiments, the conduction platen or surface is powered on for a first portion of time and powered off for a second portion of time.

In some embodiments, the powered on and the powered off portions of time are repeated sequentially multiple times.

In some embodiments, the electronic device is selected from a group consisting of a cell phone, a digital music player, a watch, a pager, a camera, and a portable computer.

In some embodiments, an apparatus is provided. The apparatus comprises: a low-pressure chamber defining an interior and having the interior configured for placement of an electronic device in the interior and removal of the electronic device from the interior, wherein the electronic device is selected from a group consisting of a cell phone, a digital music player, a watch, a pager, a camera, and a portable computer; an evacuation pump connected to the low-pressure chamber; a heater connected to the low-pressure chamber, the heater comprising or connected to a heating surface; and a power and control system comprising a controller connected to the evacuation pump and to the heater, the controller controlling removal of moisture from the electronic device by controlling the evacuation pump to decrease pressure within the low-pressure chamber or the interior, and controlling operation of the heater to add heat to the electronic device, the power and control system powering on the heater or the heating surface for a first period of time and powering off the heater or the heating surface for a second period of time, and the power and control system controlling a valve associated with the low-pressure chamber or the interior for modifying the pressure within the low-pressure chamber or the interior in response to detection of a first control event.

In some embodiments, the first control event comprises a humidity determination in the low-pressure chamber or the interior.

In some embodiments, the power and control system stopping a drying operation or cycle in response to detection of a second control event.

In some embodiments, the second control event comprises a humidity determination in the low-pressure chamber or the interior.

In some embodiments, the drying operation or cycle comprises a current drying operation or cycle.

In some embodiments, the drying operation or cycle comprises a next drying operation or cycle.

In some embodiments, the drying operation or cycle comprises a subsequent drying operation or cycle.

In some embodiments, the apparatus further comprises a door hingedly connected to the low-pressure chamber or the interior.

In some embodiments, the pressure in the low-pressure chamber or the interior is decreased to at least approximately 30 inches of Hg below external pressure outside the low-pressure chamber.

In some embodiments, the door is hingedly connected to the low-pressure chamber or the interior.

In some embodiments, the heating surface comprises a resistive heating surface.

In some embodiments, modifying the pressure within the low-pressure chamber comprises increasing the pressure within the low-pressure chamber.

In some embodiments, modifying the pressure within the low-pressure chamber comprises decreasing the pressure within the low-pressure chamber.

In some embodiments, the pressure in the low-pressure chamber or the interior is decreased to at least approximately 30 inches of Hg below external pressure outside the low-pressure chamber.

In some embodiments, the electronic device is in direct contact with the heating surface.

In some embodiments, the electronic device is not in direct contact with the heating surface.

In some embodiments, the heating surface heats the electronic device via one or more conductive mediums or surfaces.

In some embodiments, an apparatus is provided. The apparatus comprises: a low-pressure chamber defining an interior and having the interior configured for placement of an electronic device in the interior and removal of the electronic device from the interior, wherein the electronic device is selected from a group consisting of a cell phone, a digital music player, a watch, a pager, a camera, and a portable computer; an evacuation pump connected to the low-pressure chamber; a heater connected to the low-pressure chamber, the heater comprising or connected to a heating surface; and a power and control system comprising a controller connected to the evacuation pump and to the heater, the controller controlling removal of moisture from the electronic device by controlling the evacuation pump to decrease pressure within the low-pressure chamber or the interior, and controlling operation of the heater to add heat to the electronic device, the power and control system powering on the heater or the heating surface and powering off the heater or the heating surface, and the power and control system stopping a drying operation or cycle in response to detection of a first control event.

In some embodiments, the first control event comprises a humidity determination in the low-pressure chamber or the interior.

In some embodiments, the first control event comprises a first temperature determination in the low-pressure chamber or the interior, or a second temperature determination associated with the heating surface or the heater.

In some embodiments, the power and control system controlling a valve associated with the low-pressure chamber or the interior for modifying the pressure within the low-pressure chamber or the interior in response to detection of a second control event.

In some embodiments, the second control event comprises a humidity determination in the low-pressure chamber or the interior.

In some embodiments, the second control event comprises a first temperature determination in the low-pressure chamber or the interior, or a second temperature determination associated with the heating surface or the heater.

In some embodiments, the drying operation or cycle comprises a current drying operation or cycle.

In some embodiments, the drying operation or cycle comprises a next drying operation or cycle.

In some embodiments, the drying operation or cycle comprises a subsequent drying operation or cycle.

In some embodiments, the apparatus further comprises a door hingedly connected to the low-pressure chamber or the interior.

In some embodiments, the pressure in the low-pressure chamber or the interior is decreased to at least approximately 30 inches of Hg below external pressure outside the chamber.

In some embodiments, the pressure in the low-pressure chamber or the interior is decreased to at least approximately 30 inches of Hg below external pressure outside the chamber.

In some embodiments, the heating surface comprises a resistive heating surface.

In some embodiments, the first duration of time is different from the second duration of time.

In some embodiments, the first duration of time is substantially equivalent to the second duration of time.

In some embodiments, the pressure in the low-pressure chamber or the interior is decreased to at least approximately 30 inches of Hg below external pressure outside the low-pressure chamber.

In some embodiments, the electronic device is in direct contact with the heating surface.

In some embodiments, the electronic device is not in direct contact with the heating surface.

In some embodiments, the heating surface heats the electronic device via one or more conductive mediums or conductive surfaces.

In some embodiments, the pressure in the low-pressure chamber or the interior is decreased to at least approximately 28 inches of Hg below external pressure outside the low-pressure chamber.

In some embodiments, the pressure in the low-pressure chamber or the interior is decreased to at least approximately 30 inches of Hg below external pressure outside the low-pressure chamber.

In some embodiments, the pressure in the low-pressure chamber or the interior is decreased to at least approximately 30 inches of Hg below external pressure outside the low-pressure chamber.

In some embodiments, the pressure in the low-pressure chamber or the interior is decreased to at least approximately 30 inches of Hg below external pressure outside the low-pressure chamber.

In some embodiments, the electronic device is placed on a heating platen connected to or comprised in the heater.

In some embodiments, the electronic device is placed on a heating surface connected to or comprised in the heater, wherein the heating surface is energized for a first period of time, and wherein the heating surface is de-energized for a second period of time.

In some embodiments, the heater comprises a platen with which the electronic device is in indirect contact during removal of moisture from the electronic device.

In some embodiments, the apparatus further comprises a valve connected to the low-pressure chamber and the controller, wherein the pressure within the low-pressure chamber increases between successive decreases in the pressure at least in part due to the controller controlling the valve to change the pressure.

In some embodiments, the controller controls a temperature of the heater or a heating surface associated with the heater to maintain the temperature at or above approximately 110 deg. F. and at or below approximately 120 deg. F.

In some embodiments, the controller is comprised in a power and control system, and wherein the controller is configured to determine an amount of moisture removed from the electronic device.

In some embodiments, the controller is comprised in a power and control system, and wherein the controller is configured to determine an amount of moisture remaining in the electronic device.

In some embodiments, the apparatus further comprises a humidity sensor connected to the low-pressure chamber and the controller, wherein the controller controls a temperature associated with the heater or a heating surface associated with the heater or the low-pressure chamber or the interior based at least in part on a signal received from the humidity sensor.

In some embodiments, the controller controls a temperature associated with the heater or a heating surface associated with the heater or the low-pressure chamber or the interior based at least in part on the signal or a second signal received from the humidity sensor.

In some embodiments, an apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and to the heater, the at least one control system controlling removal of moisture from the electronic device by controlling the evacuation pump to decrease pressure within the low-pressure chamber, controlling operation of the heater to add heat to the electronic device, and determining whether to stop or continue removing the moisture from the electronic device based on data associated with at least one of the electronic device or the low-pressure chamber, wherein the at least one control system is further configured for: controlling at least one of the evacuation pump or a valve in the low-pressure chamber to increase the pressure within the low-pressure chamber such that the increased pressure is substantially equal to pressure outside the low-pressure chamber, the decreasing the pressure and the increasing the pressure comprising a first cycle, repeating the controlling the evacuation pump to decrease the pressure within the low-pressure chamber and the controlling the at least one of the evacuation pump or the valve to increase the pressure within the low-pressure chamber such that the increased pressure is substantially equal to the pressure outside the low-pressure chamber, the repeating of the decreasing the pressure and of the increasing the pressure comprising a second cycle, and determining whether to stop or continue removing the moisture from the electronic device based on data from at least one of the first cycle or the second cycle.

In some embodiments, a first temperature of the electronic device during at least a portion of the second cycle is higher compared to a second temperature of the electronic device during at least a portion of the first cycle.

In some embodiments, the at least one control system is further configured for second repeating the controlling the evacuation pump to decrease the pressure within the low-pressure chamber and the controlling the at least one of the evacuation pump or the valve to increase the pressure within the low-pressure chamber such that the increased pressure is equal to the pressure outside the low-pressure chamber, the second repeating of the decreasing the pressure and of the increasing the pressure comprising a third cycle.

In some embodiments, a change in temperature associated with the electronic device between the second and third cycles is smaller than a change in temperature between the first and second cycles.

In some embodiments, a change in humidity associated with the low-pressure chamber between the second and third cycles is smaller than change in humidity between the first and second cycles.

In some embodiments, determining whether to stop or continue removing the moisture from the electronic device based on the data from the at least one of the first cycle or the second cycle comprises determining whether to stop or continue removing the moisture from the electronic device based on first data from the first cycle, second data from the second cycle, and third data from the third cycle.

In some embodiments, determining whether to stop or continue removing the moisture from the electronic device comprises determining whether to stop operation of the evacuation pump.

In some embodiments, the data from at least one of the first cycle or the second cycle comprises data from the first cycle and the second cycle.

In some embodiments, the data comprises at least one of temperature data associated with the electronic device or the low-pressure chamber, pressure data, or humidity data.

In some embodiments, an apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one power and control system connected to the evacuation pump and to the heater, the at least one power and control system controlling removal of moisture from the electronic device by controlling the evacuation pump to decrease pressure within the low-pressure chamber, controlling operation of the heater to add heat to the electronic device, and determining whether to stop or continue removing the moisture from the electronic device based on data associated with at least one of the electronic device or the low-pressure chamber.

In some embodiments, the data associated with the at least one of the electronic device or the low-pressure chamber comprises data associated with the electronic device.

In some embodiments, the data associated with the at least one of the electronic device or the low-pressure chamber comprises data associated with the low-pressure chamber.

In some embodiments, the heater heats the electronic device via one or more conductive mediums or conductive surfaces, and wherein the electronic device is selected from a group consisting of a cell phone, a digital music player, a watch, a pager, a camera, and a portable computer.

In some embodiments, the data comprises temperature data.

In some embodiments, the data comprises pressure data.

In some embodiments, the data comprises humidity data.

In some embodiments, an apparatus is provided. The apparatus comprises: a low-pressure chamber defining an interior and having the interior configured for placement of an electronic device in the interior and removal of the electronic device from the interior; an evacuation pump connected to the low-pressure chamber; a heater connected to the low-pressure chamber; at least one control system connected to the evacuation pump and to the heater, the at least one control system controlling removal of moisture from the electronic device by controlling the evacuation pump to decrease pressure within the low-pressure chamber, and controlling operation of the heater to add heat to the electronic device, wherein the apparatus is in communication with a computing device, wherein the computing device executes a computing application for at least one of receiving, processing, or transmitting data associated with at least one of the electronic device or the apparatus.

In some embodiments, the computing device accesses a drying database, and initiates searching of the drying database for a record associated with the electronic device.

In some embodiments, the computing device, in response to finding the record in the drying database, at least one of: initiates prompt for providing validation input for providing access to the record, or determines the electronic device has remaining drying attempts out of a certain number of allowable drying attempts.

In some embodiments, the computing device, in response to not finding the record in the drying database, initiates prompt for entry of input data to determine whether the electronic device is a registered electronic device.

In some embodiments, the computing device, in response to not finding the record in the drying database, initiates a computing transaction for registering the electronic device.

In some embodiments, the computing device, in response to finding the record in the drying database, prompt for selection of an option to dry the electronic device.

In some embodiments, the communication with the computing device comprises Bluetooth communication or Bluetooth Low Energy communication.

In some embodiments, the communication with the computing device comprises Wi-Fi communication or cellular communication.

In some embodiments, the data comprises identification data associated with at least one of the electronic device or the apparatus.

In some embodiments, the data is received from the apparatus or the electronic device, and wherein the data is associated with an amount of moisture removed from the electronic device.

In some embodiments, the data is received from the apparatus or the electronic device, and wherein the data is associated with an amount of moisture remaining in the electronic device.

In some embodiments, the data is received from the apparatus or the electronic device, and wherein the data is associated with an amount of elapsed or remaining time associated with the removal of the moisture from the electronic device.

In some embodiments, the data comprises at least one of how long the electronic device has been or wet of if the electronic device was plugged in at the time of or after the electronic device got wet.

In some embodiments, the computing device determines progress of removal of the moisture from the electronic device.

In some embodiments, the progress is associated with an amount of moisture removed from or remaining in the electronic device.

In some embodiments, the progress is associated with an amount of elapsed or remaining time (until the electronic device is dry) associated with the removal of the moisture from the electronic device.

In some embodiments, the computing device is associated with a display or a graphical user interface for displaying the progress of removal of the moisture from the electronic device.

Various aspects of different embodiments of the present disclosure are expressed in paragraphs X1, X2, X3, X4, X5, X6, X7, X8 and X9 as follows:

X1. One embodiment of the present disclosure includes an electronic device drying apparatus for drying water damaged or other wetting agent damaged electronics comprising: a heated conduction platen means; a vacuum chamber means; an evacuation pump means; a convection oven means; a solenoid valve control means; a microprocessor controlled system to automatically control heating and evacuation; a vacuum sensor means; a humidity sensor means; and a switch array for algorithm selection.

X2. Another embodiment of the present disclosure includes a method, comprising: placing a portable electronic device that has been rendered at least partially inoperable due to moisture intrusion into a low pressure chamber; heating the electronic device; decreasing pressure within the low pressure chamber; removing moisture from the interior of the portable electronic device to the exterior of the portable electronic device; increasing pressure within the low pressure chamber after said decreasing pressure; equalizing the pressure within the low pressure chamber with the pressure outside the low pressure chamber; and removing the portable electronic device from the low pressure chamber.

X3. Another embodiment of the present disclosure includes an apparatus, comprising: a low pressure chamber defining an interior, the low pressure chamber with an interior sized and configured for placement of an electronic device in the interior and removal of an electronic device from the interior; an evacuation pump connected to the chamber; a heater connected to the chamber; and a controller connected to the evacuation pump and to the heater, the controller controlling removal of moisture from the electronic device by controlling the evacuation pump to decrease pressure within the low pressure chamber and controlling operation of the heater to add heat to the electronic device.

X4. Another embodiment of the present disclosure includes a device for removing moisture from an electronic device, substantially as described herein with reference to the accompanying Figures.

X5. Another embodiment of the present disclosure includes a method of removing moisture from an electronic device, substantially as described herein with reference to the accompanying Figures.

X6. Another embodiment of the present disclosure includes a method of manufacturing a device, substantially as described herein, with reference to the accompanying Figures.

X7. Another embodiment of the present disclosure includes an apparatus, comprising: means for heating an electronic device; means for reducing the pressure within the electronic device; and means for detecting when a sufficient amount of moisture has been removed from the electronic device.

X8. Another embodiment of the present disclosure includes a method, comprising: placing a portable electronic device that has been rendered at least partially inoperable due to moisture intrusion into a low pressure chamber; decreasing pressure within the low pressure chamber; introducing air into the interior of the electronic device, the introduced air being at a pressure above the pressure within the low pressure chamber; removing moisture from the interior of the portable electronic device; equalizing the pressure within the low pressure chamber with the pressure outside the low pressure chamber; and removing the portable electronic device from the low pressure chamber.

X9. Another embodiment of the present disclosure includes an apparatus, comprising: a low pressure chamber defining an interior, the low pressure chamber with an interior sized and configured for placement of an electronic device in the interior and removal of an electronic device from the interior; an evacuation pump connected to the chamber and configured and adapted to decrease pressure within the low pressure chamber; and a gas injector configured and adapted for pneumatic connection to the electronic device while the evacuation pump removes gas from the low pressure chamber, the injector being configured and adapted for introducing a gas into the interior of the electronic device, the gas being at a pressure above the pressure within the interior of the low pressure chamber.

Yet other embodiments include the features described in any of the previous statements X1, X2, X3, X4, X5, X6, X7, X8 and X9, as combined with one or more of the following aspects:

A regenerative desiccator means to automatically dry desiccant.

A UV germicidal lamp means to disinfect portable electronic devices.

Wherein said heated conduction platen is comprised of a thermofoil heater laminated to metallic conduction platen.

Wherein said heated conduction platen thermofoil heater is between 25 watts and 1000 watts.

Wherein said heated conduction platen utilizes a temperature feedback sensor.

Wherein said heated conduction platen surface area is between 4 square inches and 1500 square inches.

Wherein said heated conduction platen is also used as a convection oven heater to heat the outside of a vacuum chamber.

Wherein said convection oven is used to heat the outside of a vacuum chamber to minimize internal vacuum chamber condensation once vaporization occurs Wherein said vacuum chamber is fabricated from a vacuum rated material such as plastic, metal, or glass.

Wherein said vacuum chamber is constructed in such a manner as to withstand vacuum pressures up to 30 inches of mercury below atmospheric pressure.

Wherein said vacuum chamber volume is between 0.25 liters and 12 liters.

Wherein said evacuation pump provides a minimum vacuum pressure of 19 inches of mercury below atmospheric pressure.

Wherein said solenoid valves has a orifice diameter between 0.025 inches and 1 inches.

Wherein said solenoid valve is used to provide a path for atmospheric air to exchange convection oven heated air.

Wherein said microprocessor controller utilizes algorithms stored in memory for controlled vacuum drying.

Wherein said relative humidity sensor is pneumatically connected to vacuum chamber and used to sample relative humidity real time.

Wherein said microprocessor controller utilizes relative humidity maximums and minimums for controlled vacuum drying.

Wherein said microprocessor controller automatically controls the heated conduction temperature, vacuum pressure, and cycle times.

Wherein said microprocessor controller utilizes a pressure sensor, temperature sensor, and relative humidity sensor as feedback for heated vacuum drying.

Wherein said microprocessor controller logs performance data and can transmit over a modem internet interface.

Wherein said switch array for algorithm selection provides a simplistic method of control.

Wherein said regenerative desiccator is heated by external thermofoil heaters between 25 W and 1000 W.

Wherein said regenerative desiccator utilizes a fan and temperature signal to permit precise closed-loop temperature control to bake desiccant.

Wherein said regenerative desiccator utilizes 3-way pneumatic valves to pneumatically isolate and switch airflow direction and path for purging said desiccator.

Wherein said UV germicidal light emits UV radiation at a wavelength of 254 nm and a power range between 1 W and 250 W to provide adequate UV radiation for disinfecting portable electronic devices.

Wherein said UV germicidal light disinfects portable electronic devices from between 1 minute and 480 minutes.

Wherein said regenerative desiccator is heated from 120° F. to 500° F. in order to provide a drying medium.

Wherein said regenerative desiccator is heated from between 5 minutes and 600 minutes to provide ample drying time.

Wherein said heated conduction platen is heated between 70° F. and 200° F. to re-introduce heat as compensation for the loss due to the latent heat of evaporation loss.

Wherein said microprocessor controller logs performance data and can transmit and receive performance data and software updates wirelessly over a cellular wireless network.

Wherein said microprocessor controller logs performance data and can print results on an Internet Protocol wireless printer or a locally installed printer.

Wherein said placing includes placing the portable electronic device on a platen, and said heating includes heating the platen to at least approximately 110 deg. F. and at most approximately 120 deg. F.

Wherein said decreasing pressure includes decreasing the pressure to at least approximately 28 inches of Hg below the pressure outside the chamber.

Wherein said decreasing pressure includes decreasing the pressure to at least approximately 30 inches of Hg below the pressure outside the chamber.

Wherein said placing includes placing the portable electronic device on a platen, said heating includes heating the platen to at least approximately 110 deg. F. and at most approximately 120 deg. F., and said decreasing pressure includes decreasing the pressure to at least approximately 28 inches of Hg below the pressure outside the chamber.

Wherein said decreasing pressure and increasing pressure are repeated sequentially before said removing the portable electronic device.

Automatically controlling said repeated decreasing pressure and increasing pressure according to at least one predetermined criterion.

Measuring the relative humidity within the chamber; and increasing pressure after the relative humidity has decreased and the rate of decrease of the relative humidity has slowed.

Measuring the relative humidity within the chamber; wherein said decreasing pressure and increasing pressure are repeated sequentially before said removing the portable electronic device; and wherein said decreasing pressure begins when the relative humidity has increased and the rate of increase of the relative humidity has slowed.

Measuring the relative humidity within the chamber; wherein said decreasing pressure and increasing pressure are repeated sequentially before said removing the portable electronic device; and wherein said repeated decreasing pressure and increasing pressure is stopped once the difference between a sequential relative humidity maximum and relative humidity minimum are within a predetermined tolerance.

Measuring the relative humidity within the chamber; wherein said decreasing pressure and increasing pressure are repeated sequentially before said removing the portable electronic device; and wherein said repeated decreasing pressure and increasing pressure is stopped once the relative humidity within the chamber reaches a predetermined value.

Decreasing pressure within the low pressure chamber using a pump; and removing moisture from the gas being drawn from the chamber with the pump prior to the gas reaching the pump.

Wherein said removing moisture includes removing moisture using a desiccator containing desiccant.

Removing moisture from the desiccant.

Isolating the desiccant from the pump prior to said removing moisture from the desiccant.

Reversing the airflow through the desiccator while removing moisture from the desiccant.

Heating the desiccant during said removing moisture from the desiccant.

Wherein said heating includes heating the desiccant to at least 200 deg. F. and at most 300 deg. F.

Wherein said heating includes heating the desiccant to approximately 250 deg. F.

Wherein the controller controls the evacuation pump to decrease pressure within the low pressure chamber multiple times, and wherein the pressure within the low pressure chamber increases between successive decreases in pressure.

A humidity sensor connected to the low pressure chamber and the controller, wherein the controller controls the evacuation pump to at least temporarily stop decreasing pressure within the low pressure chamber based at least in part on signals received from the humidity sensor.

Wherein the controller controls the evacuation pump to at least temporarily stop decreasing pressure within the low pressure chamber when the rate at which the relative humidity changes decreases or is approximately zero.

Wherein the controller controls the evacuation pump to begin decreasing pressure within the low pressure chamber when the rate at which the relative humidity changes decreases or is approximately zero.

Wherein humidity sensor detects maximum and minimum values of relative humidity as the evacuation pump decreases pressure within the low pressure chamber multiple times, and wherein the controller determines that the device is dry when the difference between successive maximum and minimum relative humidity values is equal to or less than a predetermined value.

A valve connected to the low pressure chamber and the controller, wherein the pressure within the low pressure chamber increases between successive decreases in pressure at least in part due to the controller controlling the valve to increase pressure.

Wherein the controller controls the valve to increase pressure within the low pressure chamber at approximately the same time the controller controls the evacuation pump to stop decreasing pressure within the low pressure chamber.

Wherein the controller controls the valve to equalize pressure between the interior of the low pressure chamber and the outside of the low pressure chamber.

A temperature sensor connected to the heater and the controller, wherein the controller controls the heater to maintain a predetermined temperature based at least in part on signals received from the pressure sensor.

A pressure sensor connected to the low pressure chamber and the controller, wherein the controller controls the evacuation pump to at least temporarily stop decreasing pressure within the low pressure chamber based at least in part on signals received from the pressure sensor.

Wherein the heater includes a platen with which the electronic device is in direct contact during removal of moisture from the electronic device.

Disinfecting the electronic device.

A UV lamp for disinfecting the electronic device.

Wherein introducing air into the interior of the electronic device is while the pressure in the low pressure chamber is below the pressure outside the low pressure chamber.

Wherein introducing air into the interior of the electronic device is during said decreasing pressure.

Wherein introducing air into the interior of the electronic device is before said equalizing the pressure.

Wherein the introduced air is at a pressure above the pressure outside the low pressure chamber.

Heating the electronic device.

Heating the air introduced into the interior of the electronic device.

Measuring the temperature of air being introduced into the interior of the electronic device.

Controlling the temperature of the air being introduced into the electronic device to be at least 90 degrees F. and at most 140 degrees F.

Wherein decreasing pressure within the low pressure chamber and/or electronic device and heating of the electronic device are performed by a vacuum pump.

Wherein decreasing pressure within the low pressure chamber and/or electronic device is performed by a vacuum pump, and wherein heating of the electronic device is performed by an object other than the vacuum pump.

Wherein heating the electronic device includes heating the air introduced into the interior of the electronic device and heating an exterior surface of the electronic device through direct contact with the exterior surface of the electronic device.

Wherein decreasing pressure within the low pressure chamber and/or electronic device includes decreasing the pressure to at least approximately 28 inches of Hg below the pressure outside the chamber.

Attaching an air nozzle to an electronic port of the electronic device and introducing air through the electronic port.

Wherein introducing air into the interior of the electronic device includes introducing air into the electronic device at a rate of at least approximately 0.5 cubic feet per minute and at most approximately 2.5 cubic feet per minute.

Wherein the gas injector is configured and adapted to inject air into the interior of the electronic device.

Wherein the gas injector is configured and adapted to connect to and inject gas through an electronic connection port of the electronic device.

A heater connected to the gas injector, wherein the heater heats the gas before it is introduced into the interior of the electronic device.

Wherein the heater heating the electronic device is the evacuation pump decreasing pressure within the low pressure chamber and/or electronic device.

Wherein the heater heating the electronic device is not the evacuation pump decreasing pressure within the low pressure chamber and/or electronic device.

A heater adapted to heat an exterior surface of an electronic device placed in the low pressure chamber through direct contact with the exterior surface of the electronic device.

A controller to control the temperature of the gas introduced into the interior of the electronic device.

Wherein the heater heating the gas injected into the electronic device heats the gas to at least approximately 90 degrees F. and at most approximately 140 degrees F.

A controller connected to the evacuation pump and to the heater, the controller controlling removal of moisture from the electronic device by controlling the evacuation pump to decrease pressure within the low pressure chamber and controlling operation of the heater to add heat to the electronic device.

Wherein the controller connected to the evacuation pump controls the evacuation pump to decrease pressure within the low pressure chamber to at least approximately 28 inches of Hg below the pressure outside the chamber.

Wherein the gas injector introduces gas into the interior of the electronic device when the evacuation pump has decreased the pressure within the low pressure chamber below ambient conditions.

Wherein the gas injector introduces gas into the interior of the electronic device while the evacuation pump is decreasing pressure within the low pressure chamber.

Wherein the gas injector introduces gas at a pressure above the pressure outside the low pressure chamber.

Wherein the gas injector is configured and adapted to introduce air into the electronic device at a rate of at least approximately 0.5 cubic feet per minute and at most approximately 2.5 cubic feet per minute.

In some embodiments, a method comprises placing a portable electronic device that has been rendered at least partially inoperable due to moisture intrusion into a low-pressure chamber; heating the electronic device; decreasing pressure within the low-pressure chamber; removing moisture from the interior of the portable electronic device to the exterior of the portable electronic device; increasing pressure within the low-pressure chamber after said decreasing pressure, the step of increasing further comprising: measuring the relative humidity within the low-pressure chamber; and increasing pressure after the relative humidity has decreased and the rate of decrease of the relative humidity has slowed; equalizing the pressure within the low-pressure chamber with the pressure outside the low-pressure chamber; and removing the portable electronic device from the low-pressure chamber.

In some embodiments, said placing includes placing the portable electronic device on a platen, and said heating includes heating the platen to at least approximately 110 deg. F. and at most approximately 120 deg. F.

In some embodiments, said decreasing pressure includes decreasing the pressure to at least approximately 28 inches of Hg below the pressure outside the chamber.

In some embodiments, said decreasing pressure includes decreasing the pressure to at least approximately 30 inches of Hg below the pressure outside the chamber.

In some embodiments, said placing includes placing the portable electronic device on a platen, heating includes heating the platen to at least approximately 110 deg. F. and at most approximately 120 deg. F., and said decreasing pressure includes decreasing the pressure to at least approximately 28 inches of Hg below the pressure outside the chamber.

In some embodiments, said decreasing pressure and increasing pressure are repeated sequentially before said removing the portable electronic device.

In some embodiments, the method further comprises automatically controlling said repeated decreasing pressure and increasing pressure according to at least one predetermined criterion.

In some embodiments, the method further comprises detecting when a sufficient amount of moisture has been removed from the electronic device; and stopping the repeated decreasing pressure and increasing pressure after said detecting.

In some embodiments, the method further comprises decreasing pressure within the low-pressure chamber using a pump; and removing moisture from the gas being drawn from the chamber with the pump prior to the gas reaching the pump.

In some embodiments, said removing moisture includes removing moisture using a desiccator containing desiccant.

In some embodiments, the method further comprises removing moisture from the desiccant.

In some embodiments, the method further comprises isolating the desiccant from the pump prior to said removing moisture from the desiccant.

In some embodiments, the method further comprises disinfecting the electronic device.

In some embodiments, the method further comprises detecting when a sufficient amount of moisture has been removed from the electronic device.

In some embodiments, an apparatus is provided. The apparatus comprises a low-pressure chamber defining an interior, the low-pressure chamber having an interior sized and configured for placement of an electronic device in the interior and removal of an electronic device from the interior; an evacuation pump connected to the chamber; a heater connected to the chamber; and a controller connected to the evacuation pump and to the heater, the controller controlling removal of moisture from the electronic device by controlling the evacuation pump to decrease pressure within the low-pressure chamber and controlling operation of the heater to add heat to the electronic device.

In some embodiments, the controller controls the evacuation pump to decrease pressure within the low-pressure chamber multiple times, and wherein the pressure within the low-pressure chamber increases between successive decreases in pressure.

In some embodiments, the apparatus further comprises a humidity sensor connected to the low-pressure chamber and the controller, wherein the controller controls the evacuation pump to at least temporarily stop decreasing pressure within the low-pressure chamber based at least in part on signals received from the humidity sensor.

In some embodiments, the controller controls the evacuation pump to at least temporarily stop decreasing pressure within the low-pressure chamber when a rate at which the relative humidity changes decreases or is approximately zero.

In some embodiments, the humidity sensor detects maximum and minimum values of relative humidity as the evacuation pump decreases pressure within the low-pressure chamber multiple times, and wherein the controller determines that the device is dry when the difference between successive maximum and minimum relative humidity values is equal to or less than a predetermined value.

In some embodiments, the apparatus further comprises a humidity sensor connected to the low-pressure chamber and the controller, wherein the controller controls the evacuation pump to begin decreasing pressure within the low-pressure chamber when the rate at which relative humidity changes either decreases or is approximately zero.

In some embodiments, the apparatus further comprises a valve connected to the low-pressure chamber and the controller, wherein the pressure within the low-pressure chamber increases between successive decreases in pressure at least in part due to the controller controlling the valve to increase pressure.

In some embodiments, the controller controls the valve to increase pressure within the low-pressure chamber at the same time the controller controls the evacuation pump to stop decreasing pressure within the low-pressure chamber.

In some embodiments, the controller controls a valve to equalize pressure between the interior of the low-pressure chamber and the outside of the low-pressure chamber.

In some embodiments, the apparatus further comprises a temperature sensor connected to the heater and the controller, wherein the controller controls the heater to maintain a predetermined temperature based at least in part on signals received from the pressure sensor.

In some embodiments, the apparatus further comprises a pressure sensor connected to the low-pressure chamber and the controller, wherein the controller controls the evacuation pump to at least temporarily stop decreasing pressure within the low-pressure chamber based at least in part on signals received from the pressure sensor.

In some embodiments, the heater includes a platen with which the electronic device is in direct contact during removal of moisture from the electronic device.

In some embodiments, the apparatus further comprises a sterilizing member connected to the chamber, the sterilizing member being configured and adapted to kill germs on an electronic device positioned within the chamber.

In some embodiments, another apparatus is provided. The apparatus comprises means for conductively heating an electronic device; means for reducing the pressure within the electronic device; and means for detecting when a sufficient amount of moisture has been removed from the electronic device.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Exemplary embodiments have been shown and described, and all changes and modifications that come within the spirit of the invention are desired to be protected.

Any transmission, reception, connection, or communication may occur using any short-range (e.g., Bluetooth, Bluetooth Low Energy, near field communication, Wi-Fi Direct, etc.) or long-range communication mechanism (e.g., Wi-Fi, cellular, etc.). Additionally or alternatively, any transmission, reception, connection, or communication may occur using wired technologies. Any transmission, reception, or communication may occur directly between systems or indirectly via one or more systems.

The term signal, signals, data, or information may refer to a single signal or multiple signals. Any reference to a signal may be a reference to an attribute of the signal, and any reference to a signal attribute may refer to a signal associated with the signal attribute. As used herein, the term “real-time” or “dynamically” in any context may refer to any of current, immediately after, simultaneously as, substantially simultaneously as, a few microseconds after, a few milliseconds after, a few seconds after, a few minutes after, a few hours after, a few days after, a period of time after, etc. In some embodiments, any operation used herein may be interchangeably used with the term “transform” or “transformation.”

The present disclosure provides several important technical advantages that will be readily apparent to one skilled in the art from the figures, descriptions, and claims. Moreover, while specific advantages have been enumerated above, various embodiments may include all, some, or none of the enumerated advantages. Any sentence or statement in this disclosure may be associated with one or more embodiments. Reference numerals are provided in the specification for the first instance of an element that is numbered in the figures. In some embodiments, the reference numerals for the first instance of the element are also applicable to subsequent instances of the element in the specification even though reference numerals may not be provided for the subsequent instances of the element.

While various embodiments in accordance with the disclosed principles have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the “Background” is not to be construed as an admission that technology is prior art to any invention(s) in this disclosure. Neither is the “Summary” to be considered as a characterization of the invention(s) set forth in issued claims. Furthermore, any reference in this disclosure to “invention” in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. A method, comprising:

generating a first air flow, using a pressure-generating device, through a first air channel connecting a drying chamber, the pressure-generating device, and a moisture-reducing device, wherein the drying chamber receives a portable electronic device rendered at least partially inoperable due to moisture intrusion into an interior of the portable electronic device;

removing a first moisture from the interior of the portable electronic device to an exterior of the portable electronic device or to the moisture-reducing device;

determining the first moisture removed from the interior of the portable electronic device to the exterior of the portable electronic device or to the moisture-reducing device;

pausing the generating the first air flow through the first air channel based on the first moisture removed from the interior of the portable electronic device to the exterior of the portable electronic device or to the moisture-reducing device; and generating a second air flow, using the pressure-generating device, after the drying chamber is disconnected from the pressure-generating device and the moisture-reducing device, through a second air channel connecting the moisture-reducing device, the pressure-generating device, a valve, and an evacuation channel, wherein the second air flow removes the first moisture or a second moisture from the moisture-reducing device through the evacuation channel.

2. The method of claim 1, further comprising:

measuring a humidity in the drying chamber; and pausing the generating the first air flow through the first air channel after the humidity decreases.

3. The method of claim 1, further comprising:

measuring a humidity in the drying chamber, wherein the generating the first air flow through the first air channel begins after the humidity increases.

4. The method of claim 1, further comprising:

measuring a first humidity and a second humidity in the drying chamber, wherein the generating the first air flow through the first air channel is paused after a difference between the first humidity and the second humidity is less than or equal to a first tolerance.

5. The method of claim 1 further comprising, measuring a humidity in the drying chamber, wherein the generating the first air flow through the first air channel is paused based on the humidity in the drying chamber reaching a first value.

6. The method of claim 1, further comprising:

regenerating the moisture-reducing device, wherein the regenerating comprises heating the moisture-reducing device.

7. The method of claim 1, wherein the generating the first air flow through the first air channel further comprises generating the first air flow using a fan.

8. The method of claim 1, wherein the removing the first moisture from the portable electronic device to the moisture-reducing device occurs prior to the first air flow completing one cycle within the first air channel.

9. The method of claim 1, wherein the moisture-reducing device further comprises a desiccant.

10. The method of claim 9, further comprising removing a third moisture from the desiccant.

11. The method of claim 10, further comprising:

isolating the desiccant from the drying chamber prior to removing the third moisture from the desiccant.

12. The method of claim 9, further comprising heating the desiccant.

13. The method of claim 12, wherein the heating the desiccant comprises heating the desiccant to at least 200 deg. F. (93.3° C.) and less than or equal to 300 deg. F. (148.9° C.).

14. An apparatus, comprising:

a drying chamber comprising an interior, wherein the interior is configured for placement and removal of an electronic device;

a first air channel, wherein the first air channel connects the drying chamber, a pressure-generating device, and a moisture-reducing device;

a second air channel, wherein the second air channel connects the moisture-reducing device, the pressure-generating device, a valve, and an evacuation channel;

at least one controller connected to the pressure-generating device and to the moisture-reducing device, the at least one controller being configured to:

control the pressure-generating device to generate a first air flow through the first air channel, operate the moisture-reducing device to remove moisture from the drying chamber, control the pressure-generating device to generate the first air flow through the first air channel, and control the pressure-generating device to generate a second air flow through the second air channel;

a moisture-based sensor; and a computing device connected to the moisture-based sensor, wherein the computing device is configured to determine at least one of a first moisture removed from the electronic device or a second moisture remaining in the drying chamber and provide instructions to the at least one controller to modify the generating of the first air flow through the first air channel based on the first moisture or the second moisture.

15. The apparatus of claim 14, wherein the at least one controller is configured to control the pressure-generating device to pause the generating the first air flow through the first air channel based on a rate at which the second moisture remaining in the drying chamber changes.

16. The apparatus of claim 14, wherein the moisture-based sensor determines a humidity in the drying chamber, and the at least one controller is configured to determine whether the electronic device is at least partially dry based on a difference between a first humidity determined in the drying chamber and a second humidity determined in the drying chamber.

17. The apparatus of claim 14, wherein the at least one controller is configured to control the moisture-reducing device to maintain a first humidity in the first air flow based on at least one of the first moisture or the second moisture.

18. The apparatus of claim 14, further comprising a heater, wherein the heater is connected to and provides heat to the moisture-reducing device at least when the second air flow is generated through the second air channel.

19. The apparatus of claim 14, wherein the pressure-generating device is a fan, and the moisture-reducing device comprises a desiccant.

20. The apparatus of claim 14, wherein a valve provides the first air channel and the second air channel, wherein the valve is configured to into a first position to provide the first air channel and into a second position to provide the second air channel.

* * * * *